(12) United States Patent
Xu et al.

(10) Patent No.: US 11,664,536 B2
(45) Date of Patent: May 30, 2023

(54) ELECTROLYTES FOR LITHIUM BATTERIES WITH CARBON AND/OR SILICON ANODES

(71) Applicant: Battelle Memorial Institute, Richland, WA (US)

(72) Inventors: Wu Xu, Richland, WA (US); Ji-Guang Zhang, Richland, WA (US); Hao Jia, Richland, WA (US); Xianhui Zhang, Richland, WA (US); Xia Cao, Richland, WA (US); Sujong Chae, Richland, WA (US); Ran Yi, Richland, WA (US); Qiuyan Li, Richland, WA (US); Won-Jin Kwak, Richland, WA (US); Xiaolin Li, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 119 days.

(21) Appl. No.: 17/144,600

(22) Filed: Jan. 8, 2021

(65) Prior Publication Data

US 2021/0218062 A1 Jul. 15, 2021

Related U.S. Application Data

(60) Provisional application No. 63/080,486, filed on Sep. 18, 2020, provisional application No. 62/970,651, (Continued)

(51) Int. Cl.
*H01M 10/0568* (2010.01)
*H01M 10/0525* (2010.01)
(Continued)

(52) U.S. Cl.
CPC ....... *H01M 10/0568* (2013.01); *H01M 4/505* (2013.01); *H01M 4/525* (2013.01);
(Continued)

(58) Field of Classification Search
CPC ......... H01M 10/0568; H01M 10/0567; H01M 10/0569
(Continued)

(56) References Cited

U.S. PATENT DOCUMENTS

| 4,086,403 A | 4/1978 | Whittingham et al. |
| 6,040,191 A | 3/2000 | Sugita et al. |

(Continued)

FOREIGN PATENT DOCUMENTS

| CN | 104900916 A | 9/2015 |
| CN | 106876815 A | 6/2017 |

(Continued)

OTHER PUBLICATIONS

Chalasani et al., "Methylene ethylene carbonate: Novel additive to improve the high temperature performance of lithium ion batteries," *Journal of Power Sources*, (Jun. 15, 2012),vol. 208, pp. 67-73.

(Continued)

*Primary Examiner* — James M Erwin
(74) *Attorney, Agent, or Firm* — Klarquist Sparkman, LLP

(57) ABSTRACT

Electrolytes for lithium ion batteries with carbon-based, silicon-based, or carbon- and silicon-based anodes include a lithium salt; a nonaqueous solvent comprising at least one of the following components: (i) an ester, (ii) a sulfur-containing solvent, (iii) a phosphorus-containing solvent, (iv) an ether, (v) a nitrile, or any combination thereof, wherein the lithium salt is soluble in the solvent; a diluent comprising a fluoroalkyl ether, a fluorinated orthoformate, a fluorinated carbonate, a fluorinated borate, or a combination thereof, wherein the lithium salt has a solubility in the diluent at least 10 times less than a solubility of the lithium salt in the solvent; and an additive having a different composition than
(Continued)

the lithium salt, a different composition than the solvent, and a different composition than the diluent.

**20 Claims, 55 Drawing Sheets
(54 of 55 Drawing Sheet(s) Filed in Color)**

Related U.S. Application Data filed on Feb. 5, 2020, provisional application No. 62/959,051, filed on Jan. 9, 2020.

(51) Int. Cl.
| | |
|---|---|
| *H01M 10/0567* | (2010.01) |
| *H01M 4/525* | (2010.01) |
| *H01M 4/505* | (2010.01) |
| *H01M 10/0569* | (2010.01) |

(52) U.S. Cl.
CPC ............ *H01M 10/0525* (2013.01); *H01M 10/0567* (2013.01); *H01M 10/0569* (2013.01); *H01M 2300/004* (2013.01); *H01M 2300/0034* (2013.01)

(58) Field of Classification Search
USPC ........................................................ 429/324
See application file for complete search history.

(56) References Cited

U.S. PATENT DOCUMENTS

| | | | |
|---|---|---|---|
| 8,815,453 | B1 | 8/2014 | Tsukamoto |
| 10,367,232 | B2 | 7/2019 | Zhang et al. |
| 10,472,571 | B2 | 11/2019 | Zhang et al. |
| 10,854,923 | B2 | 12/2020 | Xu et al. |
| 10,950,895 | B2 | 3/2021 | Oh et al. |
| 2007/0243470 | A1 | 10/2007 | Yamamoto et al. |
| 2010/0209782 | A1 | 8/2010 | Choi et al. |
| 2011/0111308 | A1 | 5/2011 | Halalay et al. |
| 2011/0159329 | A1 | 6/2011 | Tsujikawa et al. |
| 2011/0200855 | A1 | 8/2011 | Yamada et al. |
| 2012/0070730 | A1 | 3/2012 | Yamada et al. |
| 2012/0141883 | A1 | 6/2012 | Smart et al. |
| 2012/0214073 | A1 | 8/2012 | Iwaya et al. |
| 2012/0321940 | A1 | 12/2012 | Kawasaki et al. |
| 2013/0017456 | A1* | 1/2013 | Sugimoto ............ H01M 4/525 429/339 |
| 2014/0038062 | A1 | 2/2014 | Kawakami et al. |
| 2014/0125292 | A1 | 5/2014 | Best et al. |
| 2014/0342249 | A1 | 11/2014 | He et al. |
| 2015/0118581 | A1 | 4/2015 | Takase et al. |
| 2015/0364801 | A1 | 12/2015 | Wijaya et al. |
| 2016/0020489 | A1 | 1/2016 | Rhodes et al. |
| 2016/0190646 | A1 | 6/2016 | Kim et al. |
| 2016/0233549 | A1 | 8/2016 | Tiruvannamalai et al. |
| 2016/0240896 | A1 | 8/2016 | Zhang et al. |
| 2016/0248122 | A1 | 8/2016 | Hwang et al. |
| 2016/0254567 | A1 | 9/2016 | Cai et al. |
| 2016/0294005 | A1 | 10/2016 | Lee et al. |
| 2016/0329567 | A1 | 11/2016 | Lee et al. |
| 2016/0344063 | A1 | 11/2016 | Wonseok et al. |
| 2016/0380314 | A1 | 12/2016 | Yang et al. |
| 2017/0005327 | A1 | 1/2017 | Goodenough |
| 2017/0062829 | A1 | 3/2017 | Ryu et al. |
| 2017/0098858 | A1 | 4/2017 | Kim et al. |
| 2017/0133716 | A1 | 5/2017 | Masuda et al. |
| 2017/0162910 | A1 | 6/2017 | Katou et al. |
| 2017/0331152 | A1 | 11/2017 | Kim et al. |
| 2017/0352908 | A1 | 12/2017 | Noguchi et al. |
| 2018/0115020 | A1 | 4/2018 | Meada |
| 2018/0251681 | A1 | 9/2018 | Zhang et al. |
| 2018/0254524 | A1 | 9/2018 | Zhang et al. |
| 2018/0331393 | A1 | 11/2018 | Cho et al. |
| 2019/0123390 | A1 | 4/2019 | Xu et al. |
| 2019/0140322 | A1 | 5/2019 | Ren et al. |
| 2019/0148775 | A1 | 5/2019 | Zhang et al. |
| 2020/0161706 | A1 | 5/2020 | Cao et al. |

FOREIGN PATENT DOCUMENTS

| | | |
|---|---|---|
| CN | 107978794 | 5/2018 |
| JP | 2000-294281 A | 10/2000 |
| JP | 2002-27022 A | 9/2002 |
| JP | 2012-169138 A | 9/2012 |
| JP | 2017-168347 | 9/2017 |
| KR | 10-2012-0099013 | 9/2012 |
| KR | 10-2019-0050709 | 5/2019 |
| WO | WO 2015/158755 A1 | 10/2015 |
| WO | WO 2016/010090 A1 | 1/2016 |
| WO | WO 2016/207017 A1 | 12/2016 |
| WO | WO 2018/160209 A1 | 9/2018 |

OTHER PUBLICATIONS

Chen et al., "High-Voltage Lithium-Metal Batteries Enabled by Localized High-Concentration Electrolytes," *Advanced Materials*, (2018), 30:1706102, 7 pp.

Ding et al., "Effects of Carbonate Solvents and Lithium Salts on Morphology and Coulombic Efficiency of Lithium Electrode," *Journal of the Electrochemical Society*, (Sep. 4, 2013), 160(10):A1894-A1901.

Doi, et al., "Dilution of Highly Concentrated LiBF4-Propylene Carbonate Electrolyte Solution with Fluoroalkyl Ethers for 5-V LiNi0.5Mn1.5O4 Positive Electrodes," *Journal of the Electrochemical Society*, (Jan. 24, 2017), 164(1): A6412-A6416.

Dokko et al., "Solvate Ionic Liquid Electrolyte for Li-S Batteries," *Journal of the Electrochemical Society*, (Jun. 6, 2013), 160: A1304-A1310.

Extended European Search Report issued in European Application No. 17898487.8, dated Dec. 4, 2020.

Hyung et al., "Flame-retardant additives for lithium-ion batteries," *Journal of Power Sources* (2003) 119-121, 383-387.

International Search Report and Written Opinion issued for International Application No. PCT/US2017/033391 dated Nov. 27, 2017.

International Search Report and Written Opinion issued for International Application No. PCT/US2018/049141 dated Jan. 20, 2019.

International Search Report and Written Opinion issued for International Application No. PCT/US2019/049684 dated Feb. 12, 2020.

International Search Report and Written Opinion issued for International Application No. PCT/US2019/062276 dated Mar. 13, 2020.

International Search Report and Written Opinion issued in International Application No. PCT/US2020/013363 dated May 7, 2020.

Jia et al., "LiPF$_6$ Stabilizer and Transition-Metal Cation Scavenger: A Bifunctional Bipyridine-Based Ligand for Lithium-Ion Battery Application," *Chem of Materials* (2019), 31(11):4025-4033.

Kasnatscheew et al., "Determining oxidative stability of battery electrolytes: validity of common electrochemical stability window (ESW) data and alternative strategies," *Physical Chemistry Chemical Physics* (2017), 19(24):16078-16086.

Lee et al., "A novel flame-retardant additive for lithium batteries," *Electrochemical and Solid-State Letters*, (Dec. 16, 1999), 3(2): 63-65.

Li et al. "Atomic structure of sensitive battery materials and interfaces revealed by cryo-electron microscopy," *Science* 358, 506-510 (2017).

Li et al., "*Li+Desolvation Dictating Lithium-Ion Battery Low-Temperature Performances,*" *ACS Appl. Mater. Interfaces* (2017), 9:18826, 21 pp.

Matsumoto et al., "A highly safe battery with a non-flammable triethyl-phosphate-based electrolyte," *Journal of Power Sources*, (Oct. 2, 2014), vol. 273, pp. 954-958.

Office action issued for U.S. Appl. No. 15/599,298, dated Jan. 18, 2019, 11 pp.

Office Action issued for U.S. Appl. No. 15/788,188, dated Apr. 26, 2019, 17 pp.

Office Action issued for U.S. Appl. No. 16/119,641, dated Feb. 5, 2020, 20 pp.

(56) References Cited

OTHER PUBLICATIONS

Office Action issued for U.S. Appl. No. 16/230,531 dated May 6, 2020, 19 pp.
Qian et al., "High rate and stable cycling of lithium metal anodes," *Nature Communications* (Feb. 20, 2015), pp. 1-9.
Ren et al., "Enabling High-Voltage Lithium-Metal Batteries under Practical Conditions," *Joule 2019*, 3(7):1662-1675.
Shiga et al., "Self-extinguishing electrolytes using fluorinated alkyl phosphates for lithium batteries," *Journal of Materials Chemistry A*, (Feb. 8, 2017), vol. 5, pp. 5156-5162.
Shigematsu et al., "Thermal behavior of charged graphite and LixCoO2 in electrolytes containing alkyl phosphate for lithium-ion cells," *Journal of the Electrochemical Society*, (Jan. 9, 2009), 156(3): A176-A180.
Shim et al., "Electrochemical performance of lithium-ion batteries with triphenylphosphate as a flame-retardant additive," *Journal of Power Sources*, (May 10, 2007), vol. 172, pp. 919-924.
Smart et al., "The evaluation of triphenyl phosphate as a flame retardant additive to improve the safety of lithium-ion battery electrolytes," *ECS Transactions*, (2011), 35(13): pp. 1-11.
Smith et al., "Lithium-ion electrolytes containing flame-retardant additives for increased safety characteristics," *ECS Transactions*, (2009), 16(35): 33-41.
Suo et al., "'Water-in-salt' electrolyte enables high-voltage aqueous lithium-ion chemistries," *Science*, (Nov. 20, 2015), 350(6263): 938-944.
Wang et al., "Nonflammable trimethyl phosphate solvent-containing electrolytes for lithium-ion batteries: I. Fundamental properties," *Journal of the Electrochemical Society*, (Aug. 24, 2001), 148(10): A1058-A1065.
Wang et al., "Nonflammable trimethyl phosphate solvent-containing electrolytes for lithium-ion batteries: II. The use of an amorphous carbon anode." *Journal of the Electrochemical Society*, (Aug. 24, 2001), 148(10): A 1066-A1071.
Wang et al., "Superconcentrated electrolytes for a high-voltage lithium-ion battery," *Nature Communications*, (Jun. 29, 2016), 12032: pp. 1-9.
Wang et al., "Fire-extinguishing organic electrolytes for safe batteries," *Nature Energy*, (Jan. 2018), 3(1): pp. 22-29.

Xiang et al., "Dimethyl methylphosphonate (DMMP) as an efficient flame retardant additive for the lithium-ion battery electrolytes," *Journal of Power Sources*, (May 6, 2007), 173:562-564.
Xu et al., "An attempt to formulate nonflammable lithium ion electrolytes with alkyl phosphates and phosphazenes," *Journal of the Electrochemical Society*, (Apr. 2, 2002), 149(5): A622-A626.
Xu et al., "Nonflammable electrolytes for Li-ion batteries based on a fluorinated phosphate," *Journal of the Electrochemical Society*, (Jul. 2, 2002), 149(8): A 1079-1082.
Xu et al., "Lithium metal anodes for rechargeable batteries," *Energy & Environmental Science*, (2014), 7:513-537.
Yamada et al., "Review—Superconcentrated Electrolytes for Lithium Batteries," *Journal of the Electrochemical Society*, (Oct. 9, 2015), 162(14): A2406-A2423.
Yao et al., "Comparative study of trimethyl phosphite and trimethyl phosphate as electrolyte additives in lithium ion batteries," *Journal of Power Sources*, (2005), 144: 170-175.
Zhang et al., "Tris (2,2,2-trifluoroethyl) phosphite as a co-solvent for nonflammable electrolytes in Li-ion batteries," *Journal of Power Sources*, (2003), 113: 166-172.
Zhang, "Li Metal Anodes and Li Metal Batteries," presented at the 3rd International Forum on Cathode & Anode Materials for Advanced Batteries, (Apr. 14-15, 2017), 21 pp.
Zhang et al. "Advanced Electrolytes for Fast-Charging High-Voltage Lithium-Ion Batteries in Wide-Temperature Range," *Advanced Energy Mater.* (2020), 10: 2000368.
Zheng et al., "Electrolyte additive enabled fast charging and stable cycling lithium metal batteries," *Nature Energy*, (Feb. 27, 2017), 2: 1-8.
Zheng et al., "Localized High Concentration Electrolyte Behavior Near a Lithium-metal Anode Surface," *Journal of Materials Chemistry A.*, (Oct. 14, 2019), vol. 7., No. 43, pp. 25047-25055.
Zhu et al., "Perfluoroalkyl-substituted ethylene carbonates: Novel electrolyte additives for high-voltage lithium-ion batteries," *J. of Power Sources*, (2014), 246:184-191.
International Search Report and Written Opinion, dated Apr. 27, 2021, issued in corresponding International Application No. PCT/US2021/012685, 9 pages.
Office Action, dated Feb. 19, 2021, issued in Chinese Application No. 201880066668.2, and English translation, 15 pages.
Supplemental Search Report dated Nov. 11, 2022, issued in European Application No. 20740852.7, 17 pages.

* cited by examiner

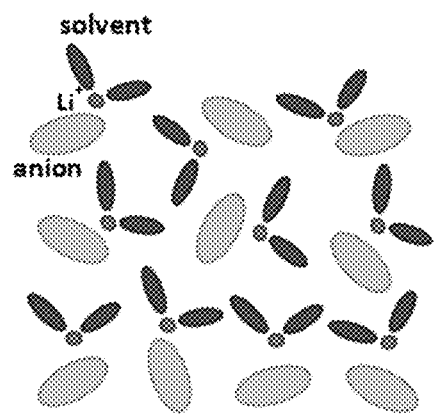
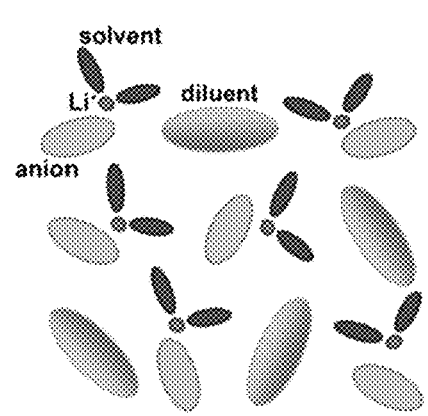
PRIOR ART
FIG. 1A        FIG. 1B
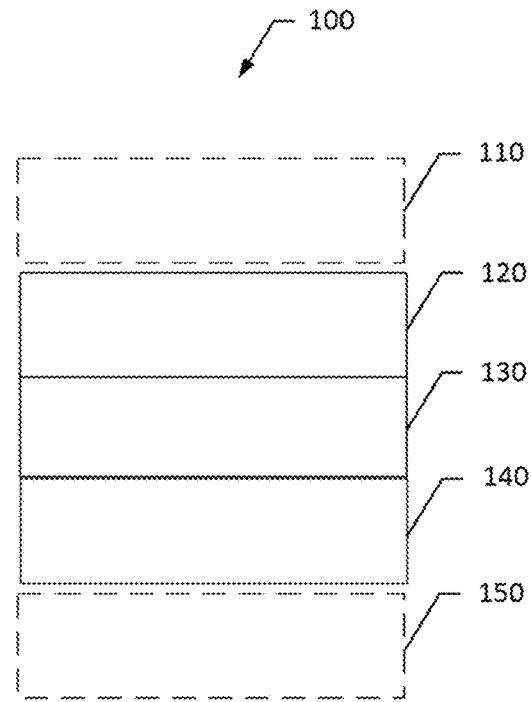
FIG. 2A
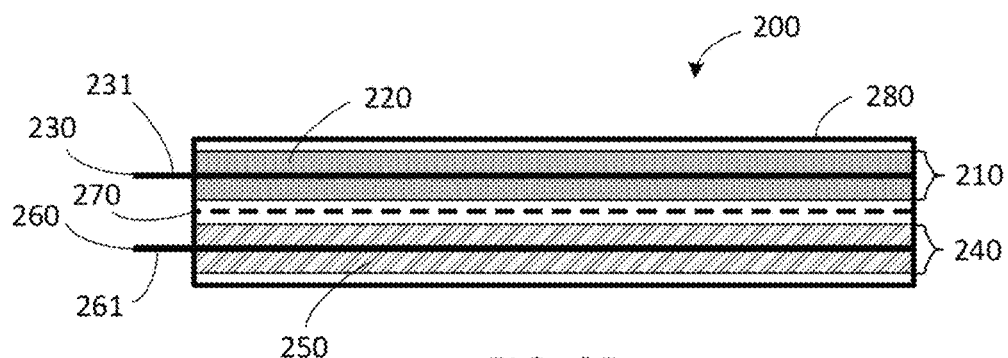
FIG. 2B FIG. 22A 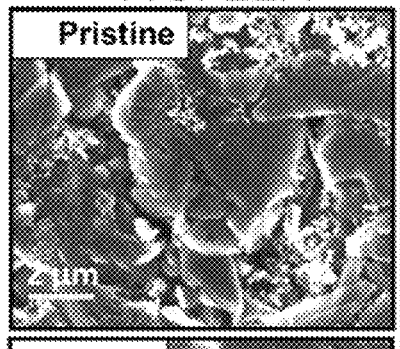 FIG. 22B 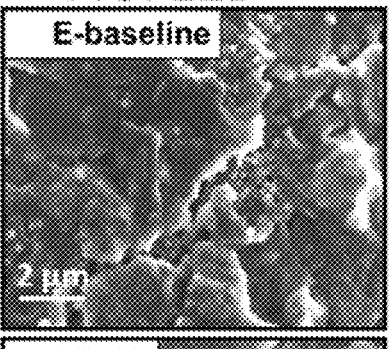 FIG. 22C 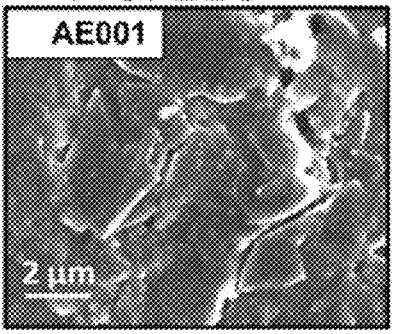
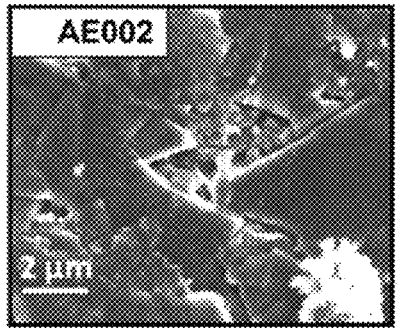 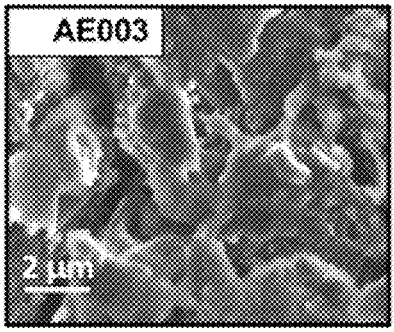
FIG. 22D   FIG. 22E
FIG. 23A 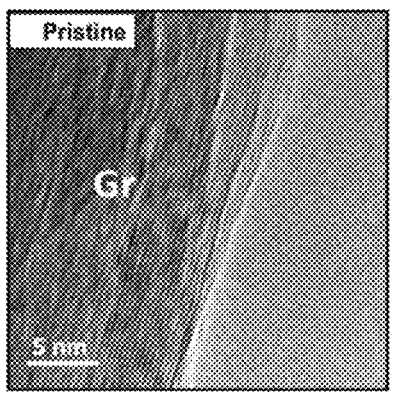 FIG. 23B 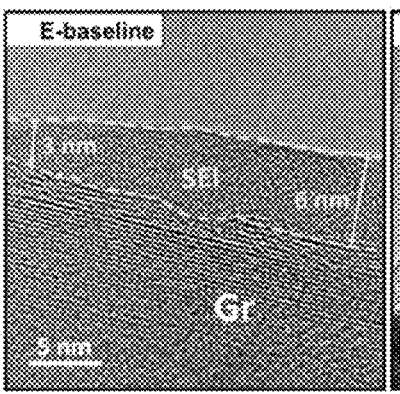 FIG. 23C 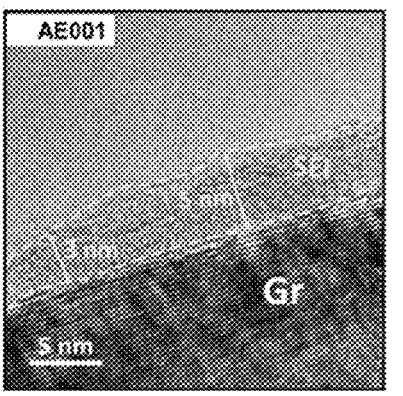
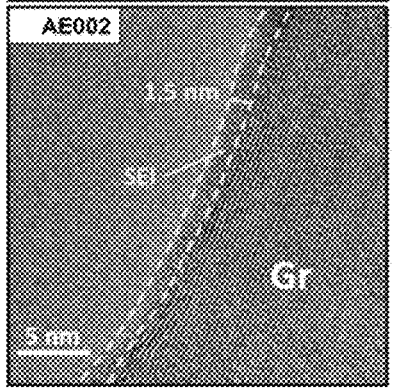 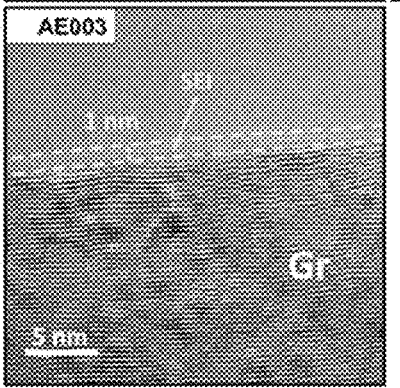
FIG. 23D   FIG. 23E

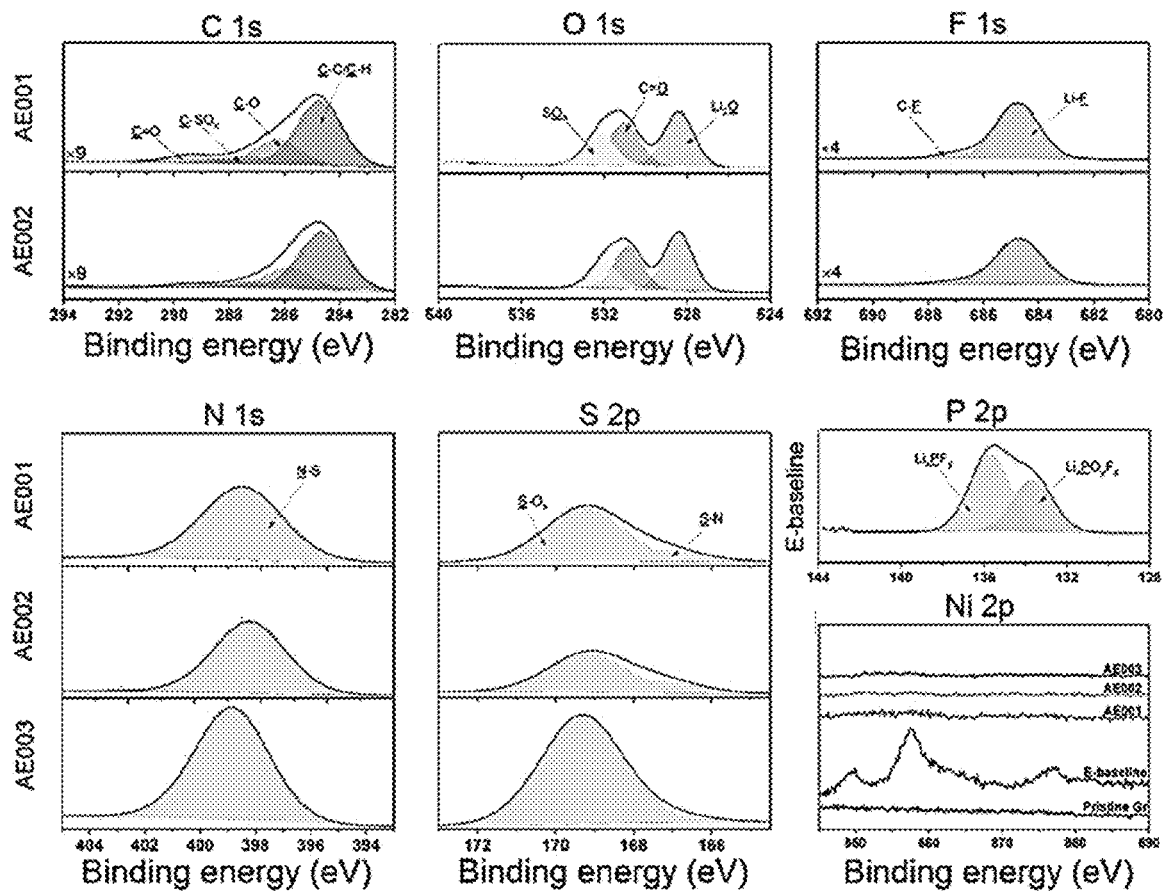
FIG. 26
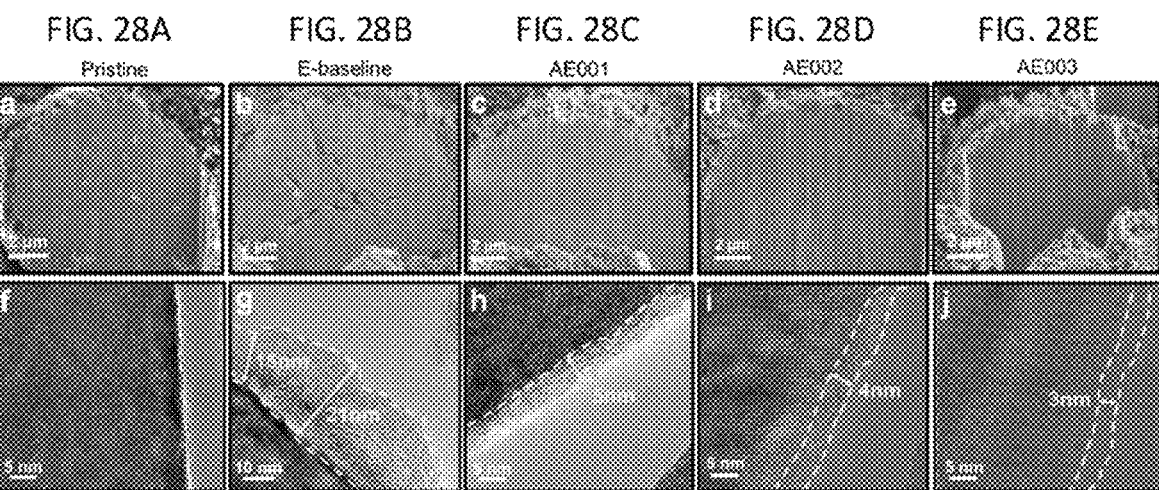

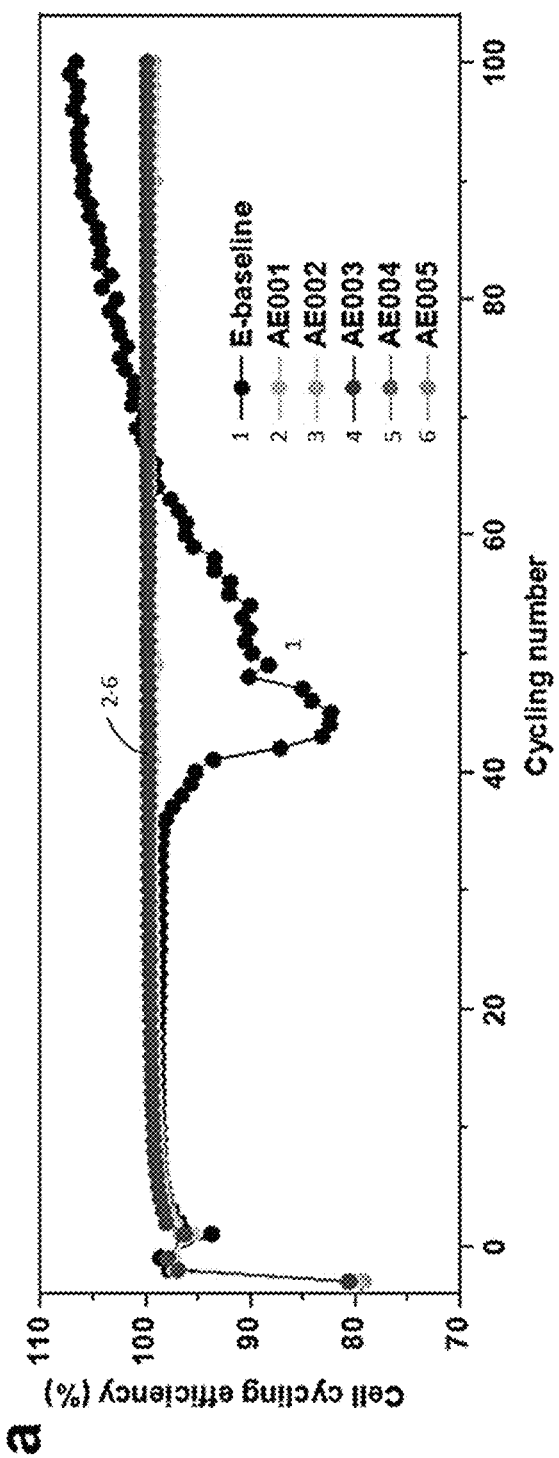
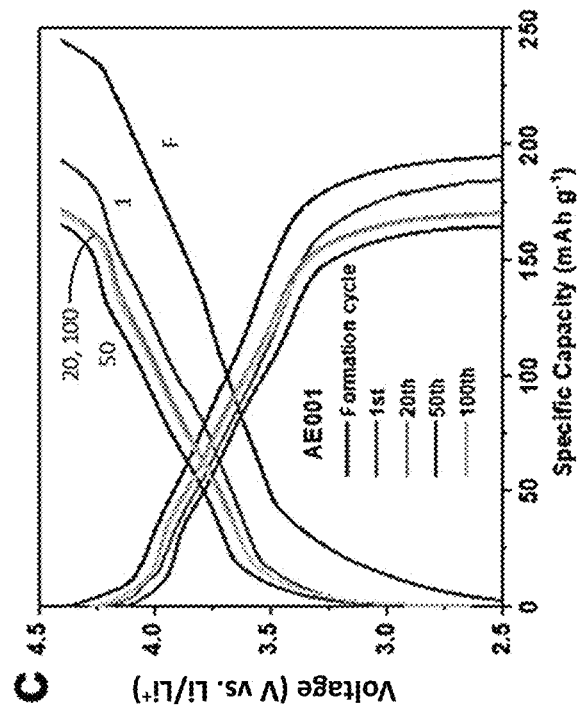
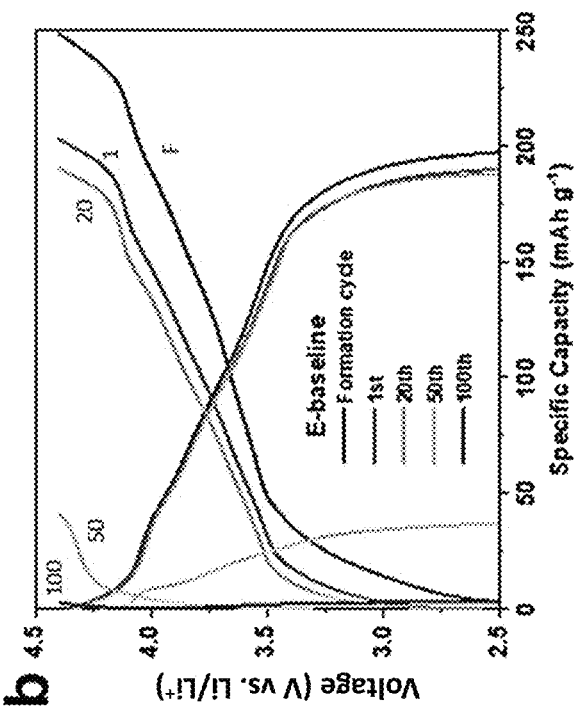
FIG. 35A
FIG. 35B
FIG. 35C

FIG. 61A E-Baseline
FIG. 61B E-DME
FIG. 61C E-DME-E
FIG. 61D E-DME-F
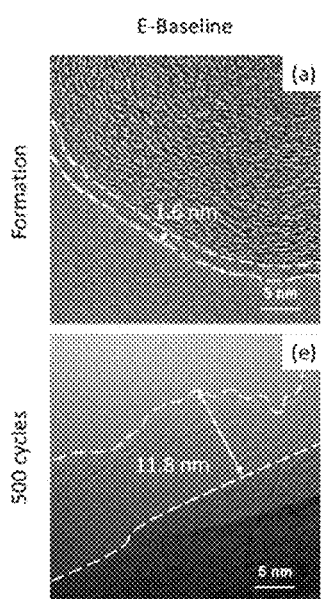 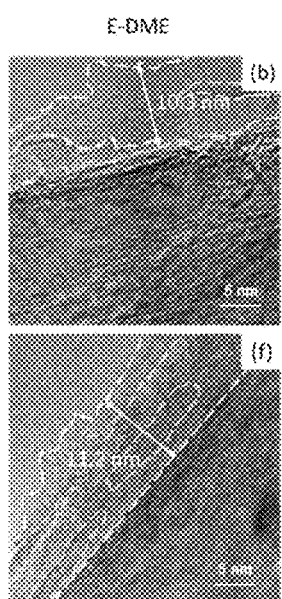 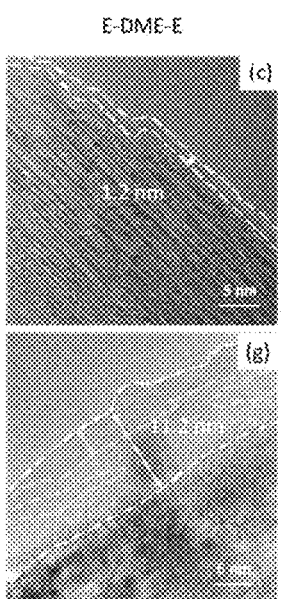 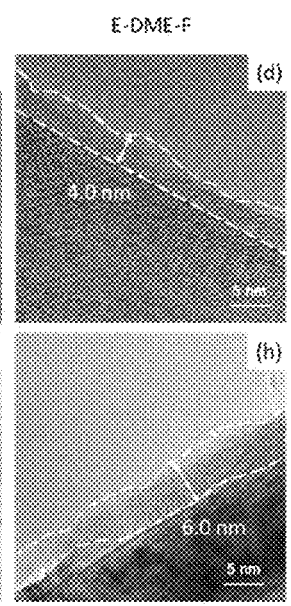
FIG. 61E
FIG. 61F
FIG. 61G
FIG. 61H
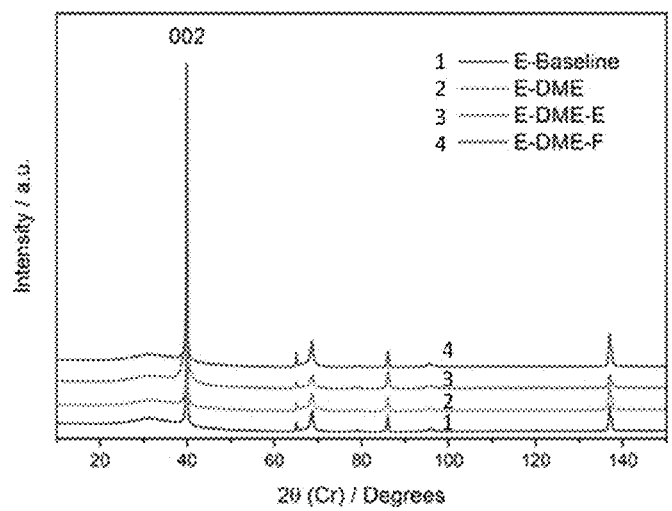
FIG. 62A
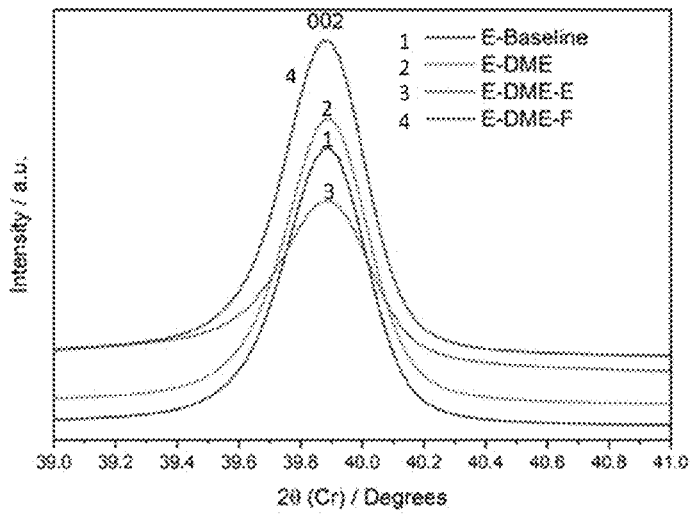
FIG. 62B

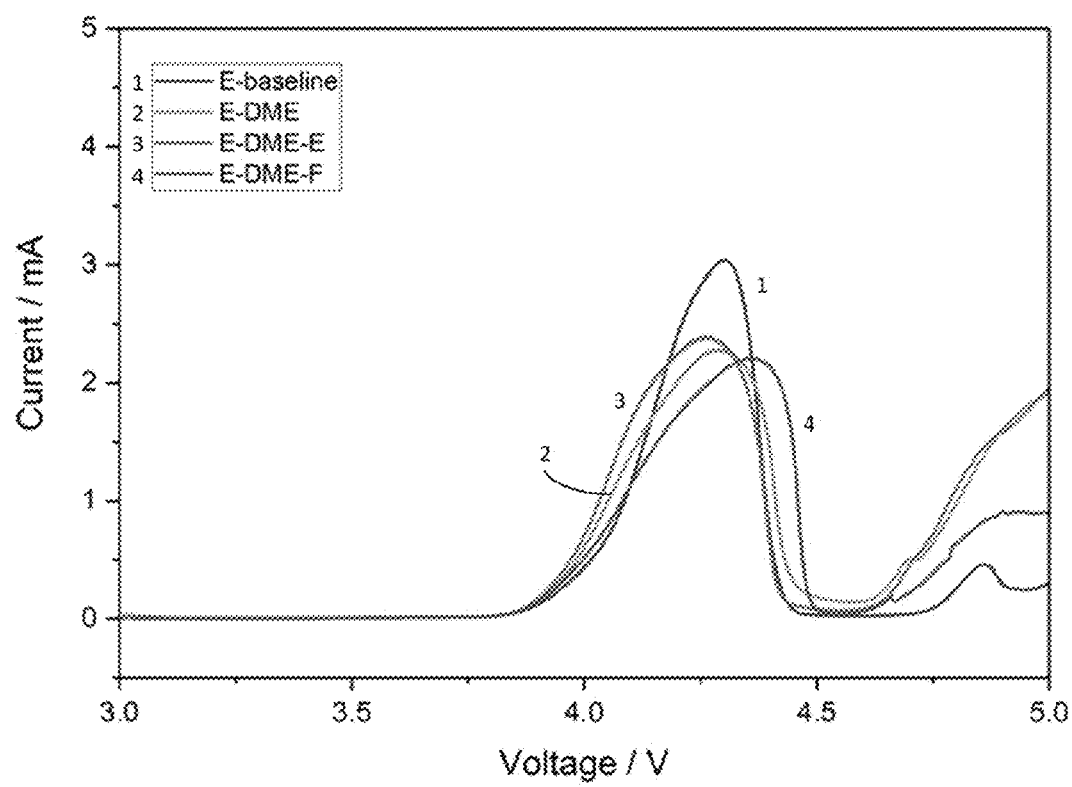
FIG. 63
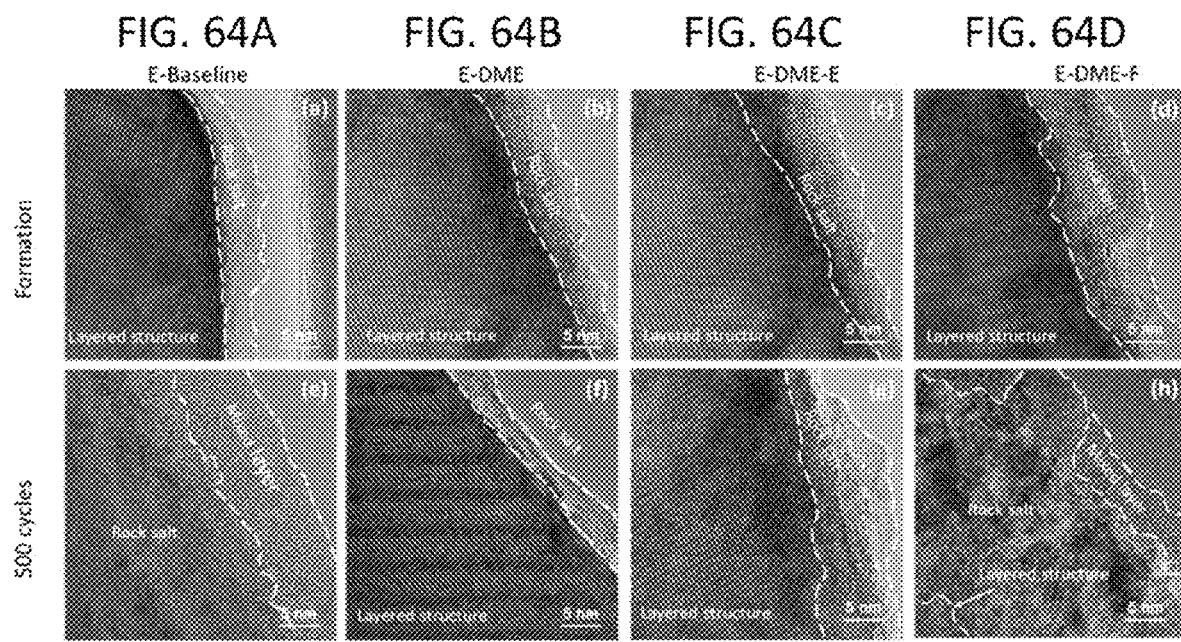
FIG. 64A  FIG. 64B  FIG. 64C  FIG. 64D
FIG. 64E  FIG. 64F  FIG. 64G  FIG. 64H

ELECTROLYTES FOR LITHIUM BATTERIES WITH CARBON AND/OR SILICON ANODES

CROSS REFERENCE TO RELATED APPLICATIONS

This application claims the benefit of the earlier filing dates of U.S. Provisional Application No. 63/080,486, filed Sep. 18, 2020, U.S. Provisional Application No. 62/970,651, filed Feb. 5, 2020, and U.S. Provisional Application No. 62/959,051, filed Jan. 9, 2020, each of which is incorporated by reference herein in its entirety.

ACKNOWLEDGMENT OF GOVERNMENT SUPPORT

This invention was made with Government support under Contract No. DE-AC05-76RL01830 and Award Number DE-EE0008444, both awarded by the U.S. Department of Energy. The Government has certain rights in the invention.

FIELD

This invention is directed to electrolytes for stable cycling of lithium-ion batteries including carbon-based, silicon-based, or carbon/silicon composite-based anodes, and cathodes with intercalation compounds or conversion compounds.

BACKGROUND

Lithium (Li)-ion batteries (LIBs) are indispensable power sources for portable electronic devices, electric vehicles, stationary or grid applications, and the like. However, further efforts on extending the cycle life, rate capability, energy density and working temperature range and improving the safety of LIBs are required to address significant challenges for their large-scale applications. Two of the most feasible and effective approaches to meet the energy density demand are increasing the specific capacity of the intercalation cathodes such as $LiCoO_2$ (LCO) or $LiNi_xMn_yCo_{1-x-y}O_2$ (NMC) and elevating the charge cut-off voltage of the LIBs. Increasing Ni content in NMC cathodes is expected to significantly boost the specific capacity of the NMC cathodes. In addition, elevating the charge cut-off voltage can increase both the specific capacity and the average voltage of the NMC cathodes. By combining these two approaches, the specific energy of the high-Ni NMC based LIBs can be significantly improved. However, the energy increase by these two approaches is usually achieved at the cost of shortened battery lifespan due to the intrinsic structural instability of the cathode material at high charge cut-off voltages (de-lithiation state) (Mao et al., *Advanced Functional Materials* 2019, 29(18): 1900247; Goonetilleke et al., *Chemistry of Materials* 2018, 31(2): 376-386), the continuous electrolyte decomposition at the cathode surface caused by its insufficient thermodynamic stability towards $Ni^{4+}$ at high operation voltages (Zhu et al., *Journal of Power Sources* 2014, 246: 184-191), and the detrimental interactions between cathode materials and anode materials caused by state-of-the-art $LiPF_6$-based electrolytes (Jia et al., *Chemistry of Materials* 2019, 31(11): 4025-4033). The practical application of Ni-rich NMC cathode materials is greatly hindered by the poor cathode-electrolyte interface (CEI) layer formed on such cathode surface in the state-of-the-art electrolytes comprised of lithium hexafluorophosphate ($LiPF_6$) in carbonate solvents, especially at voltages higher than 4.3 V vs. $Li/Li^+$, causing continuous electrolyte oxidative decomposition and other related side reactions such as transition metal dissolution from the cathode surface, thus leading to poor cycling stability, especially at elevated temperatures and high operating voltages. At the same time, the practical application of electrolytes in LIBs must also take into account the electrolyte compatibility with the graphite (Gr)- and/or silicon (Si)-based anodes through the formation of high quality solid electrolyte interface (SEI) films. A need exists for electrolytes that are stable towards the anode and cathode, are operable over a wide voltage window and a wide temperature range, and enable batteries with desirable specific energy, capacity retention, and/or cycling lifetimes.

SUMMARY

Electrolytes for use in LIBs are disclosed, as well as LIBs including the electrolytes. Embodiments of the disclosed electrolytes include a lithium salt; a nonaqueous solvent comprising at least one of the following components (i) an ester, (ii) a sulfur-containing solvent, (iii) a phosphorus-containing solvent, (iv) an ether, (v) a nitrile, or (vi) any combination thereof, wherein the lithium salt is soluble in the solvent; a diluent comprising at least one of the following components: a fluoroalkyl ether, a fluorinated orthoformate, a fluorinated carbonate, a fluorinated borate, or a combination thereof, wherein the lithium salt has a solubility in the diluent at least 10 times less than a solubility of the lithium salt in the solvent; and an additive having a different composition than the lithium salt, a different composition than the solvent, and a different composition than the diluent. The electrolyte has a lithium salt-solvent-additive-diluent molar ratio of $1:x:y:z$ where $0.5 \leq x \leq 5$, $0 \leq y \leq 1$, and $0.5 \leq z \leq 5$.

In any of the foregoing or following embodiments, the lithium salt may comprise lithium bis(fluorosulfonyl)imide (LiFSI), lithium bis(trifluoromethanesulfonyl)imide (LiTFSI), lithium (fluorosulfonyl)(trifluoromethylsulfonyl) imide (LiFTFSI), lithium bis(pentafluoroethanesulfonyl)imide (LiBETI), lithium trifluoromethanesulfonate (LiTf), lithium bis(oxalato)borate (LiBOB), $LiPF_6$, $LiAsF_6$, $LiBF_4$, $LiCF_3SO_3$, $LiClO_4$, lithium difluoro(oxalato)borate (LiDFOB), LiI, LiBr, LiCl, LiSCN, $LiNO_3$, $LiNO_2$, $Li_2SO_4$, or any combination thereof. In any of the foregoing or following embodiments, the nonaqueous solvent may comprise dimethyl carbonate (DMC), ethyl methyl carbonate (EMC), diethyl carbonate (DEC), ethylene carbonate (EC), propylene carbonate (PC), difluoroethylene carbonate (DFEC), trifluoroethylene carbonate (TFEC), trifluoropropylene carbonate (TFPC), methyl 2,2,2-trifluoroethyl carbonate (MFEC), ethyl acetate, ethyl propionate, methyl butyrate, ethyl trifluoroacetate, 2,2,2-trifluoroethyl acetate, 2,2,2-trifluoroethyl trifluoroacetate, dimethyl sulfone (DMS), ethyl methyl sulfone (EMS), ethyl vinyl sulfone (EVS), tetramethylene sulfone (TMS), dimethyl sulfoxide, ethyl methyl sulfoxide, trimethyl phosphate (TMPa), triethyl phosphate (TEPa), tributyl phosphate, triphenyl phosphate, tris(2,2,2-trifluoroethyl) phosphate, bis(2,2,2-trifluoroethyl) methyl phosphate, trimethyl phosphite, triphenyl phosphite, tris(2,2,2-trifluoroethyl) phosphite, dimethyl methylphosphonate, diethyl ethylphosphonate, diethyl phenylphosphonate, bis(2,2,2-trifluoroethyl) methylphosphonate, hexamethylphosphoramide, hexamethoxyphosphazene (cyclo-tris(dimethoxyphosphonitrile), hexamethoxycyclotriphosphazene), hexafluorophosphazene (hexafluorocyclotriphosphazene), 1,2-dimethoxyethane (DME), diethylene glycol dimethyl ether (DEGDME, or diglyme), triethylene glycol dimethyl ether (triglyme), tetraethylene glycol dimethyl ether (tetraglyme), 1,3-dioxolane (DOL), allyl ether, acetonitrile, propionitrile, or any combination thereof. In any of the foregoing or following embodiments, the additive may comprise EC, FEC, VC, 4-vinyl-1,3-dioxolan-2-one (VEC), 4-methylene-1,3-dioxolan-2-one (4-methylene ethylene carbonate (MEC)), 4,5-dimethylene-1,3-dioxolan-2-one, 4-vinyl-1,3-dioxolan-2-one, prop-1-ene-1,3-sultone (PES), 1,3,2-dioxathiolane-2-oxide, 1,3,2-dioxathiolane-2,2-dioxide, 1,3,2-dioxathiane-2,2-dioxide (DTD), lithium 2-trifluoromethyl-4,5-dicyanoimidazole (LiTDI), lithium difluoro(oxalate)borate (LiDFOB, if not used as a lithium salt), lithium hexafluorophosphate, 3-methyl-,4,2-dixoazol-5-one (MDO), tris(2,2,2-trifluoroethyl) phosphite (TTFEPi), 2-oxo-1,3,2-dioxathiane, butanedinitrile, pentanedinitrile, hexanedinitrile, tris(pentafluorophenyl) phosphine, 1-methylsulfonylethene, 1-ethenylsulfonylethene, or any combination thereof. In any of the foregoing or following embodiments, the diluent may comprise 1,1,2,2-tetrafluoroethyl-2,2,3,3-tetrafluoropropyl ether (TTE), bis(2,2,2-trifluoroethyl) ether (BTFE), 1H,1H,5H-octafluoropentyl 1,1,2,2-tetrafluoroethyl ether (OTE), 1,2,2,2-tetrafluoroethyl trifluoromethyl ether, heptafluoroisopropyl methyl ether, tris(2,2,2-trifluoroethyl)orthoformate (TFEO), bis(2,2,2-trifluoroethyl) carbonate, tris(2,2,2-trifluoroethyl) borate, or any combination thereof.

In some embodiments, the nonaqueous solvent comprises DMC, DME, TMS, TMPa, TEPa, or any combination thereof. In certain embodiments, (i) the salt comprises LiFSI; or (ii) the diluent comprises TTE, BTFE, OTE, or any combination thereof; or (iii) the additive comprises EC, FEC, VC, or any combination thereof; or (iv) any combination of (i), (ii), and (iii).

Embodiments of a battery system include an electrolyte as disclosed herein, an anode, and a cathode. The anode may be a carbon-based anode, a Si-based anode, or a anode based on composite of carbon and Si. In some examples, the anode is a Gr-based anode, a Si-based anode, a Si/Gr composite anode comprising 10 wt % to 95 wt % Gr and 5 wt % to 90 wt % Si, or a silicon/carbon composite anode comprising carbon-coated Si with a carbon (C) content of 5 wt % to 55 wt %. In certain examples, the cathode comprises $LiNi_xMn_yCo_zO_2$ where $x \geq 0.6$ or $LiNi_xMg_yTi_{1-x-y}O_2$ where $0.9 \leq x < 1$.

The foregoing and other objects, features, and advantages of the invention will become more apparent from the following detailed description, which proceeds with reference to the accompanying figures.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIGS. 1A and 1B are schematic diagrams of a conventional superconcentrated electrolyte or high concentration electrolyte (HCE) (1A) and a localized superconcentrated electrolyte (LSE) or localized high-concentration electrolyte (LHCE) (1B).

FIGS. 2A and 2B are schematic diagrams of an exemplary rechargeable battery (2A) and a side elevation view of a simplified pouch cell (2B).

FIG. 12A shows the CE with the insets showing the CE values of the three formation cycles and the CEs between 350-450 cycles; FIGS. 12B-12E show the voltage profiles at selected cycles with the baseline electrolyte (12B), AE001 electrolyte (12C), AE002 electrolyte (12D), and AE003 electrolyte (12E).

FIG. 13A shows the CEs of the three formation cycles; FIG. 13B shows the cycling efficiency over 100 cycles; FIGS. 13C-13F show the voltage profiles at selected cycles during cycling with the baseline electrolyte (13C), AE001 electrolyte (13D), AE002 electrolyte (13E), and AE003 electrolyte (13F).

FIG. 15A shows the CE over 100 cycles; FIG. 15B shows the discharge capacity over 100 cycles; FIGS. 15C-15F show the voltage profiles at selected cycles during cycling with the baseline electrolyte (15C), AE001 electrolyte (15D), AE002 electrolyte (15E), and AE003 electrolyte (15F).

FIGS. 22A-22E are scanning electron microscopy images of the pristine Gr anode (22A) and the cycled Gr anodes in E-baseline (22B), AE001 electrolyte (22C), AE002 electrolyte (22D), and AE003 electrolyte (22E) after 100 cycles at 60° C.

FIGS. 23A-23E are high-resolution transmission electron microscopy (HRTEM) images of the pristine Gr anode (23A) and the cycled Gr anodes in E-baseline (23B), AE001 electrolyte (23C), AE002 electrolyte (23D), and AE003 electrolyte (23E) after 100 cycles at 60° C.

FIG. 26 shows XPS spectra of SEI components on cycled Gr anodes after 100 cycles at 60° C. in the E-baseline, AE001, AE002, and AE003 electrolytes.

FIGS. 28A-28J are cross-sectional FIB/SEM images of NMC811 particles (28A-28E) and HRTEM images of the CEI layer morphologies on NMC811 cathodes (28F-28J) cycled in the E-baseline, AE001, AE002, and AE003 electrolytes.

FIGS. 35A-35G show the long-term cycling performance of Gr∥NMC811 coin cells with E-baseline, AE001, AE002, AE003, AE004, and AE005 electrolytes at C/3 rate in the voltage range of 2.5-4.4 V at 60° C., with three formation cycles performed at 25° C.: the Coulombic efficiency (CE) during the long-term cycling (35A); the voltage profiles at selected cycles during cycling (35B-35G).

FIGS. 61A-61H are TEM images showing morphologies of SEIs formed on Gr particles after 3 formation cycles (61A-61D, respectively) and 500 charge/discharge cycles (61E-61H, respectively) in the baseline, E-DME, E-DME-E, and E-DME-F electrolytes.

FIGS. 62A-62B show XRD patterns of Gr particles retrieved from Gr electrodes after 500 charge/discharge cycles in the baseline, E-DME, E-DME-E, and E-DME-F electrolytes.

FIG. 63 shows anodic stability voltages of the baseline, E-DME, E-DME-E, and E-DME-F electrolytes determined by LSV.

FIGS. 64A-64H are TEM images showing morphologies of NMC811 particles after 3 formation cycles (64A-64D, respectively) and 500 charge/discharge cycles (64E-64H, respectively) in the baseline, E-DME, E-DME-E, and E-DME-F electrolytes.

DETAILED DESCRIPTION

Figure 3:
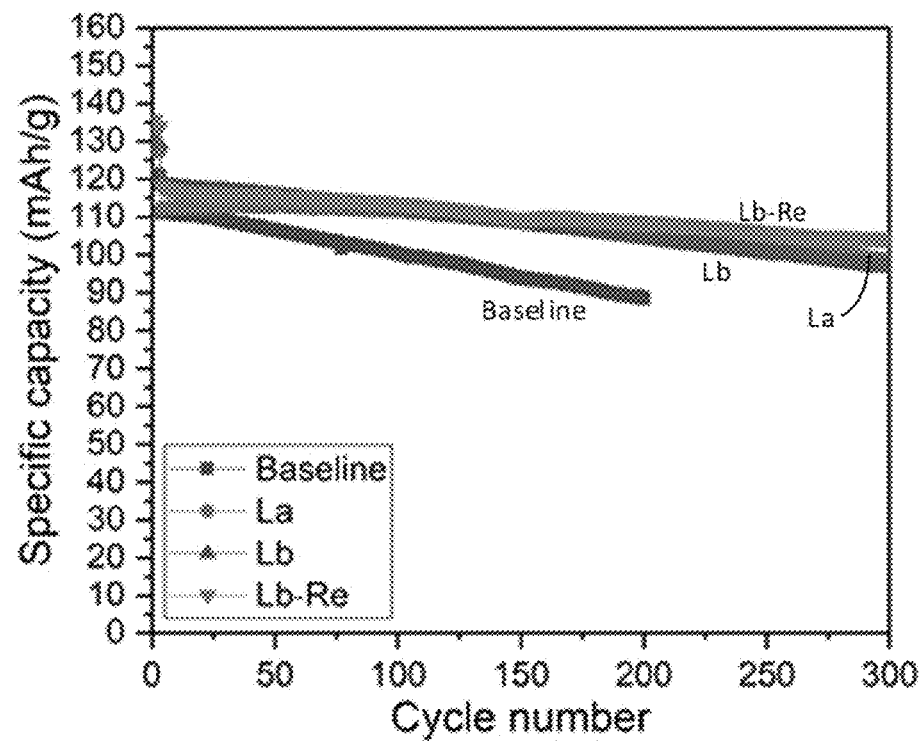
FIG. 3 is a graph showing the capacity retention of Si/Gr‖NMC532 cells with a baseline electrolyte and several DMC-based localized high-concentration electrolytes (LHCEs, La and Lb) disclosed herein, and cycled between an operating voltage window of 3 V to 4.1 V for 300 cycles.

This disclosure concerns embodiments of localized super-concentrated electrolytes (LSEs), or localized high-concentration electrolytes (LHCEs), for use in systems, such as LIB systems. Systems including the LHCEs are also disclosed. Some embodiments of the disclosed LHCEs are stable in electrochemical cells with silicon-based, carbon/silicon-based, or carbon-based (e.g., graphite- and/or hard carbon-based) anodes and various cathode materials. The LHCEs comprise a lithium salt, a nonaqueous solvent in which the lithium salt is soluble, a diluent in which the lithium salt is insoluble or poorly soluble, and an additive having a different composition than the lithium salt, a different composition than the solvent, and a different composition than the diluent. The LHCE has a lithium salt-solvent-additive-diluent molar ratio of 1:x:y:z where $0.5 \leq x \leq 5$, $0 \leq y \leq 1$, and $0.5 \leq z \leq 5$.

I. DEFINITIONS AND ABBREVIATIONS

The following explanations of terms and abbreviations are provided to better describe the present disclosure and to guide those of ordinary skill in the art in the practice of the present disclosure. As used herein, "comprising" means "including" and the singular forms "a" or "an" or "the" include plural references unless the context clearly dictates otherwise. The term "or" refers to a single element of stated alternative elements or a combination of two or more elements, unless the context clearly indicates otherwise.

Unless explained otherwise, all technical and scientific terms used herein have the same meaning as commonly understood to one of ordinary skill in the art to which this disclosure belongs. Although methods and materials similar or equivalent to those described herein can be used in the practice or testing of the present disclosure, suitable methods and materials are described below. The materials, methods, and examples are illustrative only and not intended to be limiting. Other features of the disclosure are apparent from the following detailed description and the claims.

Unless otherwise indicated, all numbers expressing quantities of components, molecular weights, molarities, voltages, capacities, and so forth, as used in the specification or claims are to be understood as being modified by the term "about." Accordingly, unless otherwise implicitly or explicitly indicated, or unless the context is properly understood by a person of ordinary skill in the art to have a more definitive construction, the numerical parameters set forth are approximations that may depend on the desired properties sought and/or limits of detection under standard test conditions/methods as known to those of ordinary skill in the art. When directly and explicitly distinguishing embodiments from discussed prior art, the embodiment numbers are not approximates unless the word "about" is recited.

Although there are alternatives for various components, parameters, operating conditions, etc. set forth herein, that does not mean that those alternatives are necessarily equivalent and/or perform equally well. Nor does it mean that the alternatives are listed in a preferred order unless stated otherwise.

Definitions of common terms in chemistry may be found in Richard J. Lewis, Sr. (ed.), *Hawley's Condensed Chemical Dictionary*, published by John Wiley & Sons, Inc., 2016 (ISBN 978-1-118-13515-0).

In order to facilitate review of the various embodiments of the disclosure, the following explanations of specific terms are provided:

Active salt: As used herein, the term "active salt" refers to a salt that constitutes at least 5% of the redox active materials participating in redox reactions during battery cycling after initial charging.

Additive: As used herein, the term "additive" refers to a component of an electrolyte that is present in an amount of greater than zero and less than or equal to 10 wt % or less than or equal to 20 mol %.

Anode: An electrode through which electric charge flows into a polarized electrical device. From an electrochemical point of view, negatively-charged anions move toward the anode and/or positively-charged cations move away from it to balance the electrons leaving via external circuitry. In a discharging battery or galvanic cell, the anode is the negative terminal where electrons flow out. If the anode is composed of a metal, electrons that it gives up to the external circuit are accompanied by metal cations moving away from the electrode and into the electrolyte. When the battery is recharged, the anode becomes the positive terminal where electrons flow in and metal cations are reduced. Unless otherwise specified, the term "anode" as used herein, refers to the negative electrode or terminal where electrons flow out during discharge.

BTFE: bis(2,2,2-trifluoroethyl)ether

Capacity: The capacity of a battery is the amount of electrical charge a battery can deliver. The capacity is typically expressed in units of mAh, or Ah, and indicates the maximum constant current a battery can produce over a period of one hour. For example, a battery with a capacity of 100 mAh can deliver a current of 100 mA for one hour or a current of 5 mA for 20 hours. The term specific capacity refers to capacity per unit of mass. In this application, the mass specifically refers to the mass of the active material in the electrodes. Specific capacity may be expressed in units of mAh/g. The term specific areal capacity refers to capacity per unit of area of the electrode or active material. Specific areal capacity may be expressed in units of mAh/cm$^2$.

Carbon- and silicon-based anode/negative electrode: A majority of the total anode mass is carbon (e.g., hard carbon, graphite) and silicon, such as at least 70 wt %, at least 80 wt %, or at least 90 wt % carbon and silicon.

Carbon/silicon composite: As used herein, the term carbon/silicon composite refers to a material including both carbon (such as graphite and/or hard carbon) and silicon. A composite material is made from two or more constituent materials that, when combined, produce a material with characteristics different than those of the individual components. Carbon/silicon composites may be prepared, for example, by pyrolysis of pitch embedded with graphite and silicon powders (see, e.g., Wen et al., *Electrochem Comm* 2003, 5(2):165-168).

Cathode: An electrode through which electric charge flows out of a polarized electrical device. From an electrochemical point of view, positively charged cations invariably move toward the cathode and/or negatively charged anions move away from it to balance the electrons arriving from external circuitry. In a discharging battery or galvanic cell, the cathode is the positive terminal, toward the direction of conventional current. This outward charge is carried internally by positive ions moving from the electrolyte to the positive cathode, where they may be reduced. When the battery is recharged, the cathode becomes the negative terminal where electrons flow out and metal atoms (or cations) are oxidized. Unless otherwise specified, the term "cathode" as used herein, refers to the positive electrode during discharge.

Cathode electrolyte interphase (CEI) layer: A passivation layer comprising electrolyte decomposition products formed on the cathode of lithium-ion batteries during the first few cycles.

Cell: As used herein, a cell refers to an electrochemical device used for generating a voltage or current from a chemical reaction, or the reverse in which a chemical reaction is induced by a current. A battery includes one or more cells. The terms "cell" and "battery" are used interchangeably when referring to a battery containing only one cell.

Consists essentially of: By "consists essentially of" is meant that the electrolyte does not include other components that materially affect the properties of the electrolyte alone or in a system including the electrolyte. Electrolyte properties include, but are not limited to, Coulombic efficiency, cycling stability, voltage window, conductivity, viscosity, volatility, and flammability. For example, the electrolyte does not include any electrochemically active component (i.e., a component (an element, an ion, or a compound) that is capable of forming redox pairs having different oxidation and reduction states, e.g., ionic species with differing oxidation states or a metal cation and its corresponding neutral metal atom) other than the lithium salt in an amount sufficient to affect performance of the electrolyte, and does not include additional solvents, diluents, or additives, besides those listed, in a significant amount (e.g., >1 wt %).

Coulombic efficiency (CE): The efficiency with which charges are transferred in a system facilitating an electrochemical reaction. CE may be defined as the amount of charge exiting the battery during the discharge cycle divided by the amount of charge entering the battery during the charging cycle. CE of Li∥Cu or Na∥Cu cells may be defined as the amount of charge flowing out of the battery during stripping process divided by the amount of charge entering the battery during plating process.

DMC: Dimethyl carbonate

DME: 1,2-Dimethoxyethane

EC: Ethylene carbonate

Electrolyte: A substance containing free ions that behaves as an ionically conductive medium. Electrolytes generally comprise ions in a solution, but molten electrolytes and solid electrolytes also are known.

FEC: Fluoroethylene carbonate

Flame retardant: As used herein, the term "flame retardant" refers to an agent that, when incorporated into an electrolyte in a sufficient amount, renders the electrolyte nonflammable or flame retarded as defined herein.

Flammable: The term "flammable" refers to a material that will ignite easily and burn rapidly. As used herein, the term "nonflammable" means that an electrolyte, will not ignite or burn during operation of an electrochemical device including the electrolyte. As used herein, the terms "flame retarded" and "low flammability" are interchangeable and mean that a portion of the electrolyte may ignite under some conditions, but that any resulting ignition will not propagate throughout the electrolyte. Flammability can be measured by determining the self-extinguishing time (SET) of the electrolyte. The SET is determined by a modified Underwriters Laboratories test standard 94 HB. An electrolyte is immobilized on an inert ball wick cut from glass fibers, such as a ball wick having a diameter of ~0.3-0.5 cm, which is capable of absorbing 0.05-1 g electrolyte. The wick is then ignited, and the time for the flame to extinguish is recorded. The time is normalized against the sample weight. If the electrolyte does not catch flame, the SET is zero and the electrolyte is nonflammable. Electrolytes having an SET of <6 s/g are also considered nonflammable. If the SET is >20 s/g, the electrolyte is considered to be flammable. When the SET is between 6-20 s/g, the electrolyte is considered to be flame retarded or have low flammability.

Fluorinated orthoformate: A fluorinated compound having a general formula

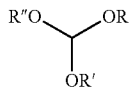

wherein at least one of R, R', and R" is fluoroalkyl and the other two substituents are independently fluoroalkyl or alkyl. The alkyl chains may be linear or branched. R, R', and R" may be the same or may be different from one another. One or more of R, R', and R" may be perfluorinated.

Fluoroalkyl: An alkyl group wherein at least one H atom has been replaced by a F atom. A perfluoroalkyl group is an alkyl group in which all H atoms have been replaced by F atoms.

Fluoroalkyl ether (hydrofluoroether, HFE): As used herein, the terms fluoroalkyl ether and HFE refer to a fluorinated ether having a general formula R—O—R', wherein one of R and R' is fluoroalkyl and the other of R and R' is fluoroalkyl or alkyl. The fluoroalkyl or alkyl chain may be linear or branched. The ether may be partially fluorinated or perfluorinated where each of R and R' is perfluoroalkyl or partially fluorinated alkyl. R and R' may be the same or may be different from one another.

Graphite-based anode/negative electrode: A majority of the total anode mass is graphite, such as at least 70 wt %, at least 80 wt %, or at least 90 wt % graphite.

Graphite- and silicon-based anode/negative electrode: A majority of the total anode mass is graphite and silicon, such as at least 70 wt %, at least 80 wt %, or at least 90 wt % graphite and silicon.

LiBETI: lithium bis(pentafluoroethylsulfonyl)imide
LiDFOB: lithium difluoro(oxalate)borate
LiFSI: lithium bis(fluorosulfonyl)imide
LiFTFSI: lithium (fluorosulfonyl)(trifluoromethylsulfonyl)imide
$LiPF_6$: lithium hexafluorophosphate
LiTDI: lithium 2-trifluoromethyl-4,5-dicyanoimidazole
LiTf: lithium trifluoromethanesulfonate
LiTFSI: lithium bis(trifluoromethylsulfonyl)imide Localized superconcentrated electrolyte (LSE) or localized high-concentration electrolyte (LHCE): As used herein, the terms LSE and LHCE may be used interchangeably and refer to an electrolyte including a lithium salt, a solvent in which the lithium salt is soluble, and a diluent in which the lithium salt is insoluble or poorly soluble. The lithium ions remain associated with solvent molecules after addition of the diluent. The anions are also in proximity to, or associated with, the lithium ions. Thus, localized regions of solvent-cation-anion aggregates are formed. In contrast, the lithium ions and anions are not associated with the diluent molecules, which remain free in the solution. There are few to no free solvent molecules (i.e., most or all solvent molecules are coordinated by lithium salt) in the diluted electrolyte, thereby providing the benefits of a conventional high-concentration electrolyte (e.g., an electrolyte with a salt concentration of at least 3 mol/L or M, molarity) without the associated disadvantages.

Negative electrode: An electrode having a negative potential during charge and discharge of a battery or electrolytic cell.

OTE: 1H,1H,5H-octafluoropentyl 1,1,2,2-tetrafluoroethyl ether

Positive electrode: An electrode having a positive potential during charge and discharge of a battery or electrolytic cell.

Silicon-based anode: A majority of the total anode mass is silicon, such as at least 70 wt %, at least 80 wt %, or at least 90 wt % silicon.

Solid electrolyte interphase (SEI) layer: A passivation layer comprising electrolyte decomposition products formed on the anode of lithium-ion batteries during the first few cycles.

Soluble: Capable of becoming molecularly or ionically dispersed in a solvent to form a homogeneous solution.

TEPa: triethyl phosphate
TFEO: tris(2,2,2-trifluoroethyl)orthoformate
TMPa: trimethyl phosphate
TMS: tetramethylene sulfone
TTE: 1,1,2,2-tetrafluoroethyl-2,2,3,3-tetrafluoropropyl ether
VC: Vinylene carbonate

II. ELECTROLYTES

A conventional high-concentration electrolyte (HCE) comprises a solvent and a salt with a salt concentration of at least 3 M. Some HCEs have a salt concentration of at least 4 M or at least 5 M. In certain instances, the salt molality may be up to 20 m (molality) or more, e.g., aqueous LiTFSI. FIG. 1A is a schematic illustration of a conventional HCE comprising a solvent and a lithium salt. Desirably, all or a large majority of the solvent molecules are coordinated with a lithium cation in the HCE. A reduced presence or absence of free, non-coordinated solvent molecules may increase Coulombic efficiency (CE) of a lithium metal anode and/or reversible insertion of Li-ions into a carbon—(e.g., graphite and/or hard carbon) and/or silicon-based anode, facilitate formation of a stabilized solid electrolyte interphase (SEI)

layer, and/or increase cycling stability of a battery including the electrolyte. However, HCEs have disadvantages, such as high material cost, high viscosity, and/or poor wetting of battery separators and/or electrodes. While dilution with additional solvent can resolve one or more of the disadvantages, dilution results in free solvent molecules and often decreases CE, hinders formation of the stabilized SEI layer, and/or decreases cycling stability of a battery.

FIG. 1B is a schematic illustration of an exemplary "localized high-concentration electrolyte" (LHCE). An LHCE includes a lithium salt, a solvent in which the lithium salt is soluble, and a diluent in which the lithium salt is insoluble or poorly soluble. In some embodiments, the term "soluble" means that the lithium salt has a solubility in the solvent of at least 1 mol/L or at least 1 mol/kg. As shown in FIG. 1B, the lithium ions remain coordinated with solvent molecules after addition of the diluent. The anions are also in proximity to, or coordinated with, the lithium ions. Thus, localized regions of solvent-cation-anion aggregates are formed. In contrast, the lithium ions and anions are not associated with the diluent molecules, which remain free in the solution. Evidence of this electrolyte structure with regions of locally concentrated salt/solvent and free diluent molecules is seen by Raman spectroscopy (e.g., as shown in US 2018/0251681 A1, which is incorporated by reference herein), nuclear magnetic resonance (NMR) characterization, and molecular dynamics (MD) simulations. Thus, although the solution as a whole is less concentrated than the solution of FIG. 1A, there are localized regions of high concentration where the lithium cations are coordinated with the solvent molecules. There are few to no free solvent molecules in the diluted electrolyte, thereby providing the benefits of an HCE without the associated disadvantages.

Conventional electrolytes and conventional HCEs often provide only relatively short cycle life in battery systems with anodes comprising silicon. In some instances, the compatibility of the electrolyte and the silicon-containing anode depends at least in part on the composition of a binder present in the anode. However, certain embodiments of the disclosed LHCEs can resolve some or all of the problems discussed above. In addition to being compatible with silicon-containing anodes, including carbon/silicon composite-based anodes, some embodiments of the disclosed LHCEs also are compatible with carbon-based anodes, such as graphite anodes.

Embodiments of an LHCE as disclosed herein comprise a lithium salt, a nonaqueous solvent in which the lithium salt is soluble, a diluent, wherein the lithium salt has a solubility in the diluent at least 10 times less than a solubility of the lithium salt in the solvent, and an additive having a different composition than the lithium salt, a different composition than the solvent, and a different composition than the diluent. The nonaqueous solvent comprises at least one of the following components: (i) an ester, (ii) a sulfur-containing solvent, (iii) a phosphorus-containing solvent, (iv) an ether, (v) a nitrile, or any combination thereof. In some embodiments, the nonaqueous solvent comprises at least one of the following components (i) a carbonate other than ethylene carbonate (EC), vinylene carbonate (VC), or fluoroethylene carbonate (FEC), (ii) a sulfone, (iii) a flame retardant comprising a phosphorus-containing solvent, (iv) an ether, or any combination thereof. The diluent comprises a fluoroalkyl ether, a fluorinated orthoformate, a fluorinated carbonate, a fluorinated borate, or a combination thereof. In some embodiments, the diluent comprises a fluoroalkyl ether, a fluorinated orthoformate, or a combination thereof. The LHCE has a lithium salt-solvent-additive-diluent molar ratio of 1:x:y:z where $0.5 \leq x \leq 5$, $0 \leq y \leq 1$, and $0.5 \leq z \leq 5$. In some embodiments, the LHCE has a lithium salt-solvent-additive-diluent molar ratio of 1:x:y:z where $0.5 \leq x \leq 3$, $0 \leq y \leq 1$, and $1 \leq z \leq 5$.

The solubility of the lithium salt in the solvent (in the absence of diluent) may be greater than 3 M, such as at least 4 M or at least 5 M. In some embodiments, the solubility and/or concentration of the lithium salt in the solvent is from 3 M to 10 M, such as from 3 M to 8 M, from 4 M to 8 M, or from 5 M to 8 M. In certain embodiments, the concentration may be expressed in terms of molality and the concentration of the lithium salt in the solvent in the absence of diluent) may be from 3 m to 25 m, such as from 5 m to 21 m, or 10 m to 21 m. In contrast, the molar or molal concentration of the lithium salt in the electrolyte as a whole (salt, solvent, diluent, and additive) may be at least 20% less than the molar or molal concentration of the lithium salt in the solvent, such as at least 30% less, at least 40% less, at least 50% less, at least 60% less, or even at least 70% less than the molar or molal concentration of the lithium salt in the solvent. For example, the molar or molal concentration of the lithium salt in the electrolyte may be 20-80% less, 20-70% less, 30-70% less, or 30-50% less than the molar or molal concentration of the lithium salt in the solvent. In some embodiments, the molar concentration of the lithium salt in the electrolyte is within a range of 0.5 M to 6 M, 0.5 M to 3 M, 0.5 M to 2 M, 0.75 M to 2 M, or 0.75 M to 1.5 M.

The lithium salt, or combination of lithium salts, participates in the charge and discharge processes of a cell including the electrolyte. Exemplary lithium salts include, but are not limited to, comprises lithium bis(fluorosulfonyl)imide (LiFSI), lithium bis(trifluoromethanesulfonyl)imide (LiTFSI), lithium (fluorosulfonyl)(trifluoromethylsulfonyl)imide (LiFTFSI), lithium bis(pentafluoroethanesulfonyl)imide (LiBETI), lithium trifluoromethanesulfonate (LiTf), lithium bis(oxalato)borate (LiBOB), $LiPF_6$, $LiAsF_6$, $LiBF_4$, $LiCF_3SO_3$, $LiClO_4$, lithium difluoro(oxalato)borate (LiDFOB), LiI, LiBr, LiCl, LiSCN, $LiNO_3$, $LiNO_2$, $Li_2SO_4$, and combinations thereof. In some embodiments, the salt is LiFSI, LiTFSI, LiBETI, LiTFTSI, LiTf, or a combination thereof. In certain examples, the salt is LiFSI.

The solvent associates with (e.g., solvates or coordinates) lithium cations. When prepared as an HCE comprising the lithium salt and the solvent, solvent-cation-anion aggregates form. Some embodiments of the disclosed HCEs are stable toward anodes (e.g., a carbon- and/or silicon-based anode), cathodes (including ion intercalation and conversion compounds), and/or current collectors [e.g., copper (Cu), aluminum (Al)] that may be unstable when lower concentration electrolytes are used and/or when other solvents are used.

The solvent is a nonaqueous solvent comprising at least one of the following components: (i) an ester, (ii) a sulfur-containing solvent, (iii) a phosphorus-containing solvent, (iv) an ether, (v) a nitrile, or any combination thereof, wherein the lithium salt is soluble in the solvent. In some embodiments, the solvent consists essentially of, or consists of the ester, the sulfone, the phosphorus-containing solvent, the ether, or any combination thereof. The term "consists essentially of" means that the solvent does not include solvents, other than those listed, in any appreciable amount (e.g., >1 wt %). In some embodiments, the nonaqueous solvent comprises at least one of the following components (i) a carbonate other than EC, VC, or FEC, (ii) a sulfone, (iii) a flame retardant comprising a phosphorus-containing solvent, (iv) an ether, or any combination thereof.

Suitable ester solvents include, but are not limited to, carbonate solvents and carboxylate solvents. Suitable carbonate solvents include, but are not limited to, dimethyl carbonate (DMC), ethyl methyl carbonate (EMC), diethyl carbonate (DEC), ethylene carbonate (EC), propylene carbonate (PC), difluoroethylene carbonate (DFEC), trifluoroethylene carbonate (TFEC), trifluoropropylene carbonate (TFPC), methyl 2,2,2-trifluoroethyl carbonate (MFEC), and combinations thereof. In some embodiments, the nonaqueous solvent comprises, consists essentially of, or consists of DMC. Suitable carboxylate solvents include, but are not limited to, ethyl acetate, ethyl propionate, methyl butyrate, ethyl trifluoroacetate, 2,2,2-trifluoroethyl acetate, 2,2,2-trifluoroethyl trifluoroacetate.

Suitable sulfur-containing solvents include, but are not limited to, sulfone solvents and sulfoxide solvents. Suitable sulfone solvents include, but are not limited to, dimethyl sulfone (DMS), ethyl methyl sulfone (EMS), ethyl vinyl sulfone (EVS), tetramethylene sulfone (TMS, also called sulfolane). Suitable sulfoxide solvents include, but are not limited to, dimethyl sulfoxide and ethyl methyl sulfoxide. In some embodiments, the nonaqueous solvent comprises, consists essentially of, or consists of TMS.

Suitable phosphorus-containing compounds include, but are not limited to, organophosphorus compounds (e.g., organic phosphates, phosphites, phosphonates, phosphoramides), phosphazenes, or any combination thereof. Phosphorus-containing compounds are normally flame retardant.

Organic phosphates, phosphites, phosphonates, phosphoramides include substituted and unsubstituted aliphatic and aryl phosphates, phosphites, phosphonates, and phosphoramides. The phosphazenes may be organic or inorganic. Exemplary phosphorus-containing compounds include, e.g., trimethyl phosphate (TMPa), triethyl phosphate (TEPa), tributyl phosphate, triphenyl phosphate, tris(2,2,2-trifluoroethyl) phosphate, bis(2,2,2-trifluoroethyl) methyl phosphate, trimethyl phosphite, triphenyl phosphite, tris(2,2,2-trifluoroethyl) phosphite, dimethyl methylphosphonate, diethyl ethylphosphonate, diethyl phenylphosphonate, bis(2,2,2-trifluoroethyl) methylphosphonate, hexamethylphosphoramide, hexamethoxyphosphazene (cyclo-tris(dimethoxyphosphonitrile), hexamethoxycyclotriphosphazene), hexafluorophosphazene (hexafluorocyclotriphosphazene), and combinations thereof. In some embodiments, the nonaqueous solvent comprises, consists essentially of, or consists of TMPa, TEPa, or a combination thereof.

Suitable ether solvents include, but are not limited to, 1,2-dimethoxyethane (DME), diethylene glycol dimethyl ether (DEGDME, or diglyme), triethylene glycol dimethyl ether (triglyme), tetraethylene glycol dimethyl ether (tetraglyme), 1,3-dioxolane (DOL), allyl ether, and combinations thereof. In some embodiments, the nonaqueous solvent comprises, consists essentially of, or consists of DME.

Suitable nitrile solvents include, but are not limited to, acetonitrile, propionitrile, succinonitrile.

The diluent comprises a fluoroalkyl ether, a fluorinated orthoformate, a fluorinated carbonate, a fluorinated borate, or a combination thereof. In some embodiments, the diluent comprises a fluoroalkyl ether, a fluorinated orthoformate, or a combination thereof. The lithium salt has a solubility in the diluent at least 10 times less than a solubility of the lithium salt in the solvent. For instance, if the salt has a solubility of 5 M in the solvent, the diluent is selected such that the salt has a solubility of less than 0.5 M in the diluent. In some embodiments, the lithium salt has a solubility in the solvent that is at least 10 times, at least 15 times, at least 20 times, at least 25 times, at least 30 times, at least 40 times, or at least 50 times greater than the salt's solubility in the diluent. The diluent is selected to be stable with the anode, cathode, and current collectors at low lithium salt concentrations (e.g., ≤3 M) or even without the lithium salt. In some embodiments, the diluent is selected to have a low dielectric constant (e.g., a relative dielectric constant ≤7) and/or low donor number (e.g., a donor number ≤10). Advantageously, the diluent does not disrupt the solvation structure of solvent-cation-anion aggregates and is considered inert because it is not interacting with the lithium salt. In other words, there is no significant coordination or association between the diluent molecules and the lithium cations. The lithium cations remain associated with solvent molecules. Thus, although the electrolyte is diluted, there are few or no free solvent molecules in the electrolyte.

In any of the foregoing or following embodiments, the diluent may be a fluorinated solvent having a wide electrochemical stability window (e.g., >4.5 V), such as a hydrofluoroether (HFE) (also referred to as a fluoroalkyl ether) or fluorinated orthoformate. HFEs advantageously have low dielectric constants, low donor numbers, reductive stability with the metal of the active salt (e.g., lithium, sodium, potassium, and/or magnesium), and/or high stability against oxidation due to the electron-withdrawing fluorine atoms. Exemplary diluents include, but are not limited to, 1,1,2,2-tetrafluoroethyl-2,2,2,3-tetrafluoropropyl ether (TTE), bis(2,2,2-trifluoroethyl) ether (BTFE), 1,1,2,2,-tetrafluoroethyl-2,2,2-trifluoroethyl ether (TFTFE), 1H,1H,5H-octafluoropentyl 1,1,2,2-tetrafluoroethyl ether (OTE), 1,2,2,2-tetrafluoroethyl trifluoromethyl ether, heptafluoroisopropyl methyl ether, methoxynonafluorobutane (MOFB), ethoxynonafluorobutane (EOFB), tris(2,2,2-trifluoroethyl)orthoformate (TFEO), tris(hexafluoroisopropyl)orthoformate (THFiPO), tris(2,2-difluoroethyl) orthoformate (TDFEO), bis(2,2,2-trifluoroethyl) methyl orthoformate (BTFEMO), tris(2,2,3,3,3-pentafluoropropyl) orthoformate (TPFPO), tris(2,2,3,3-tetrafluoropropyl)orthoformate (TTPO), bis(2,2,2-trifluoroethyl) carbonate, tris(2,2,2-trifluoroethyl) borate, and combinations thereof.

Exemplary Flammable Fluoroalkyl Ethers:

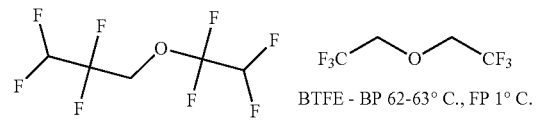

TTE - BP 92° C., FP 27.5° C.

BTFE - BP 62-63° C., FP 1° C.

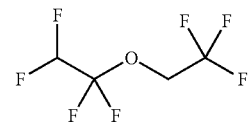

TFTFE - BP 56.7° C., FP n/a

Exemplary Nonflammable Fluoroalkyl Ethers:

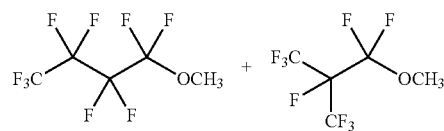

MOFB - mixture of 2 isomers
BP 60° C., autoignition temp. 405° C.

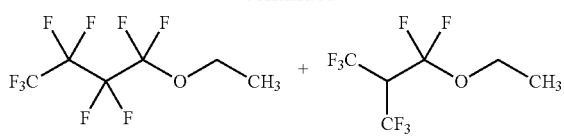

EOFB - mixture of 2 isomers
BP 76° C., autoignition temp. 434° C.

Exemplary Fluorinated Orthoformates:

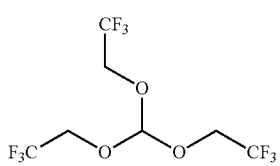

Tris(2,2,2-trifluoroethyl)orthoformate
(TFEO, b.p. 144-146° C., flash point 60° C.)

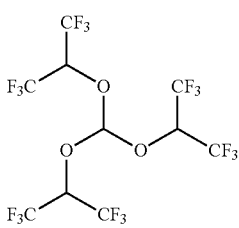

Tris(hexafluoroisopropyl)orthoformate
(THFiPO, b.p. 188 ± 35° C.*)

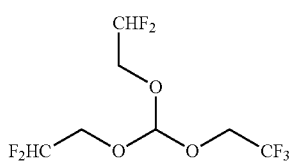

Tris(2,2-difluoroethyl)orthoformate
(TDFEO, b.p. 147 ± 35° C.)

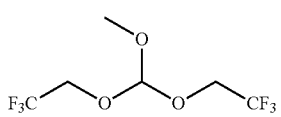

Bis(2,2,2-trifluoroethyl) methyl orthoformate
(BTFEMO, b.p. 119 ± 35° C.)

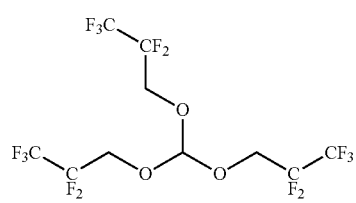

Tris(2,2,3,3,3-pentafluoropropyl)orthoformate
(TPFPO, b.p. 191 ± 35° C.)

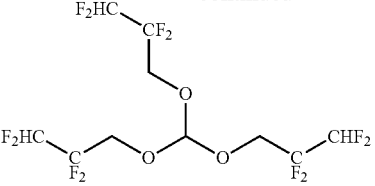

Tris(2,2,3,3-tetrafluoropropyl)orthoformate
(TTPO, b.p. 223° C.)

*Boiling points indicated with ±35° C. are predicted by ChemDraw® software (PerkinElmer)

The diluent may be flammable or nonflammable. In some embodiments, selecting a nonflammable diluent, such as a nonflammable fluoroalkyl ether or fluorinated orthoformate, significantly improves safety of practical rechargeable batteries. In certain embodiments, a flammable diluent may be used when the solvent comprises a flame retardant, such as a phosphorus-containing solvent, in an amount sufficient to render the electrolyte flame retarded or nonflammable. In other embodiments, a flammable diluent may be used when the expected operating conditions of the system are relatively nonhazardous (e.g., a relatively low operating temperature). In some embodiments, the diluent comprises, consists essentially of, or consists of TTE, BTFE, OTE, 1,2,2,2-tetrafluoroethyl trifluoromethyl ether, heptafluoroisopropyl methyl ether, TFEO, bis(2,2,2-trifluoroethyl carbonate), tris(2,2,2-trifluoroethyl) borate, or any combination thereof. In some embodiments, the diluent comprises, consists essentially of, or consists of TTE, BTFE, OTE, TFEO, or any combination thereof. In certain examples, the diluent is TTE.

In some embodiments of the disclosed LHCEs, at least 90%, at least 95%, at least 96%, at least 97%, at least 98%, or at least 99% of the molecules of the solvent are coordinated with lithium cations. In certain embodiments, fewer than 10%, such as fewer than 5%, fewer than 4%, fewer than 3%, or fewer than 2% of the diluent molecules are associated with lithium cations. The degree of coordination can be quantified by any suitable means, such as by calculating the peak intensity ratio of solvent molecules associated with cations and free solvent in Raman spectra or by using NMR spectra.

Embodiment of the disclosed LHCEs further comprise an additive. The additive has a different composition than the lithium salt, a different composition than the solvent, and a different composition than the diluent. In some embodiments, the additive comprises a carbonate, an ether, a sulfite, a sultone (sulfonate ester), a lithium salt, a phosphate, a phosphite, a phosphine, a nitrile, a dioxazolone. Exemplary additives include, but are not limited to, EC (if not used as a solvent), FEC, VC, 4-vinyl-1,3-dioxolan-2-one (vinyl ethylene carbonate, VEC), 4-methylene-1,3-dioxolan-2-one (methylene ethylene carbonate, MEC), 4,5-dimethylene-1,3-dioxolan-2-one (dimethylene ethylene carbonate, DMEC), 1,3,2-dioxathiolan-2-oxide, prop-1-ene-1,3-sultone (PES), 1-methylsulfonylethene (methyl vinyl sulfone, MVS), 1-ethenylsulfonylethene (ethyl vinyl sulfone, EVS), 1,3,2-dioxathiolane-2,2-dioxide, 1,3,2-dioxathiane 2,2-dioxide (DTD), lithium 2-trifluoromethyl-4,5-dicyanoimidazole (LiTDI), lithium bis(oxalato)borate (LiBOB), lithium difluoro(oxalate)borate (LiDFOB), lithium hexafluorophosphate ($LiPF_6$), 3-methyl-1,4,2-dioxazol-5-one (MDO), tris (2,2,2-trifluoroethyl) phosphite) (TTFEPi), 2-oxo-1,3,2-dioxathiane (1,3-propylene sulfite, PS), hexanedinitrile (adiponitrile), butanedinitrile (succinonitrile), pentanedinitrile (glutaronitrile), tris(pentafluorophenyl) phosphine (TPFP). In some embodiments, the additive comprises EC, FEC, VC, or a combination thereof.

The relative amounts of the salt, solvent, diluent, and additive are selected to reduce the cost of materials for the electrolyte, reduce viscosity of the electrolyte, maintain stability of the electrolyte against oxidation at high-voltage cathodes, improve ionic conductivity of the electrolyte, improve wetting ability of the electrolyte (e.g., towards polyolefin separators and electrodes), facilitate formation of an effective SEI layer, or any combination thereof. In general, the electrolyte has a lithium salt-solvent-additive-diluent molar ratio of 1:x:y:z where $0.5 \leq x \leq 5$, $0 \leq y \leq 1$, and $0.5 \leq z \leq 5$. In some embodiments, $0.5 \leq x \leq 3.5$, $0 \leq y \leq 1$, and $1 \leq z \leq 5$. In certain embodiments, $x=0.5-3$, $y=0.01-0.5$, and $z=2-4$. In some implementations, $x=1-2$, $y=0.1-0.5$, and $z=2-4$. In one embodiment, $0.5 < x+y \leq 4.5$. In an independent embodiment, $0.5 < x+y \leq 4$. In another independent embodiment, $1.2 \leq x+y \leq 2.5$. In still another independent embodiment, $0.5 \leq x+y \leq 0.65$ or $1.45 \leq x+y \leq 4.5$. In yet another independent embodiment, $x=0.5-3.5$, $y=0.01-0.8$, and $z=1-4$. In another independent embodiment, $x=1.5-3.0$, $y=0.01-0.8$, and $z=2-4$. In still another independent embodiment, $y=0.15-0.25$ and/or $x+y=2-3$. In yet another embodiment, $x=1.6-2.8$, $y=0.2-0.6$, and $z=3$.

In one embodiment, if the diluent comprises a fluoroalkyl ether and the additive comprises a carbonate, a sulfone, a flame retardant, an ether, or a lithium salt, then x+y is not within a range of from 0.8-1.2, or x+y is not within a range of from 0.7-1.4 or x+y is not within a range of from 0.67-1.43. In an independent embodiment, if the diluent comprises a fluoroalkyl ether, then x+y is not within a range of from 0.8-1.2, or x+y is not within a range of from 0.7-1.4 or x+y is not within a range of from 0.67-1.43. In yet another independent embodiment, if the diluent comprises 1,1,2,2-tetrafluoroethyl-2,2,3,3-tetrafluoropropyl ether (TTE), then $0.5 \leq x+y \leq 0.58$ or $1.2 \leq x+y \leq 4.5$ or $1.4 \leq x+y \leq 4.5$ or $1.45 \leq x+y \leq 4.5$.

In any of the foregoing or following embodiments, the electrolyte may have a lithium salt to solvent molar ratio within a range of 0.4 to 0.7, such as 0.4-0.6 or 0.4-0.5. In any of the foregoing or following embodiments, the electrolyte may have a salt molar concentration of 0.8 M to 1.5 M, such as 1 M to 1.4 M. In any of the foregoing or following embodiments, the electrolyte may have a solvent to diluent molar ratio within a range of 0.3 to 5, such as 0.3-2, 0.3-1, or 0.4-0.6.

In any of the foregoing or following embodiments, the additive may comprise EC, FEC, VC, or a combination thereof, and/or y may be 0.1-0.5, such as 0.1-0.3. In any of the foregoing or following embodiments, the solvent may comprise a carbonate other than EC, FEC, or VC, and the additive may comprise 2 wt % to 10 wt % FEC and 0.1 wt % to 2 wt % VC. In some embodiments, FEC and VC are present in a ratio of 5:1 by weight. In certain embodiment, the electrolyte comprises 4 wt % to 6 wt % FEC and 0.8 wt % to 1.2 wt % VC. In some examples, the electrolyte comprises 5 wt % FEC and 1 wt % VC.

In any of the foregoing or following embodiments, the lithium salt may comprise, consist essentially of, or consist of LiFSI. In any of the foregoing or following embodiments, the nonaqueous solvent may comprise, consist essentially of, or consist of DMC, DME, TMS, TMPa, TEPa, or any combination thereof. In any of the foregoing or following embodiments, the diluent may comprise, consist essentially of, or consist of TTE, BTFE, OTE, TFEO, or any combination thereof. In any of the foregoing or following embodiments, the additive may comprise, consist essentially of, or consist of EC, FEC, VC, or any combination thereof. In some embodiments, the salt comprises, consists essentially of, or consists of LiFSI and the diluent comprises, consists essentially of, or consists of TTE.

Advantageously embodiments of the disclosed electrolytes may be more stable toward carbon-based, silicon-based, and/or carbon/silicon composite-based anodes than conventional electrolytes or HCEs having a salt concentration of at least 3 M The electrolytes also may be more stable toward nickel-rich cathodes, such as $LiNi_xMn_yCo_{1-x-y}O_2$ (NMC) cathode materials with $x \geq 0.8$. Stability may be evidenced by cycling life, discharge capacity, capacity retention, and/or Coulombic efficiency, among other measures, as discussed in more detail below. In some embodiments, the electrolytes may exhibit lower viscosity and/or higher conductivity compared to HCEs. Some embodiments of the disclosed electrolytes are useful over a wide temperature range, such as a temperature range from −30° C. to 60° C.

III. BATTERY SYSTEMS

Embodiments of the disclosed LHCEs are useful in battery systems, such as rechargeable batteries. In some embodiments, the disclosed LHCEs are useful in lithium ion batteries. In some embodiments, a system comprises an LHCE as disclosed herein and an anode. The system may further comprise a cathode, a separator, an anode current collector, a cathode current collector, or any combination thereof. In certain embodiments, the anode is a carbon-based (e.g., graphite-based) anode, a silicon-based anode, or a carbon- and silicon-based anode. In some examples, the cathode is a cathode comprising an intercalation compound or a conversion compound, such as a nickel-rich cathode as discussed below.

In some embodiments, a rechargeable battery comprises an LHCE as disclosed herein, a cathode, an anode, and optionally a separator. FIG. 2A is a schematic diagram of one exemplary embodiment of a rechargeable battery 100 including a cathode 120, a separator 130 which is infused with an electrolyte (i.e., an LHCE, as disclosed herein, or a $LiPF_6$-organic carbonate based electrolyte or an HCE), and an anode 140. In some embodiments, the battery 100 also includes a cathode current collector 110 and/or an anode current collector 150.

In some embodiments the rechargeable battery is a pouch cell. FIG. 2B is a schematic side elevation view of one embodiment of a simplified pouch cell 200. The pouch cell 200 comprises an anode 210 comprising anode material 220 and an anode current collector 230, a cathode 240 comprising cathode material 250 and a cathode current collector 260, a separator 270, and a packaging material defining a pouch 280 enclosing the anode 210, cathode 240, and separator 270. The pouch 280 further encloses an electrolyte as disclosed herein (not shown). The anode current collector 230 has a protruding tab 231 that extends external to the pouch 280, and the cathode current collector 260 has a protruding tab 261 that extends external to the pouch 680.

The current collectors can be a metal or another conductive material such as, but not limited to, nickel (Ni), Cu, Al, iron (Fe), stainless steel (SS), titanium (Ti), or conductive carbon materials. The current collector may be a foil, a foam, or a polymer substrate coated with a conductive material. Advantageously, the current collector is stable (i.e., does not corrode or react) when in contact with the anode or cathode and the electrolyte in an operating voltage window of the battery. The anode and cathode current collectors may be omitted if the anode or cathode, respectively, are free standing, e.g., when the anode is metal or a free-standing film comprising an intercalation material or conversion compound, and/or when the cathode is a free-standing film. By "free-standing" is meant that the film itself has sufficient structural integrity that the film can be positioned in the battery without a support material.

In some embodiments, including some embodiments of a rechargeable lithium ion battery, the anode, or negative electrode, is a silicon-based, carbon-based (e.g., graphite-, hard, and/or soft carbon-based), or carbon- and silicon-based (e.g., a carbon/silicon composite) anode. By "carbon-based anode" is meant that a majority of the total anode mass is hard and/or soft carbon material, such as at least 70 wt %, at least 80 wt %, or at least 90 wt % carbon material, e.g., graphite, hard carbon, soft carbon, or a mixture thereof. By "silicon-based anode" is meant that the anode contains a certain minimum amount of silicon, such as at least 5%, at least 30%, at least 50 wt %, at least 60 wt %, or at least 90 wt % silicon.

By "carbon/silicon composite-based anode" is meant that a majority of the total anode mass is carbon and silicon, such as at least 70 wt %, at least 80 wt %, or at least 95 wt % of a combination of carbon and silicon. In some examples, the silicon is nano-silicon, carbon coated nano-silicon, or nano-silicon coated on carbon. In some other examples, the silicon is micron sized porous Si with nano-pores or micron sized bulk Si. For instance, the silicon may be carbon-coated nano-silicon, where the silicon is carbon-coated by chemical vapor deposition (CVD) or other approaches. In one embodiment, the silicon is a C/Si composite comprising 10 wt % CVD carbon. In some embodiments, the anode is a silicon/graphite composite anode comprising 10-95 wt % graphite and 5-90 wt % silicon. In certain embodiments, the anode is a silicon/graphite composite anode comprising 70-75 wt % graphite, 5-20 wt % silicon, 0-5 wt % conductive carbon black, and 8-12 wt % binder. In some embodiments, the anode comprises a a C/Si composite comprising 5-55 wt % carbon, such as 5-15 wt % carbon; the carbon may be CVD carbon. In some implementations, the composite comprises carbon-coated nano-silicon. In certain embodiments, the anode comprises stabilized porous silicon particles coated with a heterogeneous layer comprising a discontinuous silicon carbide (SiC) coating and a continuous carbon coating. In particular, the particles may comprise a porous silicon particle comprising a plurality of interconnected silicon nanoparticles, interconnected silicon nanoparticles being connected to at least one other silicon nanoparticle, and a plurality of pores defined by the interconnected silicon nanoparticles, the pores including outwardly opening surface pores and internal pores; a heterogeneous layer comprising a discontinuous SiC coating that is discontinuous across a portion of pore surfaces and across a portion of an outer surface of the porous silicon particle, and a continuous carbon coating that covers (i) outer surfaces of the discontinuous SiC coating and (ii) remaining portions of the pore surfaces and the outer surface of the porous silicon particle.

The anode may further include one or more binders and/or conductive additives. Suitable binders include, but are not limited to, polyacrylates (e.g., lithium polyacrylate, LiPAA), polyimides (PI), polyvinyl alcohol, polyvinyl chloride, polyvinyl fluoride, ethylene oxide polymers, polyvinylpyrrolidone, polyurethane, polytetrafluoroethylene, polyvinylidene fluoride, polyethylene, polypropylene, styrene-butadiene rubber, epoxy resin, nylon, and the like. Suitable conductive additives include, but are not limited to, carbon black, acetylene black, Ketjen black, carbon fibers (e.g., vapor-grown carbon fiber), metal powders or fibers (e.g., Cu, Ni, Al), and conductive polymers (e.g., polyphenylene derivatives). In some embodiments, the anode is prelithiated to at least 5% of capacity, at least 10% of capacity, at least 20% of capacity, at least 30% capacity at least 50% of capacity, or up to 100% capacity, such as 0-50% capacity, 10-50% capacity, or 20-30% capacity. Prelithiation may be particularly useful when a cathode with no lithium source is used.

Exemplary cathodes, or positive electrodes, for lithium ion batteries include, but are not limited to, Li-rich $Li_{1+w}Ni_xMn_yCo_zO_2$ (x+y+z+w=1, 0≤w≤0.25), $LiNi_xMn_yCo_zO_2$ (NMC, x+y+z=1), $LiCoO_2$, $LiNi_{0.8}Co_{0.15}Al_{0.05}O_2$ (NCA), $LiNi_{0.5}Mn_{1.5}O_4$ spinel, $LiMn_2O_4$ (LMO), $LiFePO_4$ (LFP), $Li_{4-x}M_xTi_5O_{12}$ (M=Mg, Al, Ba, Sr, or Ta; 0≤x≤1), $MnO_2$, $V_2O_5$, $V_6O_{13}$, $LiV_3O_8$, $LiM^{C1}_xM^{C2}_{1-x}PO_4$ ($M^{C1}$ or $M^{C2}$=Fe, Mn, Ni, Co, Cr, or Ti; 0≤x≤1), $Li_3V_{2-x}M^1_x(PO_4)_3$ ($M^1$=Cr, Co, Fe, Mg, Y, Ti, Nb, or Ce; 0≤x≤1), $LiVPO_4F$, $LiM^{C1}_xM^{C2}_{1-x}O_2$ (($M^{C1}$ and $M^{C2}$ independently are Fe, Mn, Ni, Co, Cr, Ti, Mg, or Al; 0≤x≤1), $LiM^{C1}_xM^{C2}_yM^{C3}_{1-x-y}O_2$ (($M^{C1}$, $M^{C2}$, and $M^{C3}$ independently are Fe, Mn, Ni, Co, Cr, Ti, Mg, or Al; 0≤x≤1; 0≤y≤1, 0≤x+y≤1), $LiMn_{2-y}X_yO_4$ (X=Cr, Al, or Fe, 0≤y≤1), $LiNi_{0.5-y}X_yMn_{1.5}O_4$ (X=Fe, Cr, Zn, Al, Mg, Ga, V, or Cu; 0≤y≤0.5), $xLi_2MnO_3 \cdot (1-x)LiM^{C1}_xM^{C2}_yM^{C3}_{1-y-z}O_2$ ($M^{C1}$, $M^{C2}$, and $M^{C3}$ independently are Mn, Ni, Co, Cr, Fe, or mixture thereof; x=0.3-0.5; y≤0.5; z≤0.5), $Li_2M^2SiO_4$ ($M^2$=Mn, Fe, or Co), $Li_2M^2SO_4$ ($M^2$=Mn, Fe, or Co), $LiM^2SO_4F$ ($M^2$=Fe, Mn, or Co), $Li_{2-x}(Fe_{1-y}Mn_y)P_2O_7$ (0≤x≤1; 0≤y≤1), $Cr_3O_8$, $Cr_2O_5$, a carbon/sulfur composite, or an air electrode (e.g., a carbon-based electrode comprising graphitic carbon and, optionally, a metal catalyst such as Ir, Ru, Pt, Ag, or Ag/Pd). In an independent embodiment, the cathode may be a lithium conversion compound, such as $Li_2O_2$, $Li_2O$, $Li_2S$, or LiF. In some examples, the cathode comprises $LiNi_xMn_yCo_zO_2$ where x≥0.6 (NMC) or $LiNi_xMg_yTi_{1-x-y}O_2$ where 0.9≤x<1 (NMT; e.g., $LiNi_{0.96}Mg_{0.02}Ti_{0.02}O_2$).

The separator may be glass fiber, a porous polymer film (e.g., polyethylene- or polypropylene-based material) with or without a ceramic coating, or a composite (e.g., a porous film of inorganic particles and a binder). One exemplary polymeric separator is a Celgard© K1640 polyethylene (PE) membrane. Another exemplary polymeric separator is a Celgard© 2500 polypropylene membrane. Another exemplary polymeric separator is a Celgard© 3501 surfactant-coated polypropylene membrane. The separator may be infused with an electrolyte, as disclosed herein.

In some embodiments, a battery includes a carbon-based, silicon-based, or carbon/silicon composite-based anode, a cathode suitable for a lithium ion battery, a separator, and an LHCE comprising (a) a lithium salt, (b) a nonaqueous solvent composed of at least one of the following components: (i) an ester, (ii) a sulfur-containing solvent, (iii) a phosphorus-containing solvent, (iv) an ether, (v) a nitrile, or any combination thereof; a diluent comprising a fluoroalkyl ether, a fluorinated orthoformate, a fluorinated carbonate, a fluorinated borate, or a combination thereof, wherein the lithium salt has a solubility in the diluent at least 10 times less than a solubility of the lithium salt in the solvent; and an additive having a different composition than the lithium salt, a different composition than the solvent, and a different composition than the diluent. In some embodiments, the LHCE comprises (a) a lithium salt, (b) a nonaqueous solvent composed of at least one of the following components: (i) a carbonate other than ECVC, or FEC, (ii) a sulfone, (iii) a flame retardant comprising a phosphorus-containing solvent, (iv) an ether, or (v) any combination thereof, wherein the lithium salt is soluble in the solvent, (c) a diluent comprising a fluoroalkyl ether, a fluorinated orthoformate, or a combination thereof, wherein the lithium salt has a solubility in the diluent at least 10 times less than a solubility of the lithium salt in the solvent, and (d) an additive having a different composition than the lithium salt, a different composition than the solvent, and a different composition than the diluent. The electrolyte has a lithium salt-solvent-additive-diluent molar ratio of 1:x:y:z where $0.5 \leq x \leq 5$, $0 \leq y \leq 1$, and $0.5 \leq z \leq 5$. In some implementations, $0.5 \leq x \leq 3.5$, $0 \leq y \leq 1$, and $1 \leq z \leq 5$. In some embodiments, the cathode comprises $LiNi_xMn_yCo_zO_2$ (NMC) or $LiM^{C1}{}_xM^{C2}{}_yM^{C3}{}_{1-x-y}O_2$ (such as $LiNi_{0.96}Mg_{0.02}Ti_{0.02}O_2$ (NMT)). Advantageously, some embodiments of the disclosed lithium ion batteries including an LHCE are operable at high voltages, e.g., a voltage of 4.2 V or higher, such as a voltage 4.3 V. In certain embodiments, the battery is operable at voltages up to 4.5 V, such as a voltage of 2.5-4.5 V or 2.5-4.4 V. In any of the foregoing or following embodiments, the battery may be operable over a temperature range from −30° C. to 60° C., such as −20° C. to 60° C., −10° C. to 60° C., or 0° C. to 60° C. In any of the foregoing or following embodiments, the battery may be charged and/or discharged at a C rate from C/10 to 5C, such as rate from C/5 to 3C (in some examples, 1C corresponds to 2.8 mA cm$^{-2}$). The battery may be charged and discharged at different rates.

In one embodiment, a lithium ion battery comprises a Si/Gr composite anode and the electrolyte comprises LiFSI, DMC, VC, FEC, and a diluent comprising BTFE, TTE, OTE, or any combination thereof. The cathode may be any suitable cathode, such as an NMC cathode. In some examples, the DMC to diluent molar ratio is 0.3-5, such as 0.5-2, and the FEC and VC are present in a weight ratio of 4:1 to 6:1, such as a ratio of 5:1. In certain examples, the electrolyte comprises 5 wt % FEC and 1 wt % VC. The salt:solvent molar ratio may be within a range of 0.4:1 to 0.6:1.

In an independent embodiment, a lithium ion battery comprises a graphite anode and the electrolyte comprises LiFSI, DMC, TTE, and an additive comprising VC, EC, or a combination thereof. The cathode may be any suitable cathode, such as an NMC cathode. In some examples, the electrolyte has a lithium salt-solvent-additive-diluent molar ratio of 1:x:y:z where x is 1-2; y is 0.1-0.6, such as 0.1-0.3; and z is 1.5-3, such as 1.5-2.5. In certain examples, the salt has a molar concentration of 0.8 M to 1.5 M, such as 1.3 M to 1.5 M, or 1.4 M.

In another independent embodiment, a lithium ion battery comprises a graphite anode and the electrolyte comprises LiFSI, DME, TTE, and an additive comprising VC, EC, FEC, or any combination thereof. The cathode may be any suitable cathode, such as an NMC cathode. In some examples, the electrolyte has a lithium salt-solvent-additive-diluent molar ratio of 1:x:y:z where x is 1-1.2, y is 0.1-0.3, and z is 2.5-3.0. In certain examples, the salt has a molar concentration of 0.8 M to 1.5 M, such as 0.8 M to 1.2 M, or 1 M. In some instances, the electrolyte has a lithium salt-solvent-additive-diluent molar ratio of 1:1.1:0.2:3.

In still another independent embodiment, a lithium ion battery comprises a graphite anode and the electrolyte comprises LiFSI, DMC, TTE, and FEC. The cathode may be any suitable cathode, such as an NMC or NMT cathode. In some examples, the electrolyte has a lithium salt-solvent-additive-diluent molar ratio of 1:x:y:z where x is 1.5-2.5, y is 0.1-0.3, and z is 2.5-3.5. In certain examples, the salt has a molar concentration of 0.8 M to 1.5 M, such as 0.8 M to 1.2 M, or 1 M. In some instances, the electrolyte has a lithium salt-solvent-additive-diluent molar ratio of 1:2:0.2:3.

In yet another independent embodiment, a lithium ion battery comprises a graphite anode and the electrolyte is a low-flammability or nonflammable electrolyte comprising LiFSI, TMPa, TTE, and an additive comprising VC, EC, FEC, or any combination thereof. The cathode may be any suitable cathode, such as an NMC cathode. In some examples, the electrolyte has a lithium salt-solvent-additive-diluent molar ratio of 1:x:y:z where x is 1-1.5, y is 0.1-0.3, and z is 2.5-3.5. In certain examples, the salt has a molar concentration of 0.8 M to 1.5 M, such as 0.8 M to 1.2 M, or 1 M. In some instances, electrolyte has a lithium salt-solvent-additive-diluent molar ratio of 1:1.2:0.2:3.

In another independent embodiment, a lithium ion battery comprises a graphite anode and the electrolyte comprises LiFSI, TMS, TTE, and an additive comprising VC, EC, FEC, or any combination thereof. The cathode may be any suitable cathode, such as an NMC cathode. In some examples, the electrolyte has a lithium salt-solvent-additive-diluent molar ratio of 1:x:y:z where x is 2.5-3.5, y is 0.1-0.3, and z is 2.5-3.5. In certain examples, the salt has a molar concentration of 0.8 M to 1.5 M, such as 0.8 M to 1.2 M, or 1 M. In some instances, the electrolyte has a lithium salt-solvent-additive-diluent molar ratio of 1:2.8:0.2:3.

In still another independent embodiment, a lithium ion battery comprises a Si/Gr composite anode and the electrolyte comprises LiFSI, DMC, TTE, and an additive comprising EC, FEC, or a combination thereof. The cathode may be any suitable cathode, such as an NMC cathode. In some examples, the electrolyte has a lithium salt-solvent-additive-diluent molar ratio of 1:x:y:z where x is 1.5-2.5, y is 0.2-0.5, and z is 2.5-3.5. In certain examples, the salt has a molar concentration of 0.8 M to 1.5 M, such as 0.8 M to 1.2 M, or 1 M. In one instance, the electrolyte has a lithium salt-solvent-additive-diluent molar ratio of 1:2:0.2:3. In another instance, the electrolyte has a lithium salt-solvent-additive-diluent molar ratio of 1:1.7:0.5:3.

In yet another independent embodiment, a lithium ion battery comprises a silicon anode and the electrolyte comprises LiFSI, DMC, TTE, and an additive comprising EC, FEC, or a combination thereof. The cathode may be any suitable cathode, such as an NMC cathode. In some examples, the electrolyte has a lithium salt-solvent-additive-diluent molar ratio of 1:x:y:z where x is 1-2.5, y is 0.1-0.3, and z is 1.5-3. In some implementations, x is 1-1.5, y is 0.1-0.3, and z is 1.5-2.5. In certain examples, the salt has a molar concentration of 0.8 M to 1.5 M, such as 1.3 M to 1.5 M, or 1.4 M. In one instance, the electrolyte has a lithium salt-solvent-additive-diluent molar ratio of 1:1.2:0.36:2.1. In another instance, the electrolyte has a lithium salt-solvent-additive-diluent molar ratio of 1:1.4:0.14:2.1.

In another independent embodiment, a lithium ion battery comprises a Si/Gr composite anode and the electrolyte comprises LiFSI, TTE, a solvent comprising DME, TMPa, or TMS, and an additive comprising EC, FEC, or a combination thereof. The cathode may be any suitable cathode, such as an NMC cathode. In some examples, the electrolyte has a lithium salt-solvent-additive-diluent molar ratio of 1:x:y:z where x is 1-3, y is 0.1-0.3, and z is 2.5-3.5. In certain examples, the salt has a molar concentration of 0.8 M to 1.5 M, such as 0.8 M to 1.2 M, or 1 M. In one instance, the solvent comprises DME, and the electrolyte has a lithium salt-solvent-additive-diluent molar ratio of 1:1.1:0.2:3. In another instance, the solvent comprises TMPa, and the electrolyte has a lithium salt-solvent-additive-diluent molar ratio of 1:1.2:0.2:3. In yet another instance, the solvent comprises TMS, and the electrolyte has a lithium salt-solvent-additive-diluent molar ratio of 1:2.8:0.2:3.

In any of the foregoing or following embodiments, a lithium ion battery comprising a graphite-based, silicon-based, or silicon- and graphite-based anode, and an LHCE as disclosed herein may have a performance equal to, or better than, a comparable lithium battery including the same anode and cathode with a conventional electrolyte or an HCE having a salt concentration of at least 3 M. For example, the lithium ion battery with the disclosed LHCE may have a specific capacity, a Coulombic efficiency, and/or a capacity retention equal to or greater than the comparable battery with the conventional electrolyte or superconcentrated electrolyte. A lithium ion battery with a disclosed LHCE also may exhibit a cycling stability as indicated by percent capacity retention equal to, or better than that of, a comparable lithium ion battery including including the same anode and cathode with a conventional electrolyte or a superconcentrated electrolyte. For example, a lithium ion battery with a silicon/graphite composite anode and a disclosed LHCE may have a capacity retention of at least 70%, at least 75%, at least 80%, at least 85%, or even at least 90% at 100 cycles, at 200 cycles, at 300 cycles, at 400 cycles, or even at 500 cycles. The lithium ion battery may have a first cycle Coulombic efficiency of at least 50%, at least 60%, at least 70%, at least 75%, or at least 85%, and/or a third cycle CE of at least 90%, at least 95%, or at least 97%. In some embodiments, the lithium ion battery comprising the LHCE (or LSE) may have an average CE of at least 98%, at least 99%, or even at least 99.5% over at least 200 cycles, at least 300 cycles, at least 400 cycles, or even at least 500 cycles. In certain examples, the average CE is 98-100%, 99-100%, or even 99.5-100% over at least 200 cycles, at least 300 cycles, at least 400 cycles, or even at least 500 cycles. In some examples, the first cycle Coulombic efficiency is improved by using a prelithiated anode as disclosed herein. In any of the foregoing or following embodiments, the lithium ion battery may have a capacity of from 2 mAh/cm$^2$ to 3 mAh/cm$^2$ over at least 100 cycles or at least 200 cycles. In any of the foregoing or following embodiments, the lithium ion battery may have a specific discharge capacity of from 150 mAh/g to 200 mAh/g, such as 170 mAh/g to 190 mAh/g, over at least 100 cycles, at least 200 cycles, at least 300 cycles, or at least 400 cycles over a temperature range of −20° C. to 60° C. In some embodiments, the lithium ion battery even has a specific discharge capacity of at least 140 mAh/g at a temperature of −30° C. In any of the foregoing or following embodiments, the lithium ion battery also may exhibit reduced swelling compared to batteries including conventional superconcentrated electrolytes. In any of the foregoing or following embodiments, the disclosed electrolyte may form a thinner and/or more uniform SEI layer and/or CEI layer than a conventional electrolyte, a HCE, or an LHCE not including an additive as disclosed herein. For example, the SEI/CEI layers may have an average thickness that is 15-50% of the average thickness of an SEI/CEI layer produced by a conventional electrolyte.

IV. REPRESENTATIVE EMBODIMENTS

Certain representative embodiments are exemplified in the following paragraphs.

An electrolyte, comprising: an active salt comprising lithium cations; 2-10 wt % FEC; 0.1-2 wt % VC; a nonaqueous solvent comprising a carbonate other than fluoroethylene carbonate (FEC) or vinylene carbonate (VC), wherein the active salt is soluble in the nonaqueous solvent; and a diluent comprising a fluoroalkyl ether, a fluorinated orthoformate, or a combination thereof, wherein the active salt has a solubility in the diluent at least 10 times less than a solubility of the active salt in the nonaqueous solvent. The electrolyte, wherein: (i) the electrolyte has an active salt to solvent molar ratio within a range of from 0.4 to 0.7; or (ii) the electrolyte has a solvent to diluent molar ratio within a range of 0.3 to 5; or (iii) both (i) and (ii).

The electrolyte of the foregoing paragraph, wherein the active salt comprises lithium bis(fluorosulfonyl)imide (LiFSI), lithium bis(trifluoromethanesulfonyl)imide (LiTFSI), lithium bis(pentafluoroethanesulfonyl)imide (LiBETI), lithium bis(oxalato)borate (LiBOB), LiPF$_6$, LiAsF$_6$, LiBF$_4$, LiCF$_3$SO$_3$, LiClO$_4$, lithium difluoro oxalato borate (LiDFOB), LiI, LiBr, LiCl, LiSCN, LiNO$_3$, LiNO$_2$, Li$_2$SO$_4$, or any combination thereof.

The electrolyte of any of the foregoing paragraphs, wherein: (i) the nonaqueous solvent comprises dimethyl carbonate; or (ii) the active salt comprises LiFSI; or (iii) both (i) and (ii).

The electrolyte of any of the foregoing paragraphs, wherein the diluent comprises a fluoroalkyl ether. The electrolyte, wherein the fluoroalkyl ether comprises bis(2,2,2-trifluoroethyl) ether (BTFE), 1,1,2,2-tetrafluoroethyl-2,2,2,3-tetrafluoropropyl ether (TTE), 1H,1H,5H-octafluoropentyl 1,1,2,2-tetrafluoroethyl ether (OTE), or any combination thereof.

The electrolyte of any of the foregoing paragraphs, wherein the FEC and VC are present in a ratio of 5:1 by weight. The electrolyte of any of the foregoing paragraphs, wherein the electrolyte comprises: 4-6 wt % FEC; and 0.8-1.2 wt % VC.

The electrolyte of any of the foregoing paragraphs, wherein the electrolyte comprises, consists essentially of, or consists of, LiFSI; FEC; VC; DMC; and BTFE, TTE, OTE, or any combination thereof.

An electrolyte, comprising: lithium bis(fluorosulfonyl)imide (LiFSI); a nonaqueous solvent comprising a carbonate other than fluoroethylene carbonate (FEC) or vinylene carbonate (VC), wherein the active salt is soluble in the nonaqueous solvent; 2-10 wt % FEC; 0.1-2 wt % VC; and a diluent comprising a fluoroalkyl ether, wherein a molar ratio of the LiFSI to the solvent is within a range of from 0.4 to 0.7, and a molar ratio of the solvent to the diluent is within a range of 0.3 to 5.

The electrolyte of the foregoing paragraph, wherein the diluent comprises bis(2,2,2-trifluoroethyl) ether (BTFE), 1,1,2,2-tetrafluoroethyl-2,2,2,3-tetrafluoropropyl ether (TTE), 1H,1H,5H-octafluoropentyl 1,1,2,2-tetrafluoroethyl ether (OTE), or any combination thereof.

The electrolyte of either of the foregoing paragraphs, wherein the electrolyte comprises 4-6 wt % FEC; and 0.8-1.2 wt % VC.

The electrolyte of any of the preceding three paragraphs, comprising: LiFSI; dimethyl carbonate (DMC); 4-6 wt % FEC; 0.8-1.2 wt % VC; and the diluent comprises BTFE, TTE, OTE, or any combination thereof, wherein a molar ratio of LiFSI to DMC is within a range of 0.45 to 0.65, and a molar ratio of DMC to the diluent is within a range of 0.3 to 4.

The electrolyte of the foregoing paragraph, consisting essentially of, or consisting of, LiFSI; DMC; 5 wt % FEC, 1 wt % VC; and the diluent.

The electrolyte of any of the preceding three paragraphs, wherein: (i) the diluent is BTFE, a molar ratio of LiFSI to DMC is 0.4-0.5 and a molar ratio of DMC to BTFE is 0.5; or (ii) the diluent is, TTE, a molar ratio of LiFSI to DMC is 0.4-0.5 and a molar ratio of DMC to TTE is 0.5; or (iii) the diluent is OTE, a molar ratio of LiFSI to DMC is 0.4-0.5 and a molar ratio of DMC to OTE is 0.5; or (iv) the diluent is OTE, a molar ratio of LiFSI to DMC is 0.4-0.5 and a molar ratio of DMC to OTE is 0.6-0.7; or (v) wherein the diluent is OTE, a molar ratio of LiFSI to DMC is 0.0.4-0.5 and a molar ratio of DMC to OTE is 1; or (vi) the diluent is OTE, a molar ratio of LiFSI to DMC is 0.4-0.5 and a molar ratio of DMC to OTE is 0.3-0.4; or (vii) the diluent is OTE, a molar ratio of LiFSI to DMC is 0.6 and a molar ratio of DMC to OTE is 1; or (viii) the diluent is OTE, a molar ratio of LiFSI to DMC is 0.6 and a molar ratio of DMC to OTE is 2; or (ix) the diluent is OTE, a molar ratio of LiFSI to DMC is 0.6 and a molar ratio of DMC to OTE is 4.

A lithium ion battery, comprising: an electrolyte according to any of the of the foregoing paragraphs; and an anode comprising silicon.

The lithium ion battery of the preceding paragraph, wherein the anode comprises a graphite/silicon composite.

The lithium ion battery of the preceding paragraph, wherein the anode further comprises a lithium polyacrylate or polyimide binder.

The lithium ion battery of either of the preceding paragraphs, wherein the silicon comprises microparticles of carbon-coated porous silicon.

The lithium ion battery of any of the foregoing paragraphs, further comprising a cathode.

The lithium ion battery of the foregoing paragraph, wherein the cathode comprises $Li_{1+w}Ni_xMn_yCo_zO_2$ (x+y+z+w=1, 0≤w≤0.25), $LiNi_xMn_yCo_zO_2$ (x+y+z=1), $LiNi_{0.8}Co_{0.15}Al_{0.05}O_2$, $LiCoO_2$, $LiNi_{0.5}Mn_{1.5}O_4$ spinel, $LiMn_2O_4$, $LiFePO_4$, $Li_{4-x}M_xTi_5O_{12}$ (M=Mg, Al, Ba, Sr, or Ta; 0≤x≤1), $MnO_2$, $V_2O_5$, $V_6O_{13}$, $LiV_3O_8$, $LiM^{C1}_xM^{C2}_{1-x}PO_4$ ($M^{C1}$ or $M^{C2}$=Fe, Mn, Ni, Co, Cr, or Ti; 0≤x≤1), $Li_3V_{2-x}M^1_x(PO_4)_3$ ($M^1$=Cr, Co, Fe, Mg, Y, Ti, Nb, or Ce; 0≤x≤1), $LiVPO_4F$, $LiM^{C1}_xM^{C2}_{1-x}O_2$ (($M^{C1}$ and $M^{C2}$ independently are Fe, Mn, Ni, Co, Cr, Ti, Mg, or Al; 0≤x≤1), $LiM^{C1}_xM^{C2}_yM^{C3}_{1-x-y}O_2$ (($M^{C1}$, $M^{C2}$, and $M^{C3}$ independently are Fe, Mn, Ni, Co, Cr, Ti, Mg, or Al; 0≤x≤1; 0≤y≤1; 0≤x+y≤1), $LiMn_{2-y}X_yO_4$ (X=Cr, Al, or Fe, 0≤y≤1), $LiNi_{0.5-y}X_yMn_{1.5}O_4$ (X=Fe, Cr, Zn, Al, Mg, Ga, V, or Cu; 0≤y<0.5), $xLi_2MnO_3 \cdot (1-x)LiM^{C1}_yM^{C2}_zM^{C3}_{1-y-z}O_2$ ($M^{C1}$, $M^{C2}$, and $M^{C3}$ independently are Mn, Ni, Co, Cr, Fe, or mixture thereof; x=0.3-0.5; y≤0.5; z≤0.5), $Li_2M^2SiO_4$ ($M^2$=Mn, Fe, or Co), $Li_2M^2SO_4$ ($M^2$=Mn, Fe, or Co), $LiM^2SO_4F$ ($M^2$=Fe, Mn, or Co), $Li_{2-x}(Fe_{1-y}Mn_y)P_2O_7$ (0≤x≤1; 0≤y≤1), $Cr_3O_8$, $Cr_2O_5$, a carbon/sulfur composite, or an air electrode.

The lithium ion battery of any of the foregoing paragraphs, wherein the lithium ion battery has a capacity retention of at least 80% after 150 cycles.

The lithium ion battery of any of the foregoing paragraphs, wherein the lithium ion battery has a coulombic efficiency of at least 99.7% after 200 cycles.

An electrolyte, comprising: a lithium salt; a solvent comprising (i) a carbonate other than ethylene carbonate (EC), vinylene carbonate (VC), or fluoroethylene carbonate (FEC), (ii) a sulfone, (iii) a flame retardant, (iv) an ether, or (v) any combination thereof, wherein the lithium salt is soluble in the solvent; an additive having a different composition than the lithium salt and a different composition than the solvent; and a diluent comprising a fluoroalkyl ether, a fluorinated orthoformate, or a combination thereof, wherein the lithium salt has a solubility in the diluent at least 10 times less than a solubility of the lithium salt in the solvent, the electrolyte having lithium salt-solvent-additive-diluent molar ratio of 1:x:y:z where 0.5≤x≤3.5, 0≤y≤1, and 1≤z≤5.

The electrolyte of the foregoing paragraph, wherein if the diluent comprises a fluoroalkyl ether and the additive comprises a carbonate, a sulfone, a flame retardant, an ether, or a lithium salt, then x+y is not within a range of from 0.8-1.2, or x+y is not within a range of from 0.7-1.4 or x+y is not within a range of from 0.67-1.43.

The electrolyte of the first paragraph wherein if the diluent comprises a fluoroalkyl ether, then x+y is not within a range of from 0.8-1.2, or x+y is not within a range of from 0.7-1.4 or x+y is not within a range of from 0.67-1.43.

The electrolyte of the first paragraph, wherein if the diluent comprises 1,1,2,2-tetrafluoroethyl-2,2,3,3-tetrafluoropropyl ether (TTE), then 0.5≤x+y≤0.58 or 1.2≤x+y≤4.5 or 1.4≤x+y≤4.5 or 1.45≤x+y≤4.5.

The electrolyte of any of the foregoing paragraphs, wherein 0.5≤x+y≤0.65 or 1.45≤x+y≤4.5. The electrolyte of any of the foregoing paragraphs, wherein: 1.5≤x≤3.0; 0.1≤y≤0.8; and 2.5≤z≤3.5.

The electrolyte of any of the foregoing paragraphs, wherein 0.15≤y≤0.25.

The electrolyte of any of the foregoing paragraphs, wherein x+y=2-3.

The electrolyte of the first paragraph, wherein: 1.6≤x≤2.8; 0.2≤y≤0.6; 2.2≤x+y≤3.0, or x+y=2.2, or x+y=3.0; and z=3.

The electrolyte of any of the foregoing paragraphs, wherein the lithium salt comprises comprising lithium bis(fluorosulfonyl)imide (LiFSI), lithium bis(trifluoromethylsulfonyl)imide (LiTFSI), lithium bis(pentafluoroethylsulfonyl)imide (LiBETI), lithium(tetrafluoroethylenedisulfonyl)azanide, lithium (fluorosulfonyl)(trifluoromethylsulfonyl)imide (LiFTFSI), lithium trifluoromethanesulfonate (LiTf), or any combination thereof.

The electrolyte of any of the foregoing paragraphs, wherein the solvent comprises dimethyl carbonate (DMC), 1,2-dimethoxyethane (DME), tetramethylene sulfone (TMS), trimethyl phosphate (TMPa), triethyl phosphate (TEPa), or any combination thereof.

The electrolyte of any of the foregoing paragraphs, wherein the additive comprises VC, EC, FEC, 4-methylene-1,3-dioxolan-2-one, 4,5-dimethylene-1,3-dioxolan-2-one, 4-vinyl-1,3-dioxolan-2-one, prop-1-ene-1,3-sultone (PES), 1,3,2-dioxathiolane-2-oxide, 1,3,2-dioxathiolane-2,2-dioxide, 1,3,2-dioxathiane-2,2-dioxide (DTD), lithium 2-trifluoromethyl-4,5-dicyanoimidazole (LiTDI), lithium difluoro(oxalate)borate (LiDFOB), lithium hexafluorophosphate, 3-methyl-,4,2-dixoazol-5-one (MDO), tris(2,2,2-trifluoroethyl) phosphite (TTFEPi), 2-oxo-1,3,2-dioxathiane, butanedinitrile, pentanedinitrile, hexanedinitrile,tris(pentafluorophenyl) phosphine, 1-methylsulfonylethene, 1-ethenylsulfonylethane, or any combination thereof. The electrolyte, wherein the additive comprises VC, EC, or a combination thereof.

The electrolyte of any of the foregoing paragraphs, wherein the lithium salt comprises LiFSI.

The electrolyte of any of the foregoing paragraphs, wherein the diluent comprises 1,1,2,2-tetrafluoroethyl-2,2,3,3-tetrafluoropropyl ether (TTE), bis(2,2,2-trifluoroethyl) ether (BTFE), 1H,1H,5H-octafluoropentyl 1,1,2,2-tetrafluoroethyl ether (OTE), tris(2,2,2-trifluoroethyl)orthoformate (TFEO), or any combination thereof. The electrolyte, wherein the diluent comprises TTE.

The electrolyte of any of the foregoing paragraphs, comprising: (i) LiFSI, DMC, and TTE; or (ii) LiFSI, DMC, VC, and TTE; or (iii) LiFSI, DMC, EC, and TTE; or (iv) LiFSI, DMC, EC, VC, and TTE; or (v) LiFSI, TMS, and TTE; or (vi) LiFSI, TMS, VC, and TTE.

The electrolyte of the first paragraph, comprising: (i) LiFSI, DMC, and TTE in a molar ratio of 1:2.2:3; or (ii) LiFSI, DMC, VC, and TTE in a molar ratio of 1:2:0.2:3; or (iii) LiFSI, DMC, EC, and TTE in a molar ratio of 1:2:0.2:3; or (iv) LiFSI, DMC, EC, and TTE in a molar ratio of 1:1.6:0.6:3; or (v) LiFSI, DMC, EC, VC, and TTE in a molar ratio of 1:1.4:0.6:3; or (vi) LiFSI, TMS, and TTE in a molar ratio of 1:3:3; or (vii) LiFSI, TMS, VC, and TTE in a molar ratio of 1:2.8:0.2:3.

A battery system, comprising: an electrolyte according to any of the foregoing paragraphs; an anode comprising graphite; and/or a cathode. The battery system, wherein the cathode comprises $Li_{1+w}Ni_xMn_yCo_zO_2$ (x+y+z+w=1, 0≤w≤0.25), $LiNi_xMn_yCo_zO_2$ (x+y+z=1), $LiCoO_2$, $LiNi_{0.8}Co_{0.15}Al_{0.05}O_2$, $LiNi_{0.5}Mn_{1.5}O_4$ spinel, $LiMn_2O_4$, $LiFePO_4$, $Li_{4-x}M_xTi_5O_{12}$ (M=Mg, Al, Ba, Sr, or Ta; 0≤x≤1), $MnO_2$, $V_2O_5$, $V_6O_{13}$, $LiV_3O_8$, $LiM^{C1}_xM^{C2}_{1-x}PO_4$ ($M^{C1}$ or $M^{C2}$=Fe, Mn, Ni, Co, Cr, or Ti; 0≤x≤1), $Li_3V_{2-x}M^1_x(PO_4)_3$ ($M^1$=Cr, Co, Fe, Mg, Y, Ti, Nb, or Ce; 0≤x≤1), $LiVPO_4F$, $LiM^{C1}_xM^{C2}_{1-x}O_2$ (($M^{C1}$ and $M^{C2}$ independently are Fe, Mn, Ni, Co, Cr, Ti, Mg, or Al; 0≤x≤1), $LiM^{C1}_xM^{C2}_yM^{C3}_{1-x-y}O_2$ (($M^{C1}$, $M^{C2}$, and $M^{C3}$ independently are Fe, Mn, Ni, Co, Cr, Ti, Mg, or Al; 0≤x≤1; 0≤y≤1), $LiMn_{2-y}X_yO_4$ (X=Cr, Al, or Fe, 0≤y≤1), $LiNi_{0.5-y}X_yMn_{1.5}O_4$ (X=Fe, Cr, Zn, Al, Mg, Ga, V, or Cu; 0≤y<0.5), $xLi_2MnO_3·(1-x)LiM^{C1}_yM^{C2}_zM^{C3}_{1-y-z}O_2$ ($M^{C1}$, $M^{C2}$, and $M^{C3}$ independently are Mn, Ni, Co, Cr, Fe, or mixture thereof; x=0.3-0.5; y≤0.5; z≤0.5), $Li_2M^2SiO_4$ ($M^2$=Mn, Fe, or Co), $Li_2M^2SO_4$ ($M^2$=Mn, Fe, or Co), $LiM^2SO_4F$ ($M^2$=Fe, Mn, or Co), $Li_{2-x}(Fe_{1-y}Mn_y)P_2O_7$ (0≤y≤1), $Cr_3O_8$, $Cr_2O_5$, a carbon/sulfur composite, or an air electrode. The battery system, wherein the cathode comprises $LiNi_xMn_yCo_zO_2$ where x≥0.8.

Any of the foregoing battery systems, wherein the battery exhibits: (i) a capacity retention of at least 94% after 500 cycles at 25° C. compared to the first cycle after three formation cycles; or (ii) an average coulombic efficiency of at least 98% after 500 cycles at 25° C.; or (iii) a capacity retention of at least 90% after 100 cycles at 60° C. compared to the first cycle after three formation cycles; or (iv) a capacity retention of at least 80% after 100 cycles at −30° C. compared to the first cycle after three formation cycles; or (v) any combination of (i), (ii), (iii), and (iv).

The battery system of any of the foregoing paragraphs, wherein: (i) the lithium salt comprises LiFSI; or (ii) the solvent comprises DMC, DME, TMS, TMPa, TEPa, or any combination thereof; (iii) the additive comprises VC, EC, or a combination thereof; or (iv) the diluent comprises TTE, BTFE, TFEO, OTE, or any combination thereof; or (v) any combination of (i), (ii), (iii), and (iv). The battery system, wherein the additive comprises VC and the diluent comprises TTE.

The battery system of the foregoing paragraph, wherein 1.6≤x≤2.8; 0.2≤y≤0.6; and z=3.

A battery system, comprising: an anode, where the anode is a graphite-based anode, a silicon-based anode, or a graphite- and silicon-based anode; a cathode; and an electrolyte comprising a lithium salt, a solvent comprising (i) a carbonate other than ethylene carbonate (EC), vinylene carbonate (VC), or fluoroethylene carbonate (FEC), (ii) a sulfone, (iii) a flame retardant, (iv) an ether, or (v) any combination thereof, wherein the lithium salt is soluble in the solvent, an additive having a different composition than the lithium salt and a different composition than the solvent, and a diluent comprising a fluoroalkyl ether, a fluorinated orthoformate, or a combination thereof, wherein the lithium salt has a solubility in the diluent at least 10 times less than a solubility of the lithium salt in the solvent, the electrolyte having a lithium salt-solvent-additive-diluent molar ratio of 1:x:y:z where 0.5≤x≤3.5, 0.01≤y≤1, and 1≤z≤5.

The battery system, wherein: 0.5≤x≤3; 0.01≤y≤0.5; and 2≤z≤4. The battery system, wherein: 1≤x≤2; 0.1≤y≤0.5; and 2≤z≤4. The battery system, wherein 0.5<x+y≤4. The battery system, wherein 1.2≤x+y≤2.5.

The battery system of any of the foregoing paragraphs, wherein the additive comprises ethylene carbonate (EC), fluoroethylene carbonate (FEC), vinylene carbonate (VC), or a combination thereof.

The battery system of any of the foregoing paragraphs, wherein the lithium salt comprises comprising lithium bis (fluorosulfonyl)imide (LiFSI), lithium bis(trifluoromethylsulfonyl)imide (LiTFSI), lithium bis(pentafluoroethylsulfonyl)imide (LiBETI), lithium(tetrafluoroethylenedisulfonyl) azanide, lithium (fluorosulfonyl)(trifluoromethylsulfonyl) imide (LiFTFSI), lithium trifluoromethanesulfonate (LiTf), or any combination thereof.

The battery system of any of the foregoing paragraphs, wherein the solvent comprises 1,2-dimethoxyethane (DME), tetramethylene sulfone (TMS), trimethyl phosphate (TMPa), triethyl phosphate (TEPa), dimethyl carbonate (DMC), or any combination thereof.

The battery system of any of the foregoing paragraphs, wherein the diluent comprises 1,1,2,2-tetrafluoroethyl-2,2, 3,3-tetrafluoropropyl ether (TTE), bis(2,2,2-trifluoroethyl) ether (BTFE), 1H,1H,5H-octafluoropentyl 1,1,2,2-tetrafluoroethyl ether (OTE), tris(2,2,2-trifluoroethyl)orthoformate (TFEO), or any combination thereof.

The battery system of any of the foregoing paragraphs, wherein: the salt comprises LiFSI; the solvent comprises DME, TMS, TMPa, DMC, or any combination thereof; the additive comprises EC, FEC, VC, or a combination thereof; and the diluent comprises TTE.

The battery system of any of the foregoing paragraphs, wherein the electrolyte consists essentially of the salt, the solvent, the additive, and the diluent.

The battery system of any of the foregoing paragraphs, wherein the electrolyte comprises: LiFSI, DME, EC, and TTE; or LiFSI, DME, FEC, and TTE; or LiFSI, DME, VC, and TTE; or LiFSI, TMS, EC, and TTE; or LiFSI, TMS, FEC, and TTE; or LiFSI, TMS, VC, and TTE; or LiFSI, TMPa, EC, and TTE; or LiFSI, TMPa, FEC, and TTE; or LiFSI, TMPa, VC, and TTE; or LiFSI, DMC, FEC, and TTE; or LiFSI, DMC, EC, and TTE; or LiFSI, DMC, EC, FEC, and TTE.

The battery system of any of the foregoing paragraphs, wherein the anode is a graphite-based anode.

The battery system of the preceding paragraph, wherein the solvent comprises DME, TMS, or TMPa.

The battery system of any of the foregoing paragraphs, wherein the anode is a silicon-based anode, and the solvent does not comprise a flame retardant.

The battery system of the preceding paragraph, wherein the solvent comprises TMS, DME, or DMC.

The battery system of any of the foregoing paragraphs, wherein the cathode comprises $Li_{1+w}Ni_xMn_yCo_zO_2$ (x+y+z+w=1, 0≤w≤0.25), $LiNi_xMn_yCo_zO_2$ (x+y+z=1), $LiCoO_2$, $LiNi_{0.8}Co_{0.15}Al_{0.05}O_2$, $LiNi_{0.5}Mn_{1.5}O_4$ spinel, $LiMn_2O_4$, $LiFePO_4$, $Li_{4-x}M_xTi_5O_{12}$ (M=Mg, Al, Ba, Sr, or Ta; 0≤x≤1), $MnO_2$, $V_2O_5$, $V_6O_{13}$, $LiV_3O_8$, $LiM^{C1}_xM^{C2}_{1-x}PO_4$ ($M^{C1}$ or $M^{C2}$=Fe, Mn, Ni, Co, Cr, or Ti; 0≤x≤1), $Li_3V_{2-x}M^1_x(PO_4)_3$ ($M^1$=Cr, Co, Fe, Mg, Y, Ti, Nb, or Ce; 0≤x≤1), $LiVPO_4F$, $LiM^{C1}_xM^{C2}_{1-x}O_2$ (($M^{C1}$ and $M^{C2}$ independently are Fe, Mn, Ni, Co, Cr, Ti, Mg, or Al; 0≤x≤1), $LiM^{C1}_xM^{C2}_yM^{C3}_{1-x-y}$ $O_2$ (($M^{C1}$, $M^{C2}$, and $M^{C3}$ independently are Fe, Mn, Ni, Co, Cr, Ti, Mg, or Al; $0 \leq x \leq 1$; $0 \leq y \leq 1$), $LiMn_{2-y}X_yO_4$ (X=Cr, Al, or Fe, $0 \leq y \leq 1$), $LiNi_{0.5-y}X_yMn_{1.5}O_4$ (X=Fe, Cr, Zn, Al, Mg, Ga, V, or Cu; $0 \leq y < 0.5$), $xLi_2MnO_3 \cdot (1-x)LiM^{C1}_yM^{C2}_zM^{C3}_{1-y-z}O_2$ ($M^{C1}$, $M^{C2}$, and $M^{C3}$ independently are Mn, Ni, Co, Cr, Fe, or mixture thereof; x=0.3-0.5; $y \leq 0.5$; $z \leq 0.5$), $Li_2M^2SiO_4$ ($M^2$=Mn, Fe, or Co), $Li_2M^2SO_4$ ($M^2$=Mn, Fe, or Co), $LiM^2SO_4F$ ($M^2$=Fe, Mn, or Co), $Li_{2-x}(Fe_{1-y}Mn_y)P_2O_7$ ($0 \leq y \leq 1$), $Cr_3O_8$, $Cr_2O_5$, a carbon/sulfur composite, or an air electrode. The battery system of claim 17, wherein the cathode comprises: $LiNi_xMn_yCo_zO_2$ where $x \geq 0.6$; or $LiNi_xMg_yTi_{1-x-y}O_2$ where $0.9 \leq x < 1$.

The battery system of any of the foregoing paragraphs, wherein the battery system exhibits: (i) a first cycle coulombic efficiency of at least 75%; or (ii) an average coulombic efficiency of at least 98% over 500 cycles at 25° C. after three formation cycles; (iii) a capacity retention of at least 85% after 500 cycles at 25° C. compared to the first cycle after three formation cycles; or (iv) a capacity retention of at least 90% from $350^{th}$ cycle to $500^{th}$ cycle; or (v) any combination of (i), (ii), (iii), and (iv).

The battery system of any of the foregoing paragraphs, wherein: (i) the battery system is capable of operating at a voltage of 4.4 V or higher; or (ii) the battery system is capable of operating over a temperature range of from 20° C. to 50° C.; or (iii) both (i) and (ii).

An electrolyte comprising a lithium salt, a solvent comprising (i) a carbonate other than ethylene carbonate (EC), vinylene carbonate (VC), or fluoroethylene carbonate (FEC), (ii) a sulfone, (iii) a flame retardant, (iv) an ether, or (v) any combination thereof, wherein the lithium salt is soluble in the solvent, an additive having a different composition than the lithium salt and a different composition than the solvent, and a diluent comprising a fluoroalkyl ether, a fluorinated orthoformate, or a combination thereof, wherein the lithium salt has a solubility in the diluent at least 10 times less than a solubility of the lithium salt in the solvent, the electrolyte having a lithium salt-solvent-additive-diluent molar ratio of 1:x:y:z where $0.5 \leq x \leq 3.5$, $0.01 \leq y \leq 1$, and $1 \leq z \leq 5$.

The electrolyte of the foregoing paragraph, wherein: $0.5 \leq x \leq 3$; $0.01 \leq y \leq 0.5$; and $2 \leq z \leq 4$. The electrolyte of the foregoing paragraph, wherein: $1 \leq x \leq 2$; $0.1 \leq y \leq 0.5$; and $2 \leq z \leq 4$. The electrolyte of the foregoing paragraph, wherein $0.5 < x+y \leq 4$. The electrolyte of the foregoing paragraph, wherein $1.2 \leq x+y \leq 2.5$.

The electrolyte of any of the foregoing paragraphs, wherein the additive comprises ethylene carbonate (EC), fluoroethylene carbonate (FEC), vinylene carbonate (VC), or a combination thereof.

The electrolyte of any of the foregoing paragraphs, wherein the lithium salt comprises lithium bis(fluorosulfonyl)imide (LiFSI), lithium bis(trifluoromethylsulfonyl)imide (LiTFSI), lithium bis(pentafluoroethylsulfonyl)imide (LiBETI), lithium(tetrafluoroethylenedisulfonyl) azanide, lithium (fluorosulfonyl)(trifluoromethylsulfonyl)imide (LiFTFSI), lithium trifluoromethanesulfonate (LiTf), or any combination thereof.

The electrolyte of any of the foregoing paragraphs, wherein the solvent comprises 1,2-dimethoxyethane (DME), tetramethylene sulfone (TMS), trimethyl phosphate (TMPa), triethyl phosphate (TEPa), dimethyl carbonate (DMC), or any combination thereof.

The electrolyte of any of the foregoing paragraphs, wherein the diluent comprises 1,1,2,2-tetrafluoroethyl-2,2,3,3-tetrafluoropropyl ether (TTE), bis(2,2,2-trifluoroethyl) ether (BTFE), 1H,1H,5H-octafluoropentyl 1,1,2,2-tetrafluoroethyl ether (OTE), tris(2,2,2-trifluoroethyl)orthoformate (TFEO), or any combination thereof.

The electrolyte of any of the foregoing paragraphs, wherein the electrolyte comprises: LiFSI, DME, EC, and TTE; or LiFSI, DME, FEC, and TTE; or LiFSI, DME, VC, and TTE; or LiFSI, TMS, EC, and TTE; or LiFSI, TMS, FEC, and TTE; or LiFSI, TMS, VC, and TTE; or LiFSI, TMPa, EC, and TTE; or LiFSI, TMPa, FEC, and TTE; or LiFSI, TMPa, VC, and TTE; or LiFSI, DMC, FEC, and TTE; or LiFSI, DMC, EC, and TTE; or LiFSI, DMC, EC, FEC, and TTE.

The electrolyte of any of the foregoing paragraphs, wherein the electrolyte consists essentially of the salt, the solvent, the additive, and the diluent.

V. EXAMPLES

Example 1

DMC-Based Electrolytes for Cells with Si/Gr Composite Anodes

A baseline electrolyte formula and several LHCE formulas are shown in Table 1. The baseline electrolyte was prepared on the basis of molarity, whereas the other electrolytes were prepared on the basis of molar ratio. Additives, such as VC and FEC, were added after mixing the lithium salt with solvent and diluent.

TABLE 1

Formulations of the investigated electrolytes

| Name | Formulation |
| --- | --- |
| Baseline | 1.2 M $LiPF_6$ in EC-EMC (3:7 by wt.) + 10 wt. % FEC |
| La | LiFSI-DMC-BTFE (molar ratio = 0.51:1.1:2.2) + 1.0 wt % VC + 5 wt % FEC |
| Lb | LiFSI-DMC-TTE (molar ratio = 0.51:1.1:2.2) + 1.0 wt % VC + 5 wt % FEC |
| Lc1 | LiFSI-DMC-OTE (molar ratio = 0.51:1.1:2.2) + 1.0 wt % VC + 5 wt % FEC |
| Lc2 | LiFSI-DMC-OTE (molar ratio = 0.51:1.1:1.65) + 1.0 wt % VC + 5 wt % FEC |
| Lc3 | LiFSI-DMC-OTE (molar ratio = 0.51:1.1:1.1) + 1.0 wt % VC + 5 wt % FEC |
| Lc4 | LiFSI-DMC-OTE (molar ratio = 0.51:1.1:3.3) + 1.0 wt % VC + 5 wt % FEC |
| Lc5 | LiFSI-DMC-OTE (molar ratio = 0.51:0.84:0.84) + 1.0 wt % VC + 5 wt % FEC |
| Lc6 | LiFSI-DMC-OTE (molar ratio = 0.51:0.84:0.42) + 1.0 wt % VC + 5 wt % FEC |
| Lc7 | LiFSI-DMC-OTE (molar ratio = 0.51:0.84:0.21) + 1.0 wt % VC + 5 wt % FEC |

Full cells were prepared. The anode was composed of 88 wt % Si/Gr composite (BTR New Energy Materials Inc.), 10 wt % polyimide (P84, HP POLYMER GmbH) and 2 wt % carbon black (C65, Imerys) BTR. Loading level was 2.7 mg/cm$^2$. The cathode was composed of 90 wt % Li[$Ni_{0.5}Mn_{0.3}Co_{0.2}$]$O_2$ (NMC532, Toda), 5 wt % carbon black (C45, Imerys), and 5 wt % polyvinylidene fluoride (Solef 5130, Solvay). The loading level and electrode density of cathode were 11.4 mg/cm² and 2.7 g/cm³, respectively. The loading level of each anode and cathode was adequately controlled to satisfy the N/P ratio of 1.2 in the full-cell.

Electrochemical cell testing: Before the full-cell test, the Si anode was cycled 3 times at a C-rate of 0.1C (1C corresponds to 900 mA/g) in a 2032 coin-type half-cell with Li metal as a counter electrode. The operation voltage window was set from 0.02 V to 1.5 V. After the Si electrodes reached the fully delithiated state, they were collected by disassembling the cell. Then they were paired with a cathode for full-cell test in the 2032 coin-type cell. The full-cell was initially cycled for 3 cycles at the C-rate of 0.05C (1C corresponds to 130 mA/g, where the weight is based on only cathode material), then further cycled at the C-rate of 0.33C (1C corresponds to 130 mA/g). The voltage window was between 3.0 V to 4.1 V.

FIG. 3 compares the cycling performance of Si/Gr∥NMC532 full cells using baseline electrolyte and La/Lb electrolytes. After formation cycles, the capacity retention of the cell using baseline electrolyte was 80% in 200 cycles. In contrast, the capacity retentions of the cells using La and Lb electrolytes were 94% and 88% at $200^{th}$ cycles, respectively. After 300 cycles, the capacity retentions of the cells using La and Lb were 88% and 81%, respectively. Sample Lb-Re in FIG. 3 is the repeat of sample Lb.

Figure 4:
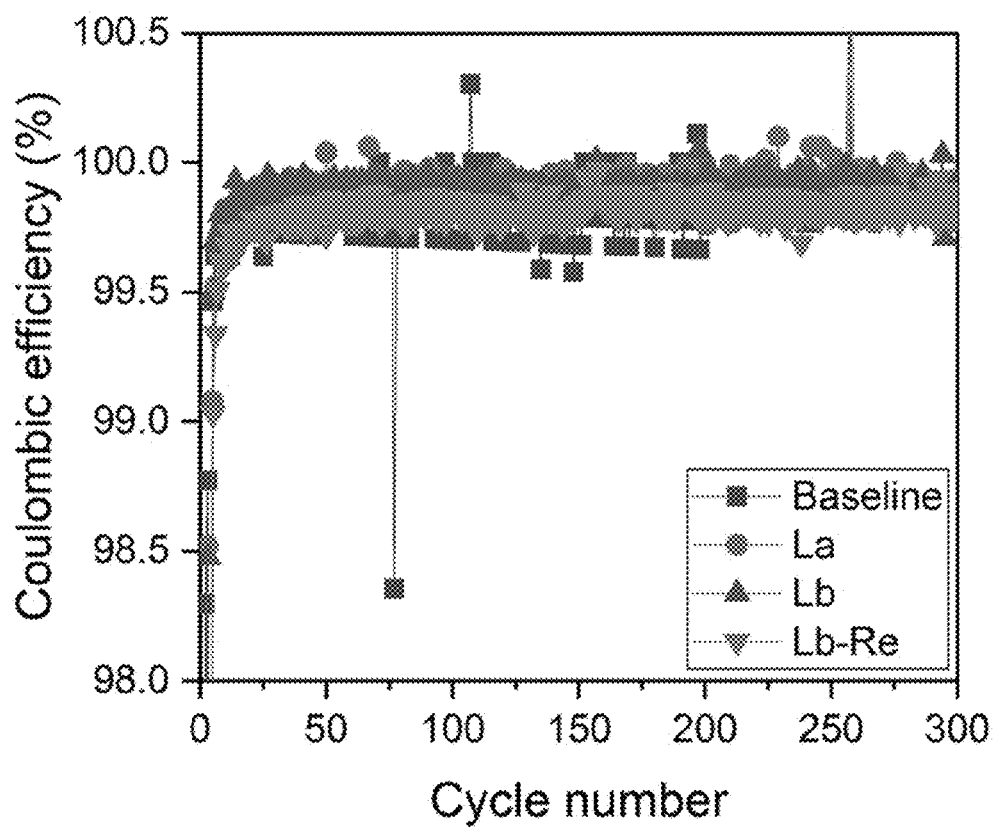
FIG. 4 is a graph showing the Coulombic efficiency (CE) of the Si/Gr‖NMC532 cells of FIG. 3 over the 300 cycles.

FIG. 4 compares the coulombic efficiency (CE) of Si/Gr∥NMC532 full cells using baseline electrolyte and La/Lb electrolytes. At the $200^{th}$ cycle, the CE of cells using baseline electrolyte, La and Lb were 99.77%, 99.99%, and 99.95%, respectively. This trend is consistent with the trend of the capacity retention shown in FIG. 1. Sample Lb-Re in FIG. 4 is the repeat of sample Lb.

Figure 5:
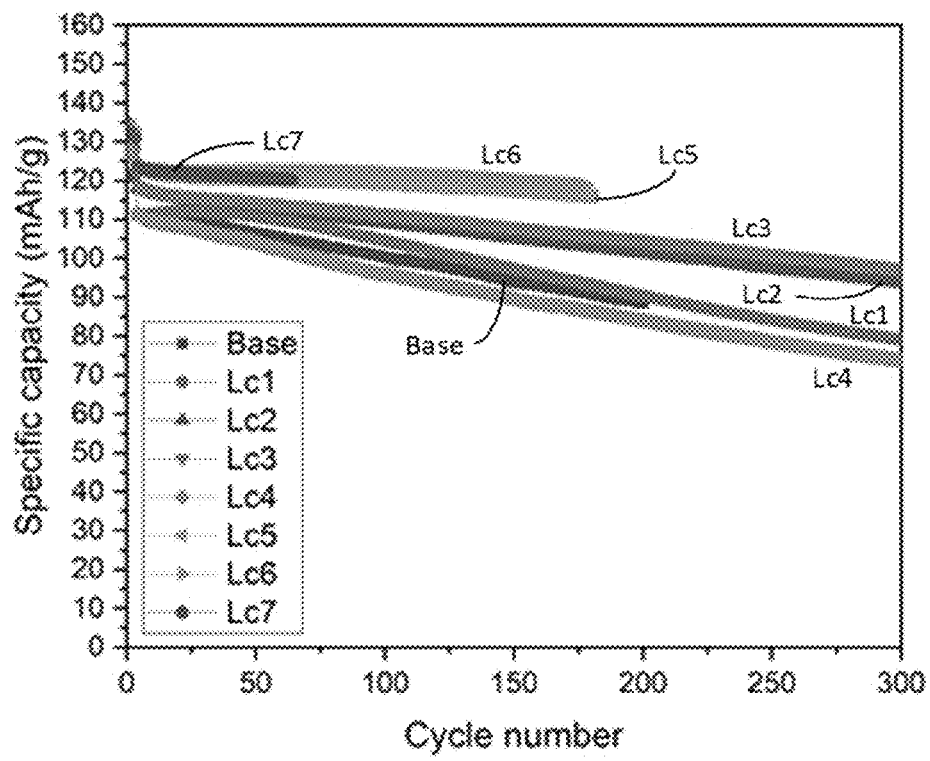
FIG. 5 is a graph showing the capacity retention of Si/Gr‖NMC532 cells with a baseline electrolyte and several additional DMC-based LHCEs (Lc1-Lc7) disclosed herein, and cycled between an operating voltage window of 3 V to 4.1 V for 300 cycles.

FIG. 5 compares the cycling performance of Si/Gr∥NMC532 full cells using baseline electrolyte and Lc series of electrolytes. After formation cycles, the capacity retention of the cell using baseline electrolyte was 85% in 150 cycles. In contrast, the capacity retentions of the cells using Lc1, Lc2, Lc3, Lc4, Lc5, and Lc6 electrolytes were 87%, 89%, 91%, 80%, 95% and 97% in 150 cycles, respectively. The capacity retention of the cell using Lc7 was 98% in 50 cycles.

Figure 6:
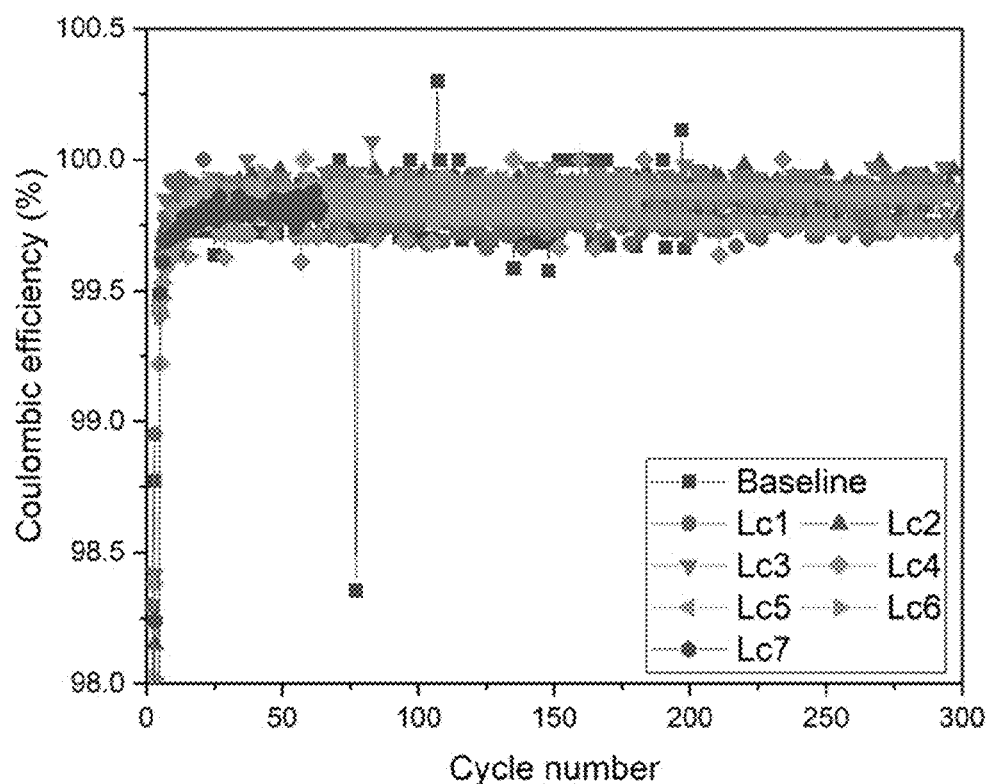
FIG. 6 is a graph showing the CE of the Si/Gr‖NMC532 cells of FIG. 5 over the 300 cycles.

FIG. 6 compares the coulombic efficiency (CE) of Si/Gr∥NMC532 full cells using baseline electrolyte and Lc series of electrolytes. At the $200^{th}$ cycle, the CE of cells using baseline electrolyte, Lc1, Lc2, Lc3, Lc4, Lc5, and Lc6 electrolytes were 99.89%, 99.74%, 99.86%, and 99.81%, 99.78%, 99.83%, and 99.88% respectively. This trend is consistent with the trend of the capacity retention shown in FIG. 5.

Example 2

DMC-Based Electrolytes for Cells with Graphite Anodes

Experimental:

Electrolyte and electrode preparation: The electrolytes were prepared by dissolving the LiFSI or LiPF₆ in the selected solvent and additive mixtures inside an MBraun glovebox filled with purified argon, where the moisture and oxygen content was less than 1 ppm. The NMC811 cathode (composed of 96 wt. % NMC811 as active material and with an areal capacity loading of 2.8 mAh cm⁻²) and the Gr anode (areal capacity loading ~3.5 mAh cm⁻²) electrode laminates. The cathode was punched into 1.27 cm² disks and the Gr anode was punched into 1.77 cm² disks. The electrode disks were further dried at 120° C. overnight under vacuum before use.

Physical properties measurements: Electrolyte conductivities were performed on a Bio-Logic MCS 10 fully integrated multichannel conductivity spectroscopy in the temperature range of −40° C. to 60° C. The viscosities of the electrolytes as a function of temperature were measured with an Anton Paar rheometer (Ashland, Va., USA). A cone-plate measuring system, CP25-1 coupled with a P-PTD200 cell, was used. A Peltier system installed in the measuring system was employed for temperature control. The temperature of samples was initially set at −7° C. to start the measurements. Once a measurement was started, temperature was increased linearly from −7 to 50° C. in a time duration of 32 min while the viscosity was measured and recorded, with a shear rate of 40 s⁻¹. A nitrogen flow chamber was set up above the measuring plate to minimize the sample exposure to air. A certificated viscosity standard S60 (Cannon Instrument Co., State College, Pa., USA) was used to calibrate the rheometer measuring system.

Electrochemical tests: CR2032 coin cells (from MTI Corporation) were assembled for electrochemical test. In Gr∥NMC811 cells, a piece of Gr anode disk, a piece of polyethylene separator (Asahi Hi-Pore, Japan), a piece of NMC811 cathode disk and an extra piece of Al disk were sandwiched together with 100 μL electrolyte and crimped in coin cells with Al-clad positive cans inside the argon-filled glovebox. The cells were cycled at C/3 charge and discharge rate after three formation cycles at C/20 with a cutoff voltage range of 2.5-4.4 V, where 1C corresponds to the current density of 2.8 mA cm⁻². Linear sweep voltammetry (LSV) studies of the electrolyte solutions were conducted in a three-electrode cell configuration (Li|Li|SP-PVDF/Al, the SP areal loading was 0.5 mg cm⁻²) with a scan rate of 0.1 mV s⁻¹ using a CHI606E workstation. Li∥Gr half cells were performed with a cyclic voltammetry (CV) test in a cutoff voltage range of 0.01-2.0 V using scan rate of 0.1 mV s⁻¹.

Characterizations: For postmortem analyses, including X-ray diffraction (XRD), scanning electron microscopy (SEM), transmission electron microscopy (TEM) and X-ray photoelectron spectroscopy (XPS) measurements, the cycled cells were carefully disassembled inside the glovebox to collect the cycled Gr anodes and NMC811 cathodes. These cycled electrodes were rinsed with pure anhydrous DMC solvent to remove residual electrolyte, dried and then sealed in the glovebox before being transferred for characterizations. XRD patterns were obtained on a Rigaku Mini-Flex II XRD instrument (Cu Kα radiation, 30 kV, 15 mA, and scan rate 1.0° per min). SEM measurements were carried out on a Helios focused ion beam (FIB)-SEM at an accelerating voltage of 5 kV and a current of 86 pA. The TEM samples were performed on FEI Helios Dual Beam system. A randomly selected secondary particle of NMC811 was coated with a ~2 μm Pt layer. The particle was then extracted along with the capping layers and welded to the TEM grid (Zou et al., *Chem. Mater.* 2018, 30:7016). The FIB processes were performed at 30 kV, 5 kV and 2 kV to remove the damaged layers and polish the surface. The as-prepared sample was characterized by a JEOL JEM-ARM200F spherical-aberration-corrected microscope with a convergence angle set at 20.6 mrad for imaging (ibid., Li et al., *Science* 2017, 358:506). XPS measurements were conducted on a Physical Electronics Quantera scanning X-ray microprobe with a focused monochromatic Al Kα X-ray (1,486.7 eV) source for excitation and a pass energy of 69.0 eV for high-energy-resolution spectra collection. All the XPS results were fitted with CasaXPS software. The binding energy was calibrated by shifting the C—C/C—H peak to 284.8 eV in C 1s spectra. Shirley BG type was used for background subtraction and GL(30) line shape was used for peak fit. The differential scanning calorimetry measurements were carried out in a Perkin Elmer DSC 6000 using a scanning rate of 2° C. $min^{-1}$ from −50° C. to 50° C.

Three exemplary LHCEs (noted as AE001-AE003, whose formulations are listed in Table 2), based on LiFSI as the salt, organic carbonate solvents (DMC, EC and VC) as the solvating solvent, and TTE as the diluent were developed and evaluated in the cell chemistry with a state-of-the-art high voltage NMC811 (2.8 mAh $cm^{-2}$) cathode and a commercial Gr anode (3.5 mAh $cm^{-2}$). These LHCEs exhibited excellent compatibility with both Gr anode and NMC811 cathode, and effectively generated thin, uniform and robust passivation films (SEI and CEI) on both the anode and cathode surfaces to prevent the electrolytes from continuous chemical/electrochemical decomposition and transition metal dissolution. Accordingly, significantly improved cycling stability of LIBs under the high cut-off voltage of 4.4 V operating at both room temperature and high temperatures, good rate capability under charging and discharging, and excellent low-temperature discharging performance was simultaneously achieved in the LiFSI-DMC-EC LHCE. This work demonstrated that, in some embodiments, the SEI and CEI, but not the electrolyte conductivity and viscosity, govern the LIB performances for fast charging and discharging and low-temperature behavior, so this work represents a viable path to the successful utilization of fast charging and high voltage LIBs in a wide-temperature range.

TABLE 2

Electrolyte formulation, density, conductivity, and viscosity (all at 25° C.) of the baseline electrolyte and the three LHCEs studied in this work

| Electrolyte | Electrolyte formulation | Density (g $ml^{-1}$) | Conductivity (mS $cm^{-1}$) | Viscosity (cP) |
|---|---|---|---|---|
| E-baseline | 1.0 M $LiPF_6$ in EC-EMC (3:7 by wt.) + 2 wt. % VC | 1.39 | 6.07 | 3.35 |
| AE001 | 1.4 M LiFSI in DMC-TTE (2.2:3 by mol.) | 1.50 | 1.40 | 3.67 |
| AE002 | 1.4 M LiFSI in DMC-VC-TTE (2:0.2:3 by mol.) | 1.55 | 1.05 | 3.53 |
| AE003 | 1.4 M LiFSI in DMC-EC-TTE (2:0.2:3 by mol.) | 1.49 | 1.07 | 3.69 |

Electrochemical Stability

Figure 7:
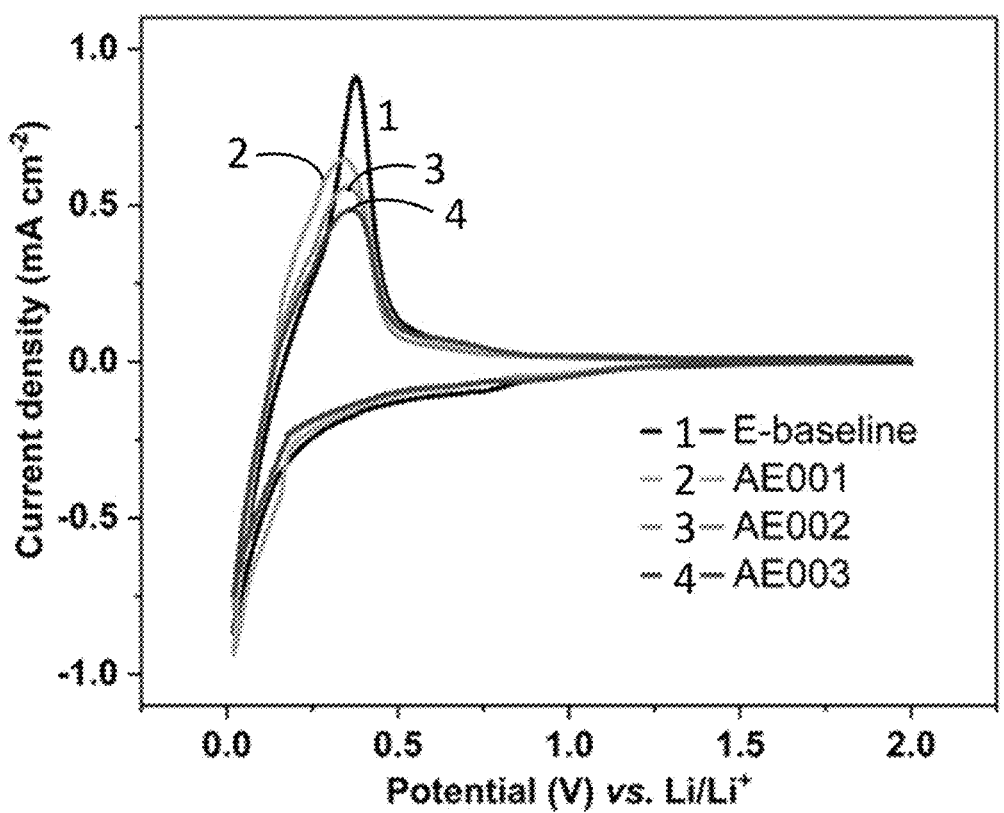
FIG. 7 shows the first cycle cyclic voltammetry curves of Li‖Gr cells with a baseline electrolyte and three DMC-based LHCEs (AE001-AE003) as disclosed herein between 0.02-2.0 V at a scan rate of $0.1$ $mV \cdot s^{-1}$.
Figure 8A:
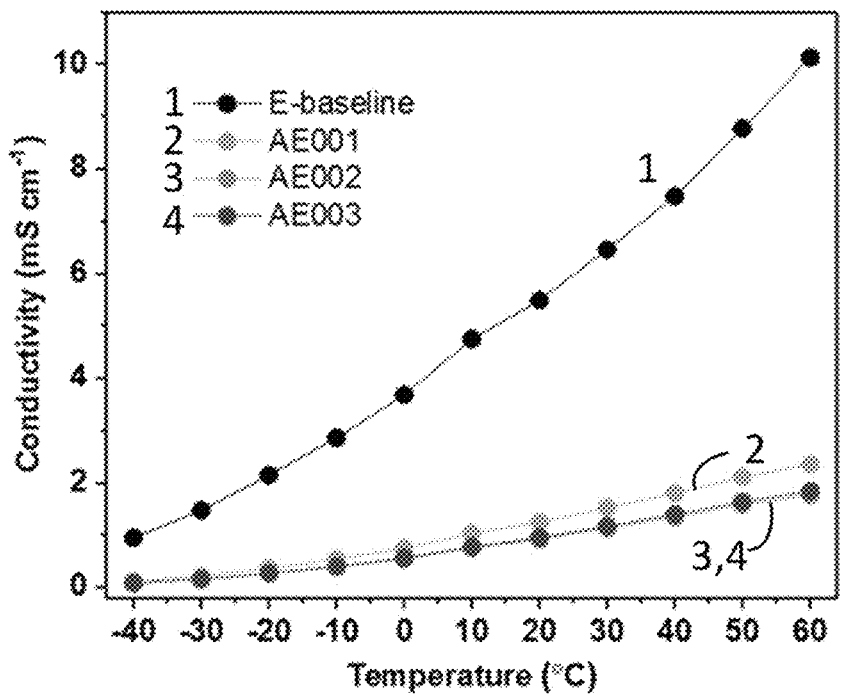
FIGS. 8A and 8B show the temperature dependence of ionic conductivities (8A) and viscosities (8B) of the electrolytes of FIG. 7.
Figure 8B:
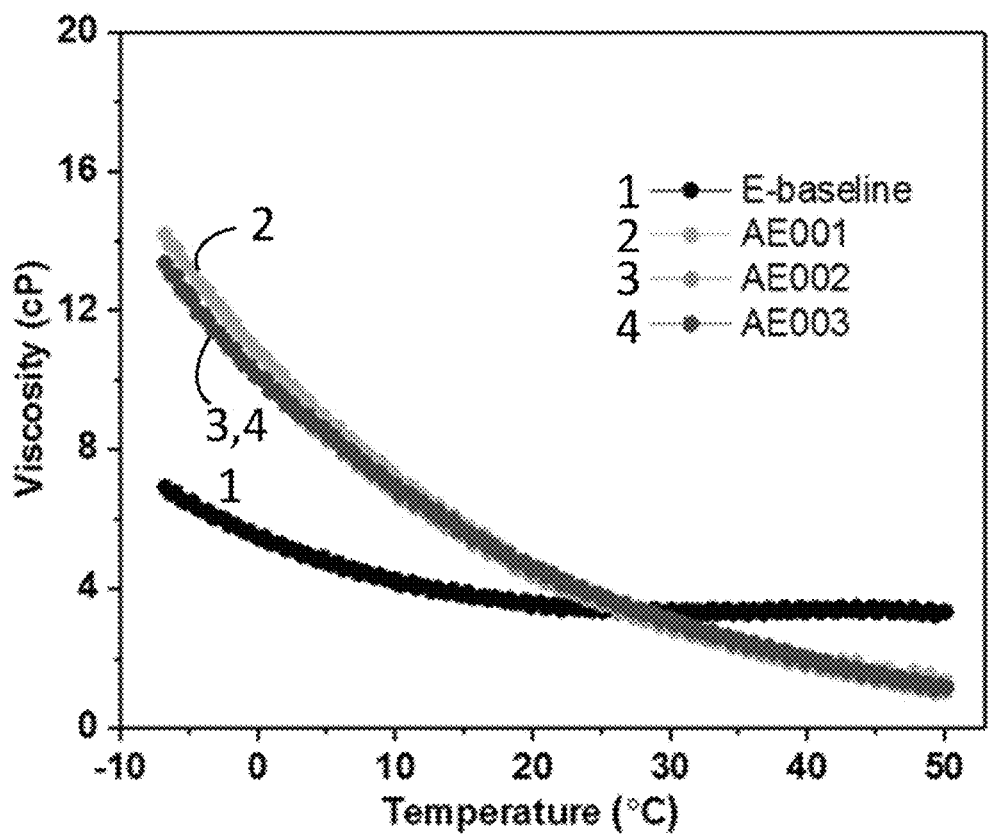

The formulations and basic properties of the three LHCEs (AE001-AE003) and the conventional $LiPF_6$/carbonate electrolyte (noted as E-baseline) are listed in Table 2. The electrochemical stabilities of the four electrolytes on Gr anode and at high voltages were first evaluated by CV in Li||Gr cells and LSV in Li|Li|SP-PVDF/Al three-electrode cells, respectively. It is observed from the CV profiles in FIG. 7 that all three LHCEs showed good compatibility with Gr anode as the baseline electrolyte did, enabling the evaluation of these new electrolytes in Gr-based LIBs. The lower response current densities for the LHCEs than that for E-baseline are possibly due to the lower room-temperature ionic conductivities of LHCEs (Table 2, FIG. 8A). The ionic conductivity values are 4-6 times lower than those of the E-baseline. For instance, the ionic conductivities at 25° C. were 1.40 mS $cm^{-1}$ for AE001, 1.05 mS $cm^{-1}$ for AE002, 1.07 mS $cm^{-1}$ for AE003, and 6.07 mS $cm^{-1}$ for E-baseline. However, the viscosities of LHCEs showed larger changes with temperature than that of E-baseline, where a cross point occurred at about 27° C. with the viscosity value of about 3.4 cP (FIG. 8B). Above 27° C., the three LHCEs had lower viscosities than the E-baseline; but below 27° C. the LHCEs showed larger viscosities than E-baseline.

Figure 9:
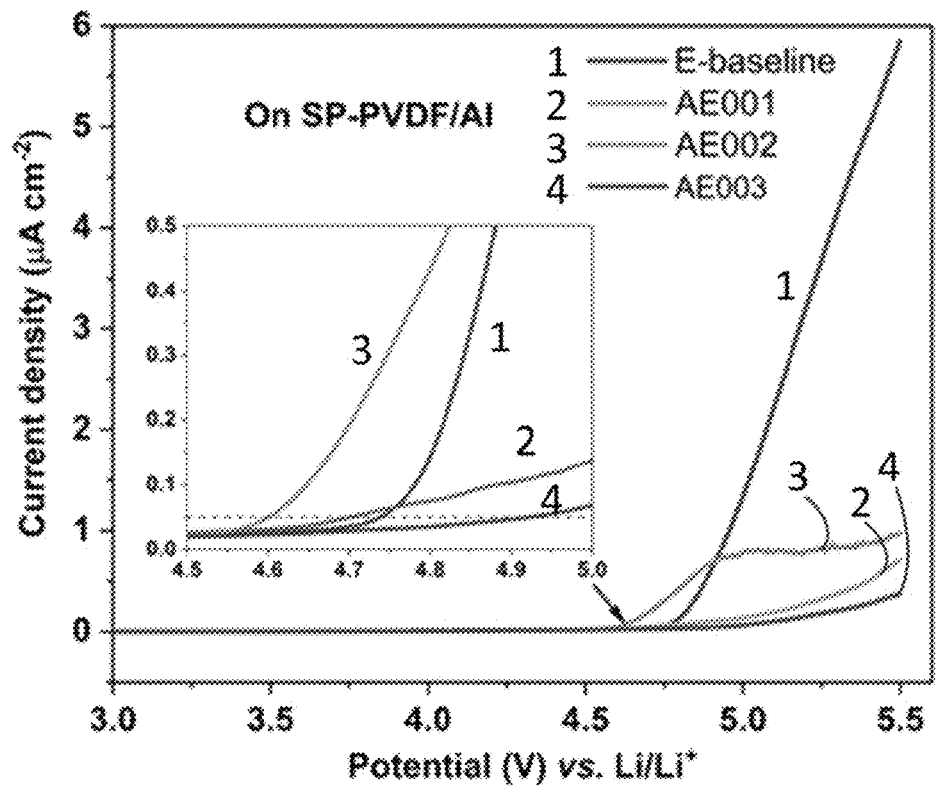
FIG. 9 shows linear sweep voltammetry (LSV) curves on SP-PVDF/Al electrode in three-electrode cells with Li as counter and reference electrodes and SP-PVDF/Al as working electrode at a scan rate of $0.1$ $mV \cdot s^{-1}$.

On the high voltage side, the LSV scans in FIG. 9 showed the anodic decomposition (with a response current density of 0.05 pA $cm^{-2}$) on an SP-PVDF/Al electrode started at 4.70 V in AE001, 4.60 V in AE002, 4.93 V in AE003, and 4.74 V in E-baseline. Although AE001 and AE002 showed slightly lower oxidation potential than E-baseline, the former two electrolytes exhibited much lower current density after 4.91 V than the control electrolyte, indicating good passivation formed from the two LHCEs. Overall, AE003 exhibited superior oxidative stability and good compatibility with Gr electrode, being expected to offer advanced electrochemical performances in high voltage LIBs.

Battery Performance

Figure 10:
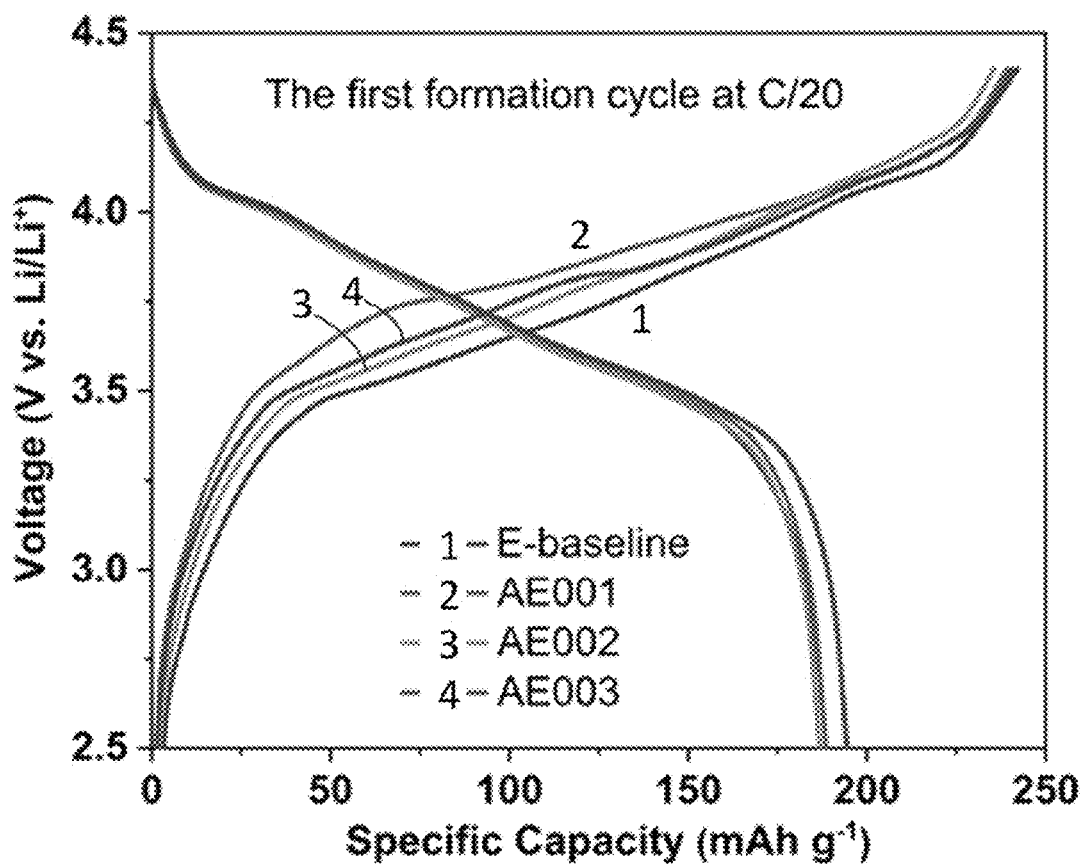
FIG. 10 shows the voltage profiles of the first formation cycle at C/20 rate at 25° C. between 2.5 and 4.4 V for Gr‖NMC811 coin cells with a baseline electrolyte and three DMC-based LHCEs as disclosed herein.
Figure 11A:
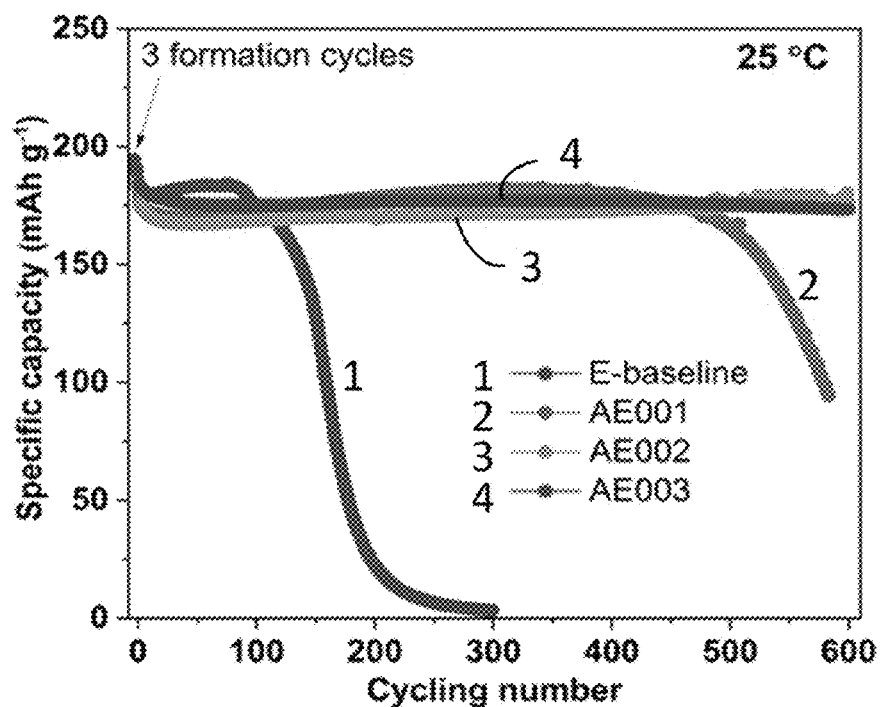
FIGS. 11A and 11B show long-term cycling stability of the cells of FIG. 10 at C/3 rate at 25° C. (11A) and 60° C. (11B) after three formation cycles at 25° C.
Figure 12A:
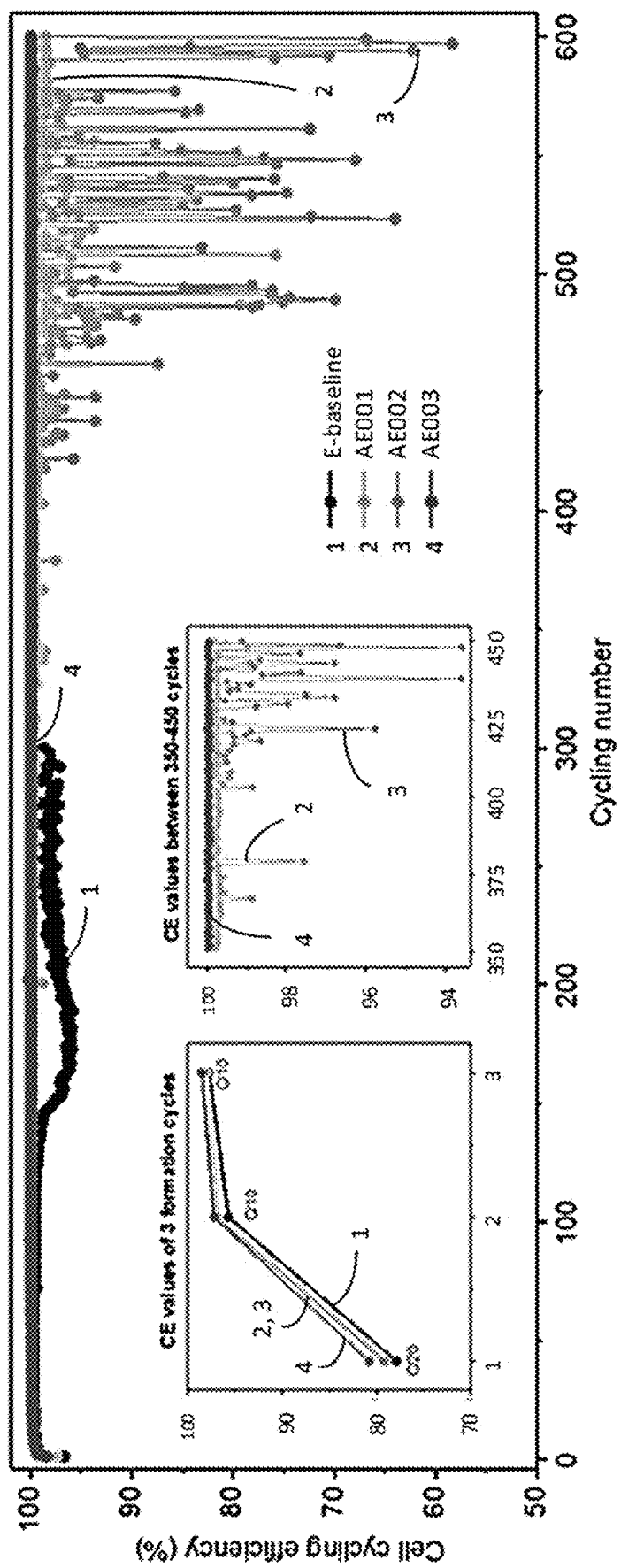
FIGS. 12A-12E show the long-term cycling performance of the Gr‖NMC811 coin cells of FIG. 10 at C/3 rate in the voltage range of 2.5-4.4 V at 25° C.
Figure 12B:
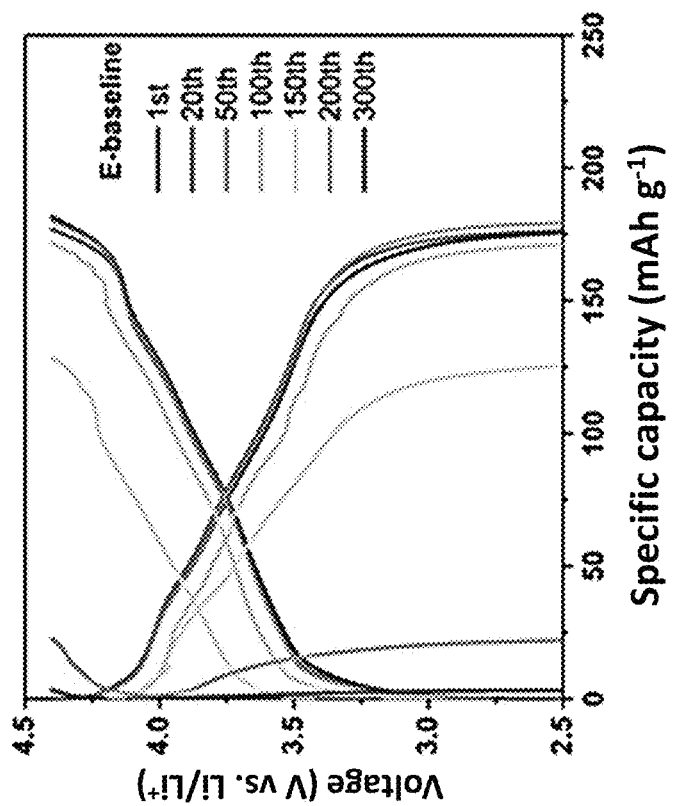
Figure 12C:
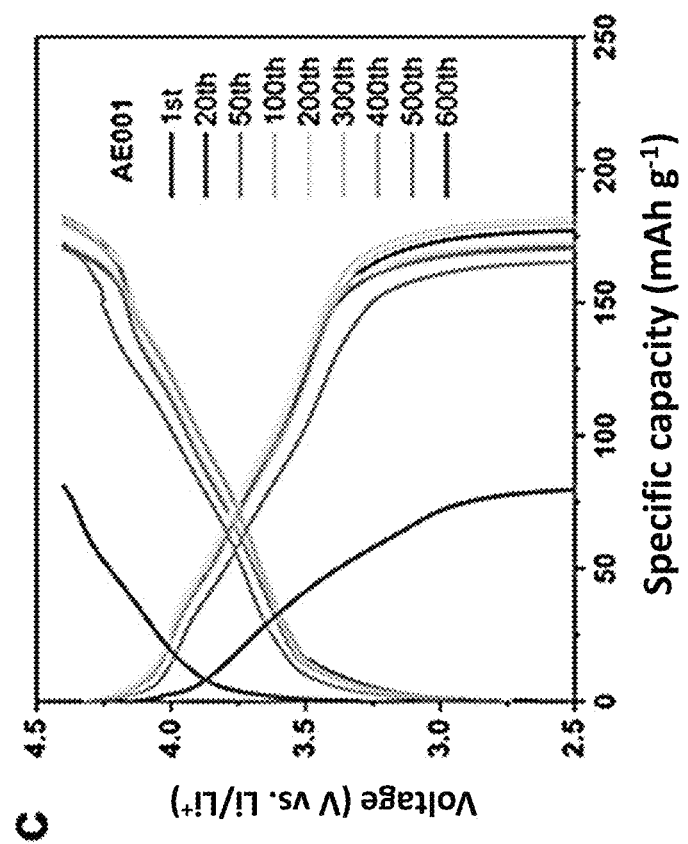

The long-term cycling stability, rate capability and low-temperature discharge performance of the three LHCEs and the E-baseline were investigated in Gr||NMC811 coin cells under the voltages range of 2.5-4.4 V after three formation cycles performed at C/20 for the first cycle and C/10 for the other two cycles, where 1C corresponds to 2.8 mAh $cm^{-2}$. The voltage profiles of the first formation cycle of the cells with different electrolytes at 25° C. are shown in FIG. 10. The cells with the four different electrolytes showed slightly different curves during charge, possibly because of the different oxidations of the electrolyte components, but their discharge curves were nearly the same. The cell using AE003 showed the highest discharge capacity of 194.3 mAh $g^{-1}$ and also the highest Coulombic efficiency (CE) of 80.8% at the first cycle, while the cells using other three electrolytes (AE001, AE002 and E-baseline) exhibited similar discharge capacities of 188.4, 186.8 and 188.5 mAh $g^{-1}$, respectively and the CE values were 78.8% for AE001, 79.3% for AE002 and 77.9% for E-baseline. FIG. 11A shows the long-term cycling stability of Gr||NMC811 coin cells with the four electrolytes at 25° C. under the charge/discharge rate of C/3 after three formation cycles. The corresponding cycling CE and the voltage profiles at selected cycles are shown in FIGS. 12A-12E. It was clearly observed that although the cell with E-baseline electrolyte exhibited slightly higher discharge capacities than the three LHCEs in the first 100 cycles, it had an abrupt capacity drop after that (FIG. 11A), with capacity retentions of 71.5% and 12.5% at the $150^{th}$ and $200^{th}$ cycles, respectively (compared to the capacity of the first cycle at C/3 rate after the three formation cycles), and a fluctuation of cycling CE after ~150 cycles (FIG. 12A). This can be attributed to the poor electrode/electrolyte stability of E-baseline on both Gr and NMC811 and the aggressive side reactions of E-baseline with the Ni-rich NMC material, especially the highly reactive $Ni^{4+}$, which will be discussed later. The consequence was the quick propagation of resistive surface films on Gr and NMC811 surfaces and accordingly the increased overpotential (FIG. 12B), leading to the battery failure at an early stage.

Figure 12E:
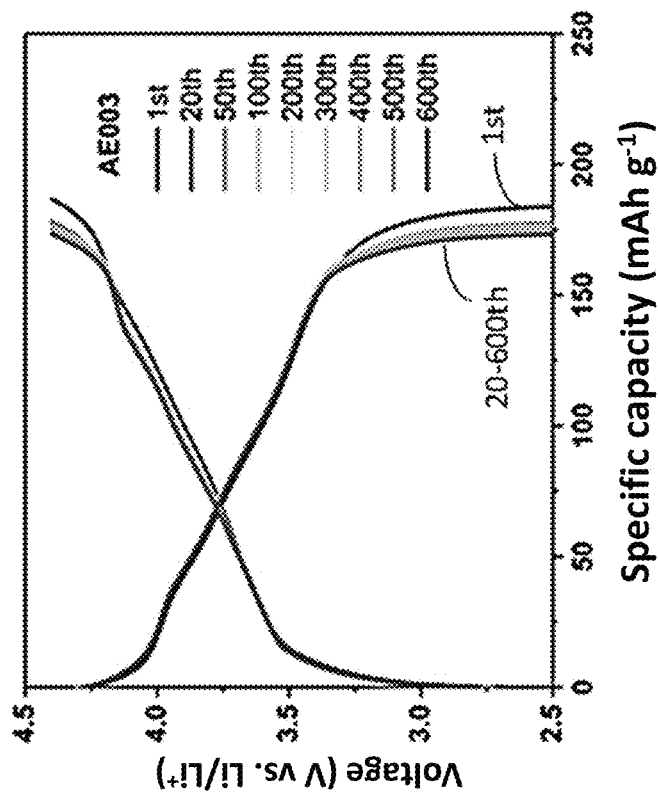
Figure 12D:
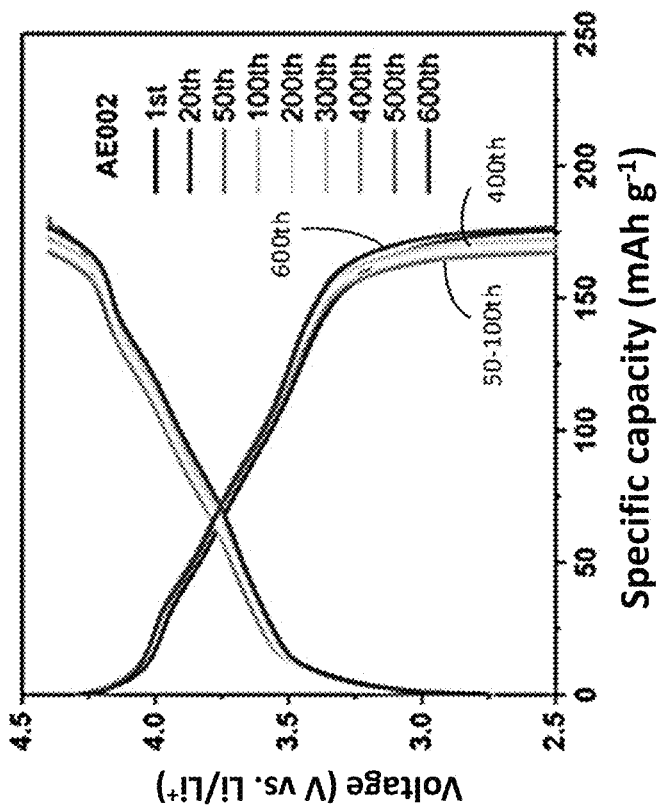

In comparison, the cells with all three LHCEs exhibited significantly improved cycling stability. The cells with AE001 and AE002 gave discharge capacities of 179.8 and 172.9 mAh $g^{-1}$ at the $400^{th}$ cycle with capacity retentions of 100% and 98.6%, respectively. After that, the cell with AE001 experienced capacity fading accompanied by CE fluctuation and voltage polarization, which were more severe after the 500$^{th}$ cycle (FIGS. 12A, 12C), resulting in a capacity retention of 40.7% after 600 cycles. When part of the DMC in AE001 was replaced with VC (i.e. AE002), no capacity attenuation and slight overpotential increase were observed in the cell with AE002 during the 600 cycles (FIGS. 12A, 12D), but the capacity and the CE exhibited fluctuations, an irregular behavior after 400 cycles (FIGS. 11A, 12A), indicating the occurrence of side reactions in the cell with AE002 after long-term cycling. When the VC in AE002 was replaced by equal moles of EC, significant improvement in cycling stability in terms of capacity, CE and overpotential were obtained in the cell with AE003 (FIGS. 10, 12A, 12E). The discharge capacity at the 600$^{th}$ cycle for the cell with AE003 was 173.4 mAh g$^{-1}$, corresponding to a capacity retention of 94.2%. Meanwhile, the CE remained at ~99.9% during the 600 cycles for the cell with AE003, much more stable than the CEs for the cells with AE001 and AE002 (FIG. 12A). This is probably because the participation of EC benefited the formation of uniform and robust SEI on Gr and CEI on NMC811 (which will be discussed more in later sections). More importantly, there was negligible increase in cell overpotential during 600 cycles for the cell with AE003 (FIG. 12E), indicating that the electrode/electrolyte interphase layers are highly conductive for Li$^+$ ion transportation under the participation of EC.

Figure 11B:
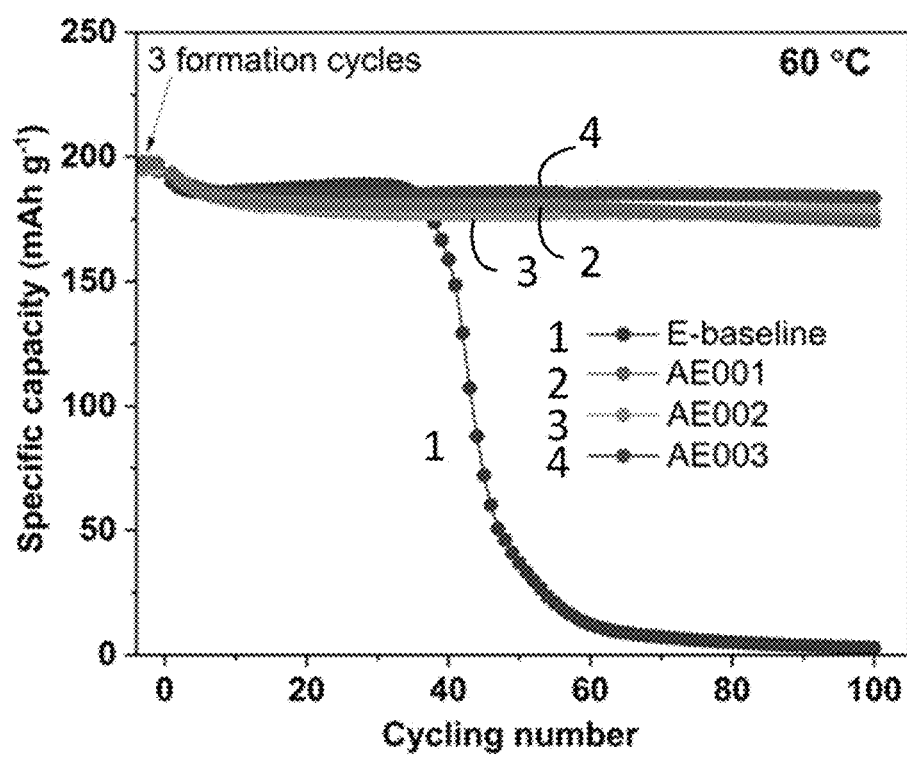
Figure 13A:
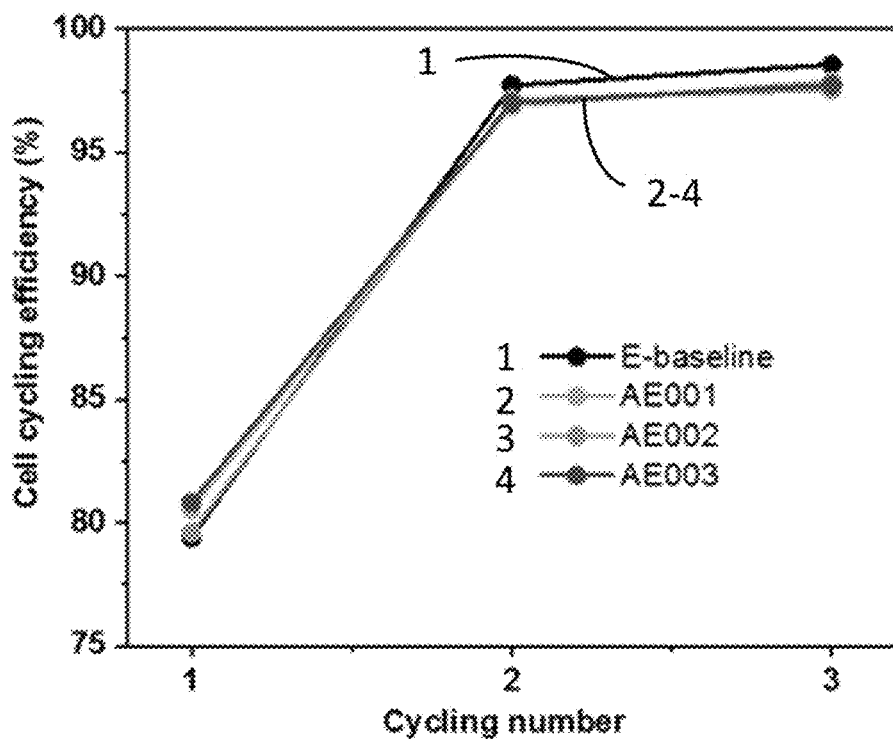
FIGS. 13A-13F show the long-term cycling performance of the Gr‖NMC811 coin cells of FIG. 10 at C/3 rate in the voltage range of 2.5-4.4 V at 60° C., with three formation cycles at 25° C.
Figure 13B:
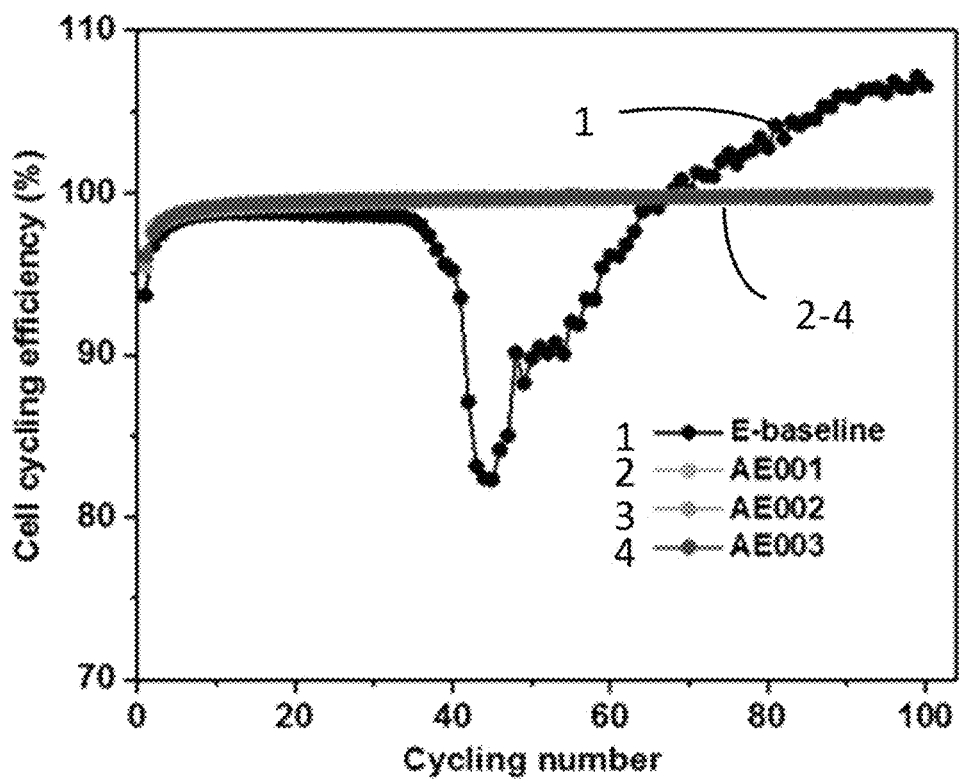
Figure 13C:
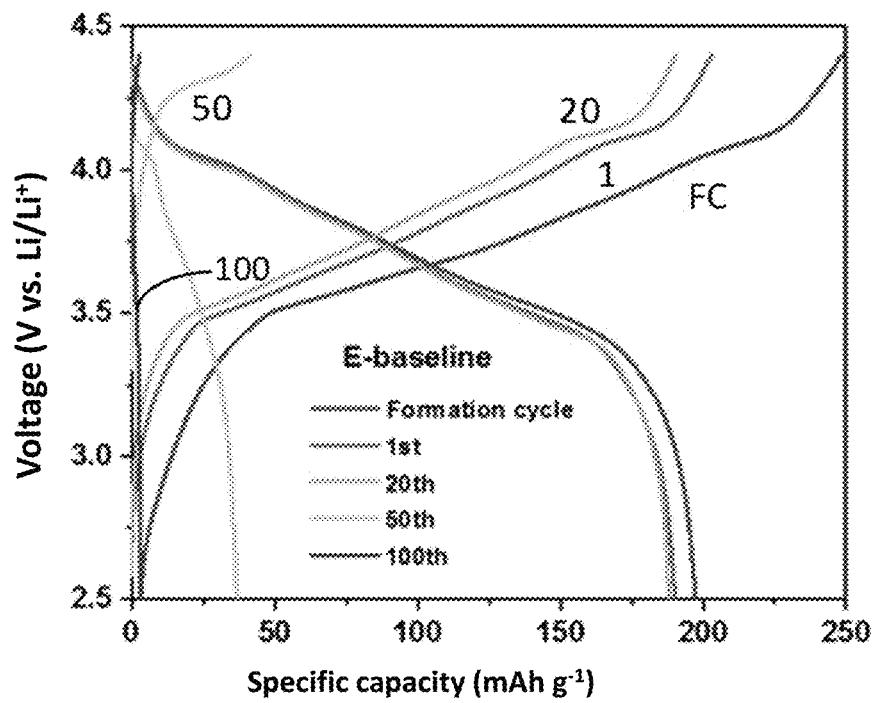
Figure 13D:
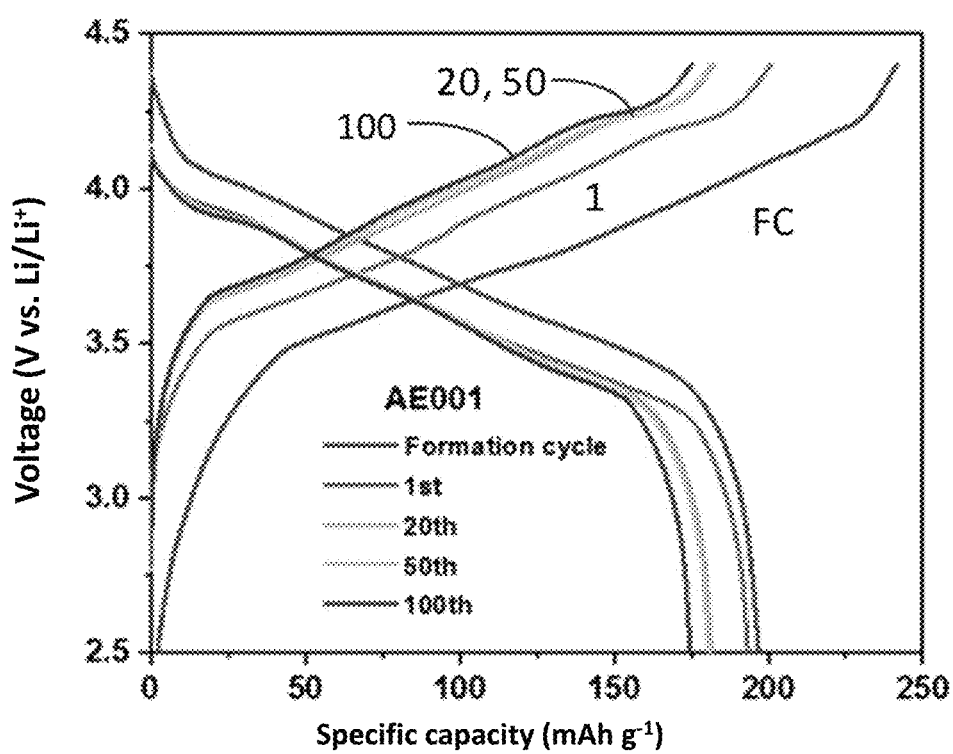
Figure 13E:
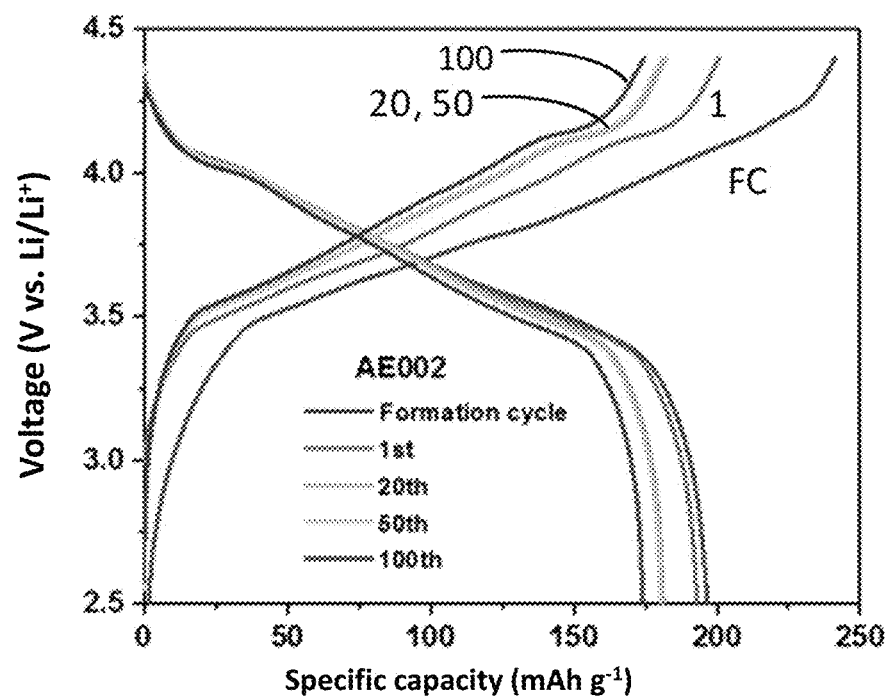
Figure 13F:
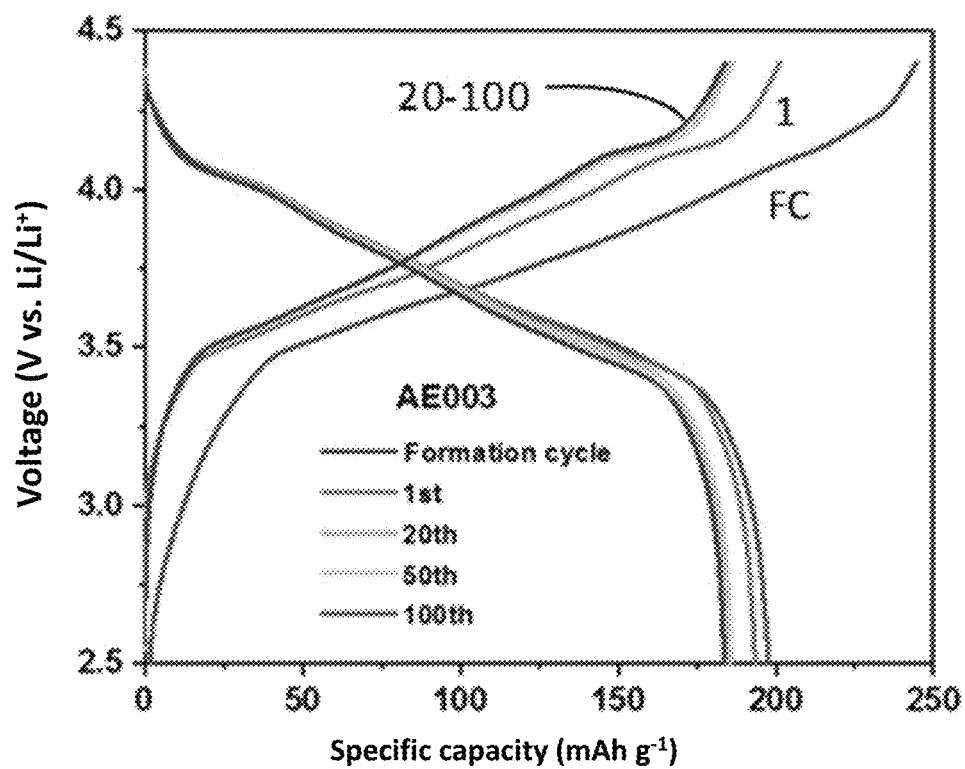
Figure 14:
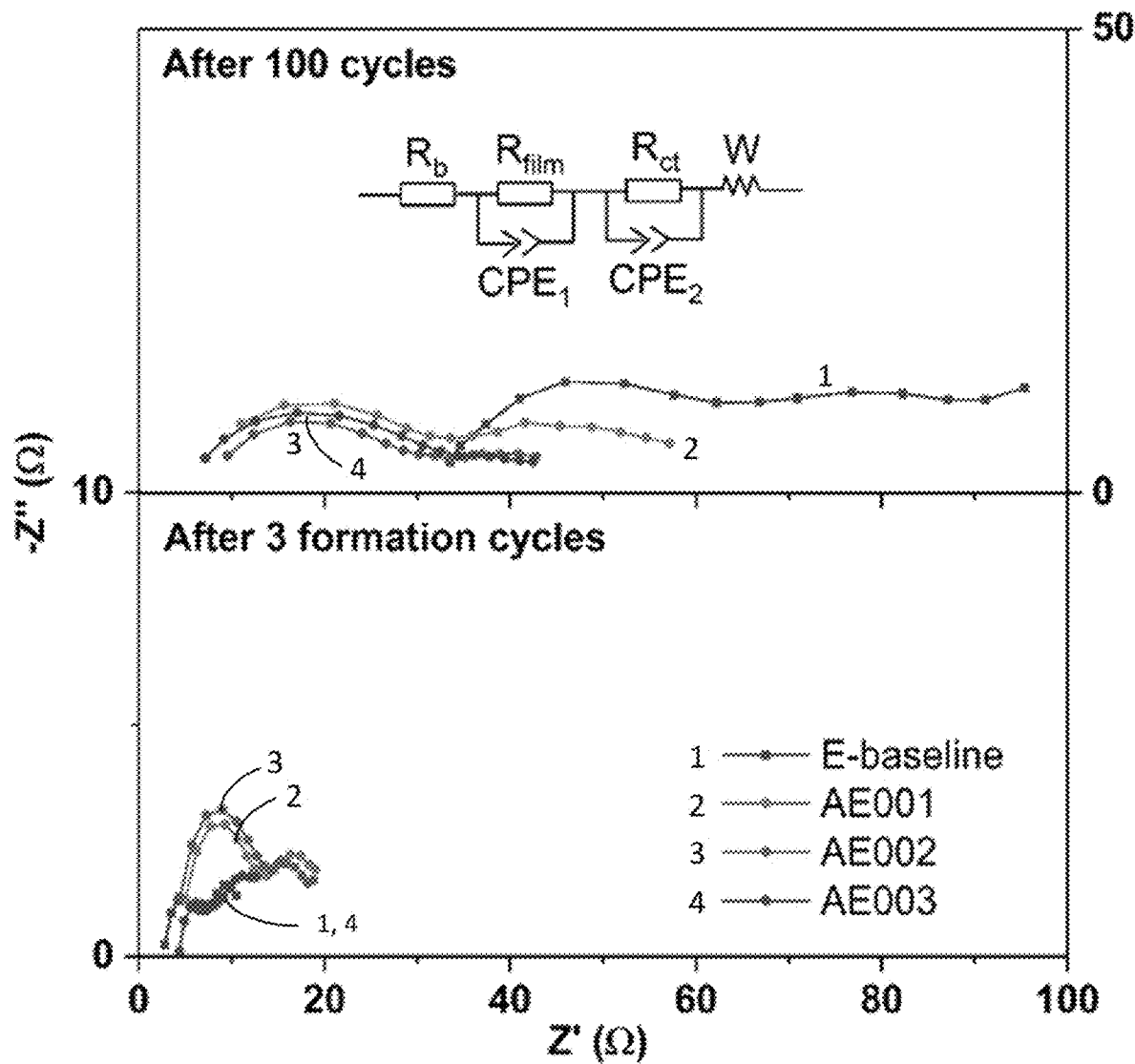
FIG. 14 shows Nyquist plots of the Gr‖NMC811 coin cells of FIG. 10 after 3 formation cycles at 25° C. (lower panel) and after 100 cycles at 60° C. (upper panel).

In the conventional LiPF$_6$/carbonate electrolyte, an increase in testing temperature will drastically accelerate the parasitic reactions of electrolyte on both high-Ni NMC cathode and Gr anode. This will accelerate the degeneration of NMC cathode and cause the formation of more resistive components in the SEI film of Gr anode, which in turn results in fast capacity loss. The cycling performance of the Gr||NMC811 coin cells with the four electrolytes was evaluated at 60° C. after three formation cycles at 25° C. As seen from FIG. 11B, the cell with E-baseline exhibited a sharp capacity drop at the 35$^{th}$ cycle and the capacity retention after 50 cycles was only 19.4%, accompanying with obviously increased voltage polarization (FIG. 13C). In contrast, the cells with AE001-AE003 demonstrated superior high-temperature cycling performance with the reversible capacities of 174.3, 177.9 and 183.6 mAh g$^{-1}$ after 100 cycles (FIG. 11B), corresponding to capacity retentions of 90.2%, 91.8% and 94.9%, respectively, with limited increase in overpotential during the 100 cycles (FIGS. 13D-13F). As evidenced by the electrochemical impedance spectroscopy (EIS) results of the Gr||NMC811 cells before and after 100 cycles at 60° C. shown in FIG. 14, the total impedances of the cells with four electrolytes were small before cycling and the cell with E-baseline was slightly smaller than those with LHCEs. However, after 100 cycles at 60° C. the cell with E-baseline had a significant increase in the contact resistance ($R_b$), the surface film resistance ($R_{film}$) and the charge transfer resistance ($R_{ct}$), while the cells using AE001-AE003 had a slight increase in $R_b$, limited increase in $R_{film}$ and low values of $R_{ct}$. The cells using AE002 and AE003 had even smaller $R_{ct}$ than that of AE001. The values of the $R_b$, $R_{film}$ and $R_{ct}$ were fitted according to the equivalent circuit in FIG. 14, and the results are presented in Table 3. The EIS results confirmed the much more conductive surface films formed on the electrode/electrolyte interfaces using AE001-AE003, especially AE002 and AE003 after cycling, even at 60° C.

TABLE 3

EIS fitting results for Gr||NMC811 cells with different electrolytes.

| Electrolyte | After 3 formation cycles | | | After 100 cycles at 60° C. | | |
|---|---|---|---|---|---|---|
| | $R_b$ (Ω) | $R_{film}$ (Ω) | $R_{ct}$ (Ω) | $R_b$ (Ω) | $R_{film}$ (Ω) | $R_{ct}$ (Ω) |
| E-baseline | 2.8 | 2.3 | 8.9 | 30.3 | 48.0 | 160.8 |
| AE001 | 4.4 | 7.6 | 9.7 | 5.3 | 21.6 | 38.8 |
| AE002 | 4.1 | 6.8 | 9.6 | 6.7 | 16.1 | 29.8 |
| AE003 | 4.1 | 4.3 | 6.1 | 3.2 | 15.0 | 22.8 |

Figure 15A:
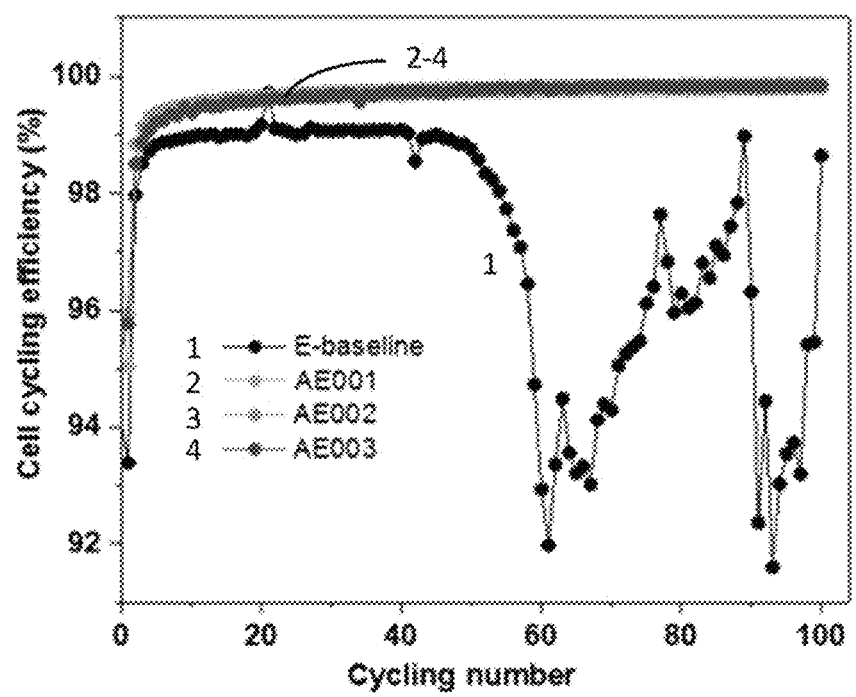
FIGS. 15A-15F show the long-term cycling performance of the Gr‖NMC811 coin cells of FIG. 10 at C/3 rate in the voltage range of 2.5-4.4 V at 60° C., with three formation cycles at 60° C.
Figure 15B:
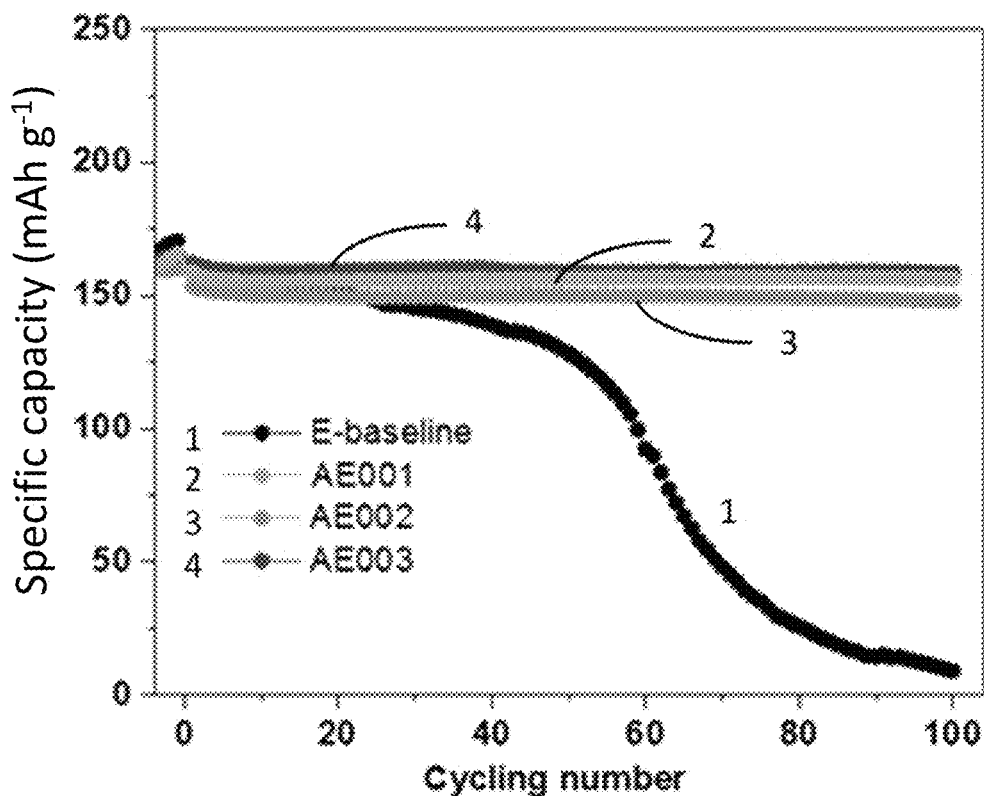
Figure 15C:
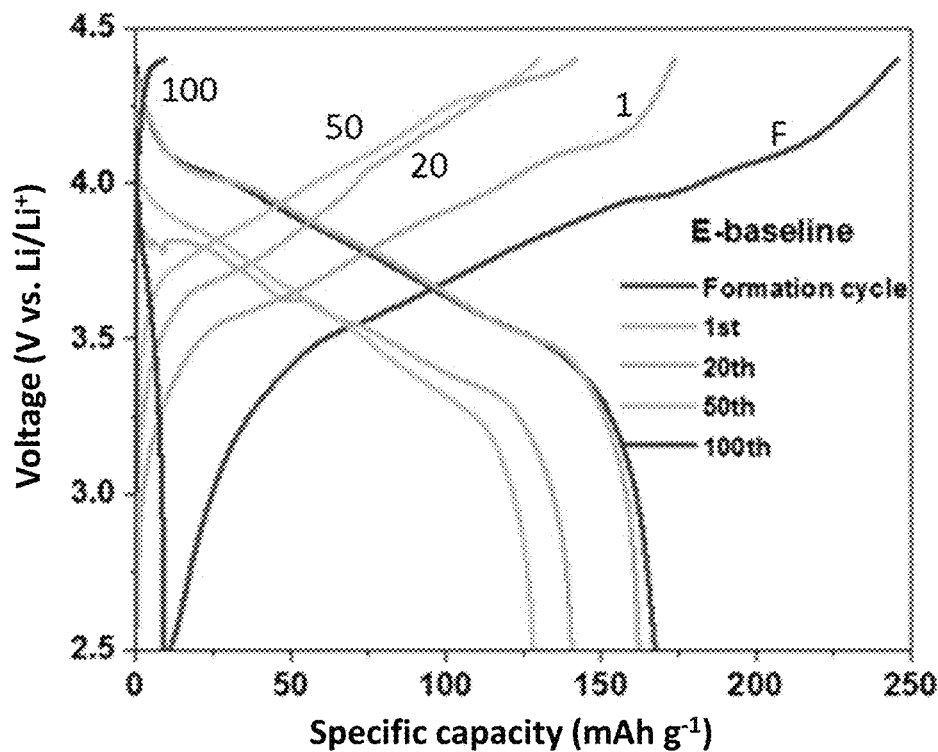
Figure 15D:
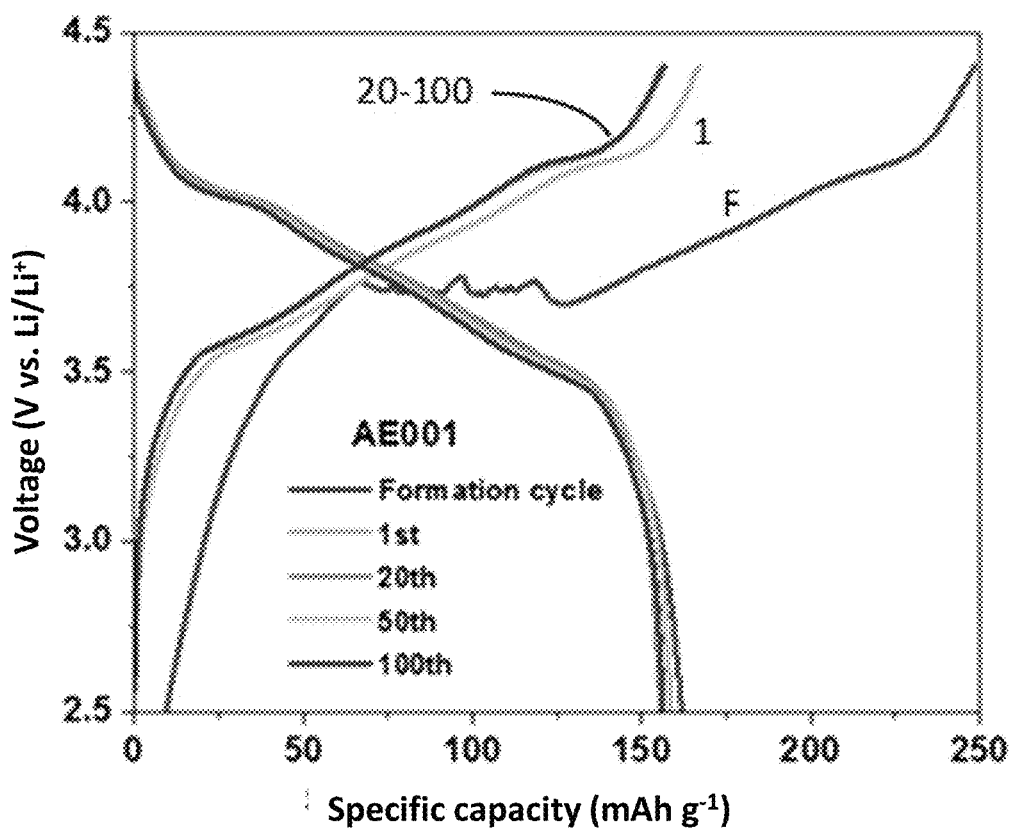
Figure 15E:
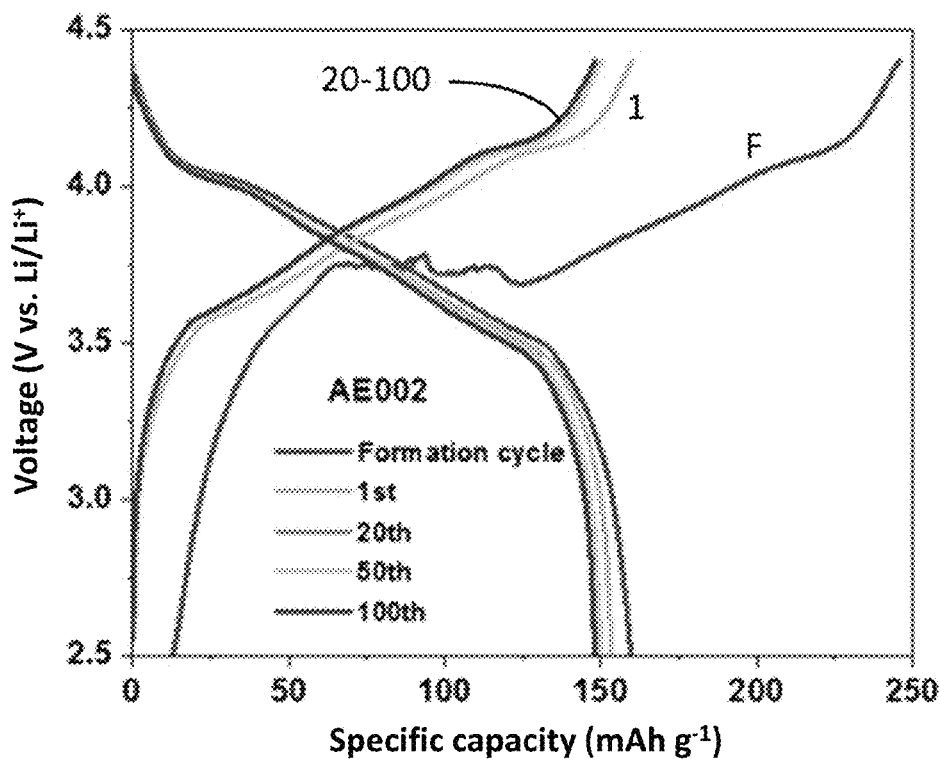
Figure 15F:
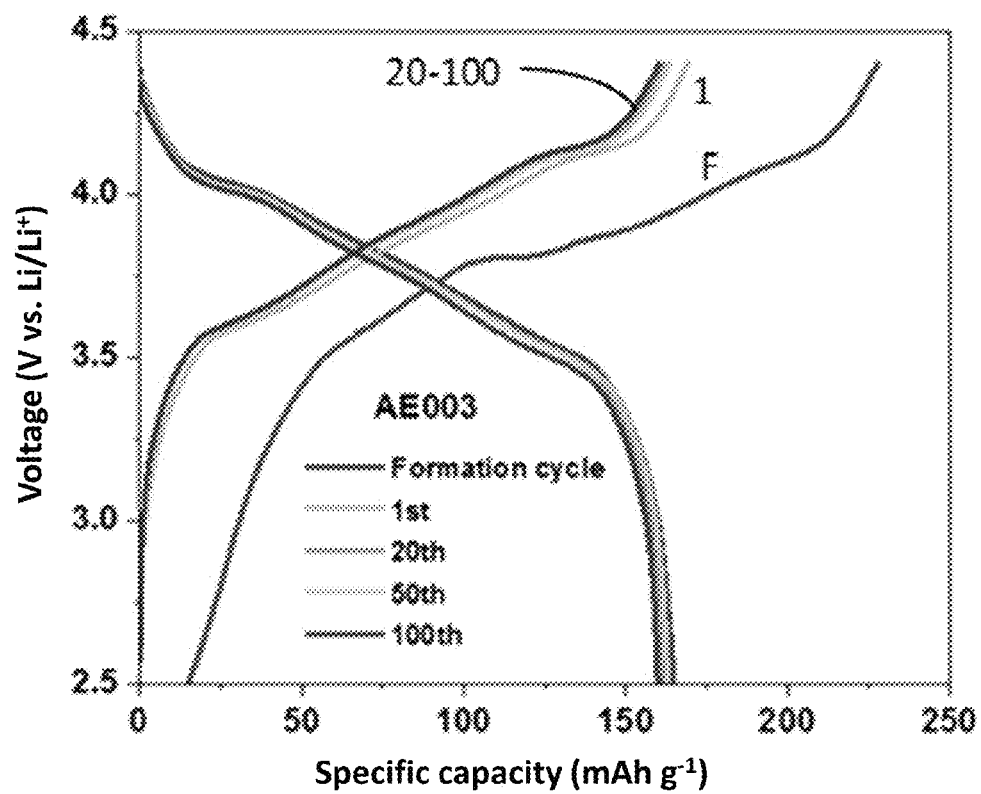

When the formation cycles of the Gr||NMC811 coin cells were conducted at elevated temperatures (e.g. 60° C.), the three LHCEs also led to very stable cycling performance (FIG. 15B) at the same temperature as the formation cycles were conducted, with limited change in overpotential (FIGS. 15C-15F) although the cell capacities decreased with increasing the formation temperature. The CEs of the first formation cycle using E-baseline and AE001-AE003 all decreased to the range of 65-68% (FIG. 15A). This is possibly because more parasitic electrolyte decompositions occurred on both Gr and NMC811 electrodes during the formation cycles at the elevated temperature, resulting in lower first cycle CE, thicker surface film, larger resistance of the SEI layer, and more loss of Li$^+$ in the cathode material, thus lower capabilities of the cells (160-167 mAh g$^{-1}$) when compared to those of cells with formation cycles performed at 25° C. On the contrary, the Gr||NMC811 cell using the conventional LiPF$_6$ electrolyte showed much inferior cycling performance (FIG. 15B). The rapid capacity drop in E-baseline occurred about 30 cycles at 60° C. and the remaining capacity was almost negligible at the 1$_{00}$th cycle. In comparison, the capacity retentions after 100 cycles for AE001, AE002 and AE003 were 98.6%, 96.5%, and 98.0%, respectively. In addition, the cell overpotential growth in AE001-AE003 was almost negligible during the 100 cycles, compared to the significant voltage polarization after the first cycle using the baseline electrolyte (FIGS. 15C-15F). It is indicated that even at higher formation temperature, the cells with three LHEs especially AE003 demonstrated excellent cycling stability and less voltage polarization, which is also an indication of the high quality of formed SEI on Gr and CEI on NMC811 at elevated temperatures.

Figure 16A:
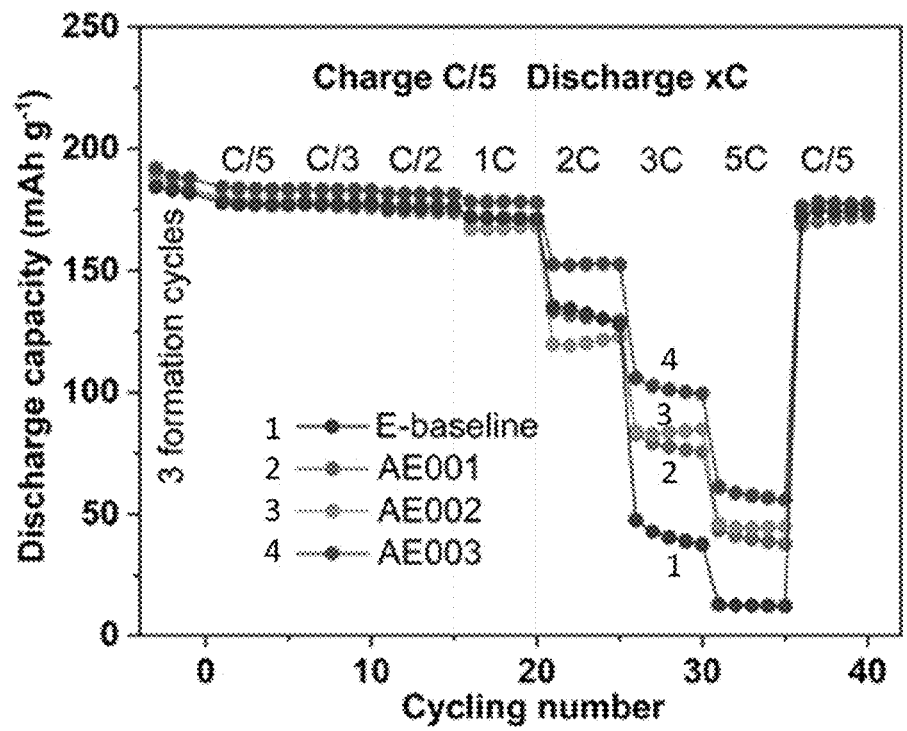
FIGS. 16A and 16B show rate capabilities of the Gr‖NMC811 coin cells of FIG. 10 under varying discharge rates (xC, FIG. 16A) with the same charge rate at C/5, and varying charge rates (xC, FIG. 16B) with the same discharge rate at C/5.
Figure 16B:
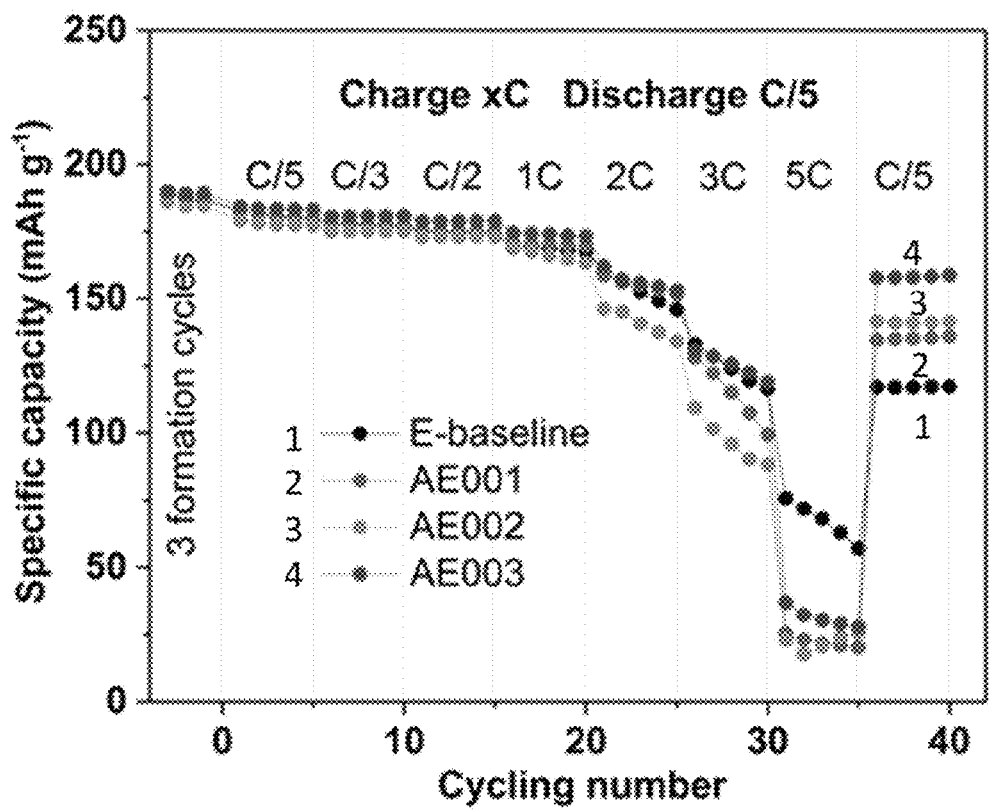
Figure 17:
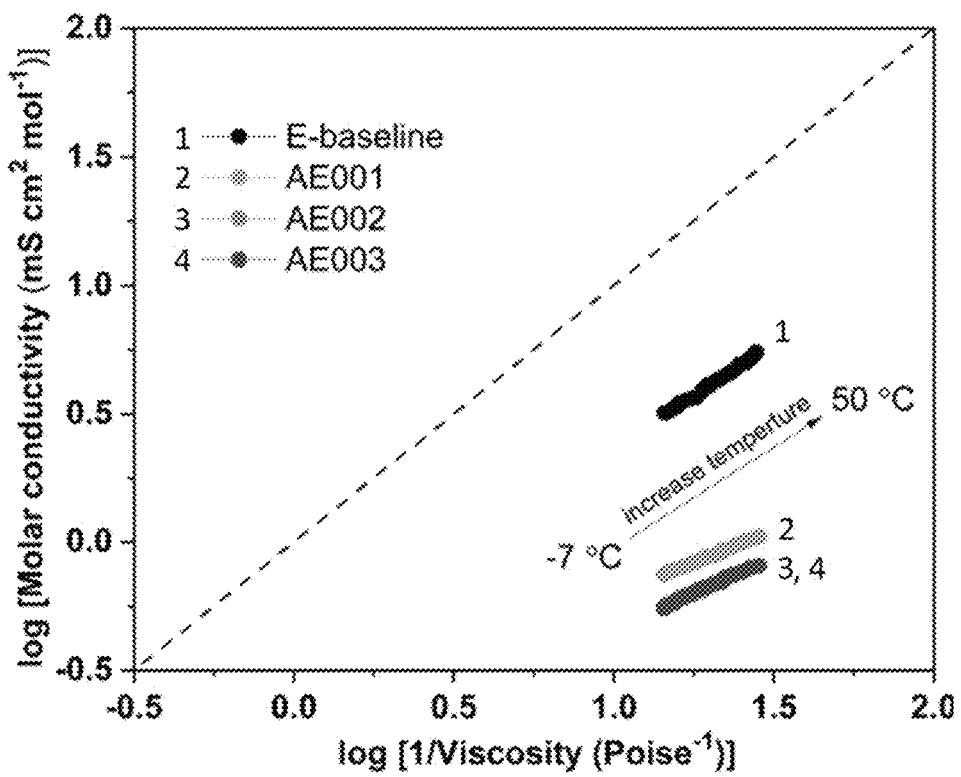
FIG. 17 is a Walden plot of the baseline electrolyte and the three DMC-based LHCEs according to conductivity and viscosity with temperature.
Figure 18:
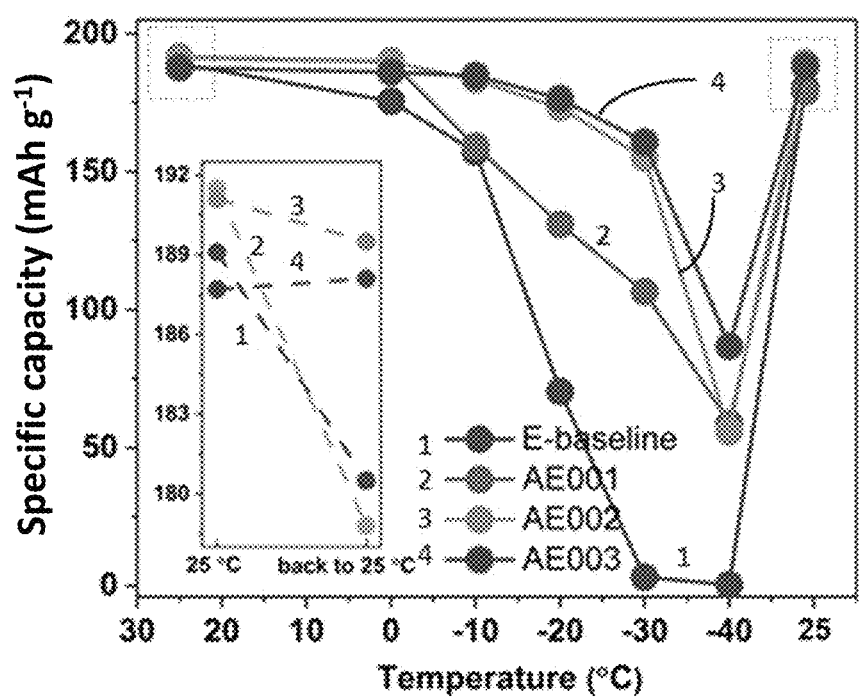
FIG. 18 shows the low-temperature discharge performance of the Gr∥NMC811 coin cells of FIG. 10 at C/5 discharge rate. The operating temperature for all charging process was 25° C. while the discharging was conducted at 25° C., 0° C., −10° C., −20° C., −30° C. and −40° C., and then back to 25° C. The inserted diagram shows the discharge capacities at 25° C. before and after the low-temperature discharging. 1C corresponds to 2.8 mA cm$^{-2}$.

The rate capabilities of the three LHCEs and the E-baseline at different C rates were also evaluated in Gr||NMC811 cells by two testing protocols. Under the protocol with a constant charge rate of C/5 and different discharge rates from C/5 to 5C, as shown in FIG. 16A, the cell with AE003 showed the superior discharge rate capability in the full rate range while the baseline electrolyte suffered rapid capacity fading when discharge rates were 3C and 5C. The cells with AE001 and AE002 exhibited similar discharge rate capability like E-baseline at 1C rate and below but better performance than E-baseline at discharge rates of 3C and 5C. When the discharge rate was changed back to C/5, the cells with all four electrolytes had the similar discharge capacities. As for the protocol with different charge rates from C/5 to 5C but the same discharge rate of C/5 (FIG. 16B), the cell with AE002 showed inferior rate capability than the cells with other LHCEs and the baseline electrolyte from C/5 to 5C. The cell with AE001 kept similar reversible capacities like the cell with E-baseline when the charge rate was up to 2C, and the cell with AE003 maintained the same rate capability as the cell with E-baseline till 3C rate during charging. When the charge rate was increased to 5C, the cells with all three LHCEs showed very limited capacity, lower than the cell with E-baseline. This is mainly because the LHCEs have stronger ion associations (FIG. 17) than the baseline electrolyte, which makes it more difficult to desolvate at the SEI of the Gr electrode. When VC and EC were added in the LHCEs (i.e. AE002 and AE003), even stronger ion associations occurred compared to the LHCE AE001 with only DMC as the solvating solvent. However, when the charge rate was set back to C/5, the recovering discharge capacity from high to low followed the order of AE003>>AE002>AE001>>E-baseline. The results from both rate capability testing protocols demonstrated the superior rate performance of the cells with AE003 up to 3C rate, indicating the more conductive electrode/electrolyte interfaces on both Gr and NMC811 electrodes and correspondingly fast electrode redox reaction kinetics in the cells with AE003.

Figure 19A:
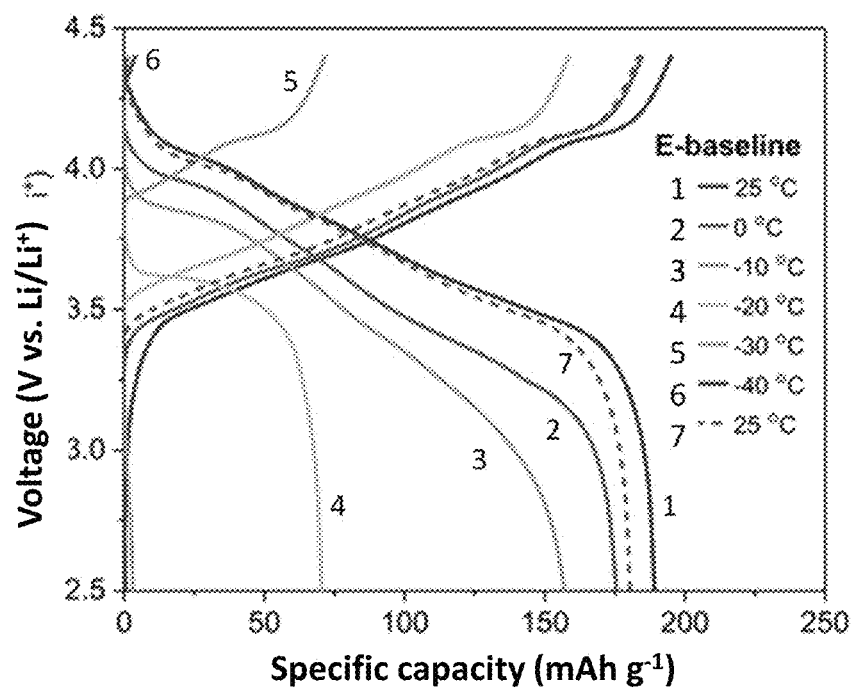
FIGS. 19A-19D show voltage profiles of the Gr∥NMC811 coin cells of FIG. 10 during low-temperature discharging tests in the temperature range of 25° C. to −40° C. at C/5 charge/discharge rate between 2.5-4.4 V with the baseline electrolyte (19A), AE001 electrolyte (19B), AE002 electrolyte (19C), and AE003 electrolyte (19D). Three formation cycles (first at C/20 and the other two at C/10) were conducted at 25° C. before the low-temperature testing. The operating temperature for charging is 25° C. and the temperatures for discharging are 25° C., 0° C., −10° C., −20° C., −30° C. and −40° C., respectively, then back to 25° C.
Figure 19B:
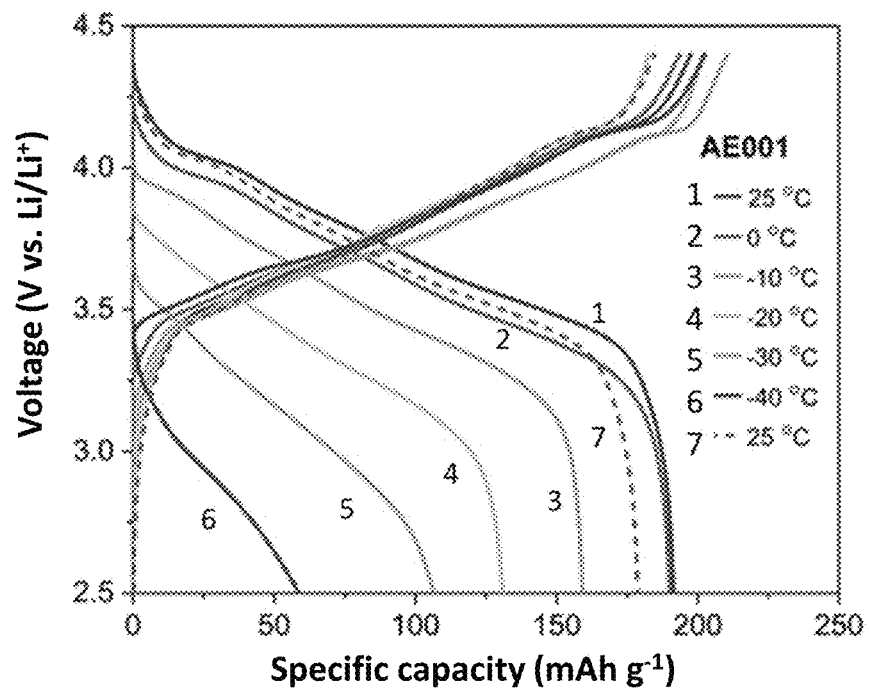
Figure 19C:
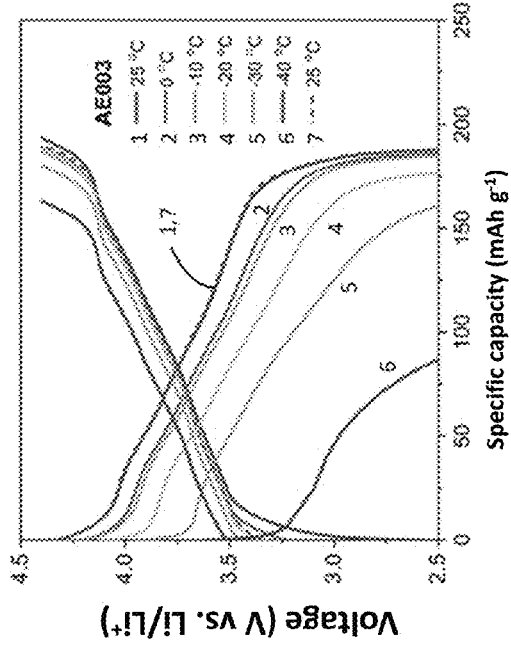
Figure 19D:
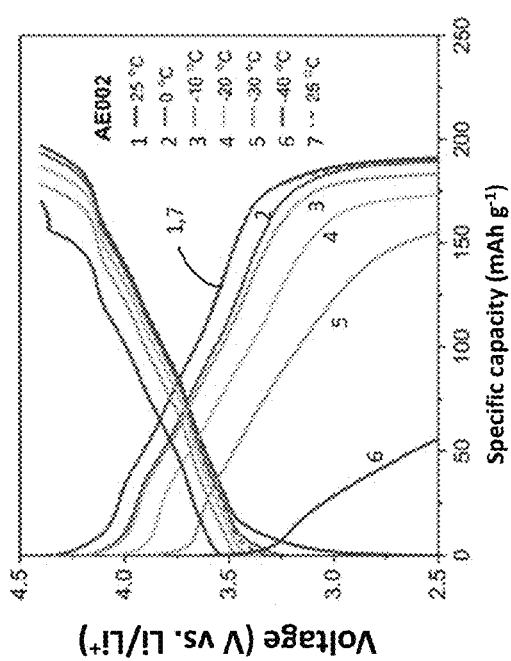
Figure 20:
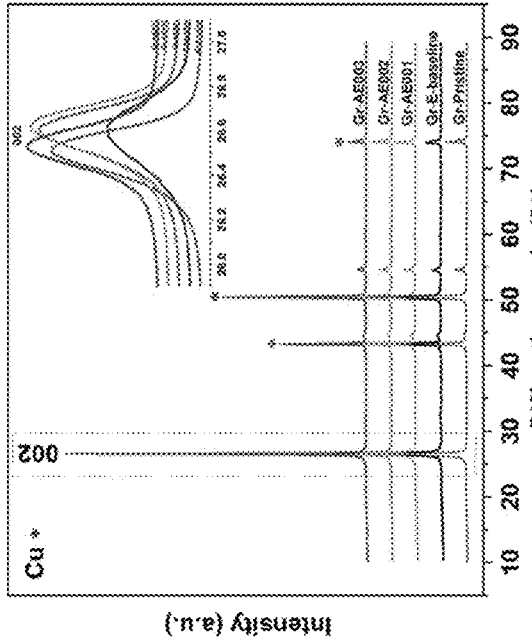
FIG. 20 shows differential scanning calorimetry (DSC) curves of the E-baseline, and the AE001, AE002, and AE003 LSEs.

Furthermore, the low-temperature discharging performance of the LHCEs and E-baseline was performed (25° C. to −40° C.), as shown in FIGS. 18 and 19A-19D. Even with much lower ionic conductivities and doubled viscosities under low temperatures than the E-baseline, the LHCEs enabled superior low-temperature discharge performances, as evidenced by the significantly higher capacity retentions in the full range of the testing temperatures, better recovery of the capacity when the temperature was set back to 25° C. and greatly smaller voltage decay than the conventional $LiPF_6$ electrolyte, which should be attributed to the more conductive electrode/electrolyte interfaces formed in the LiFSI-based LHCEs. As for E-baseline, when the operating temperature decreased from 25° C. to 0° C., −10° C., −20° C. and −30° C., the discharge capacity retention compared to that of 25° C. (189 mAh g$^{-1}$) continually decreased to 92.6%, 83.1%, 37.0% and 1.6%, respectively, accompanied by severe voltage decay (FIG. 19A). The cell using E-baseline failed at and below −20° C. In comparison, the cell with AE003 showed negligible discharge capacity fading and voltage decay when the temperature reduces from 25 to 0° C. and −10° C. (FIG. 19D). When operating at −30° C., the discharge capacities of the cells with AE001-AE003 were 106.5, 154.9, and 160.7 mAh g$^{-1}$, corresponding to capacity retentions of 55.6%, 81.1% and 85.6% and energy density retentions of 47.1%, 72.1% and 76.0%, respectively (compared to 25° C.). When further decreasing the temperature to −40° C., the cells with LHCEs all suffered sharp capacity drop, but the capacity retentions still were 30.7%, 29.2% and 46.2%, respectively. The differential scanning calorimetry (DSC) scan in FIG. 20 confirmed the absence of solidification in LHCEs. The peaks at about 2-3° C. are due to the melting of ice formed during cooling process of the samples in liquid nitrogen. Therefore, it is speculated that the accelerated increase of viscosities when temperatures are lower than −30° C. in LHCEs (FIG. 8B) should contribute to the fast capacity decay at −40° C. When the working temperature turns back to 25° C. after the low-temperature discharging tests, the reversible capacities of the cells with AE002 and AE003 fully recovered, with negligible voltage decay (FIGS. 18 and 19C,D); while for the cells with E-baseline and AE001, 95.5% and 93.4% of the discharge capacities were recovered, respectively. It is seen from the low-temperature tests that AE003, which contains a small portion of EC with high-melting point, presented better low-temperature discharge performance than the LHCEs without EC. This is significantly different from the previous reports, in which EC plays an adverse effect on the low-temperature discharge capacity of LIBs using the $LiPF_6$/carbonate electrolyte (Lie et al., *ACS Appl. Mater. Interfaces* 2017, 9:18826). It is speculated that the small portion of EC in AE003 is beneficial to the formation of a robust and more conductive electrode/electrolyte interface layer, resulting in superior $Li^+$ ion transfer kinetics which enables the better low-temperature discharge performance in the cells with AE003 than in AE001 and AE002.

Overall, the Gr||NMC811 full cells using LHCEs exhibited significantly superior electrochemical performances in terms of long-term cycling stability at room temperature and high temperature, capacity retention, voltage stability, rate capability and low-temperature discharging behavior in comparison with E-baseline cells at a high cutoff voltage of 4.4 V. These performances are the best ever reported for LIBs based on a high energy density NMC811 cathode and Gr anode at a high charge cutoff voltage. In addition, the results demonstrated that the electrolyte conductivity and viscosity were not the major controlling factors for the LIB performances at fast charging/discharging and low-temperature discharge. Therefore, Gr||NMC batteries combining the high energy density NMC811 cathode, and the highly stable electrolytes of LHCEs, especially AE003, are a promising energy storage system for wide-temperature-range (from −30 to 60° C.) applications.

Graphite/Electrolyte Interface

Figure 21:
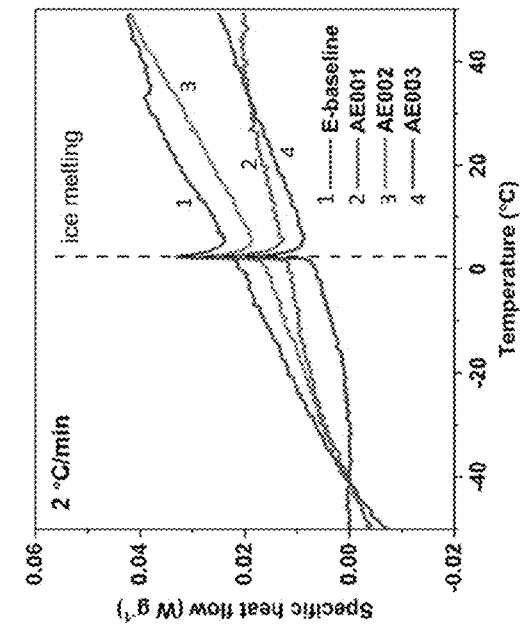
FIG. 21 shows x-ray diffraction (XRD) patterns of the pristine Gr anode and the cycled Gr anodes in E-baseline and the LSEs after 100 cycles at 60° C.; the inset image is the expanded view of (002) reflection.

In LIBs, the electrolyte stability on the Gr anode is a significant factor for the cell performances. The XRD (FIG. 21) and SEM (FIG. 22) were firstly used to characterize the crystalline structures and morphologies of the Gr anodes, respectively, after 100 cycles at 60° C. in the four electrolytes. The XRD patterns show that the Gr cycled in AE003 took negligible changes away from the pristine one, indicating the superior structural integrity of Gr layers after cycling. The SEM images of cycled Gr particles in FIGS. 22A-22D showed insignificant difference in the four electrolytes except for the covered surface layers which may exhibit different thicknesses. Under high resolution transmission electron microscope (HRTEM), the pristine Gr showed a clean surface (FIG. 23A). After 100 cycles in E-baseline, a non-uniform surface layer of 3-6 nm thick was covered on the Gr (FIG. 23B), which should be derived from the decomposition of the electrolyte, mainly EC and $LiPF_6$. When the electrolyte was changed to AE001, the LHCE of 1.4 M LiFSI/DMC-TTE, a slightly thinner SEI of around 3-5 nm was generated on the Gr anode (FIG. 23C). However, the similar thickness of SEI layers formed in E-baseline and AE001 leads to totally different electrochemical performance in wide temperatures, implying the great difference in the composition of the SEI layers. Furthermore, with the use of a small amount of VC to replace equal amount of DMC, a more homogeneous and thinner SEI was formed on the Gr anode with a thickness of ca. 1.5 nm in AE002 (FIG. 23C). With further modification by replacing the VC with the same amount of EC, an even more homogeneous and thinner SEI layer of ca. 1 nm was observed on the Gr anode in AE003 (FIG. 23A). As demonstrated by the well-maintained Gr layer structure in these three LHCEs shown in FIGS. 23C-23E and their stable cycling performance in FIGS. 11A-11B, the SEI films formed on the Gr anodes in these LHCEs are thin but robust. In addition, as evidenced by the EIS results of the Gr||NMC811 cells before and after 100 cycles at 60° C. shown in FIG. 14 and Table 3, the SEI films formed in these LHCEs especially AE002 and AE003 are much more ionically conductive. These observations are also consistent with the greatly improved battery performances in wide-temperature cycling, rate capability and low-temperature discharge shown in FIGS. 16A-B and 18.

To analyze the electrolyte decomposition products on the cycled Gr anodes, XPS was further conducted. The elements and their related atomic ratios detected in the SEI layers are summarized FIG. 24. It is seen from FIG. 24 that the SEIs from the four electrolytes had roughly similar contents of Li, C and O, but the SEI from E-baseline had much higher content of F than the ones from the three LHCEs. On the other hand, P was only detected in the SEI from E-baseline, while N and S were only found in SEIs for the three LHCEs, which are from the decompositions of the salt anions used in the related electrolytes, respectively. When analyzing the narrow scan XPS spectra, it was found that the SEI components from E-baseline were significantly different from those in the LHCEs because of the involvement of different anions and solvents. The three LHCEs showed similar SEI components but different compositions, as suggested by the detailed elemental distributions of the SEI on Gr anodes in FIGS. 25, 26. Combining the results from the C 1s and O 1s spectra, it can be observed that the SEI formed in E-baseline contained more organic compounds due to the increased products from the solvent reduction/decomposition and supported by the higher amounts of C—C/C—H, C=O and C—O contained species, as found in the measured surface layer composition. However, the nature of the SEIs formed in the LHCEs was more inorganic, as a result of significant salt reduction/decomposition products such as $Li_2O$. This effect along with the appearance of C (C—$SO_x$, 287.7 eV, C 1s), N (N—S, 398.4 eV, N 1s) and S (S—O, 167.3 eV and S—N, 169.2 eV, S 2p) signals and the decrease of C=O (531.1 eV, O 1s) signal on the surface films imply that the SEI layers in LHCEs derived mainly from $FSI^-$ anions and could effectively inhibit further side reactions of the solvent. The slight amount of C—F species found in the LHCEs indicates the participation of TTE in the SEI formation. Combining with the electrochemical performances in FIGS. 11A-i 1 B, the higher contents of F, N and S species in AE003 than those in AE001 and AE002 (FIG. 24) may suggest the improved SEI passivating ability from more completed $FSI^-$ sacrificial decomposition. Therefore, these LiFSI-based LHCEs diluted with TTE created a Li-rich interphase by early-onset reduction of the salt anion and effectively suppressed the solvent reduction/decomposition, enabling unprecedented and highly reversible cycling based on Gr anode in high voltage window and moreover exhibiting fast ion conduction and stability over a wide temperature range. Meanwhile, obviously much higher Ni 2p signal could be seen on the Gr anode cycled in E-baseline while the Ni 2p signal is hardly detected on the Gr anodes cycled in the three LHCEs. The Ni is from the NMC cathode. The Ni 2p results indicate the LHCEs can enable a much better protective CEI than E-baseline in such high cut-off voltage, enabling superior cathode stability.

Cathode/Electrolyte Interface

Figure 24:
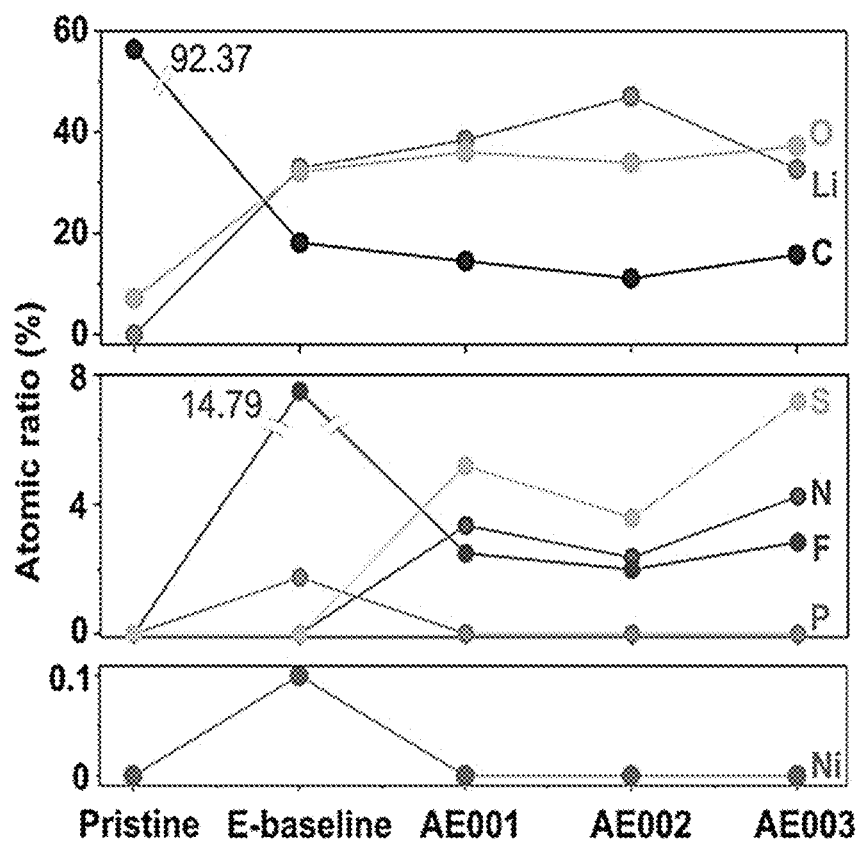
FIG. 24 shows quantified atomic composition ratios of the elements in the SEI layer from the baseline, AE001, AE002, and AE003 electrolytes by x-ray photon spectroscopy.
Figure 25:
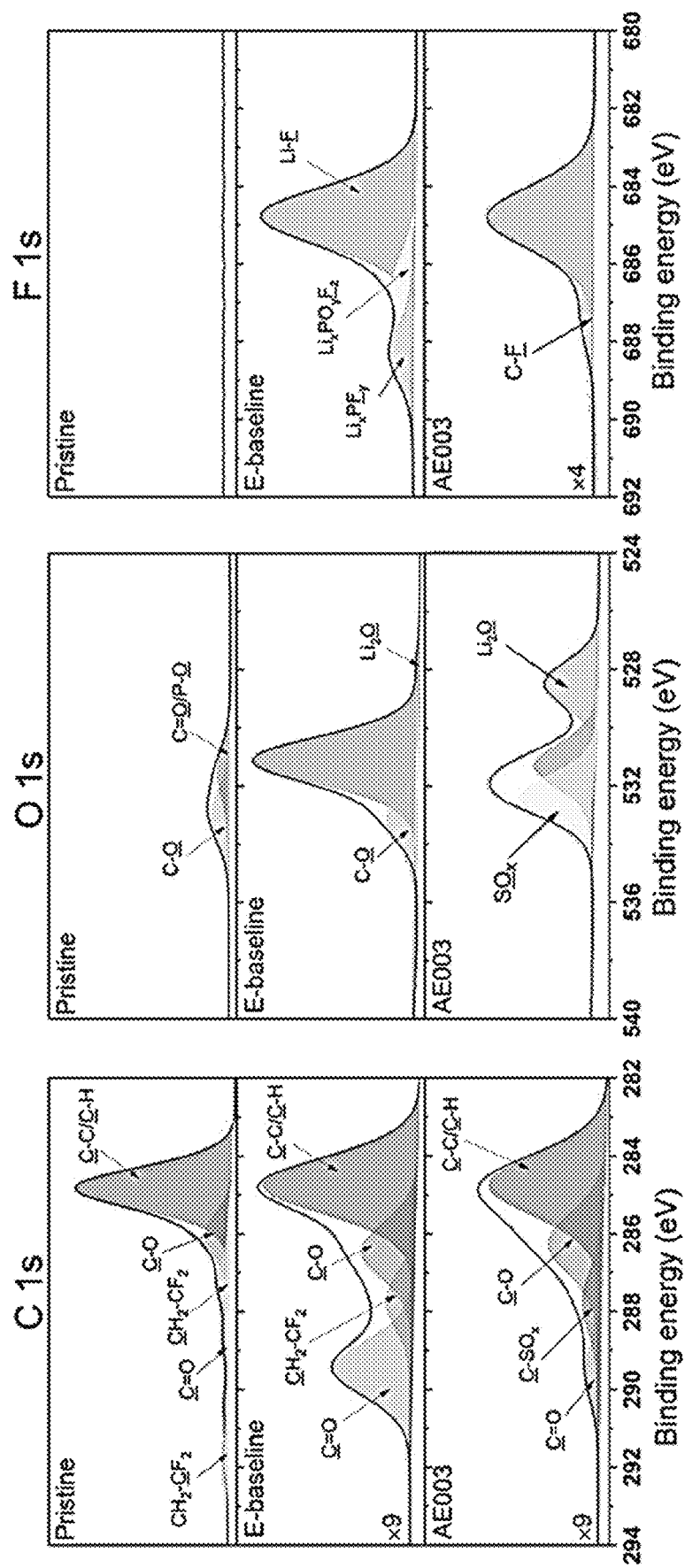
FIG. 25 shows XPS spectra of C 1s, O 1s, and F 1s on pristine Gr anode and Gr anodes cycled in E-baseline and AE003 electrolytes.
Figure 27A:
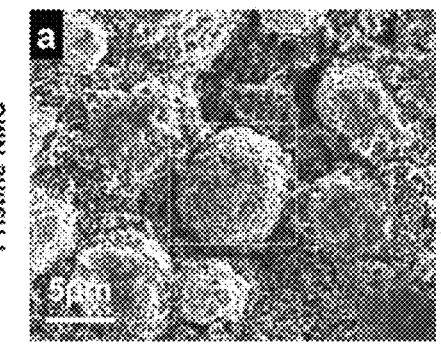
FIGS. 27A-27J are SEM images of pristine NMC811 cathode (27A, 27B), and NMC811 cathodes cycled in Gr∥NMC811 cells with E-baseline (27C, 27D), AE001 (27E, 27F), AE002 (27G, 27H), and AE003 (27I, 27J) electrolytes for 100 cycles at 60° C.
Figure 27B:
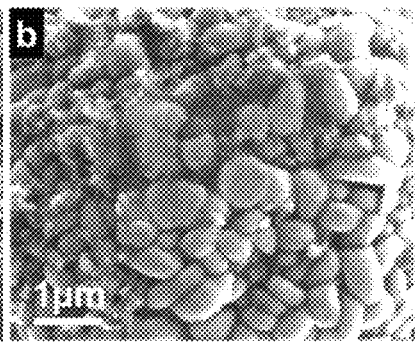
Figure 27C:
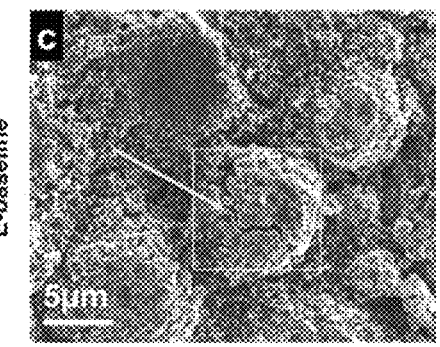
Figure 27D:
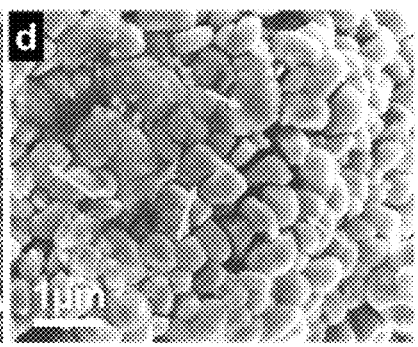
Figure 27E:
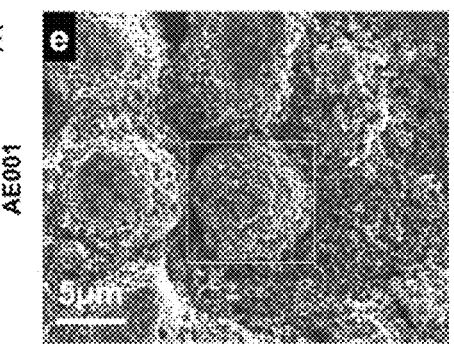
Figure 27F:
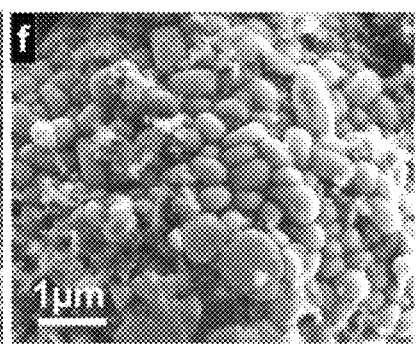
Figure 27G:
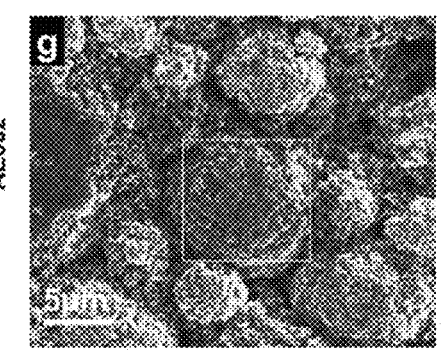
Figure 27H:
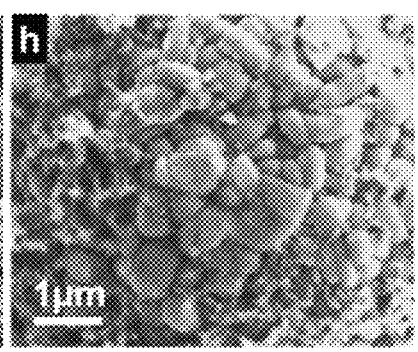
Figure 27I:
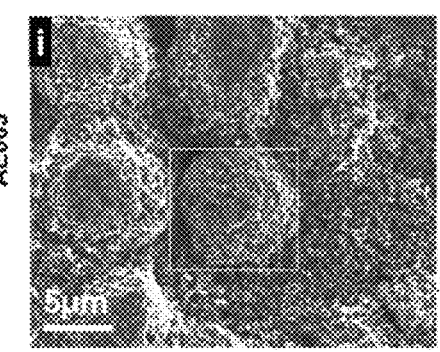
Figure 27J:
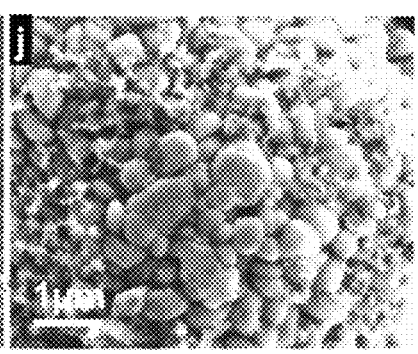
Figure 29A:
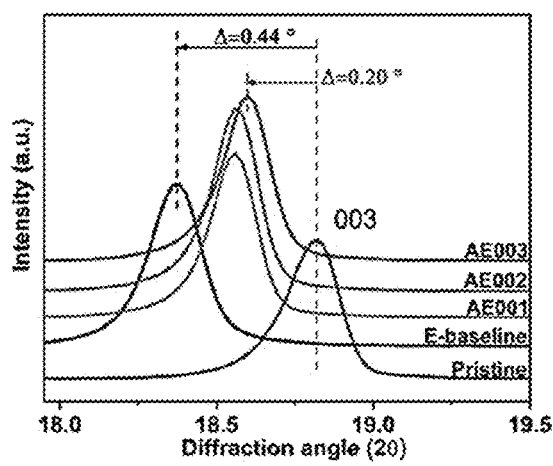
FIGS. 29A-29B are XRD patterns of (003) (29A) and (108)/(110) (29B) peaks of NMC811 cathodes cycled in the E-baseline, AE001, AE002, and AE003 electrolytes.
Figure 29B:
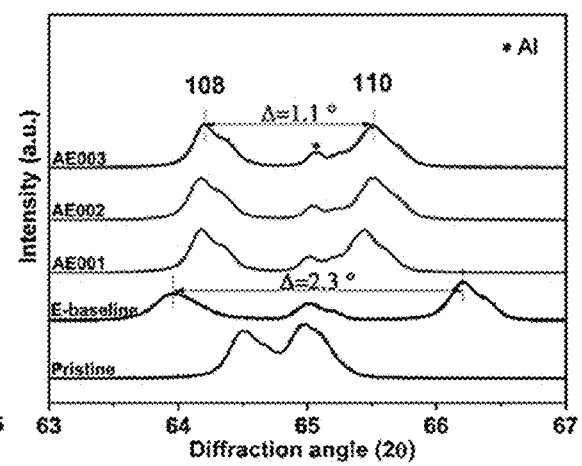

To understand the origin of the excellent cycling stability and remarkably improved wide-temperature performance of the LHCEs over the conventional $LiPF_6$/carbonate electrolyte in Gr||NMC811 cells, the cycled NMC811 cathodes and their surface layers (i.e. the cathode/electrolyte interfaces) after 100 cycles at 60° C. were also characterized by SEM, XRD, HRTEM and XPS. As shown by the SEM images of surface view on NMC811 particles in FIGS. 27A-27J and the FIB/SEM images of the cross-section view on single NMC811 particles in FIGS. 28A-28E, cracking in secondary and primary particles as well as the bulk of the cycled NMC811 cathode in E-baseline was obviously observed as indicated by the arrows (FIGS. 27C, 27D), which can be attributed to the severe changes in crystalline parameters of NMC811 as indicated in the peak shifts of (003) and (108)/(110) reflections to lower/higher scattering angles, by the XRD patterns in FIGS. 29A-B, also which may contribute to the rapid capacity fading. On the contrary, the NMC811 particles cycled in the three LHCEs well maintained their integration (FIGS. 27E-27J) and fewer changes in crystalline parameters (FIGS. 29A-B). FIGS. 29A-B show that more significant shifts to lower-high scattering angles were observed in the E-baseline electrolyte than in the LHCEs, indicating the more severe elongation/shrinkage of the crystal axis, i.e., more drastic deformations of the crystal volume, which have been reported to be a main contribution toward particle cracking during cycling. These results agree with the SEM images of FIGS. 27A-27J and 28A-28E, in which the primary and secondary particles of cycled NMC811 using E-baseline presented obvious cracks, compared to the imperceptible cracks in AE001-AE003. Furthermore, as shown by the TEM image in FIG. 28F, the pristine NMC811 presented a clean surface. While, after 100 cycles in E-baseline, a non-uniform CEI layer with a thickness of 15~21 nm was observed on the cycled NMC811 (FIG. 28G). When the electrolytes were the LHCEs, the CEI layers on the surfaces of the cycled NMC811 were much more uniform and thinner than that in E-baseline, of which the thicknesses were ~5 nm for AE001 (FIG. 28H), ~4 nm for AE002 (FIG. 28I) and ~3 nm for AE003 (FIG. 28J). Although the CEs in AE001-AE003 were much thinner, they were more robust and protective, as demonstrated by the negligible Ni dissolution in LHCEs compared to that of the E-baseline (FIGS. 24 and 26). These results indicate that manipulating the salt/solvent/additive chemistry of the electrolytes enables efficient protection on the NMC cathode, which further helps inhibit electrolyte decomposition and transition metal dissolution and correspondingly suppress particles cracking.

Figure 30A:
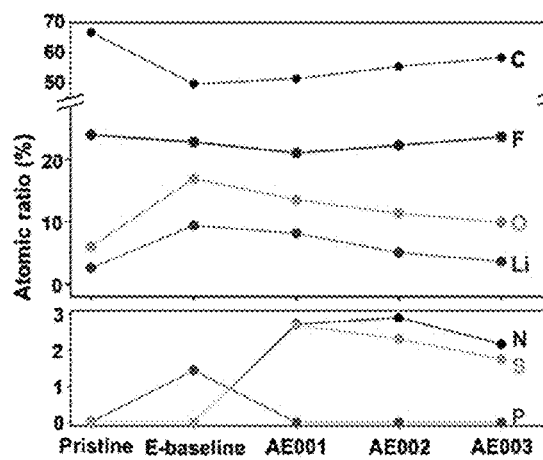
FIGS. 30A-30D show the XPS atomic ratios of elements (30A) and XPS spectra of C 1s (30B), O 1s (30C), and F 1s (30D) of the CEI from a pristine NMC811 cathode and NMC811 cathodes after 100 cycles at 60° C. in the E-baseline and AE003 electrolytes.
Figure 30B:
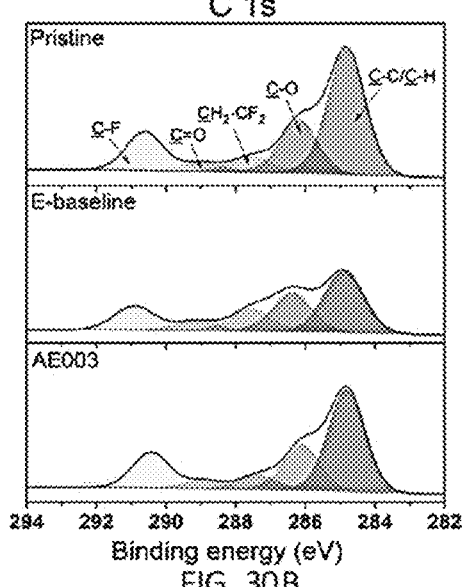
Figure 30C:
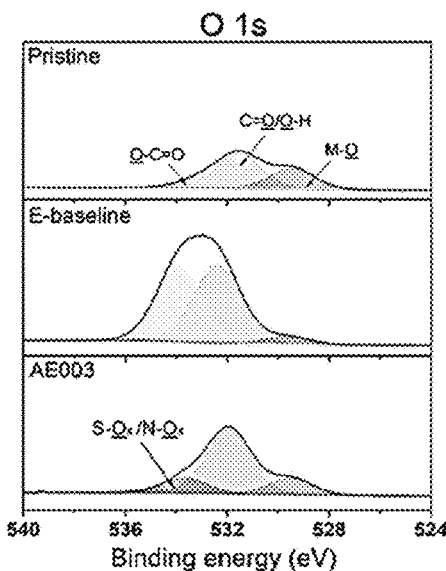
Figure 30D:
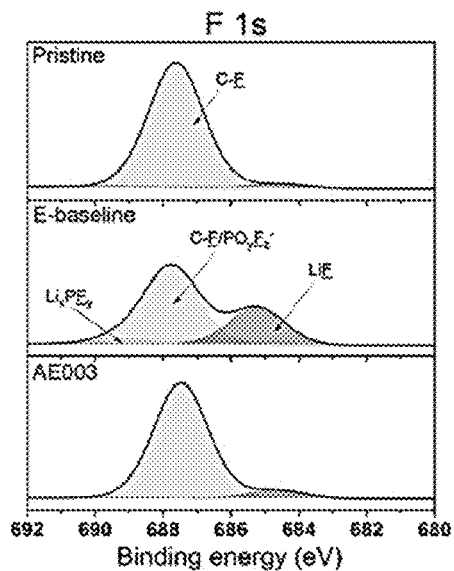
Figure 31:
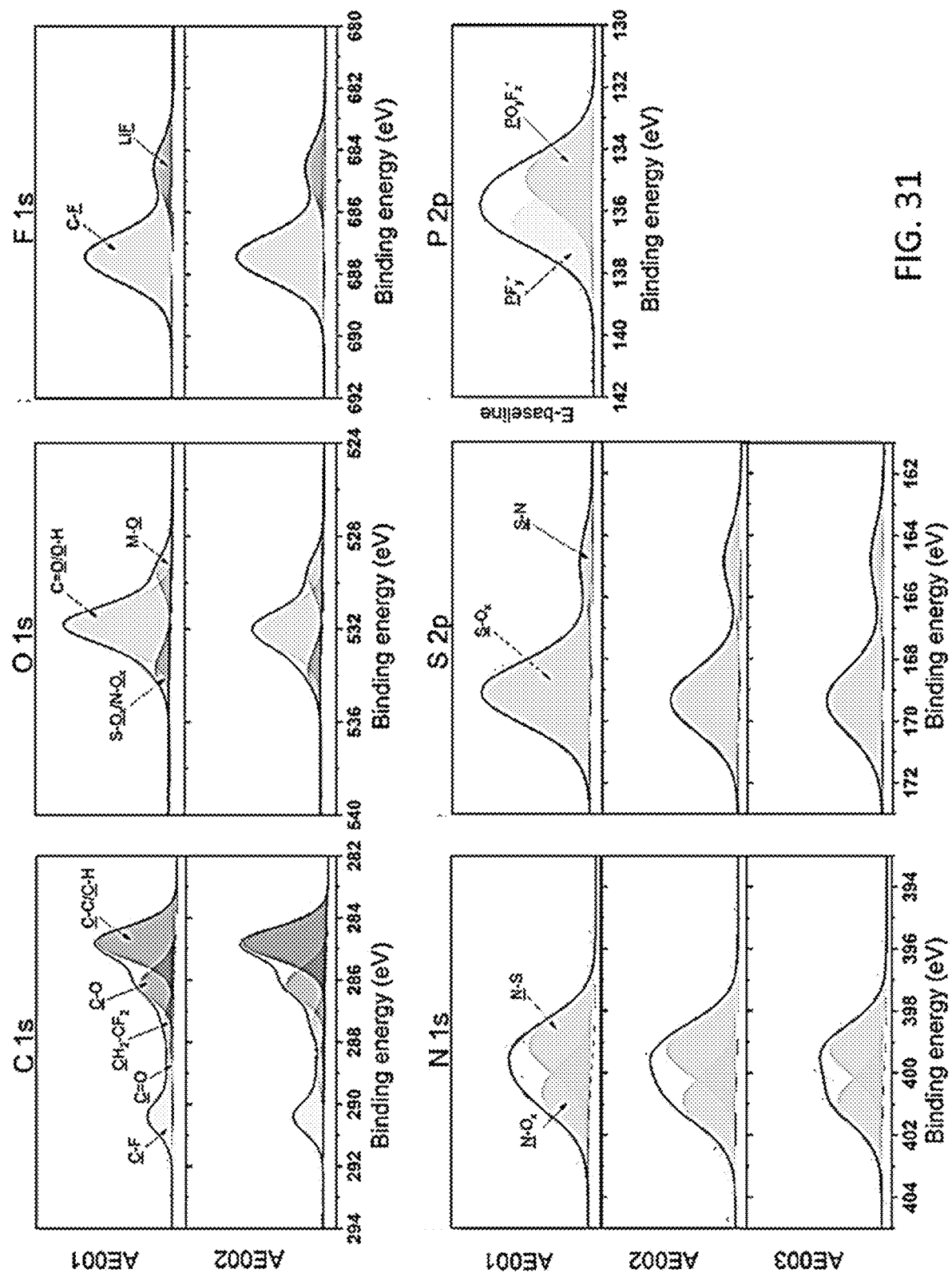
FIG. 31 shows XPS spectra of CEI components on cycled NMC811 cathodes after 100 cycles at 60° C. in the electrolytes of E-baseline (for P 2p), AE001 (for C 1s, O 1s, F 1s, N 1s and S 2p), AE002 (for C 1s, O 1s, F 1s, N 1s and S 2p), and AE003 (for N 1s and S 2p).

The elements and their related atomic ratios detected in the CEI layers are summarized in FIG. 30A, and the detailed narrow scan XPS spectra are shown in FIGS. 30B-30C and 31. Similar to SEIs on cycled Gr anodes, the CEIs from the four electrolytes had similar contents of Li, C, O and F, but P was also found in the CEI from E-baseline while N and S were detected in CEIs for the three LHCEs, which are from the decompositions of the salt anions and solvents used in the related electrolytes, respectively. When analyzing the narrow scan XPS spectra, it is seen from the C 1s spectra in FIGS. 30B and 31 that the CEI components on cycled NMC811 cathodes in the four electrolytes were similar, including the conductive carbon (C—C/C—H, 284.8 eV, C 1s), the PVDF binder ($CF_2$—$CH_2$, ~287.5 eV, C 1s and C—F, ~290.7 eV, C 1s), and the M-O species (~529.6 eV, O 1s). For the O 1s spectra (FIGS. 30C and 31), significantly increased C=O and possible O—H signals were found on the cathodes cycled in AE001-AE003, suggesting DMC molecules are involved in the CEI formation process. In addition, the apparent signals of S—$O_x$/N—$O_x$ (534.0 eV, O 1s) indicate the decomposition of salt anion $FSI^-$, which was further confirmed by the N—$O_x$ (400.1 eV, N 1s) and S—$O_x$ (169.5 eV, S 2p) signals presented in FIG. 31. In the F 1s spectra (FIGS. 30D and 31), the cycled cathode in E-baseline showed a much stronger LiF signal (685.4 eV, F 1s) than those in LHCEs, indicating serious corrosion by the trace amount of hydrofluoric acid (HF) in the $LiPF_6$ electrolyte. The $PO_yF_z$ signals (685.4 eV, F 1s in FIG. 30D and 135.9 eV, P 2p in FIG. 31) also confirmed the decomposition of $LiPF_6$. The presence of large amount of highly resistive LiF on the cathode surface is reported to be detrimental to $Li^+$ transport kinetics, resulting in capacity fading (Zhao et al., *Adv. Energy Mater.* 2018, 8: 1800297). In addition, the HF has the potential to attack the surface of the layered cathode, which may aggravate Li$^+$/Ni$^{2+}$ cation mixing as well as disordered rock-salt phase formation due to insufficient coordinating oxygen contributed to the corrosion reactions. Hence, the much lower content of LiF on cathodes cycled in LSEs, as indicated by the weaker Li—F signals in FIGS. 30D and 31 and lower contents of Li in FIG. 30A, largely contribute to the significantly improved cycling performance when compared to E-baseline. On the other hand, more apparent signals of C—F species (FIGS. 30D and 31) were observed on the NMC811 surfaces cycled in LHCEs, especially in AE003, suggesting the fluorinated ether diluent, TTE, participates in the CEI formation on the NMC811 surface. It was found that all the LHCEs presented similar C 1s, S—O$_x$/N—O$_x$ and M-O signals, while the difference lies in N 1s, S 2p, C=O/O—H, C—F and Li—F. With the best electrochemical performance, AE003 exhibited the lowest content of C=O/O—H and the strongest signal of C—F (also indicated by the lowest atomic ratio of Li but the highest atomic ratio of F as shown in FIG. 30A), implying the unfavorable role of DMC and the beneficial effect of TTE in the CEI formation on the NMC811 surface. And the lowest and sub-lowest intensities of N 1s and S 2p signals in AE003 and AE002 respectively, combining the performance in cycling and rate capability, imply moderate decomposition of salt anion FSI$^-$ enables a more robust and conductive CEI on the NMC811 cathode. At the same time, obviously much higher Ni 2p signal seen on the Gr anode cycled in E-baseline compared to those in the LHCEs again proved the LHCEs can enable a much better protective CEI than E-baseline in such high cut-off voltage (FIG. 26), enabling superior cathode stability. The characterization results demonstrate that the electrode/electrolyte interfaces on both anode and cathode are the major dominating factors for the LIB performances.

Example 3

Additional DMC-Based Electrolytes for Cells with Graphite Anodes

Experimental:

Chemicals and materials: LiPF$_6$, EC, DMC, EMC, VC, DME and acetonitrile (AN) in battery grade were acquired from Gotion and used as received. LiFSI in battery grade was obtained from Nippon Shokubai Co., Ltd. and was dried at 100° C. overnight before use. TMPa, TEPa, dimethyl methylphosphonate (DMMP) and TMS, were ordered from Sigma-Aldrich. TTE was purchased from SynQuest Laboratories. Li chips were ordered from MTI Corporation. TMPa, TEPa, DMMP, TMS and TTE were used after pre-drying with molecular sieves. All electrolytes were prepared inside a glove box filled with purified argon, where the moisture and oxygen contents were less than 1 ppm. The moisture content in the organic solvents and electrolytes was measured by Karl-Fisher titration to make sure the water content was less than 20 ppm.

Coin cell assembly and electrochemical tests: CR2032-type coin cells were used to test the cycling performance of the electrolytes in different battery systems. Gr anode (with an areal capacity loading of 3.5 mAh cm$^{-2}$) and NMC811 cathode (with an areal capacity loading of 2.8 mAh cm$^{-2}$) were used. The coin cells were assembled in the argon-filled glove box by using a piece of cathode disk (1.27 cm$^2$), a piece of polyethylene separator, a piece of anode disk (1.77 cm$^2$), and 100 μL electrolyte. The half cells and full cells were cycled on a Landt tester at 25° C. after three formation cycles.

Two additional electrolytes, AE004 and AE005 were prepared. All five electrolytes are shown in Table 4.

TABLE 4

Electrolyte formulation, density, conductivity and viscosity (all at 25° C.) of the baseline electrolyte and the LHCEs.

| Electrolyte Code | Electrolyte formulation | Density (g ml$^{-1}$) | Conductivity (mS cm$^{-1}$) | Viscosity (cP) |
|---|---|---|---|---|
| E-baseline | 1.0 M LiPF$_6$ in EC-EMC (3:7 by wt.) + 2 wt. % VC | 1.39 | 6.07 | 3.35 |
| AE001 | 1.4 M LiFSI in DMC-TTE (2.2:3 by mol.) | 1.50 | 1.40 | 3.67 |
| AE002 | 1.4 M LiFSI in DMC-VC-TTE (2:0.2:3 by mol.) | 1.55 | 1.05 | 3.53 |
| AE003 | 1.4 M LiFSI in DMC-EC-TTE (2:0.2:3 by mol.) | 1.49 | 1.07 | 3.69 |
| AE004 | 1.4 M LiFSI in DMC-EC-TTE (1.6:0.6:3 by mol.) | 1.49 | 0.76 | 4.08 |
| AE005 | 1.4 M LiFSI in DMC-EC-VC-TTE (1.4:0.6:0.2:3 by mol.) | 1.48 | 0.69 | 5.88 |

Figure 32A:
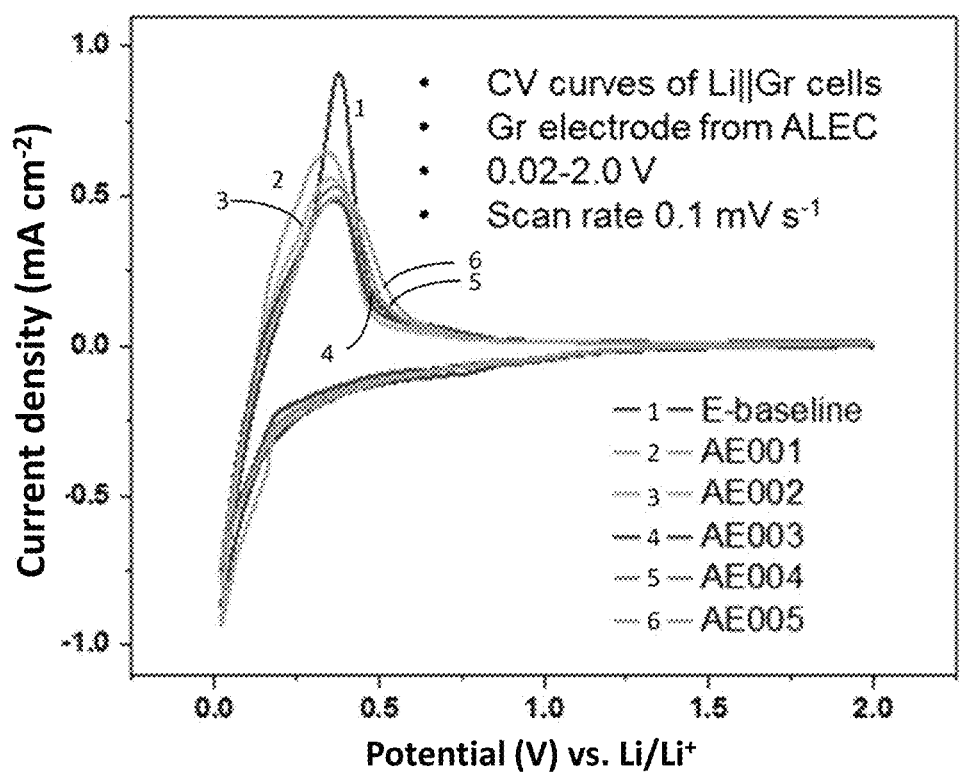
FIGS. 32A and 32B show first cycle CV curves of Li∥Gr cells with E-baseline, AE001, AE002, AE003, AE004, and AE005 electrolytes between 0.02-2.0 V at a scan rate of 0.1 mV·s$^{-1}$ (32A) and LSV curves on SP-PVDF/Al electrode in three-electrode cells with Li as counter and reference electrodes at a scan rate of 0.1 mV·s$^{-1}$ (32B).
Figure 32B:
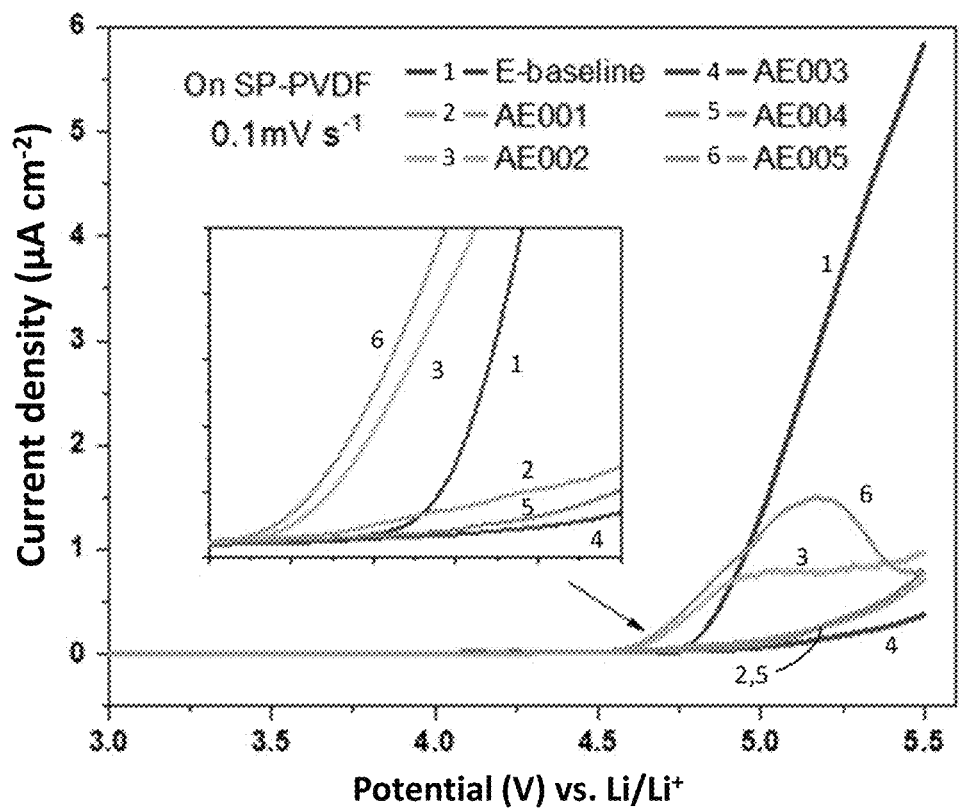

The electrochemical stabilities of the six electrolytes on Gr anode and at high voltages were first evaluated by CV in Li∥Gr cells and LSV in Li|Li|SP-PVDF/Al three-electrode cells, respectively. It is seen from the CV curves in FIG. 32A that all five LHCEs showed good stability on Gr anode as the baseline electrolyte did, enabling the evaluation of these new electrolytes in Gr-based LIBs. The lower response current densities for the LHCEs than that for E-baseline were possibly due to the lower room-temperature ionic conductivities of LHCEs (Table 4). On the high voltage side, the LSV scans in FIG. 32B show the electrochemical anodic decomposition (with a response current density of 0.05 pA cm$^{-2}$) on SP-PVDF/Al electrode started at 4.70 V in AE001, 4.60 V in AE002, 4.93 V in AE003, 4.83 V in AE004, 4.58 V in AE005 and 4.74 V in E-baseline. Although AE001, AE002 and AE005 showed slightly lower oxidation potentials than E-baseline, the former three electrolytes exhibited much lower current density after 4.96 V than the control electrolyte, indicating the good passivation formed from the three LHCEs. Overall, AE003 exhibited superior oxidative stability and good compatibility with Gr electrode, being expected to give advanced electrochemical performances.

Figure 33A:
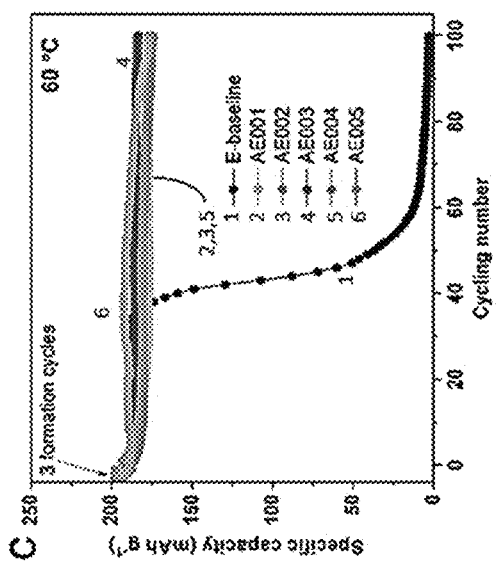
FIGS. 33A-33F show battery performances of the E-baseline, AE001, AE002, AE003, AE004, and AE005 electrolytes in Gr∥NMC811 coin cells between 2.5 and 4.4 V: voltage profiles of the first formation cycle at C/20 rate and 25° C. (33A); long-term cycling stability at C/3 rate at 25° C. (33B) and 60° C. (33C) after three formation cycles at 25° C.; rate capabilities under varying discharge rates (xC, 33D) with the same charge rate at C/5, and varying charge rates (xC, 33E) with the same discharge rate at C/5; low-temperature discharge performance at C/5 discharge rate (33F); the operating temperature for all charging process was 25° C. while the discharging was conducted at 25° C., 0° C., −10° C., −20° C., −30° C. and −40° C., and then back to 25° C. 1C corresponds to 2.8 mA cm$^{-2}$.

The long-term cycling stability, rate capability and low-temperature discharge performance of the five LHCEs and the E-baseline were investigated in Gr∥NMC811 coin cells under the voltages range of 2.5-4.4 V after three formation cycles performed at C/20 for the first cycle and C/10 for the other two cycles, where 1C corresponds to 2.8 mA cm$^{-2}$. The voltage profiles of the first formation cycle of the cells with different electrolytes at 25° C. are shown in FIG. 33A. The cells with the six different electrolytes showed slightly different curves during charge, possibly because of the different oxidations of the electrolyte components, but their discharge curves were nearly the same. The cells using AE003 and AE004 showed the highest discharge capacity of 194.3 and 195.3 mAh g$^{-1}$ and also the highest Coulombic efficiency (CE) of 80.8% and 81.5%, respectively, at the first cycle, while the cells using other four electrolytes (AE001, AE002, AE005 and E-baseline) exhibited similar discharge capacities of 188.4, 186.8, 183.9 and 188.5 mAh g$^{-1}$, respectively and the CE values were 78.8% for AE001, 79.3% for AE002, 78.8% for AE005 and 77.9% for E-baseline.

Figure 33B:
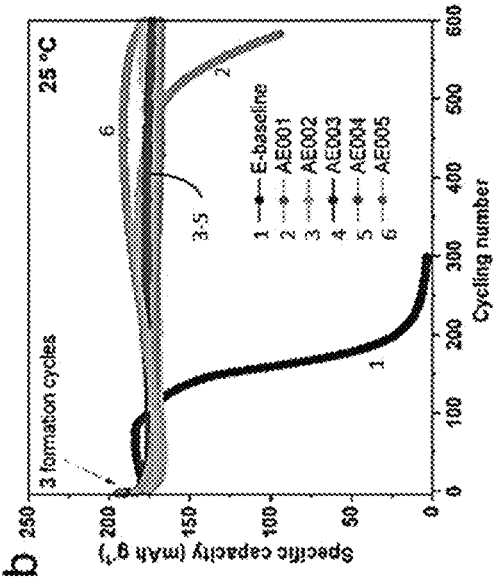
Figure 34A:
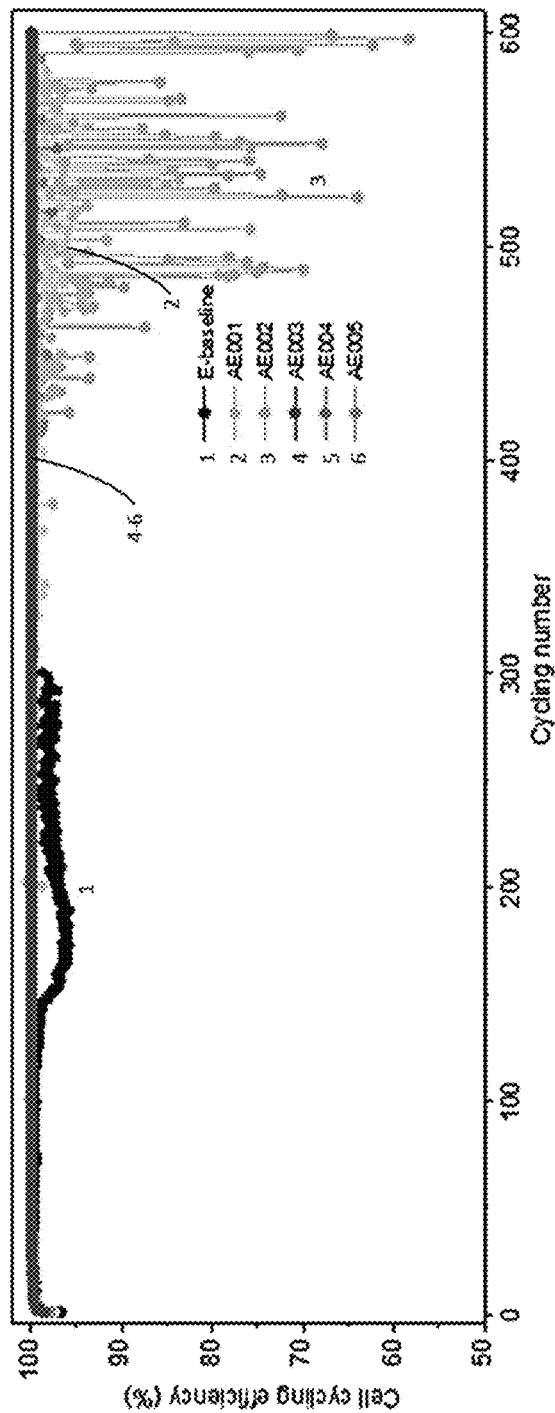
FIGS. 34A-34G show the long-term cycling performance of Gr∥NMC811 coin cells with E-baseline AE001, AE002, AE003, AE004, and AE005 electrolytes at C/3 rate in the voltage range of 2.5-4.4 V at 25° C.: the Coulombic efficiency (CE) during the long-term cycling (34A); the voltage profiles at selected cycles during cycling (34B-34G).
Figure 34C:
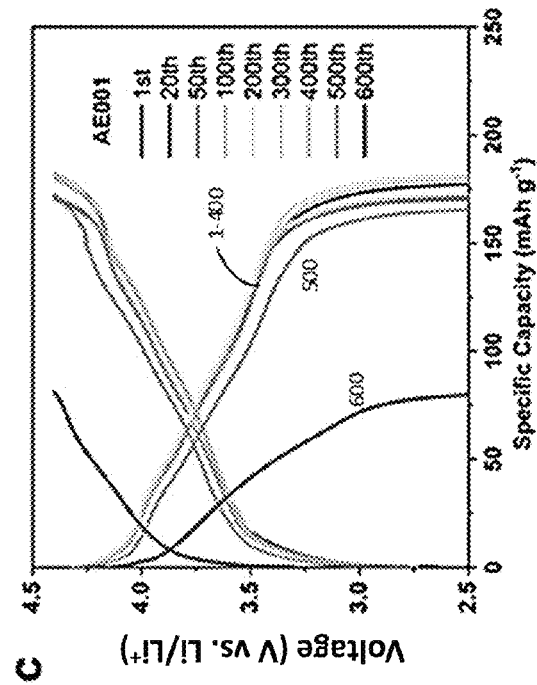
Figure 34B:
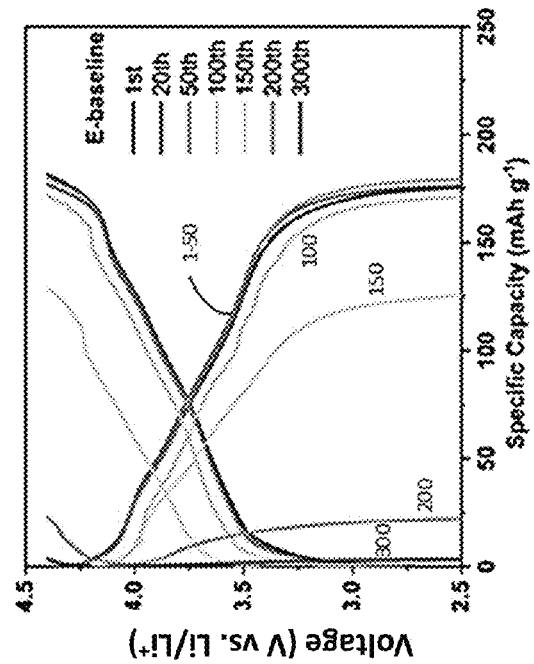
Figure 34D:
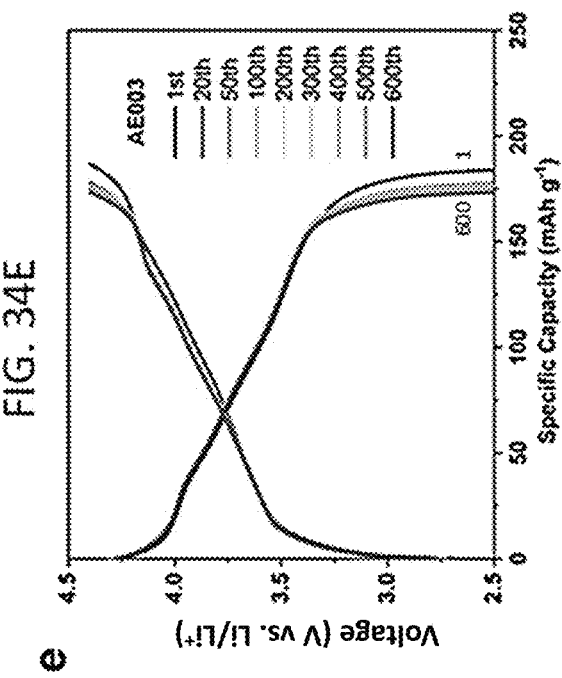

FIG. 33B shows the long-term cycling stability of Gr∥NMC811 coin cells with the six electrolytes at 25° C. under the charge/discharge rate of C/3 after three formation cycles, and the corresponding cycling CEs and the voltage profiles at selected cycles are shown in FIGS. 34A-34G. It is clearly observed that although the cell with E-baseline electrolyte exhibited slightly higher discharge capacities than the five LSEs in the first 100 cycles, it has an abrupt capacity drop after that (FIG. 33B), with capacity retentions of 71.5% and 12.5% at the 150$^{th}$ and 200$^{th}$ cycles, respectively (compared to the capacity of the first cycle at C/3 rate after the three formation cycles), and a fluctuation of cycling CEs after ~150 cycles (FIG. 34A). This can be attributed to the poor electrode/electrolyte stability of E-baseline on both Gr and NMC811 and the aggressive side reactions of E-baseline with the Ni-rich NMC material, especially the highly reactive Ni$^{4+}$, which will be discussed later. The consequence is the quick accumulation of resistive surface films on Gr and NMC811 surfaces and accordingly the increased overpotential (FIG. 23B), leading to the battery failure at an early stage.

Figure 34E:
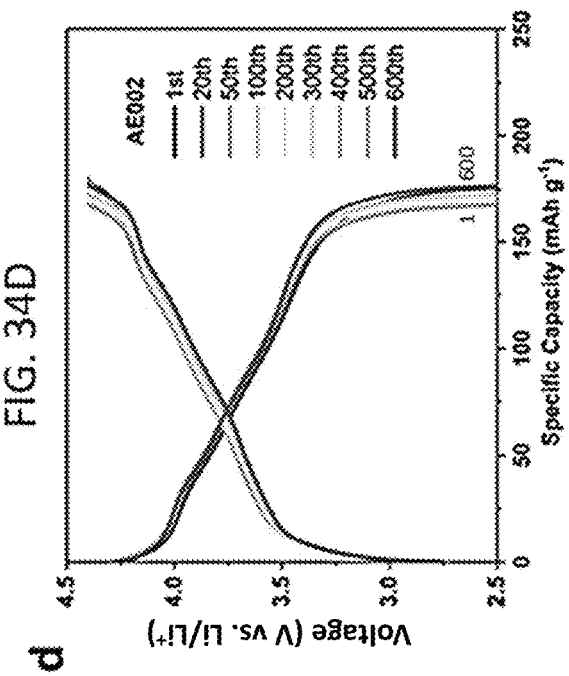
Figure 34F:
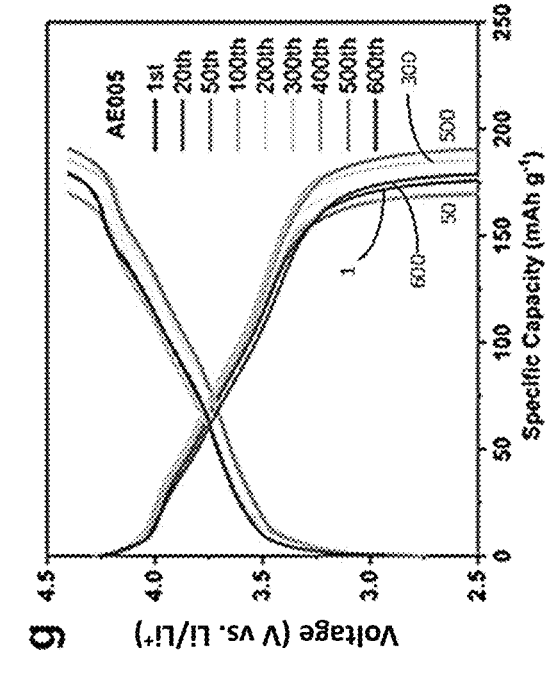
Figure 34G:
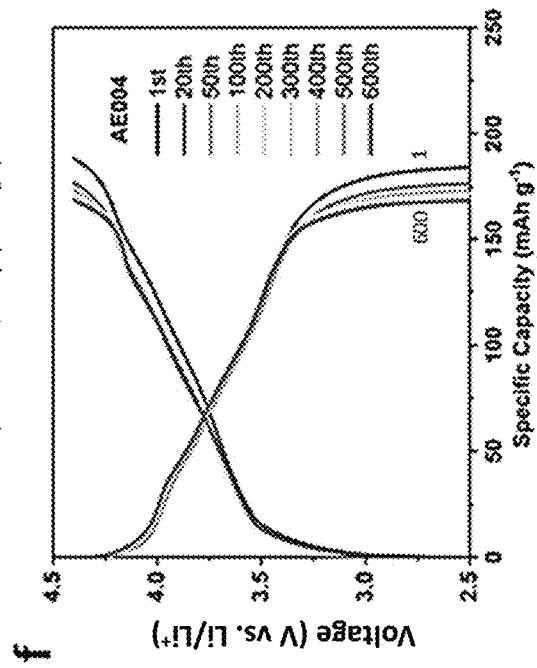

In comparison, the cells with all five LHCEs exhibited significantly improved cycling stability. The cells with AE001 and AE002 gave discharge capacities of 179.8 and 172.9 mAh g$^{-1}$ at the 400$^{th}$ cycle with capacity retentions of 100% and 98.6%, respectively. After that, the cell with AE001 experienced capacity fading accompanying with CE fluctuation and voltage polarization, which are more severe after the 500$^{th}$ cycle (FIGS. 34A, 34C), resulting in a capacity retention of 40.7% after 600 cycles. When part of DMC in AE001 was replaced with VC (i.e. AE002), no capacity attenuation and slight overpotential increase were observed in the cell with AE002 during the 600 cycles (FIGS. 33A and 34D), but the capacity and the CE exhibited fluctuations, an irregular behavior after 400 cycles (FIGS. 33B and 34A), indicating the occurrence of side reactions in the cell with AE002 after long-term cycling. When the VC in AE002 was replaced by equal EC, significant improvement in cycling stability in terms of capacity, CE and overpotential were obtained in the cell with AE003 (FIGS. 33A, 34A, 34E). The discharge capacity at the 600$^{th}$ cycle for the cell with AE003 was 173.4 mAh g$^{-1}$, corresponding to a capacity retention of 94.2%. Meanwhile, the CE stayed at ~99.9% during the 600 cycles for the cell with AE003, much more stable than the CEs for the cells with AE001 and AE002 (FIG. 34A). This is probably because the participation of EC benefits the formation of uniform and robust SEI on Gr and CEI on NMC811. More importantly, there was negligible increase in cell overpotential during 600 cycles for the cell with AE003 (FIG. 34E), indicating that the electrode/electrolyte interphase layers were highly conductive for Li$^+$ ion transportation under the participation of EC. The favorable role of EC was further confirmed by the stable cycling (FIG. 33A) and negligibly increased overpotential (FIG. 34F) during 600 cycles for the cell using AE004 (in which the content of EC was higher than AE003). While for the cell using AE005, the reversible capacity slightly increased with the cycling (FIG. 33B) and after 600 cycles there was an obvious growth of overpotential.

Figure 33C:
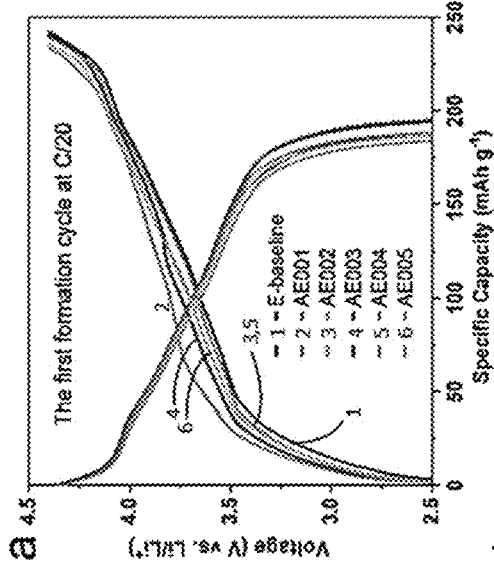
Figure 35E:
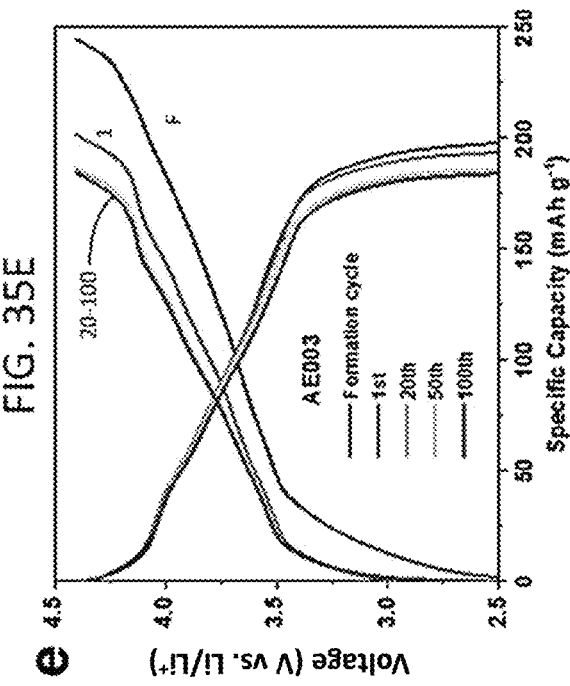
Figure 35G:
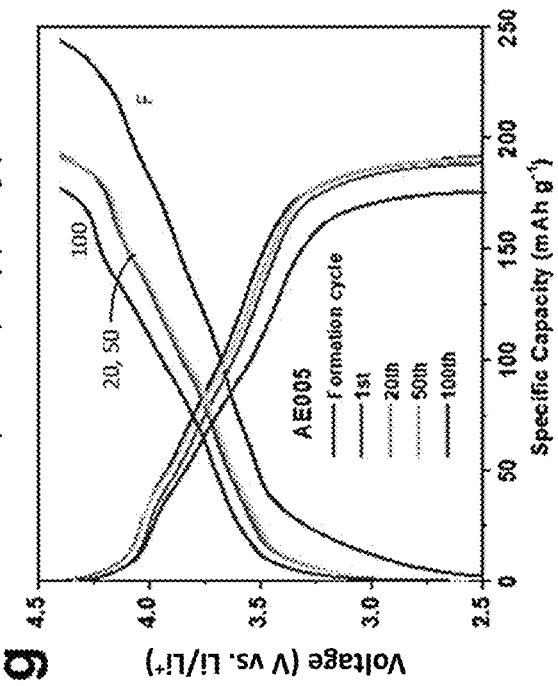
Figure 35D:
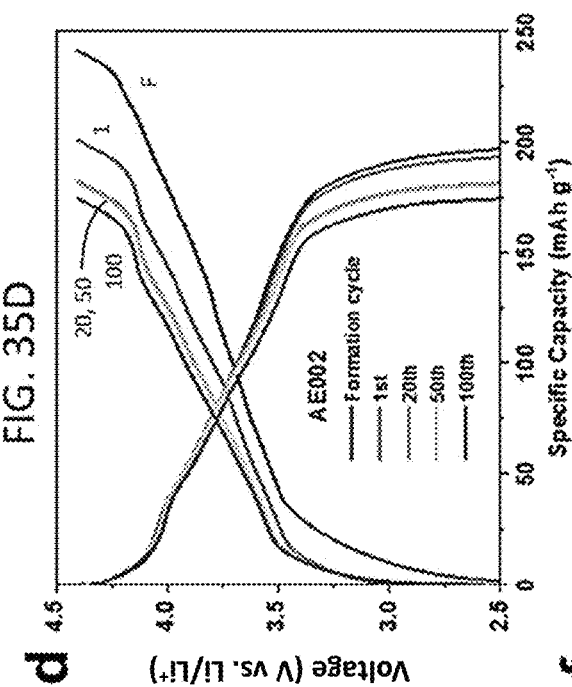
Figure 35F:
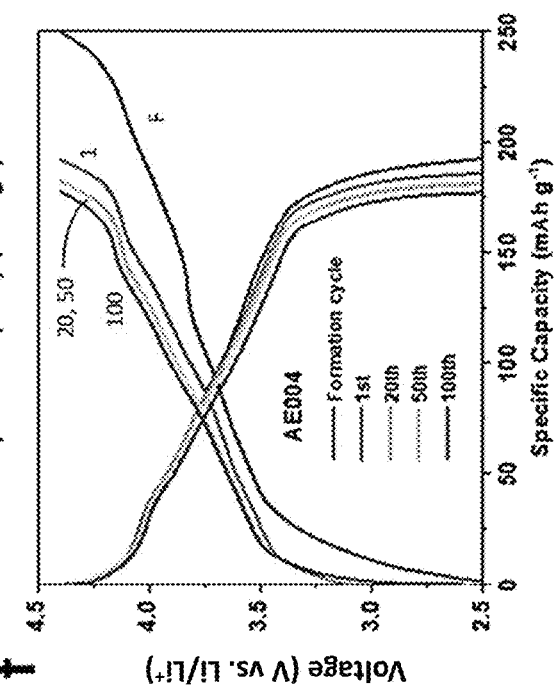

In the conventional LiPF$_6$/carbonate electrolyte, an increase in testing temperature will drastically accelerate the parasitic reactions of electrolyte on both high-Ni NMC cathode and Gr anode. This will accelerate the degeneration of NMC cathode and cause the formation of more resistive components in the SEI film of Gr anode, which in turn results in fast capacity loss. The cycling performance of the Gr∥NMC811 coin cells was evaluated with the six electrolytes under 60° C. after three formation cycles at 25° C. As seen from FIG. 33C, the cell with E-baseline exhibited a sharp capacity drop at the 35$^{th}$ cycle and the capacity retention after 50 cycles was only 19.4%, accompanying with obviously increased voltage polarization (FIG. 35C). In contrast, the cells with AE001-AE005 demonstrate superior high-temperature cycling performance with the reversible capacities of 174.3, 177.9, 183.6, 176.0 and 175.2 mAh g$^{-1}$ after 100 cycles (FIG. 33C), corresponding to capacity retentions of 90.2%, 91.8%, 94.9, 94.8 and 92.8%, respectively, with limited increase in overpotential during the 100 cycles (FIGS. 35A-35G).

Figure 33D:
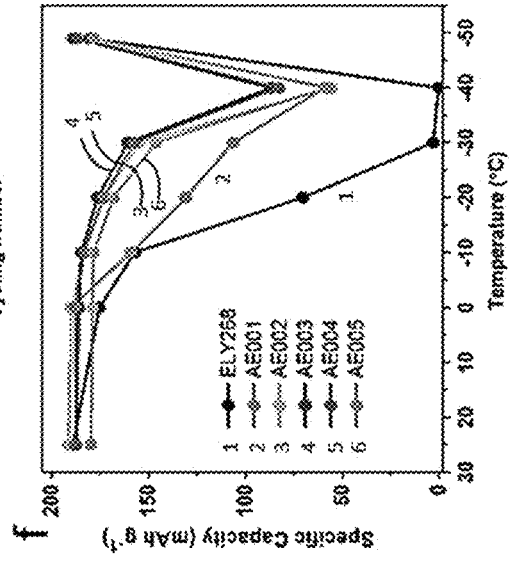
Figure 33E:
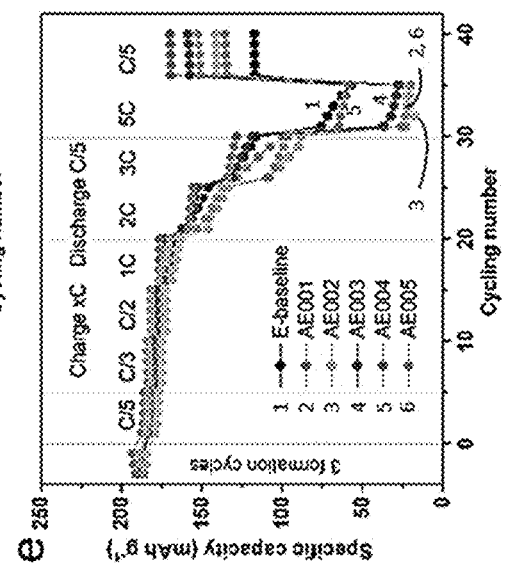

The rate capabilities of the five LSEs and the E-baseline at different C rates were also evaluated in Gr∥NMC811 cells by two testing protocols. Under the protocol with a constant charge rate of C/5 and different discharge rates from C/5 to 5C, as shown in FIG. 33D, the cell with AE003 showed the superior discharge rate capability in the full rate range while the baseline electrolyte suffered rapid capacity fading when discharge rates were 3C and 5C. The cell with AE005 presented worse discharge rate capability than all the other LHCEs in the full range of rate. The cells with AE001 AE002 and AE003 exhibited similar discharge rate capability like E-baseline at 1C rate and below but better performance than E-baseline at discharge rates of 3C and 5C. When the discharge rate was changed back to C/5, the cells with all six electrolytes had similar discharge capacities. As for the protocol with different charge rates from C/5 to 5C but the same discharge rate of C/5 (FIG. 33E), the cells with AE002 and AE005 showed inferior rate capability than the cells with other LHCEs and the baseline electrolyte from C/5 to 5C. The cell with AE001 had similar reversible capacities to the cell with E-baseline when the charge rate was up to 2C, the cell with AE003 maintained the same rate capability as the cell with E-baseline till 3C rate during charging, and the cell with AE004 showed slightly better rate capability than E-baseline from C/5 to 3C and similar capacities with that of E-baseline at 5C. When the charge rate was increased to 5C, the cells with all LHCEs except AE004 showed very limited capacity, lower than the cell with E-baseline. However, when the charge rate was set back to C/5, the recovering discharge capacity from high to low followed the order of AE004>>AE003>>AE005>>AE002>AE001>>E-baseline. The results from both rate capability testing protocols demonstrated the superior rate performance of the cells with AE003 up to 3C rate, indicating the more conductive electrode/electrolyte interfaces on both Gr and NMC811 electrodes and correspondingly fast electrode redox reaction kinetics in the cells with AE003.

Figure 33F:
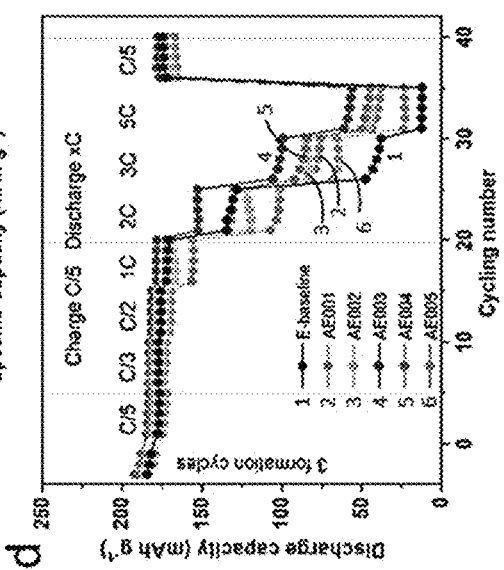
Figure 36A:
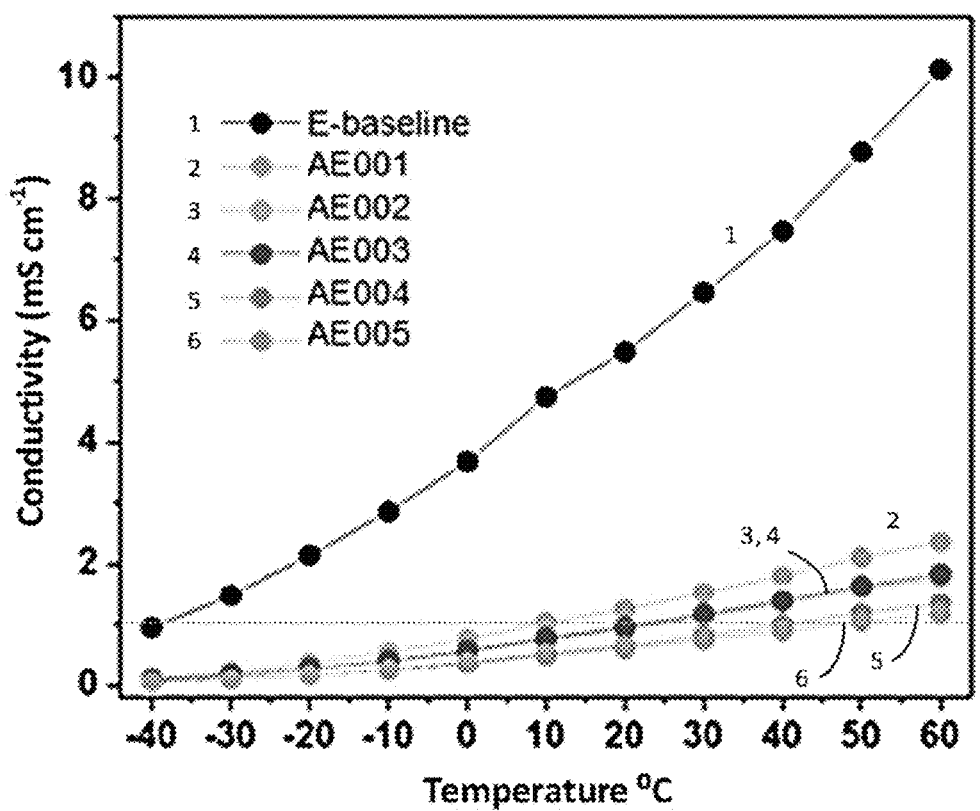
FIGS. 36A-36B show the temperature dependence of ionic conductivities from −40 to 60° C. (36A) and viscosity from −7 to 50° C. (36B) of the E-baseline, AE001, AE002, AE003, AE004, and AE005 electrolytes.
Figure 36B:
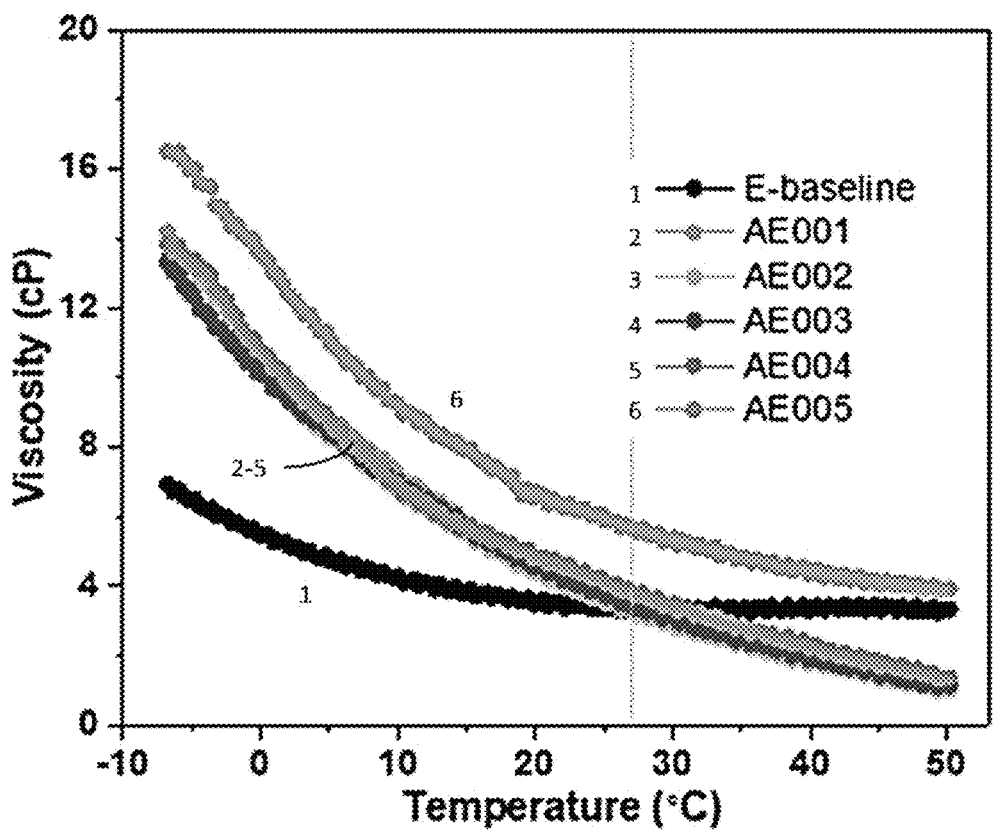
Figure 37A:
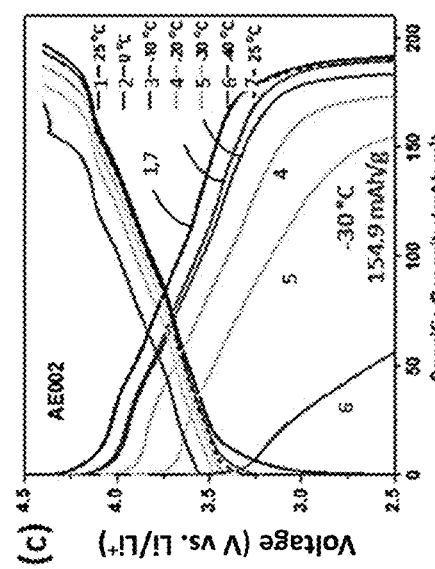
FIGS. 37A-37F show voltage profiles of Gr∥NMC811 coin cells using the E-baseline (37A), AE001 (37B), AE002 (37C), AE003 (37D), AE004 (37E), and AE005 (37F) electrolytes during low-temperature discharging test in the temperature range of 25° C. to −40° C. and then back to 25° C. (the black dotted line) at C/5 charge/discharge rate between 2.5-4.4 V.
Figure 37B:
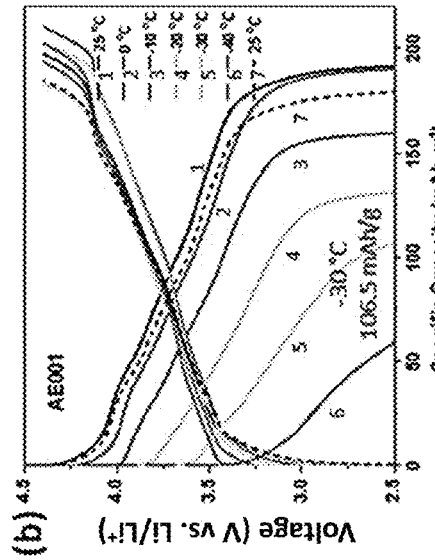
Figure 37C:
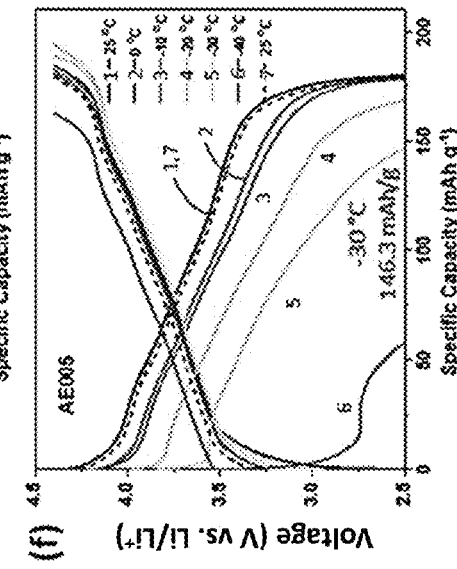
Figure 37D:
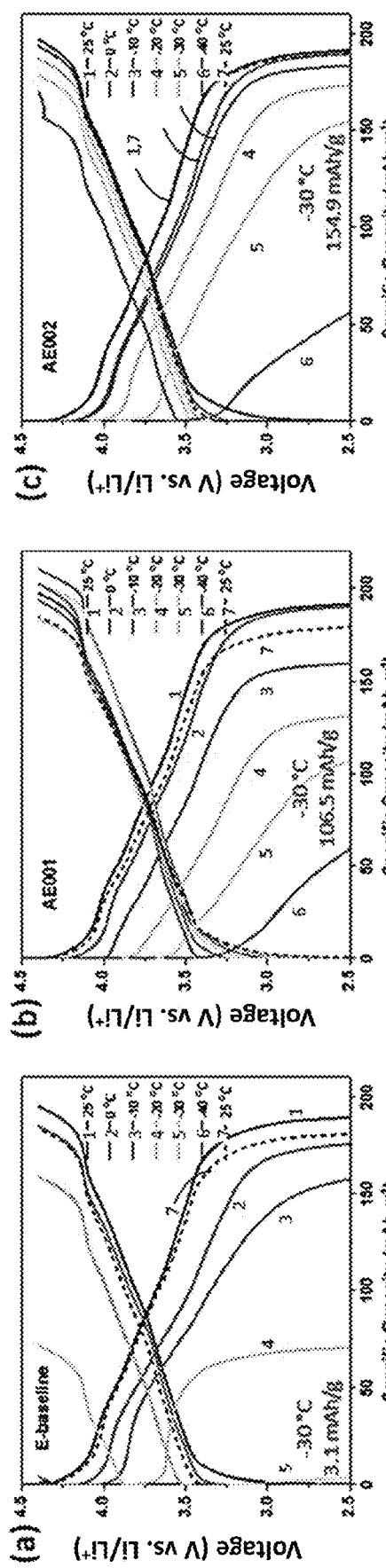
Figure 37E:
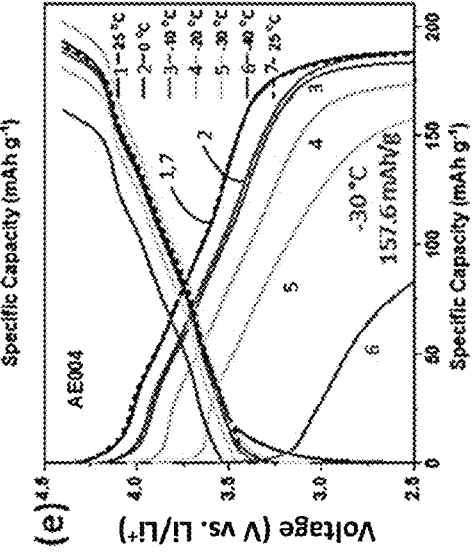
Figure 37F:
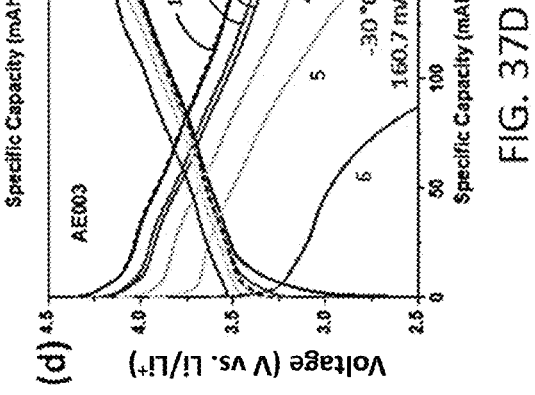

Furthermore, the low-temperature discharging performance of the LHCEs and E-baseline was performed (25° C. to −40° C.), as shown in FIG. 33F. Even with much lower ionic conductivities and doubled viscosities under low temperatures than the E-baseline (FIGS. 36A-36B), the LHCEs enabled superior low-temperature discharge performances, as evidenced by the significantly higher capacity retentions in the full range of the testing temperatures, better recovery of the capacity when the temperature is set back to 25° C. and greatly smaller voltage decay than the conventional LiPF$_6$ electrolyte (FIGS. 37A-37F), which should be contributed to the more conductive electrode/electrolyte interfaces formed in the LiFSI-based LHCEs. As for E-baseline, when the operating temperature decreased from 25° C. to 0° C., −10° C., −20° C. and −30° C., the discharge capacity retention compared to that of 25° C. (189 mAh g$^{-1}$) continually decreased to 92.6%, 83.1%, 37.0% and 1.6%, respectively, accompanying with severe voltage decay (FIG. 37A). Obviously, the cell failed at and below −20° C. In comparison, the cell with AE003 showed negligible discharge capacity fading and voltage decay when the temperature reduced from 25 to 0° C. and −10° C. (FIG. 37D). When operating at −30° C., the discharge capacities of the cells with AE001-AE005 were 106.5, 154.9, 160.7, 157.6 and 146.3 mAh g$^{-1}$, corresponding to capacity retentions of 55.6%, 81.1%, 85.6%, 83.4% and 81.3% and energy density retentions of 47.1%, 72.1%, 76%, 73.4 and 69.8%, respectively (compared to 25° C.). When further decreasing the temperature to −40° C., the cells with LHCEs all suffered sharp capacity drops, but the capacity retentions still were 30.7%, 29.2%, 46.2%, 44.0% and 32.2%, respectively. It is speculated that the accelerated increase of viscosities when temperature is lower than −30° C. in LHCEs (FIG. 36B) should contribute to the fast capacity decay at −40° C. When the working temperature turns back to 25° C. after the low-temperature discharging tests, the reversible capacities of the cells with AE002-AE005 were completely recovered, with negligible voltage decay (FIGS. 33F and 37C, 37D); while for the cells with E-baseline and AE001, 95.5% and 93.4% of the discharge capacities were recovered, respectively. It is seen from the low-temperature tests that AE003, which contains a small portion of EC with high-melting point, presented better low-temperature discharge performance than the LHCEs without EC and the one with more EC (AE004). This is significantly different from the previous reports, in which EC played an adverse effect on the low-temperature discharge capacity of LIBs using the LiPF$_6$/carbonate electrolyte. It is speculated that the small portion of EC in AE003 is beneficial to the formation of a robust and more conductive electrode/electrolyte interface layer, resulting in superior Li$^+$ ions transfer kinetic which enables the better low-temperature discharge performance in the cells with AE003 than in the other LHCEs.

Example 4

Electrolytes with Varying Solvents for Cells with Graphite, Silicon/Carbon Composite, or Silicon Anodes Experimental:

Chemicals and materials: LiPF$_6$, EC, DMC, EMC, VC, FEC, DME and AN in battery grade were acquired from Gotion and used as received. LiFSI in battery grade was obtained from Nippon Shokubai Co., Ltd. and was dried at 100° C. overnight before use. TMPa, TEPa, DMMP and TMS were purchased from Sigma-Aldrich. TTE and TFEO were purchased from SynQuest Laboratories. Li chips were ordered from MTI Corporation. TMPa, TEPa, DMMP, TMS, TTE and TFEO were used after pre-drying with molecular sieves. All electrolytes were prepared inside a glove box filled with purified argon, where the moisture and oxygen contents were less than 1 ppm. The moisture content in the organic solvents and electrolytes was measured by Karl-Fisher titration to make sure the water content was less than 20 ppm.

Coin cell assembly and electrochemical tests: CR2032-type coin cells (ordered from MTI Corporation) were used to test the cycling performance of the electrolytes in different battery systems. Graphite (Gr) or silicon/carbon (Si/C) composite or Si anodes and LiNi$_{0.6}$Mn$_{0.2}$Co$_{0.2}$O$_2$ (NMC622) or LiNi$_{0.8}$Mn$_{0.1}$Co$_{0.102}$ (NMC811) or LiNi$_{0.96}$Mg$_{0.02}$Ti$_{0.02}$O$_2$ (NMT) cathodes were used. The coin cells were assembled in the argon-filled glove box by using a piece of cathode disk (1.27 cm$^2$), a piece of polyethylene (PE) separator, a piece of anode disk (1.77 cm$^2$), and certain amount of electrolyte. To avoid corrosion to the stainless-steel positive cans by the electrolyte at high voltages, the Al-clad positive cans were used to assemble the full cells. An extra piece of Al foil (2.83 cm$^2$) was also added in between the cathode disk and the Al-clad positive can. The full cells were cycled on a Landt tester or an Arbin tester at 25° C. or other selected temperatures after three formation cycles at 25° C.

In addition to the electrolytes of Example 3, LHCEs based on other solvents were also systematically studied. The electrolyte formulae are summarized in Table 5.

TABLE 5

| Electrolyte formulae | |
|---|---|
| Code | Electrolyte formulation |
| E257 | 1.0 M LiPF$_6$/EC-EMC (3:7 wt.) |
| E268 | 1.0 M LiPF$_6$/EC-EMC (3:7 wt.) + 2 wt. % VC |
| E001 | LiFSI:DMC:TTE = 1.0:2.2:3.0 by mol. |
| E002 | LiFSI:DME:TTE = 1.0:1.1:3.0 by mol. |
| E003 | LiFSI:TMP$_a$:TTE = 1.0:1.4:3.0 by mol. |
| E004 | LiFSI:DMMP:TTE = 1.0:1.4:3.0 by mol. |
| E005 | LiFSI:AN:TTE = 1.0:3.3:3.0 by mol. |
| E009 | LiFSI:TMS:TTE = 1.0:3.0:3.0 by mol. |
| E010 | LiFSI:TEP$_a$:TTE = 1.0:1.4:3.0 by mol. |

A piece of PE separator, Gr electrode disk (from Argonne National Laboratory, 1.77 cm$^2$), and NCM811 electrode (from Argonne National Laboratory, 1.27 cm$^2$), were assembled into CR2032-type coin cells with 50 μL electrolyte. The cells were conducted three formation cycles (C/20 for 1 cycle and C/10 for 2 cycles) and then regularly cycled at C/3 charging and 1C discharging in the voltage range of 2.5-4.4 V.

Figure 38:
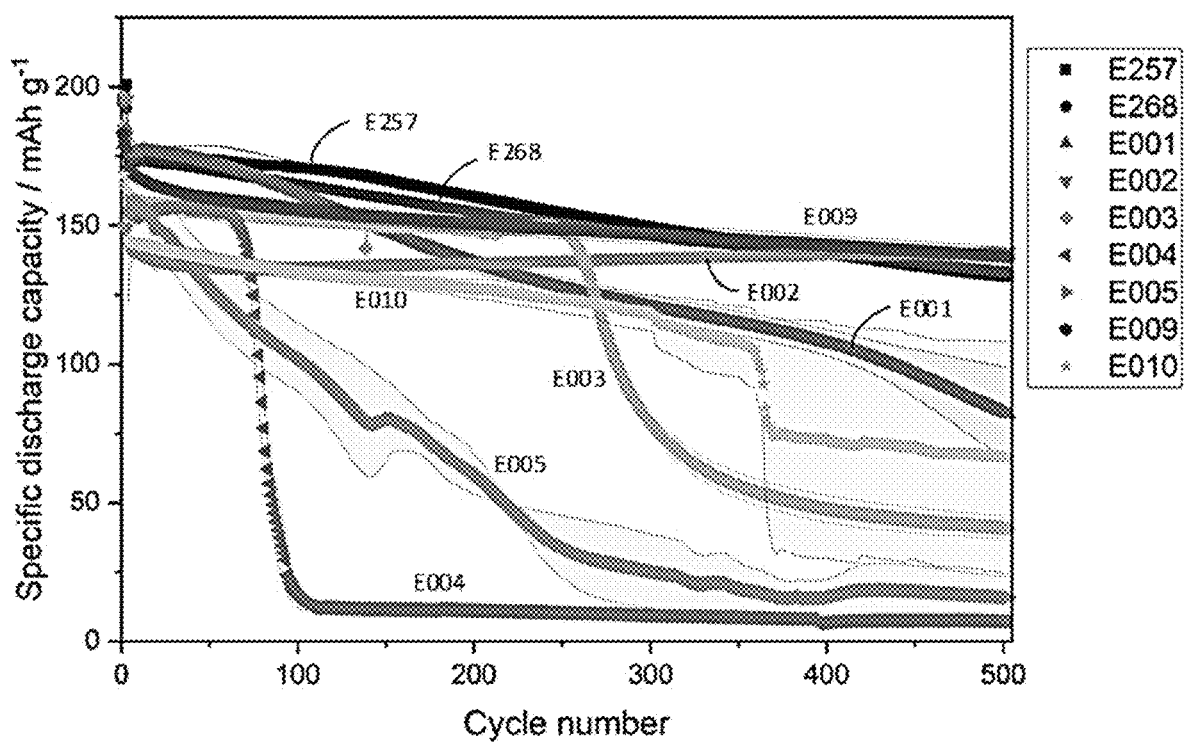
FIG. 38 shows the long-term cycling performance of Gr∥NMC811 coin cells with various LHCEs without vinylene carbonate (VC) and comparison with two baseline electrolytes without (E257) and with (E268) 2 wt % VC at 25° C.; the discharge capacity shows the average value with standard deviation.

FIG. 38 shows the cycling performance of Gr∥NCM811 full cells using LHCEs with different solvents without VC additive. The cells with phosphorus-containing solvents, including TMPa, TEPa and DMMP, all showed sudden capacity decays after being charged and discharged for a certain number of cycles. The reason can be probably assigned to the failure of SEI and/or CEI. Only TMS-based cells showed excellent capacity retention. The results indicated that without VC additive, few LHCEs show superior cycling performance in Gr∥NMC811 cells.

DME-based electrolytes: In response to this challenge, additives were introduced into the LHCEs. A series of DME-based LHCEs were prepared as shown in Table 6.

TABLE 6

Electrolyte formulae

| Code | Electrolyte formula |
|---|---|
| E268 | 1.0 M LiPF$_6$/EC-EMC (3:7 wt.) + 2 wt. % VC |
| E002 | LiFSI:DME:TTE = 1.0:1.1:3.0 by mol. |
| E002V | LiFSI:DME:TTE:VC = 1.0:1.1:3.0:0.2 by mol. |
| E002E | LiFSI:DME:TTE:EC = 1.0:1.1:3.0:0.2 by mol. |
| E002F | LiFSI:DME:TTE:FEC = 1.0:1.1:3.0:0.2 by mol. |

Figure 39A:
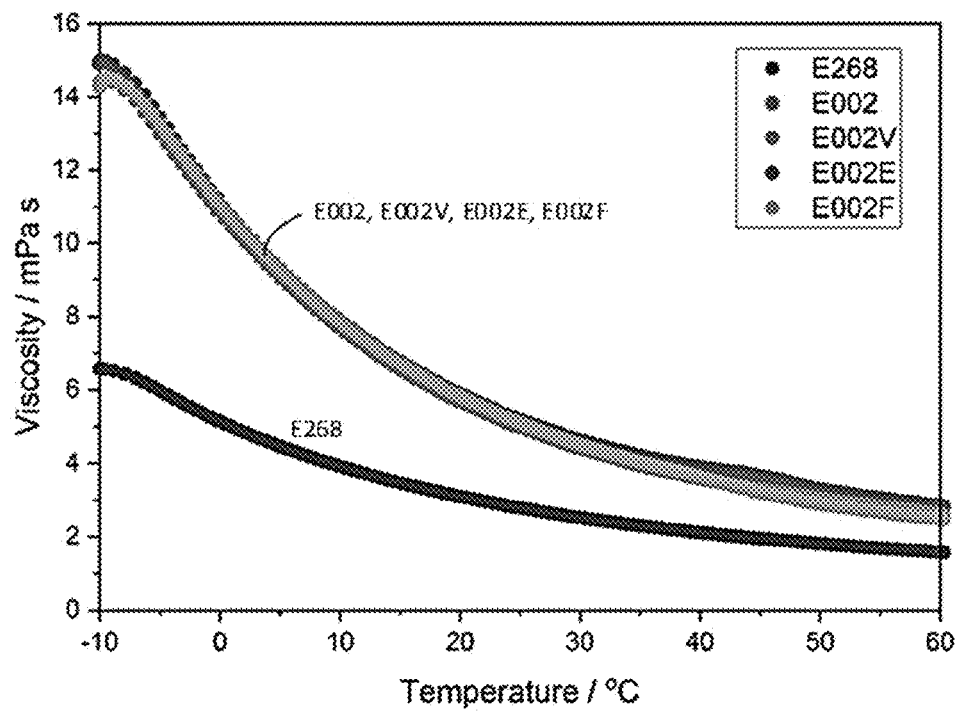
FIGS. 39A-39B show temperature dependence of viscosities (39A) and ionic conductivities (39B) of a baseline electrolyte with 2 wt % VC and several DME-based LHCEs.
Figure 39B:
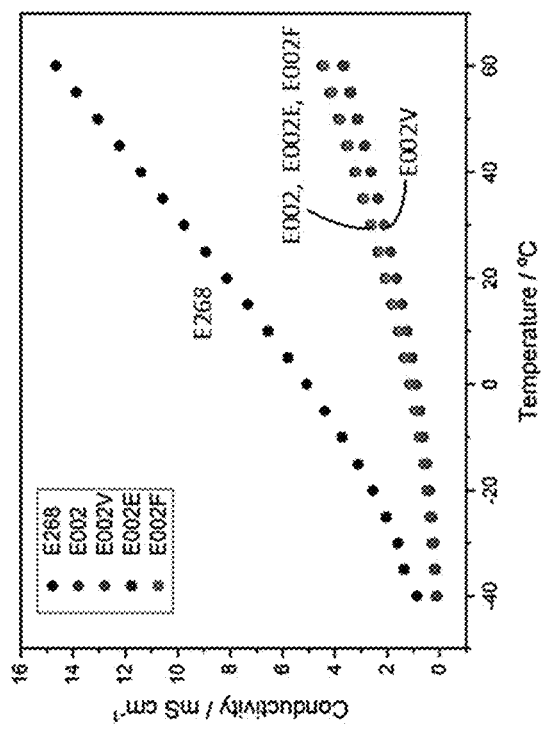

Dependence of viscosities and ionic conductivities of E268 and DME-based LHCEs on temperature was evaluated. As shown in FIG. 39A, the DME-based LHCEs exhibited a higher viscosity than the E268 in the measured temperature range. At room temperature (25° C.), the viscosities of E268, E002, E002V, E002E and E002F were determined as 2.78, 5.15, 4.96, 5.18, 5.10 mPa s. As a result of higher viscosity and low amount of dissociation solvent, DME-based LHCEs exhibited lower ionic conductivities than E268 (FIG. 39B). At the room temperature, the ionic conductivities of E268, E002, E002V, E002E, E003F are determined as 8.94, 1.90, 1.90, 2.36, 2.31 mS cm$^{-1}$, respectively.

Figure 40B:
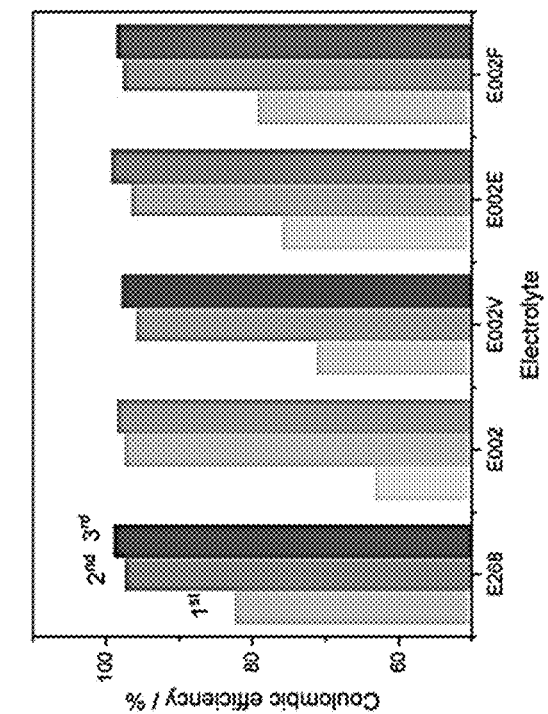
FIGS. 40A-40B show charge/discharge voltage-specific capacity profiles at the first formation cycle at C/20 rate (40A) and CE comparison in the formation cycles (40B) of Gr∥NMC811 cells with the electrolytes of FIGS. 39A-39B.
Figure 40A:
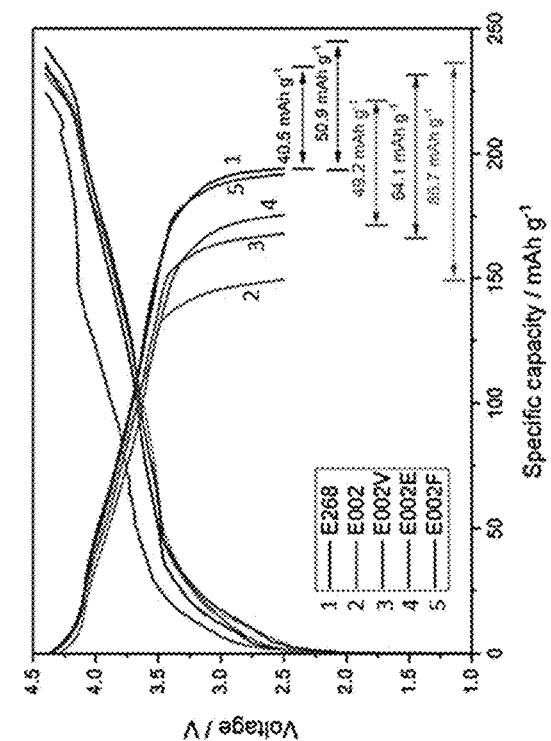

FIG. 40A shows the charge/discharge voltage-specific capacity profiles at the first formation cycle at C/20 rate for Gr||NMC811 cells comprising the electrolytes listed in Table 6. The cell with E268 had first cycle charge and discharge capacities of 234.7 and 194.2 mAh g$^{-1}$, leading to a CE of 82.7%. The cell with E002 had only 236.2 and 149.5 mAh g$^{-1}$ for the first cycle charge and discharge capacities, yielding the first cycle CE of mere 63.3% (FIG. 40B). With the addition of additive VC, EC or FEC in E-DME, the first cycle discharge capacity and CE of the cells was improved, 167.9 mAh g$^{-1}$ and 71.24% for E002V, 175.6 mAh g$^{-1}$ and 78.1% for E002E, and 191.8 mAh g$^{-1}$ and 79.0% for E002F. Such improvement is mainly attributed to the good passivation on Gr electrodes by the additives VC, EC and FEC due to their capability of forming high quality SEI during the reduction process. As shown in FIG. 40B, at the third formation cycle, the three DME-LHCEs already yield the CE close to (98.4% for E002, 97.8% for E002V and 98.5% for E002F) or even over (99.2% for E002E) that of E268 (98.9%).

Figure 41A:
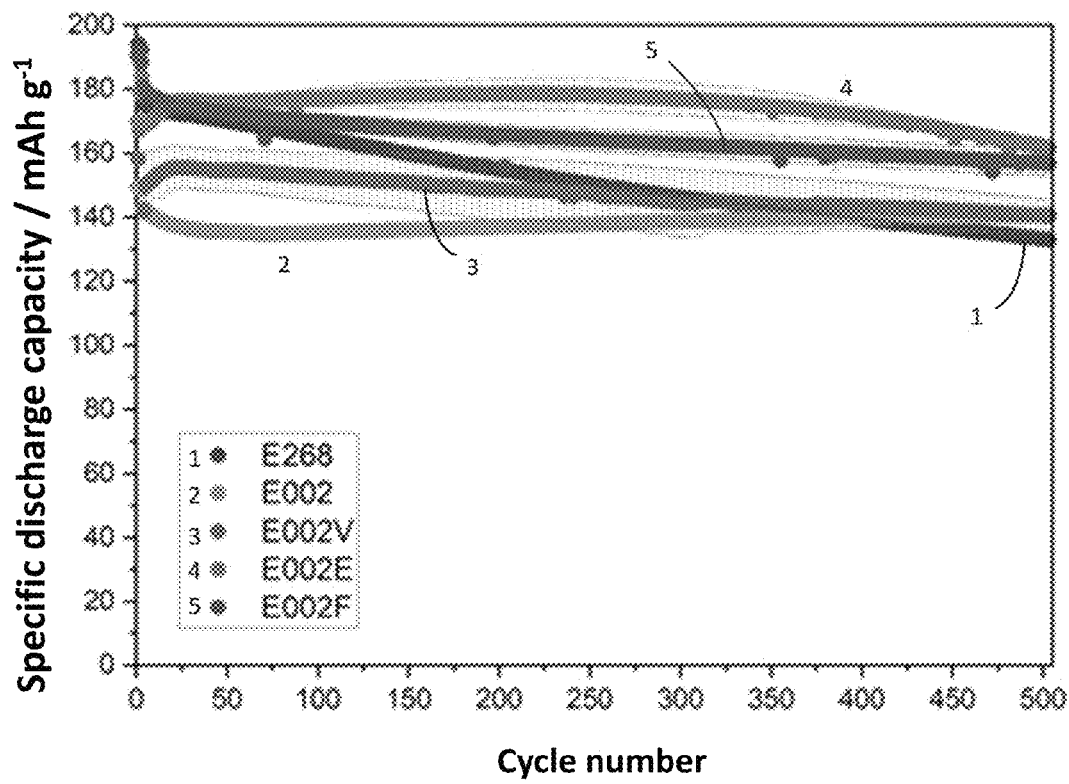
FIGS. 41A-41B show the specific discharge capacity of the Gr∥NMC811 cells of FIGS. 40A-40B (1×charge/discharge cycle at C/20 and 2×charge/discharge cycles at C/10 as formation cycle, followed by 500×charge at C/3 discharge at 1C cycles) (41A) and the CE of the cells (41B).
Figure 41B:
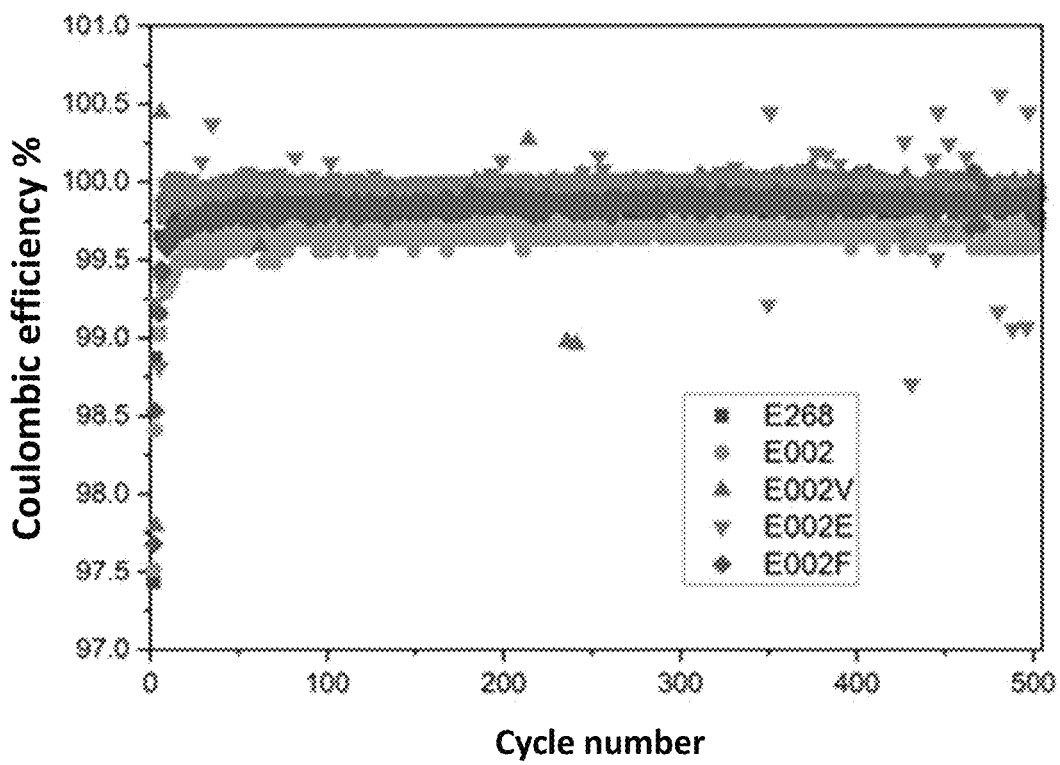

Upon cycling, the cells comprising E268 and E002F showed normal monotonous capacity decay, whereas the discharge capacities of the cells comprising E002 and E002E showed a certain degree of capacity increased in certain cycling segments (FIG. 41A). The reasons for such an increase in capacity with cycling reasons are not entirely clear. Apparently, electrolyte additives play a highly influential role over the cycling performance of cells using DME-based LHCEs. After 500 charge/discharge cycles in the voltage range of 2.5-4.4 V, the capacity retentions of the cells comprising E268, E002, E002E and E002F amounted to 75.8%, 98.5%, 95.6% and 86.8%, respectively. It can be inferred that the DME-based LHCEs are superior electrolytes to state-of-the-art LiPF$_6$-organocarbonate based electrolyte (E268) in terms of improving the cycle life of high energy LIBs. As indicated in FIG. 41A, the capacity of E002E based cells exhibited a more rapid capacity fading than E002F cells after approximately 350 charge/discharge cycles. The capacity retentions of E002E and E002F cells from 350$^{th}$ cycle to 500$^{th}$ cycle were determined as 92.7% and 97.3%, respectively. The Coulombic efficiencies were similar and ranged from ~99.5-100% (FIG. 41B).

Figure 42:
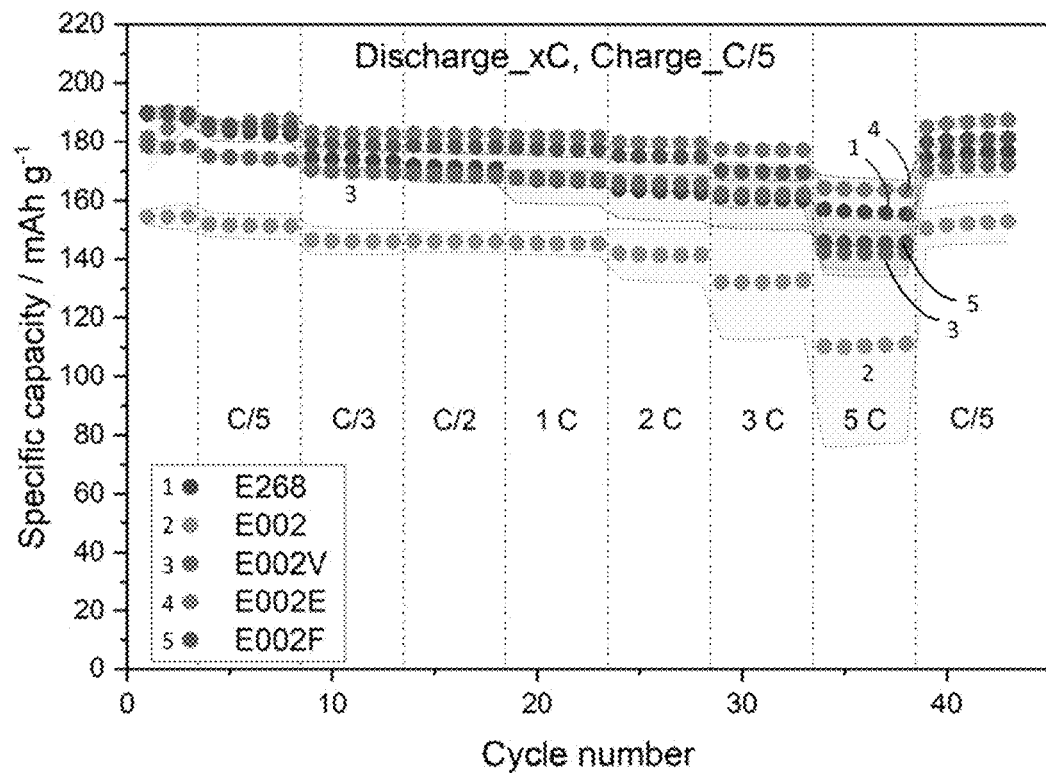
FIG. 42 shows the discharge rate capability of Gr∥NMC811 cells of FIGS. 40A-40B at 25.0±0.1° C. over a voltage range of 2.5-4.4 V.

The discharge C-rate performance of the Gr||NMC811 cells comprising the electrolytes listed in Table 6 were also evaluated. As illustrated in FIG. 42, due to the significant irretrievable capacity loss in the formation cycles, the E002 cells exhibited relatively low specific capacities under all selected discharge C-rates. E002V cells exhibited slightly lower C-rate performance than the E268 due to the relatively large capacity loss in the formation cycles. E002E cells showed higher discharge capacities than E268 cells at all selected C-rates. E002F resulted in slightly better C-rate performance than E268 under the discharge C-rates up to 3C, however E-DME-F exhibited lower capacity at 5C discharge rate. The reason behind the electrochemical performance improvements by DME based electrolytes will be discussed in Example 5 later.

The applicability of the E002F (DME-based LHCE with FEC additive) to LIBs with this Co-free LiNi$_{0.96}$Mg$_{0.02}$Ti$_{0.02}$O$_2$ (NMT) cathode in Gr||NMT cells was also studied. Ultrahigh-nickel layered oxide NMT cathode powder was synthesized and then prepared into a cathode. Gr anode was from Argonne National Laboratory. E268 was selected as the baseline electrolyte for comparison. The obtained Gr||NMT cells were conducted three formation cycles (C/20 for 1 cycle and C/10 for 2 cycles) and then cycled at C/3 charging/discharging in the voltage range of 2.5-4.4 V, 1C corresponds to 1.5 mA cm$^{-2}$.

Figure 43:
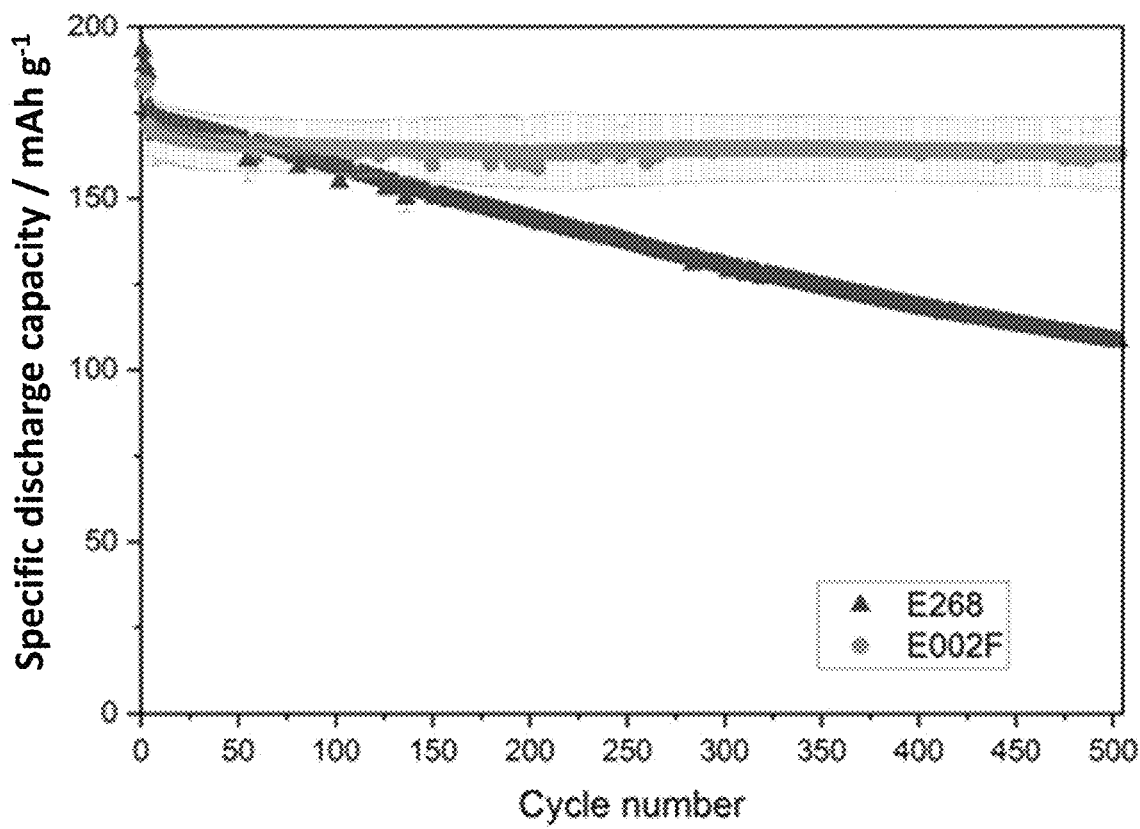
FIG. 43 shows the average specific discharge capacity of Gr∥NMT coin cells comprising a baseline electrolyte or an LHCE comprising LiFSI:DME:TTE:FEC=1.0:1.1:3.0:0.2 by mol over 500 cycles at 25° C.

As shown in FIG. 43, Gr||NMT cells using E002F achieved superior capacity retention to those using E268. At 500$^{th}$ cycles, the capacity retentions of Gr||NMT cells using E268 and E002F amounted to 61.1% and 95.3%, respectively. The results demonstrated that the LHCEs screened from Gr||NMC811 cell chemistry were also qualified to be used in Gr||NMT chemistry, as extraordinary cycling performance was achieved with E002F in Gr||NMT cells.

DMC-based electrolytes: Table 7 shows the compositions of a baseline electrolyte and a DMC-based LHCE.

TABLE 7

Electrolyte formulae

| Code | Electrolyte formula |
|---|---|
| Baseline | 1.0 M LiPF$_6$/EC-EMC (3:7 wt.) + 2 wt. % VC |
| AE012 | LiFSI:DMC:TTE:FEC = 1.0:2.0:3.0:0.2 by mol. |

Gr||NMT coin cells with AE012 and Baseline electrolyte were assembled in an argon-filled glove box, conducted three formation cycles (C/20 for 1 cycle and C/10 for 2 cycles) and then cycled at C/3 charging/discharging in the voltage range of 2.5-4.4 V, 1C corresponds to 1.5 mA cm$^{-2}$.

Figure 44:
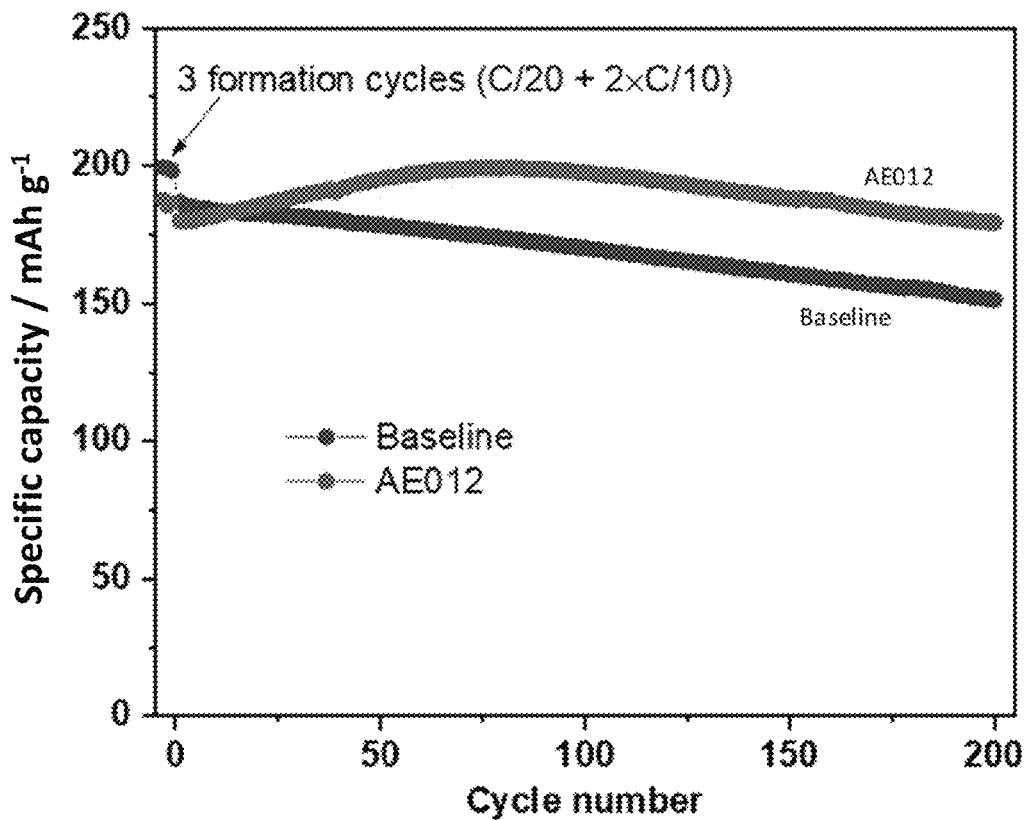
FIG. 44 shows long-term cycling performance of Gr∥NMT coin cells comprising a baseline electrolyte or an LHCE comprising LiFSI:DMC:TTE:FEC=1.0:2.0:3.0:0.2 by mol at 25° C.

FIG. 44 shows the cycling performance of Gr||NMT cells using AE012 and Baseline, respectively. The cell with AE012 showed lower capacities at the formation cycles and the initial several cycles at C/3 than the cell using Baseline. However, after formation cycles, the cell with Baseline suffered from continuous capacity decay and results in a capacity retention of 80.8% after 200 cycles. In contrast, AE012 enables the cell a gradual capacity growth in the first 50 cycles which probably due to the high viscosity and special solvation structure of the LHCE and then negligible capacity fade in the following cycles, leading to a high capacity retention of 99.7% after 200 cycles. It is indicated that the AE012 may be in favor of forming much protective electrode/electrolyte interphases on both Gr and NMT surfaces when compared to the Baseline electrolyte, thus enabling much improved cycling stability.

TMPa-based electrolytes with reduced flammability: The compositions of the LHCEs can be tuned to achieve different functions. In this example, a flame retardant, TMPa, was employed as the solvating solvent for the preparation of LHCEs to reduce the flammability of the electrolytes. The formulae of the TMPa-based electrolytes are summarized in Table 8.

TABLE 8

Electrolyte formulae

| Code | Electrolyte formula |
|---|---|
| E268 | 1.0 M LiPF$_6$/EC-EMC (3:7 wt.) + 2 wt. % VC |
| E003 | LiFSI:TMP$_a$:TTE = 1.0:1.4:3.0 by mol. |
| E003V | LiFSI:TMP$_a$:TTE:VC = 1.0:1.2:3.0:0.2 by mol. |
| E003E | LiFSI:TMP$_a$:TTE:EC = 1.0:1.2:3.0:0.2 by mol. |
| E003F | LiFSI:TMP$_a$:TTE:FEC = 1.0:1.2:3.0:0.2 by mol. |

Figure 45A:
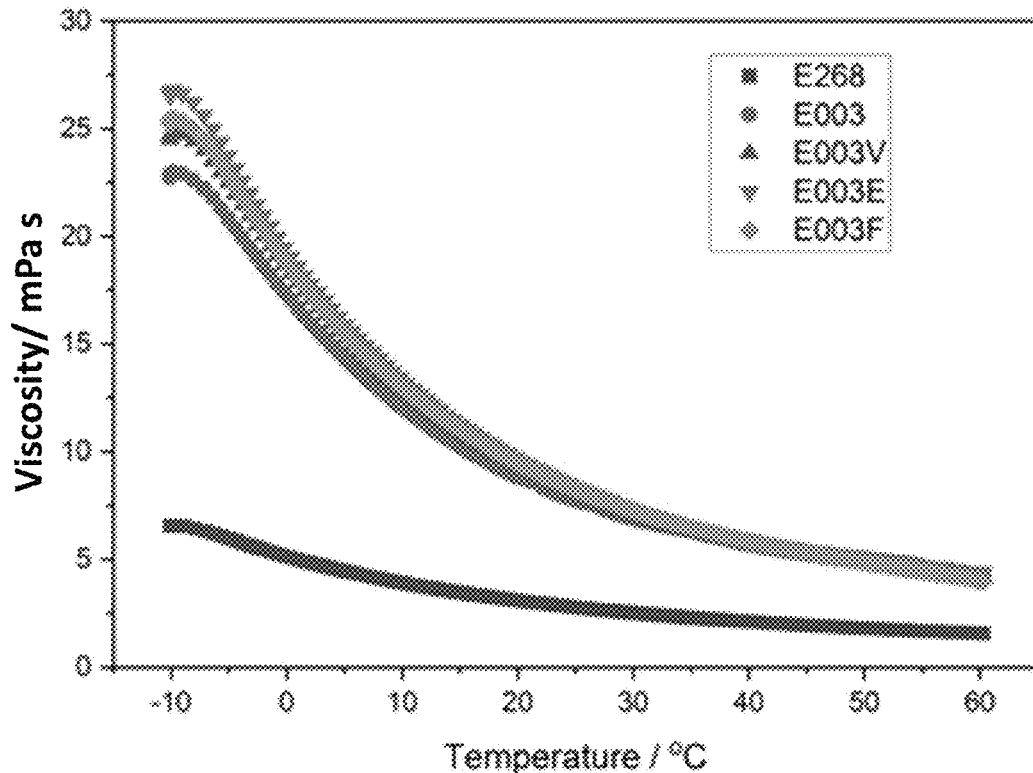
FIGS. 45A-45B show temperature dependence of viscosities (45A) and ionic conductivities (45B) of a baseline electrolyte and several TMPa-based LHCEs.
Figure 45B:
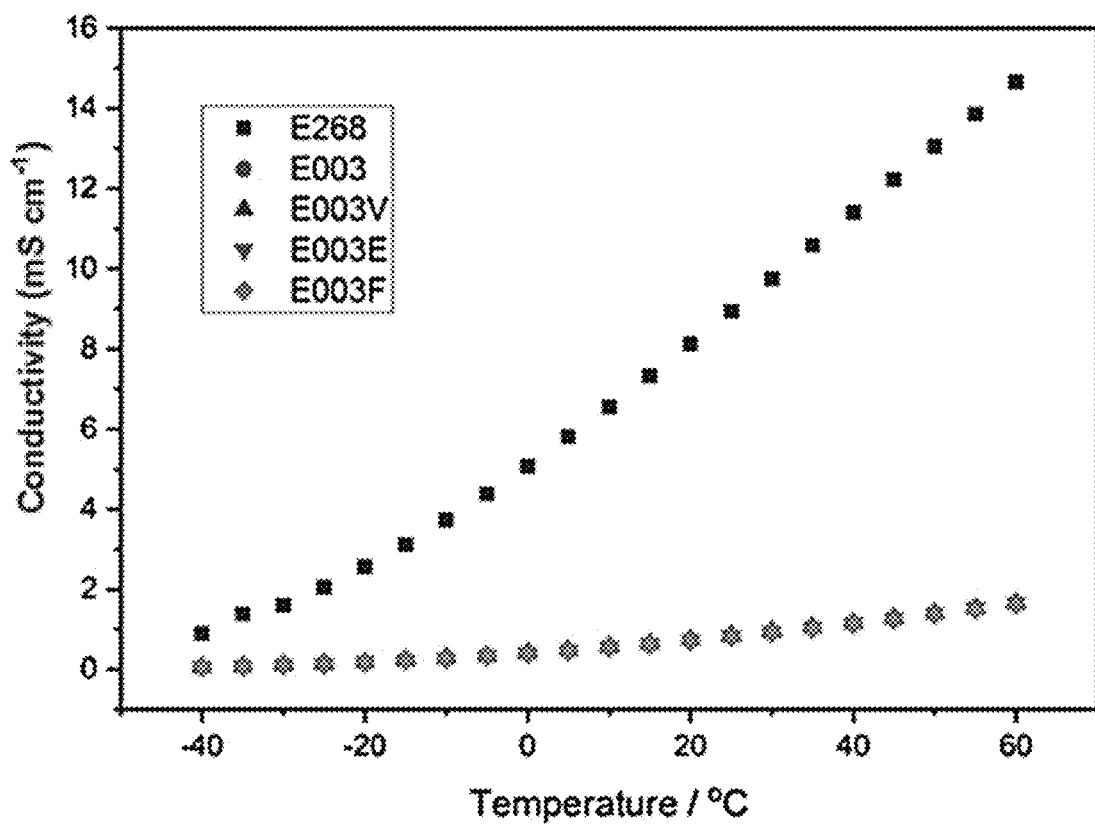

Similar to DME-based electrolytes, the TMPa-based LHCEs exhibited a higher viscosity than the E268 in the measured temperature range, as shown in FIG. 45A. At room temperature (25° C.), the viscosities of E268, E003, E003V, E003E and E003F were determined as 2.78, 7.74, 8.04, 8.36, 8.21 mPa s. Due to the higher viscosity of TMPa than DME, E003 electrolytes exhibited significantly higher viscosities than DME-based LHCEs. As shown in FIG. 45B, the ionic conductivities of TMPa-based electrolytes were significantly lower. At room temperature, the conductivities of E268, E003, E003V, E003E and E003F were determined as 8.94, 0.81, 0.83, 0.82, 0.80 mS cm$^{-1}$, respectively. Comparing all the TMPa-based LHCEs, it can be inferred that the addition of the small amount of electrolyte additive did not induce significant viscosity and conductivity change.

Figure 46:
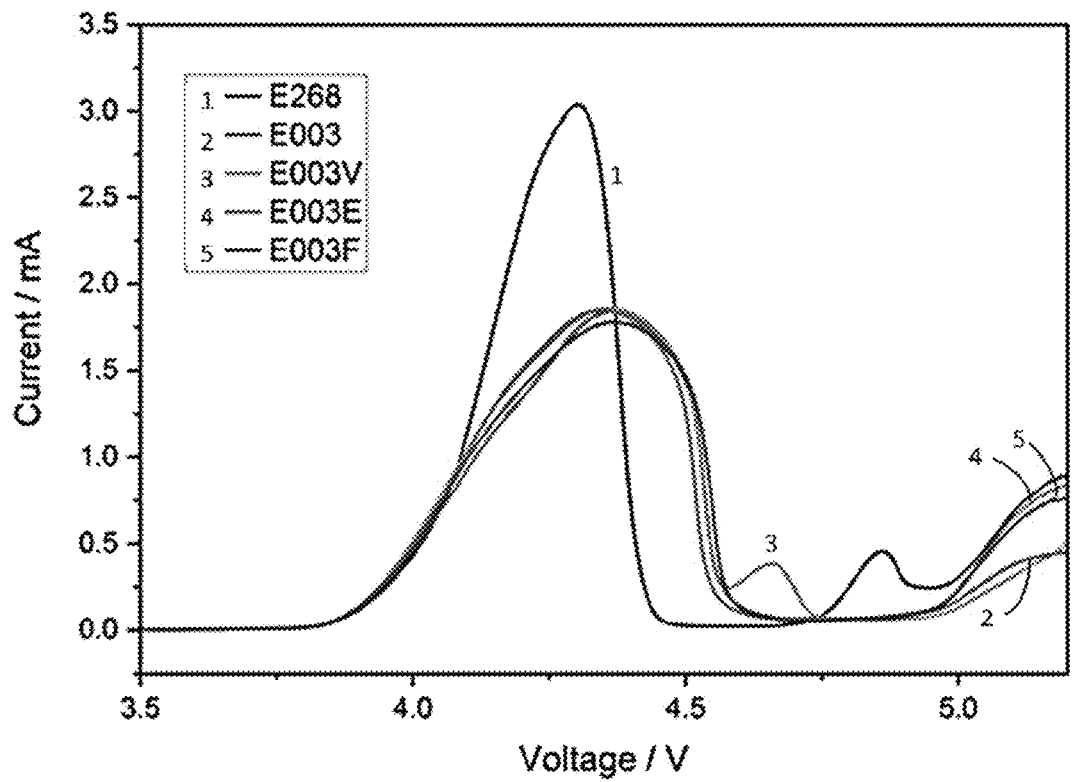
FIG. 46 shows the anodic stability voltages of the electrolytes of FIGS. 45A-45B determined by linear sweep voltammetry at the scan rate of 0.1 mV s$^{-1}$.

The anodic stabilities of E268 and the TMPa-based electrolytes were studied using a Li||Mn$_2$O$_4$ cell set-up. The anodic stability voltages of E268, E003, E003V, E003E and E003F were determined to be 4.7 V, 4.9 V, 4.6 V, 4.9 V and 4.9 V, respectively, as shown in FIG. 46. Due to the unique solvation structure of LHCEs and the chemical stability of TMPa, TMPa-based LHCEs exhibited higher anodic stability than E268, with the only exception of E003V. The decomposition of VC in E003V at 4.6 V was the major reason behind its inferior anodic stability. The superior anodic stabilities of TMPa based LHCEs make them favorable candidates for high voltage LIB applications.

Figure 47A:
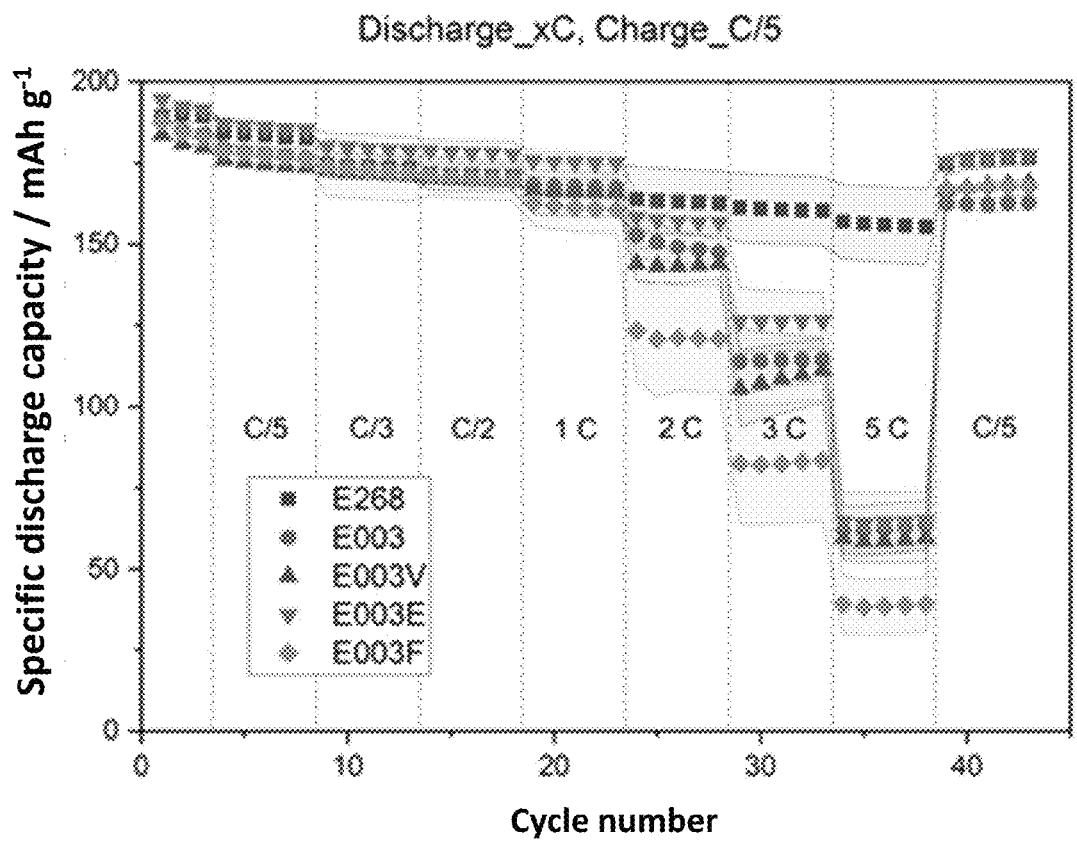
FIGS. 47A-47B show the C-rate performance (47A) and average specific discharge capacity as a function of cycle number (47B) of Gr∥NMC811 cells using a baseline and several TMPa-based LHCEs.
Figure 47B:
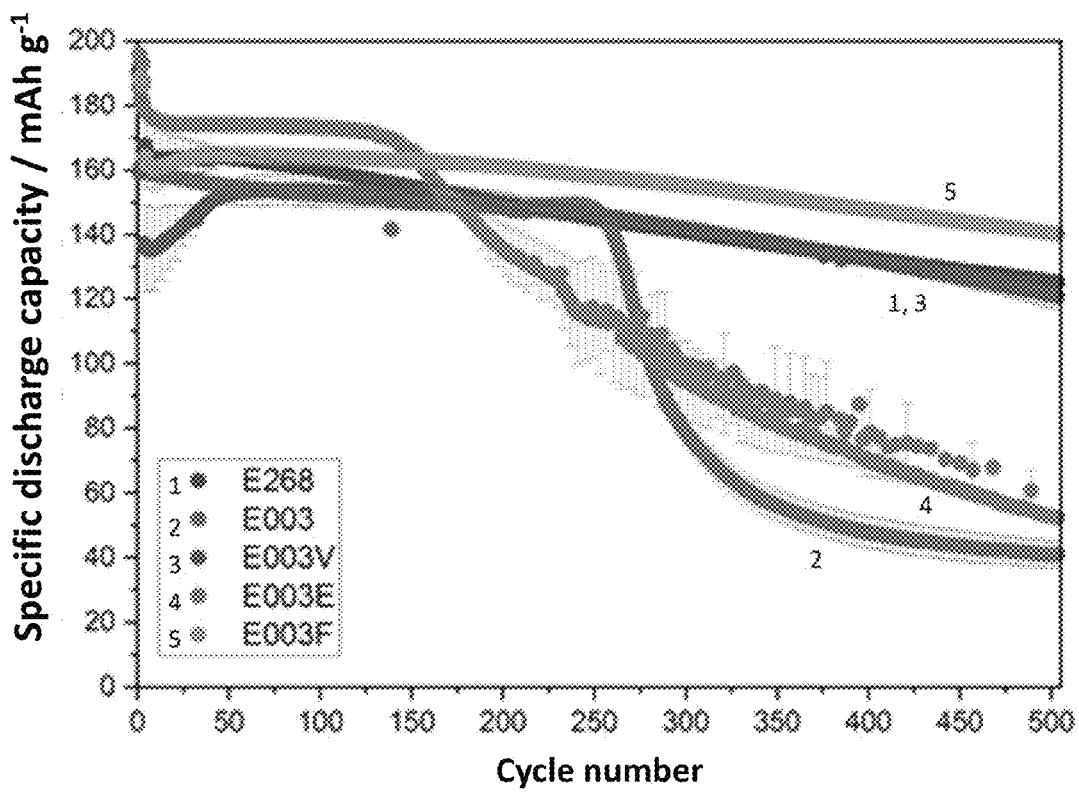

The C-rate performance and the long-term cycling performance of the Gr||NMC811 cells comprising TMPa-based LHCEs were evaluated. E268 was selected as the reference electrolyte. As shown in FIG. 47A, cells using TMPa-based LHCEs generally exhibited relatively inferior C-rate capabilities than the cells using E268 baseline electrolyte when the C-rate was higher than 2C, which can be attributed to the relatively low ionic conductivities of these electrolytes. As shown in FIG. 47B, the introduction of the electrolyte additives plays an influential role in determining the lifespan of the Gr||NMC811 cells using TMPa-based LHCEs. Gr||NMC811 cells using E003 (additive free) exhibited rapid capacity fading at about the 250$^{th}$ cycle. After the introduction of EC (E003E), the initial average specific capacity of Gr||NMC811 cells was increased. However, the rapid capacity decay started at an even earlier stage (about the 150$^{th}$ cycle). In comparison, the introduction of VC and FEC into TMPa-based LHCEs effectively extended the cycle life of Gr||NMC811 cells. After 500 charge/discharge cycles, Gr||NMC811 cells using E003V exhibited an average specific discharge capacity very similar to that of Gr||NMC811 cells using E268. E003F achieved the best capacity retention among all the electrolytes listed in Table 8.

TMS-based electrolytes: Several TMS-based LHCEs were prepared as shown in Table 9.

TABLE 9

Electrolyte formulae

| Code | Electrolyte formula |
|---|---|
| E268 | 1.0 M LiPF$_6$/EC-EMC (3:7 wt.) + 2 wt. % VC |
| E009 | LiFSI:TMS:TTE = 1.0:3.0:3.0 by mol. |
| E009V | LiFSI:TMS:TTE:VC = 1.0:2.8:3.0:0.2 by mol. |
| E009E | LiFSI:TMS:TTE:EC = 1.0:2.8:3.0:0.2 by mol. |
| E009F | LiFSI:TMS:TTE:FEC = 1.0:2.8:3.0:0.2 by mol. |

Figure 48:
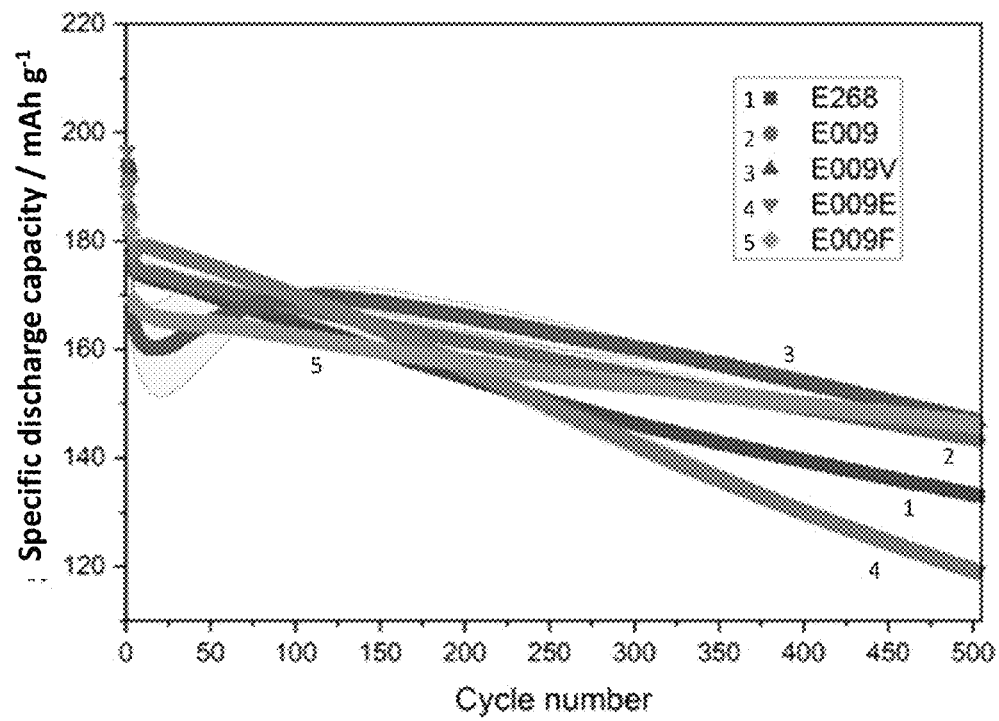
FIG. 48 shows the average specific discharge capacity of Gr∥NMC811 cells comprising a baseline electrolyte and TMS-based LHCEs plotted as a function of cycle number.

As illustrated in FIG. 48, TMS-based LHCE (E009) can achieve superior cycling performance in Gr||NMC811 cells, even in the absence of electrolyte additives. The possible reason can be attributed to the effective SEI formation ability of TMS. The synergetic effects between E009 and electrolyte additives were studied in this example. As shown in FIG. 47, the introduction of EC into E009 improved the initial specific discharge capacity of the Gr||NMC811 cells, which was in good agreement with the results obtained with DME-based and TMPa-based LHCEs. The introduction of VC (E009V) led to the capacity increase in the first few tens of charge/discharge cycles. Although cells using E009F (with FEC additive) exhibited slightly lower initial capacity than the cells using E268, the capacity decay rate was lower. After 500 charge/discharge cycles, the capacity retentions of E268, E009, E009V, E009E and E009F-based cells were determined to be 75.8%, 81.1%, 88.1%, 66.7%, 86.4%, respectively. It should be noted that E009V based cells exhibited a rapid capacity increase in the first 100 charge/discharge cycles, which contributed to their exceptionally high capacity retention. E009F was probably the best electrolyte formula since the E009F cells showed the lowest decay rate among all the cells illustrated in FIG. 48.

DMC-based LSEs for Si/C-based LIBs: Two DMC-based LHCEs were prepared as shown in Table 10.

TABLE 10

Electrolyte formulae investigated in this example

| Code | Electrolyte formula |
|---|---|
| Control | 90 wt. % [1.0 M LiPF$_6$/EC-EMC (3:7 wt.)] + 10 wt. % FEC |
| AE003 | LiFSI:DMC:TTE:EC = 1.0:2.0:3.0:0.2 by mol. |
| AE011 | LiFSI:DMC:TTE:EC:FEC = 1.0:1.7:3.0:0.2:0.3 by mol. |

Si/C and NCM811 electrodes were used to assemble Si/C||NMC811 CR2032-type coin cells with 75 μL electrolyte. The cells were conducted three formation cycles at C/20 for the first cycle and C/10 for the other two cycles before all the other electrochemical tests in the voltage range of 2.8-4.4 V, where 1C corresponds to 5.0 mA cm$^{-2}$.

Figure 49B:
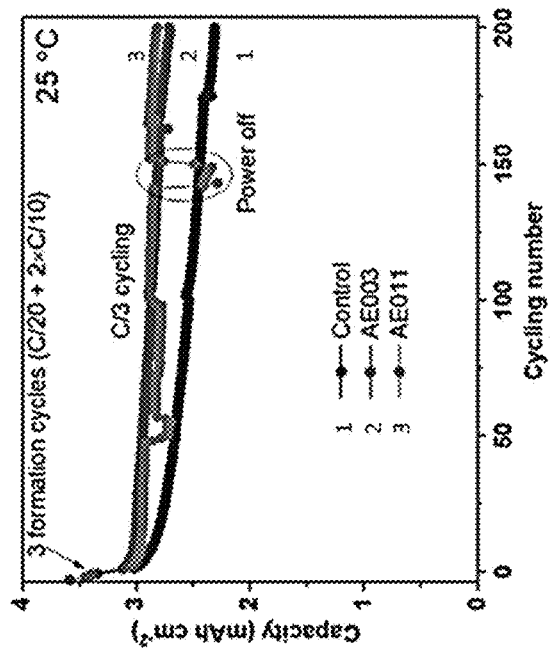
FIGS. 49A-49D show battery performances of a baseline electrolyte and two DMC-based LHCEs in Si/C∥NMC811 coin cells between 2.8 and 4.4 V: voltage profiles of the first formation cycle at C/20 rate and the first cycle at C/3 at 25° C. (49A); long-term cycling stability at C/3 rate at 25° C. (49B) and 45° C. (49C) after three formation cycles at 25° C.; rate capabilities under varying discharge rates (xC) with the same charge rate at C/10 (1C corresponds to 5.0 mA cm$^{-2}$) (49D).
Figure 49D:
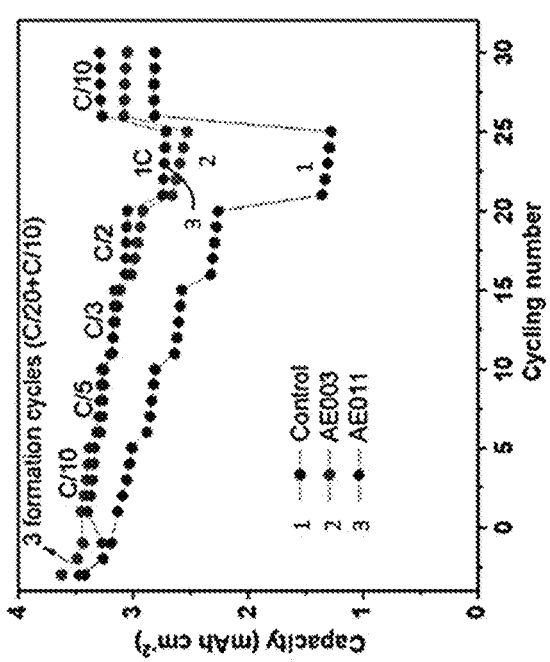
Figure 49A:
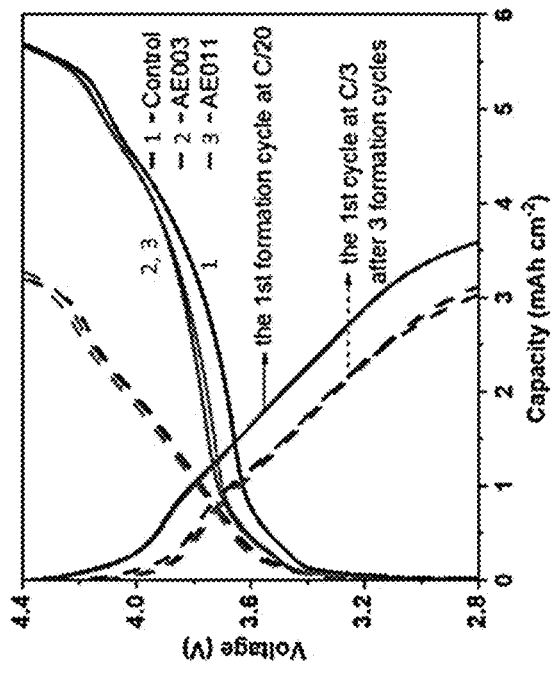
Figure 49C:
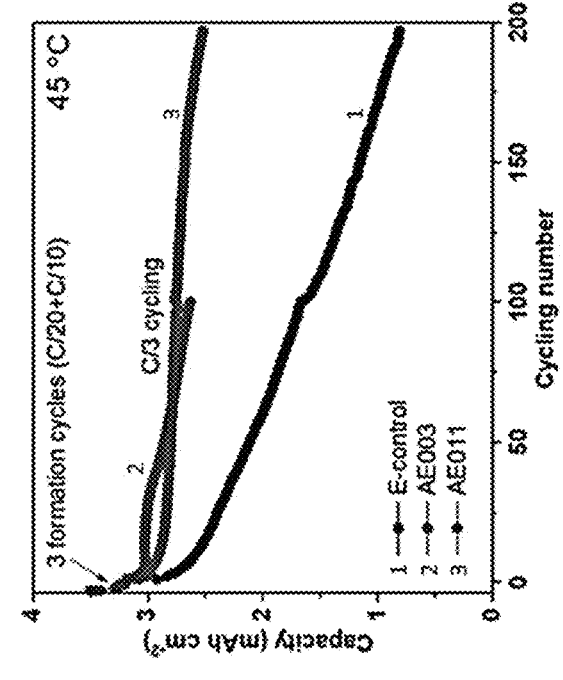

The long-term cycling stability at both room temperature (25° C.) and elevated temperature (45° C.) and the discharge rate capability of the two LHCEs (AE003 and AE011) and the control electrolyte were investigated in Si/C||NMC811 coin cells. FIG. 49A shows that the cells with AE003, AE011 and the control delivered similar charge and discharge capacities at both the first formation cycle and the first C/3 cycle at 25° C. After long-term cycling at C/3 under both 25° C. and 45° C., the retained capacities in cells with AE011 were much higher than those in control. AE003 behaved very similar to AE011 at both temperatures. From FIG. 49B, it can be observed that the areal capacity of cell using AE011 was 2.8 mAh cm$^{-2}$ after 200 cycles, corresponding to a capacity retention of 90.3%, being much higher than the capacity retention of 76.7% (i.e. a reversible capacity of 2.3 mAh cm$^{-2}$) in the cell with the control electrolyte after 200 cycles at 25° C. AE003 also enabled a capacity retention of 86.8% after 200 cycles, higher than control but slightly lower than AE011. When the operating temperature was elevated to 45° C., AE011 still enables significantly improved cycling stability as indicated in FIG. 49C. The cell with AE011 exhibited a discharge capacity of 2.5 mAh cm$^{-2}$ at the 200$^{th}$ cycle with a capacity retention of 80.6%. AE003 also enabled a capacity retention of 82.6% after 100 cycles at high temperature. In contrast, just 26.7% (0.78 mAh cm$^{-2}$) of the reversible capacity was maintained after 200 cycles under 45° C. in the cell with control. It is suggested that the functional LHCEs, especially AE011, can greatly enhance the cycling stability of Si/C∥NMC811 cells under both room and elevated temperatures. Further, the discharge rate capability of AE003 and AE011 was also evaluated with the comparison with the control electrolyte after three formation cycles. Under the protocol with a constant charge rate of C/10 and different discharge rates from C/10 to 1C, as shown in FIG. 49D, the cell with AE011 showed a superior discharge rate capability even compared to the cell using AE003 in the full rate range, while the control electrolyte suffered rapid capacity fading when discharge rate was 1C. When the discharge rate was changed back to C/10, AE011 enabled total capacity recovery, while the cells with AE003 and Control both recovered about 90.6% of the reversible capacities, compared to the initial capacities at initial C/10, which indicates the formation of more conductive electrode/electrolyte interphases on both Si/C and NMC811 electrodes and consequently, faster electrode redox reaction kinetics in the cells with AE011.

Carbonate-based LHCEs for Si-based LIBs: Beyond the application of DMC-based LHCEs in Gr- and Si/C-based LIBs, advanced electrolytes with suitable additives also provided excellent performance in high voltage batteries with a high Si content anode. The formulations of the LHCEs (AE003, AE011, AE012 and AE013) and the conventional LiPF$_6$/carbonate electrolyte for Si based batteries (noted as Si-baseline) studied are listed in Table 11.

TABLE 11

| Electrolyte formulae | |
| --- | --- |
| Electrolyte Code | Electrolyte formula |
| Si-baseline | 1.2 M LiPF$_6$ in PC-EMC (3:7 by wt.) + 1 wt. % VC + 7% wt. % FEC |
| AE003 | 1.4 M LiFSI in DMC-EC-TTE (2:0.2:3 by mol.) |
| AE011 | 1.4 M LiFSI in DMC-EC-FEC-TTE (1.7:0.2:0.3:3 by mol.) |
| AE012 | 1.4 M LiFSI in DMC-FEC-TTE (2:0.2:3 by mol.) |
| AE013 | 1.4 M LiFSI in DMC-EC-FEC-TTE (2:0.1:0.1:3 by mol.) |

Figure 50:
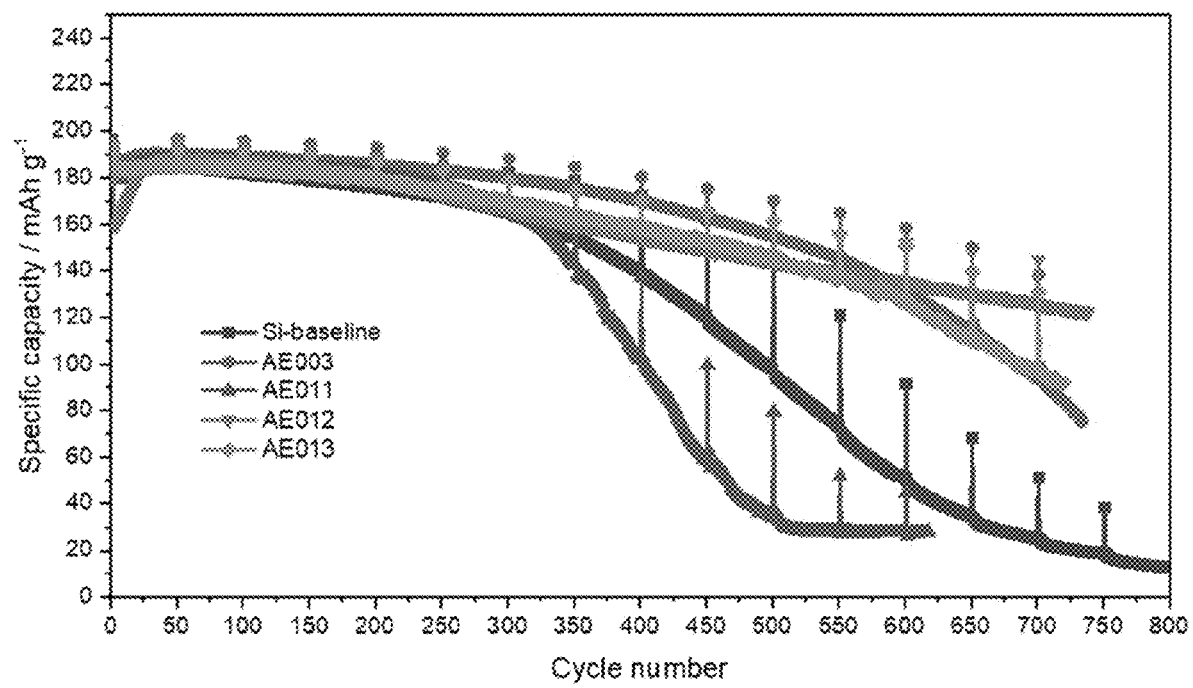
FIG. 50 shows long-term cycling specific capacity of Si∥NMC622 coin cells with a baseline electrolyte and four DMC-based LHCEs at 25° C. at 0.7C charge and C/2 discharge after a formation cycle of C/10 in the 1$^{st}$ cycle and C/5 for the 2$^{nd}$ cycle. Capacity check at C/5 at every 50 cycles. Si with 30% capacity pre-lithiation.
Figure 51:
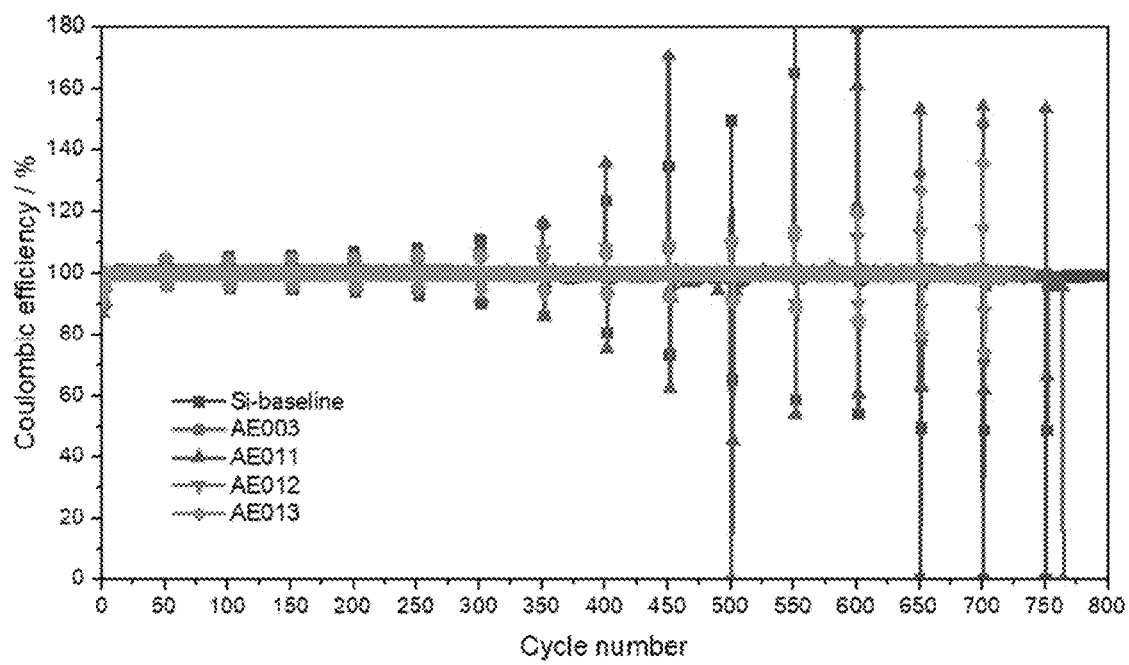
FIG. 51 shows long-term cycling CE of the coin cells of FIG. 50.

The long-term cycling of these LHCEs and the Si-baseline was investigated in Si∥NMC622 coin cells under the voltages range of 2.0-4.35 V with a charge rate of 0.7C and a discharge rate of C/2 after two formation cycles performed at C/10 for the first cycle and C/5 for the second cycle, where 1C corresponds to a current density of 3 mA cm$^{-2}$. The Si anode was pre-lithiated with 30% capacity. FIG. 50 shows the specific capacity over the long-term cycling using different electrolytes, and the corresponding cycling CEs and the voltage profiles at selected cycles are shown in FIGS. 51 and 52. For the Si-baseline, the cell is stable for around 350 cycles and starts a fast decay after 350 cycles, with capacity retentions of 82.6% and 38.9% at the 350th and 550th cycles, respectively (compared to the capacity of the first cycle at C/3 rate after the two formation cycles). This can be attributed to the poor electrode/electrolyte stability of Si-baseline electrolyte on both Si and NMC622, which leads to a quick accumulation of resistive surface films on Si and NMC622. In comparison, it is clearly observed that the three LHCEs (AE003, AE012 and AE013) have much higher capacity retentions in Si∥NMC622 cells than the Si-baseline electrolyte. The cells with AE003, AE012 and AE013 give discharge capacities of 154.9, 144.5 and 149.4 mAh g$^{-1}$ at the 500$^{th}$ cycle with capacity retentions of 83.7%, 78.1% and 80.8%, respectively.

FIG. 51 shows the corresponding CEs during the long-term cycling as shown in FIG. 50. All the cells with AE003, AE012 and AE013 showed high average CE above 99.8% during the cycling, and the detailed values are summarized in Table 12. One interesting phenomenon was the CE fluctuation during the C rate change at every 50 cycles, where C/5 charge/discharge was used for capacity check. Much higher CE fluctuation of 60% after long term cycling was observed in Si∥NMC622 cells with Si-baseline and AE011 electrolytes, where the fluctuation significantly escalated after 350 cycles, which is in consistent with the fast capacity decay after 350 cycles in these two electrolytes. Electrolytes AE003, AE012 and AE013 had much smaller CE fluctuation within 10% after 500 cycles. For CE fluctuation beyond 500 cycles, the AE012 was the smallest, constant with the stable cycling as shown in FIG. 50. These results demonstrated that the cells using optimized LHCEs have much lower resistance and better kinetics after long term cycling, which can be attributed to the significantly improved SEI and CEI properties on Si anode and NMC622 cathode cycled in such LHCEs.

TABLE 12

First cycle Coulombic efficiency (FCE) and average Coulombic efficiency (ACE) during cycling of the Si-baseline electrolyte and the four LHCEs studied in this Example.

| | 25° C. (Si with 30% pre-lithiation) | | 45° C. (Si without pre-lithiation) | |
| --- | --- | --- | --- | --- |
| Electrolyte | FCE/% | ACE/% | FCE/% | ACE/% |
| Si-baseline | 91.05 | 99.84 | 84.88 | 99.6 |
| AE003 | 90.94 | 99.88 | 84.57 | 99.81 |
| AE011 | 86.84 | 99.72 | 83.59 | 99.8 |

TABLE 12-continued

First cycle Coulombic efficiency (FCE) and average Coulombic efficiency (ACE) during cycling of the Si-baseline electrolyte and the four LHCEs studied in this Example.

| | 25° C. (Si with 30% pre-lithiation) | | 45° C. (Si without pre-lithiation) | |
|---|---|---|---|---|
| Electrolyte | FCE/% | ACE/% | FCE/% | ACE/% |
| AE012 | 88.87 | 99.89 | 84.99 | 99.84 |
| AE013 | 91.02 | 99.81 | 85.03 | 99.81 |

Figure 52A:
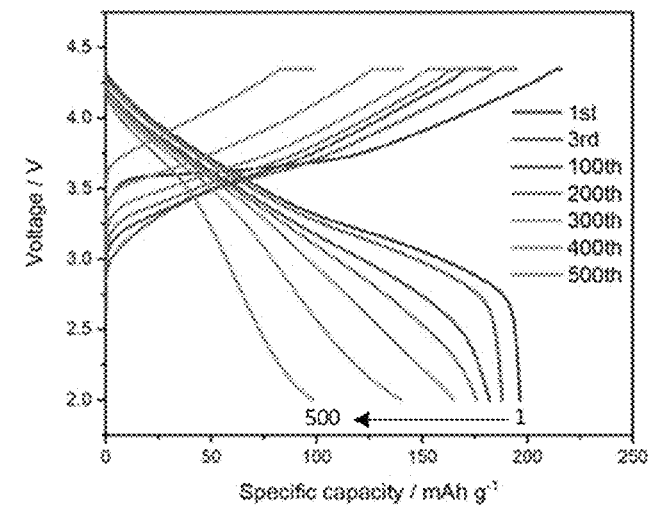
FIGS. 52A-52B show the voltage profiles of Si∥NMC622 coin cells using a Si-baseline electrolyte (52A) and a DMC-based LHCE (52B) at 25° C. at 0.7C charge and C/2 discharge after formation cycle of C/10 in the 1st cycle and C/5 for the 2$^{nd}$ cycle. Capacity check at C/5 at every 50 cycles. Si with 30% capacity pre-lithiation.
Figure 52B:
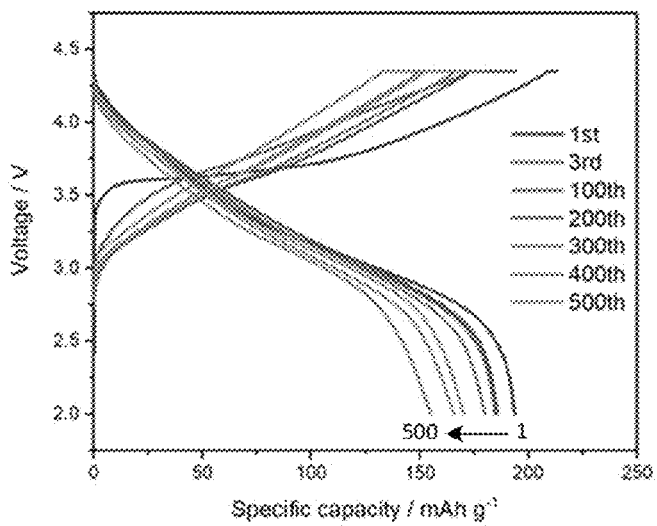

The voltage profiles of selected cycles during cycling are given in FIGS. 52A-52B, where AE003 represents the optimized LHCE and Si-baseline was compared as a reference. For the cell using Si-baseline, the overpotential increased significantly upon cycling with a 0.6 V change from the $3^{rd}$ cycle (first cycle after 2 formation cycles) to $500^{th}$ cycle, evidence of the large resistance increases during cycling. However, for the cell using AE003 electrolyte, the overpotential at initial charge state barely changed during long-term cycling, suggesting a much smaller change of resistance.

Figure 53:
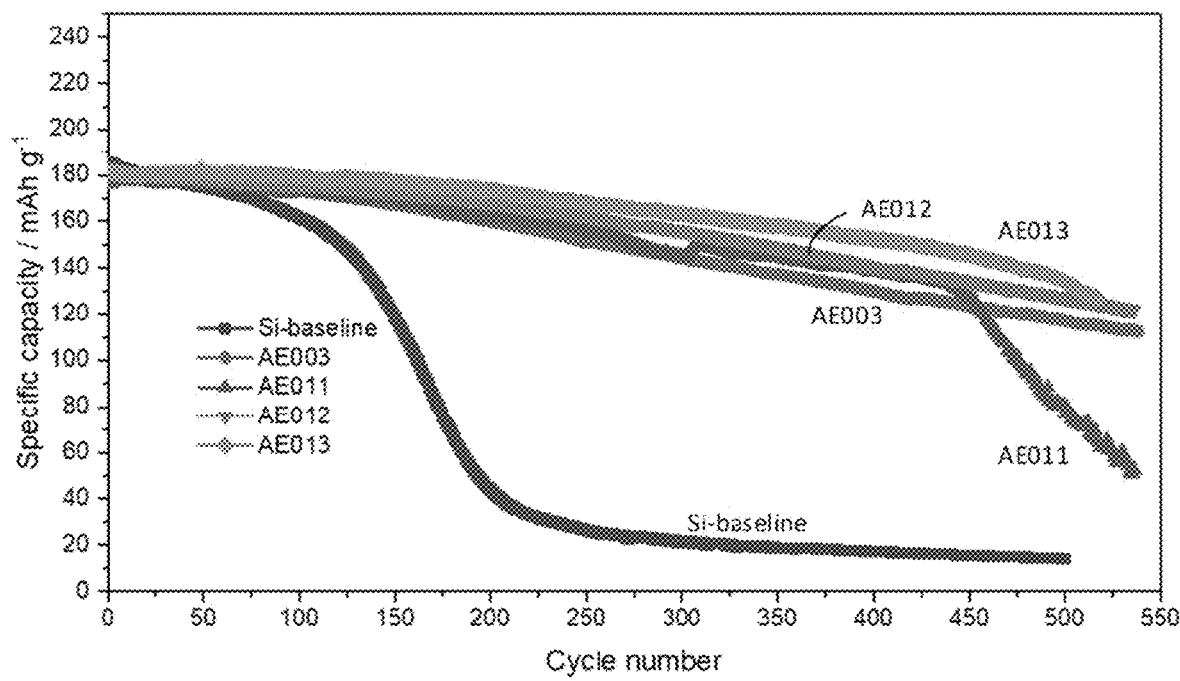
FIG. 53 shows long-term cycling specific capacity of Si∥NMC622 coin cells with a baseline electrolyte and four DMC-based LHCEs at 45° C. after a formation cycle of C/10 in the 1st cycle and C/5 for the 2$^{nd}$ cycle at 25° C. Capacity check at C/5 at every 50 cycles. Si without pre-lithiation.

In addition, Si||NMC622 cells were also tested at elevated temperature of 45° C. To simplify the testing and approximate practical conditions, the Si anode was not pre-lithiated in the Si||NMC622 cells tested at 45° C. As shown in FIG. 53, all four cells comprising LHCEs showed much more stable cycling performance than cell using Si-baseline electrolyte, which showed a clear capacity decay. The capacity retentions for AE003, AE011, AE012 and AE013 after 400 cycles were 74.2%, 76.0%, 77.8% and 80.0% respectively, while it was 21.9% for the Si-baseline electrolyte after 200 cycles.

Figure 54:
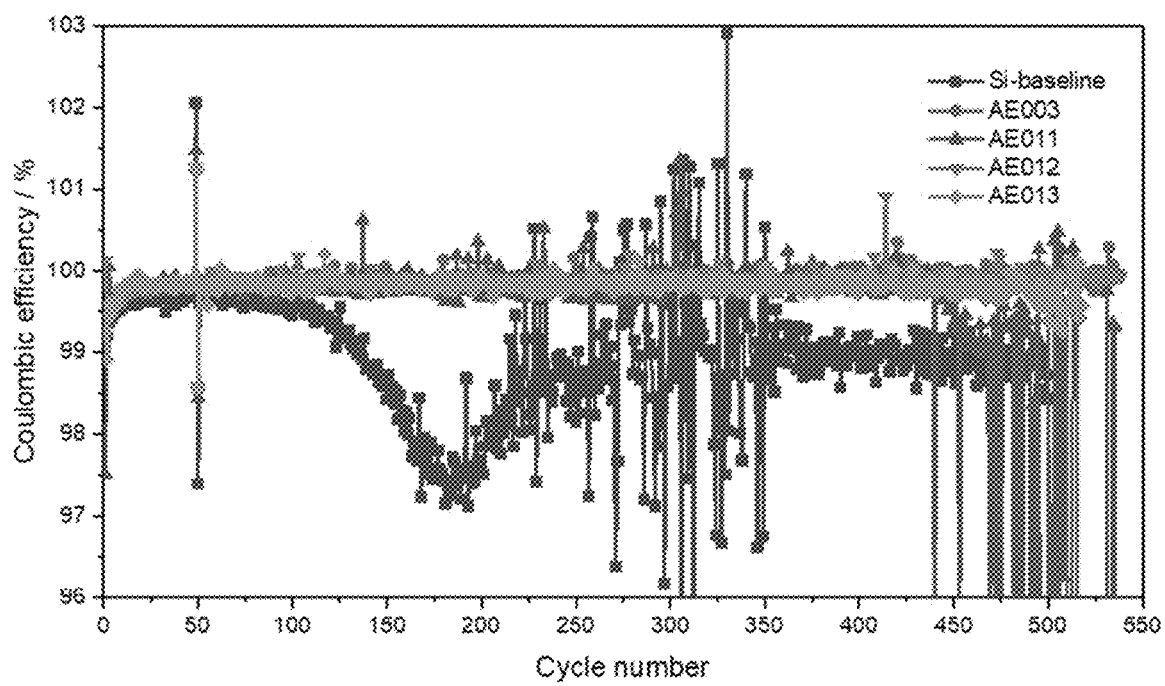
FIG. 54 shows long-term cycling CE of the coin cells of FIG. 53.

The corresponding CE during the cycling at 45° C. is shown in FIG. 54. All the cells with AE003, AE011, AE012 and AE013 showed higher average CE above 99.8% during the cycling than 99.6% of Si-baseline, and the detailed values are summarized in Table 12. Similar to 25° C., the CE fluctuation during the C rate change at every 50 cycles was smaller in the LHCEs, indicating the resistance of the Si||NMC622 was smaller in the LHCEs than the cell with Si-baseline electrolyte. Beyond that, fast CE fading showed after 100 cycles in the cell with baseline, while CE was stable in the cells with LHCEs.

Other solvent-based LHCEs for Si/C-based LIBs: Investigated electrolytes are shown in Table 13.

TABLE 13

Electrolyte formulae

| Code | Electrolyte formula |
|---|---|
| E002E | LiFSI:DME:TTE:EC = 1.0:1.1:3.0:0.2 by mol. |
| E002F | LiFSI:DME:TTE:FEC = 1.0:1.1:3.0:0.2 by mol. |
| E003F | LiFSI:TMP$_a$:TTE:FEC = 1.0:1.2:3.0:0.2 by mol. |
| E009 | LiFSI:TMS:TTE = 1.0:3.0:3.0 by mol. |
| E009E | LiFSI:TMS:TTE:EC = 1.0:2.8:3.0:0.2 by mol. |
| E009F | LiFSI:TMS:TTE:FEC = 1.0:2.8:3.0:0.2 by mol. |

Si/C and NCM811 electrodes were used to assemble Si/C||NMC811 CR2032-type coin cells with 75 μL electrolyte. The cells were conducted three formation cycles at C/20 for the first cycle and C/10 for the other two cycles before all the other electrochemical tests in the voltage range of 2.8-4.4 V, where 1C corresponds to a current density of 5.0 mA cm$^{-2}$.

Figure 55A:
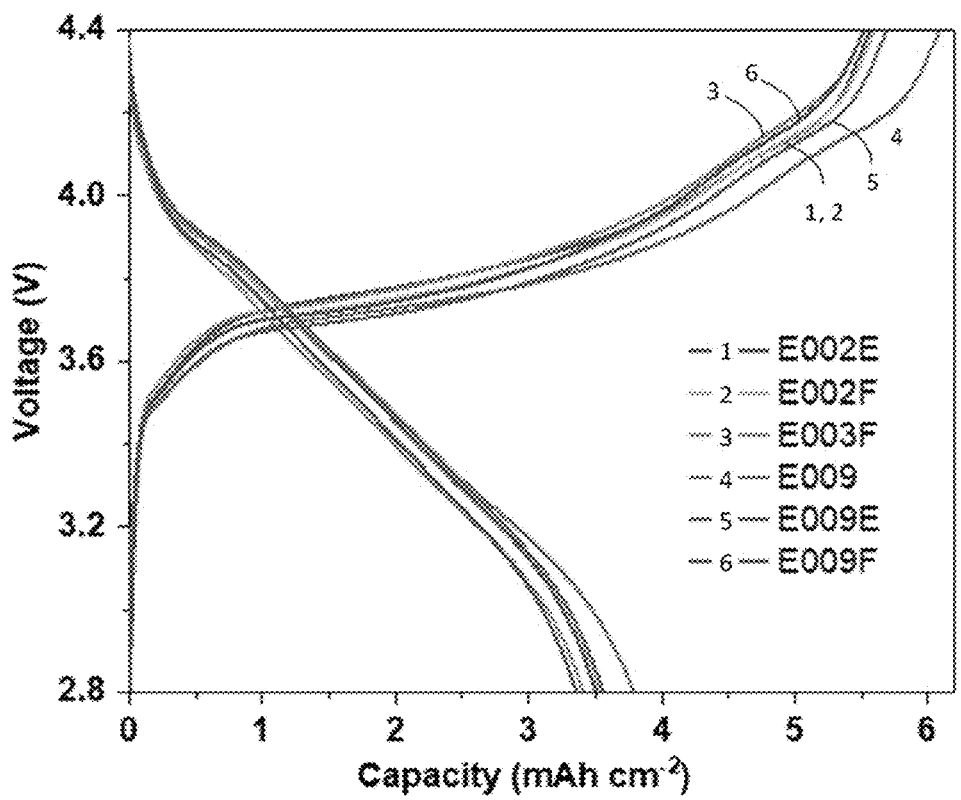
FIGS. 55A-55B show battery performances of a baseline electrolyte and several LHCEs in Si/C∥NMC811 coin cells between 2.8 and 4.4 V at 25° C.: voltage profiles of the first formation cycle at C/20 rate (55A); cycling stability at C3 rate, 1C corresponds to 5.0 mA cm$^{-2}$ (55B).
Figure 55B:
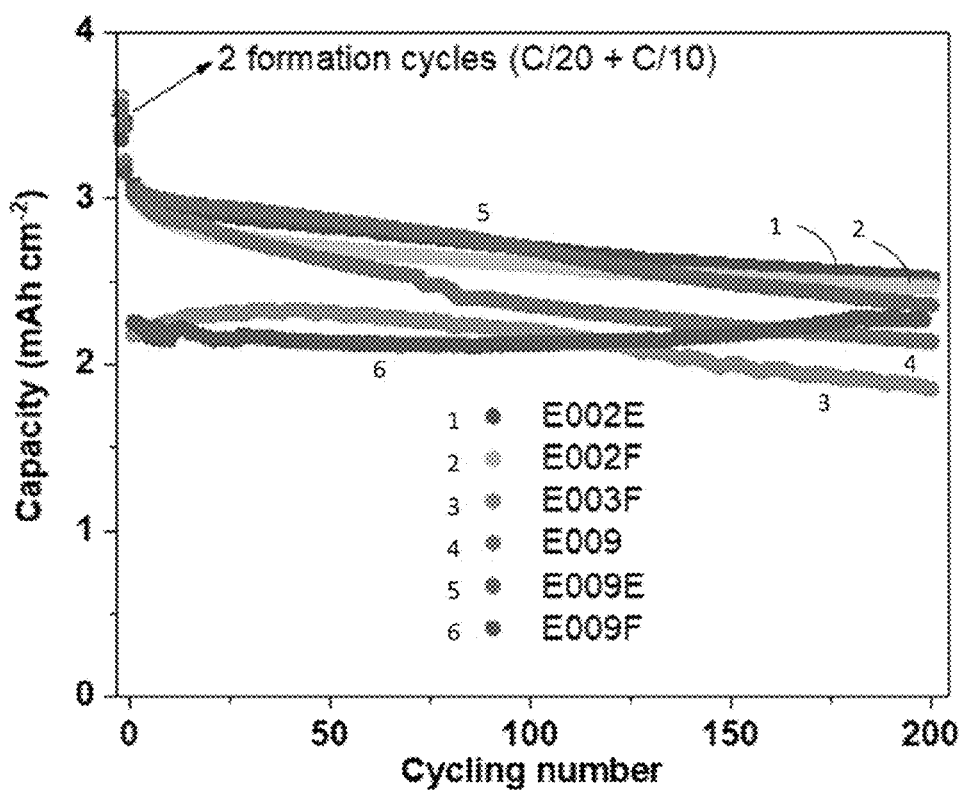

FIG. 55A shows the voltage profiles of the first formation cycle at C/20 for the Si/C||NMC811 cells in different electrolytes. The cells with E002E, E002F, E003F, E009, E009E and E009F gave initial discharge capacities of 3.50, 3.53, 3.41, 3.79, 3.56 and 3.36 mAh cm$^{-2}$, respectively, which follows the order from high to low of E009>E009E>E002F>E002E>E003F>E009F. When it turns to the cycling at 0/3, this capacity order became different, indicating the different Li diffusion abilities in these electrolytes. From FIG. 55B, after two formation cycles, the reversible capacity of the cell with E002E was the highest. And the order of the initial areal capacity from high to low at 0/3 was E002E>E009E=E002F>>E009F>E003F>E009, with areal capacities of 3.1, 3.0, 3.0, 2.3, 2.2 and 14.8 mAh cm$^2$, respectively. After 200 cycles at 0/3, the reversible areal capacities of E002E, E009E, E002F, E009F, E003F and E009 were 2.5, 2.4, 2.5, 2.3, 1.8 and 2.1 mAh cm$^2$, respectively. Although the cell with E009F showed low areal capacity at the initial cycles, it exhibited superior cycling stability with no capacity loss after 200 cycles.

Other promising electrolyte additives for LHCEs are proposed to further improve the cycling performance of Li-ion batteries with Gr, Si/C, and Si anodes and Ni-rich cathodes like NMC622, NMC811, and NMT. The IUPAC names and the abbreviations are summarized in Table 14.

TABLE 14

Electrolyte additives of interest for LHCEs

| IUPAC name | Common name or abbreviation |
|---|---|
| 1,3-dioxolan-2-one | Ethylene carbonate (EC) |
| 1,3-dioxol-2-one | Vinylene carbonate (VC) |
| 4-Fluoro-1,3-dioxolan-2-one | Fluoroethylene carbonate (FEC) |
| 4-Methylene-1,3-dioxolan-2-one | MEC |
| 4,5-Dimethylene-1,3-dioxolan-2-one | DMEC |
| 4-Vinyl-1,3-dioxolan-2-one | VEC |
| 1,3,2-Dioxathiolan-2-oxide | |
| Prop-1-ene-1,3-sultone | PES |
| 1-Methylsulfonylethene | Methyl vinyl sulfone (MVS) |
| 1-Ethenylsulfonylethene | Ethyl vinyl sulfone (EVS) |
| 1,3,2-Dioxathiolane-2,2-dioxide | |
| 1,3,2-Dioxathiane 2,2-dioxide | DTD |
| Lithium 2-trifluoromethyl-4,5-dicyanoimidazole | LITDI |
| Lithium bis(oxalato)borate | LiBOB |
| Lithium difluoro(oxalate)borate | LIDFOB |
| Lithium hexafluorophosphate | LiPF$_6$ |
| 3-Methyl-1,4,2-dioxazol-5-one | MDO |
| Tris(2,2,2-trifluoroethyl) phosphite | TTFEPi |
| 2-Oxo-1,3,2-dioxathiane | 1,3-Propylene sulfite (PS) |
| Hexanedinitrile | Adiponitrile |
| Butanedinitrile | Succinonitrile |
| Pentanedinitrile | Glutaronitrile |
| Tris(pentafluorophenyl) phosphine | TPFP |

Conducting salts and diluent solvents are also influential over the electrochemical performance of the cells using LHCEs. Additional exemplary conducting salts and diluents are listed in Table 15 and Table 16, respectively.

TABLE 15

Other conducting salts

| IUPAC name | Common name or abbreviation |
| --- | --- |
| Lithium bis(trifluoromethylsulfonyl)azanide | LiTFSI |
| Lithium bis(pentafluoroethylsulfonyl)azanide | LiBETI |
| Lithium (tetrafluoroethylenedisulfonyl)azanide | |
| Lithium (fluorosulfonyl)(trifluoromethylsulfonyl)azanide | LiFTFSI |
| Lithium trifluoromethanesulfonate | LiTf |

TABLE 16

Other diluent solvents

| IUPAC name | Common name or abbreviation |
| --- | --- |
| 2-[bis(2,2,2-trifluoroethoxy)methoxy]-1,1,1-trifluoroethane | Tris(2,2,2-trifluoroethyl) orthoformate (TFEO) |
| 1,1,2,2,3,3,4,4-octafluoro-5-(1,1,2,2-tetrafluoroethoxy)pentane | OTE |
| 1,1,1-Trifluoro-2-(2,2,2-trifluoroethoxy)ethane | Bis(fluoromethyl) ether (BTFE) |

Example 5

Further Evaluation of DME-Based Electrolytes for Cells with Graphite Anodes

Experimental:

Electrolyte preparation, cell assembly and electrochemical performance evaluations of Gr∥NMC811 cells: LiPF$_6$, EC, EMC, VC, FEC and DME, all in battery grade, were purchased from Gotion, Inc. and used as received. LiFSI in battery grade was supplied by Nippon Shokubai Co., Ltd., and was dried at 100° C. under vacuum overnight before use. TTE was ordered from SynQuest and dried with pre-activated molecular sieves till the water content was less than 10 ppm by Karl Fisher titration. The electrolytes, whose formulae are summarized in Table 17, were prepared in an MBraun glovebox filled with purified argon where the contents of both oxygen and water were less than 1 ppm.

Laminates of Gr and NMC811 electrodes were obtained from the Cell Analysis, Modeling, and Prototyping (CAMP) Facility at Argonne National Laboratory (ANL), and their corresponding areal capacities were 1.84 mAh cm$^{-2}$ and 1.45 mAh cm$^{-2}$, respectively. Disks of Gr (15.0 mm in diameter) and NMC811 (12.7 mm in diameter) were punched, dried at 110° C. under vacuum for at least 12 h, and then transferred into the argon-filled glovebox. CR2032 coin cell kits were ordered from MTI Corporation. Each coin cell was assembled with a piece of NMC811 disk, a piece of polyethylene separator (Asahi Hi-Pore, Japan), a piece of Gr disk, and 50 µL electrolyte. To avoid the anodic corrosion of stainless steel at high voltages, the aluminum (Al)-clad positive case was used and an additional Al foil of 19.0 mm diameter placed in between the positive cathode disk and NMC811 cathode.

After cell assembly, the cells were placed in a temperature chamber (TestEquity TEC1) of 25° C., connected to a LAND Battery Testing System (CT2001A) and rested for 12 h. The formation cycles were consisted of first charge/discharge cycle at C/20 rate and then two charge/discharge cycles at C/10 rate in the voltage range of 2.5-4.4 V, where 1C=1.45 mA cm$^{-2}$. For the long-term cycling performance evaluation, the test procedure included three formation cycles and then consecutive 500 cycles at C/3 charge and 1C discharge. For the C-rate capability evaluation, the cells were first conducted three formation cycles, and then cycled by charging at C/5 and discharging at C/5, C/3, C/2, 1C, 2C, 3C, 5C, and C/5. At each discharge C-rate, the charge/discharge cycles were repeated for five times. All the electrochemical tests were performed at the temperature of 25.0±0.1° C.

Ionic conductivity evaluation: The ionic conductivities of the studied electrolytes were measured using a Bio-Logic MCS. During the measurement, the temperature was increased to 60° C. and then decreased to −40° C. in a stepwise manner (5° C./step). At each temperature step, the cell was held for 15 min and the ionic conductivities were measured and recorded at the end of each step.

Ab initio molecular dynamics (AIMD) simulations of solvation structures of the studied electrolytes: The AIMD simulations of the solvation structures were performed in similar manner as described in our previous publication (Jia et al., ACS Applied Materials & Interfaces 2020, 12 (49), 54893-54903). The initial structure of each salt/solvent/additive/diluent mixture system was set up by randomly placing the numbers of LiFSI, DME, EC/FEC/VC, and TTE molecules on the basis of the experimental densities and molar ratios. These initial geometry structures were firstly minimized with molecular mechanics method. These final structures were used as input structures for AIMD simulations. The relaxed systems were pre-equilibrated for 5 ps in AIMD simulations. The production time was 10 ps. A time step of 1 fs was used in all AIMD simulations.

Diffusion ordered spectroscopy (DOSY) nuclear magnetic resonance (NMR) of the studied electrolytes: DOSY NMR experiments were performed on an Agilent DD2 500 spectrometer with a 5 mm HX z gradient One NMR probe. Larmor frequencies for these samples were 499.97, 470.39 and 194.32 MHz for $^1$H, $^{19}$F and $^7$Li, respectively. Gradient Compensated Stimulated Echo with Spin-Lock and Convection Compensation (DgcsteSL_cc) was used as the DOSY pulse sequence, which produced consistent results when testing a series of diffusion delays on each sample. For this series of experiments a 60 ms diffusion delay in 16 steps were collected. Additionally, the diffusion gradient length was 2 ms for $^1$H and $^{19}$F spectra and the diffusion gradient length was 4 ms for $^7$Li spectra with the maximum gradient strength from the Performa I gradient amp of 40 G/cm. The Diffusion coefficient was calculated using the Stejskal-Tanner equation.

Post-mortem analyses on electrodes: The cycled cells were disassembled inside the argon-filled glovebox. The Gr anodes and the NMC811 cathodes were retrieved from the cells, washed with fresh EMC (for E-Baseline) or DME (for LHCEs) to remove residual electrolytes, thoroughly dried under vacuum inside the antechamber of the glovebox, and subsequently delivered to do post-mortem characterizations in airtight vials.

XPS: XPS measurements were performed with a Physical Electronics Quantera Scanning X-ray Microprobe. This system uses a focused monochromatic Al Kα X-ray (1486.7 eV) source for excitation and a spherical section analyzer. The X-ray beam is incident normal to the sample, and the photoelectron detector is at 45° off-normal. High energy resolution spectra were collected using a pass-energy of 69.0 eV with a step size of 0.125 eV. The X-ray beam diameter was ~100 μm and was scanned over a 1200 μm×200 μm area of the sample.

TEM: Gr samples—The sample powder was scratched off the electrode disk and spread on a clean glass slide in the glovebox filled with argon. Subsequently, a lacey carbon TEM grid is placed on top of the powder (lacey carbon-side down). Thereafter, the TEM grid was loaded to a FEI CompuStage High-Visibility, Low-Background, Double-Tilt Specimen Holder, which is subsequently loaded into the TEM. NMC811 samples—The NMC811 samples were prepared according to the same procedure described in a previous publication (Zhang et al., *Advanced Energy Mater* 2020, 10: 2000368). A 300 kV FEI Titan monochromated (scanning) transmission electron microscope ((S)TEM) equipped with a probe aberration corrector was used to acquire the bright-field image, selected area electron diffraction (SAED), and high-resolution TEM image. All the samples were imaged under low dose conditions (~2 e Å$^{-2}$ s$^{-1}$ for low magnification imaging, ~200 e Å$^{-2}$ s$^{-1}$ for high resolution TEM imaging) to prevent beam induced damage and artifacts.

Results and Discussion for the Improved Electrochemical Performance of DME-Based LIBs:

Three DME-based LHCEs were prepared for the electrochemical performance evaluation, in which the main components are LiFSI as solute, DME as solvating solvent and TTE as diluent, without or with small amounts of additives (EC and FEC). A conventional LiPF$_6$-organocarbonates electrolyte was adopted as the baseline electrolyte (hereinafter, E-Baseline) for comparison. The detailed electrolyte formulae are listed Table 17.

TABLE 17

Formulations of the investigated electrolytes

| Name | Formulation |
|---|---|
| E-Baseline (E268) | 1.0 M LiPF$_6$ in (EC:EMC = 3.0:7.0 by wt.) + 2.0 wt. % VC |
| E-DME (E002) | LiFSI:DME:TTE = 1.0:1.1:3.0 by mol. |
| E-DME-E (E002E) | LiFSI:DME:TTE:EC = 1.0:1.1:3.0:0.2 by mol. |
| E-DME-F (E002F) | LiFSI:DME:TTE:FEC = 1.0:1.1:3.0:0.2 by mol. |

Mechanistic insight to the extraordinary battery performances of E-DME-E and E-DME-F: Due to the lone-pair electrons of oxygen atoms in its structure, DME exhibits a relatively high donor number (20.0), which enables it to readily dissolve and dissociate Li salts. However, the non-coordinated DME present in regular dilute electrolytes can be anodically decomposed at the surface of positive material at relatively low voltages, making it unfavorable for high voltage operations. In addition to the anodic instability, DME in its dilute electrolytes is also incompatible with the Gr anode, which probably originates from the lack of effective SEI formation ability. For these reasons, DME has been conventionally considered as an inappropriate solvent candidate for the electrolytes used in LIBs. However, after making LHCEs comprising DME and adding a certain amount of additive (EC or FEC), excellent cycling and rate performances of Gr∥NMC811 cells can be achieved even at relatively high charge cut-off voltage of 4.4 V (FIGS. 41A-41B). To elucidate the counterintuitive properties of E-DME-E and E-DME-F, comprehensive analyses and simulations, including AIMD simulations, DOSY NMR, XPS, TEM and XRD, were performed, where both E-Baseline and E-DME were employed as benchmark electrolytes.

Figure 56A:
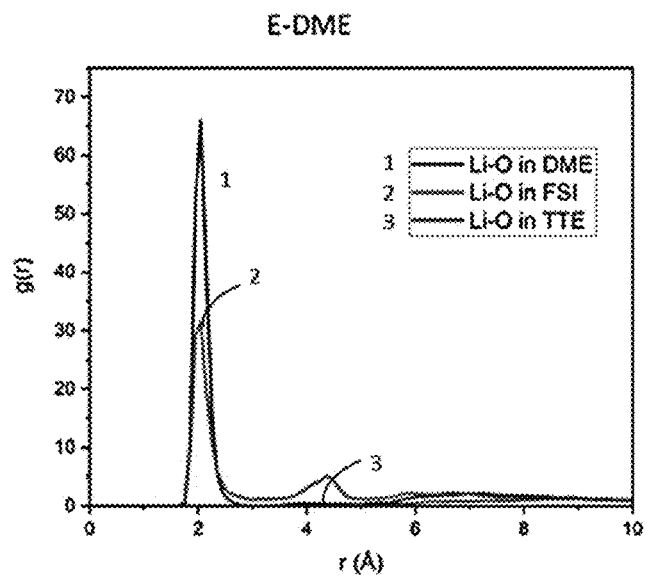
FIGS. 56A-56C show the radial distribution function between Li and O atoms of different molecules in DME-based LHCEs: E-DME (56A), E-DME-E (56B), and E-DME-F (56C).
Figure 56B:
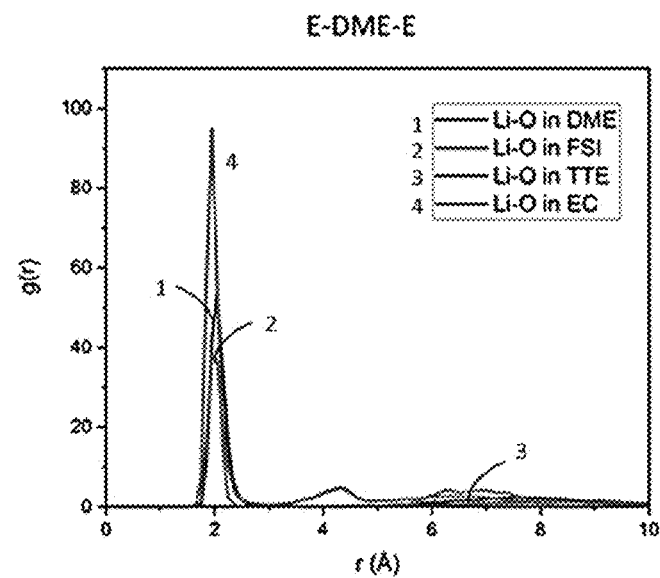
Figure 56C:
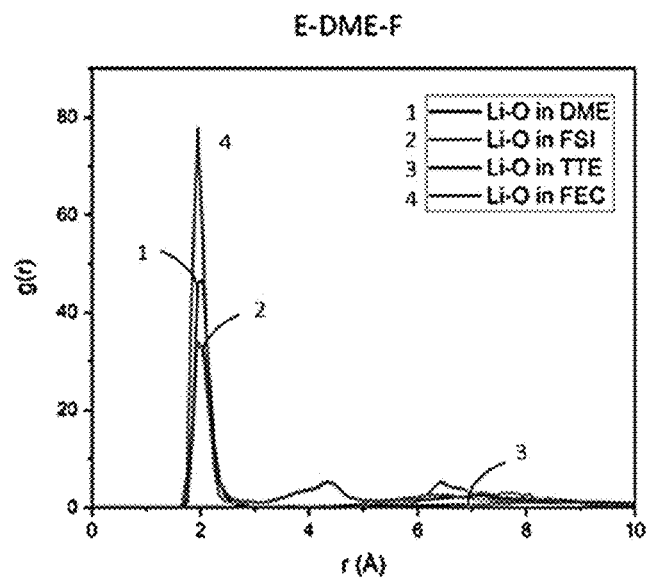

AIMD simulations: It is well acknowledged that the SEI on Gr electrode, being predominant over the electrochemical performances of LIBs, is formed by the decomposition products of electrolyte in the initial cycles. The compositions and properties of the SEI are strongly dependent on the salt anion, solvent, additive, and solvation structure, i.e., the composition and structure of cation solvation sheath of the electrolyte. Therefore, prior to SEI studies, it is indispensable to elucidate the microscopic structure of the electrolyte. The solvation structures of the 1.0-1.2 M LiPF$_6$-organocarbonates electrolytes were well studied. It is generally accepted that the cation solvation sheathes in these electrolytes are primarily comprised of Li$^+$ coordinated by 2-5 cyclic carbonate molecules, such as EC and/or other cyclic carbonate additives in the inner solvation sheath. The solvation structures of the DME-based LHCEs are expected to be different from those of the conventional electrolytes. To elucidate the solvation structures of the DME-based LSEs, AIMD simulations were performed for E-DME, E-DME-E and E-DME-F. AIMD showed that DME and LiFSI tend to form clusters in TTE in E-DME, being consistent with the conclusion drawn in previous publications (Chen et al., *Advanced Materials* 2018, 30(21):1706102). TTE has very weak (if any) affinity to Li$^+$ due to the strong electron withdrawing effect of fluorine (F) atoms in its molecule. After the addition of small portion of additive, EC or FEC, into E-DME, the cluster structures in E-DME are not damaged. Compared with DME, these additives (EC/FEC) show an even stronger affinity to Li$^+$, as the length of Li$^+$→EC/FEC coordination bond is slightly shorter than that of Li$^+$→DME bond, as indicated by the radial distribution function (see FIGS. 56A-56C). The radial distribution function between Li$^+$ and the O atoms of DME, FSI$^-$, TTE, EC and FEC in the E-DME, E-DME-E and E-DME-F electrolytes was obtained from the AIMD simulations. As shown in FIG. 56A, the strong peaks of Li—O(DME) and Li—O(FSI) were observed in E-DME, suggesting that Li$^+$ has a strong affinity with both DME and FSI$^-$ in the ion-sheath cluster. In comparison, Li—O(TTE) did not show any apparent peaks. After the addition of EC (FIG. 56B) or FEC (FIG. 56C) into the E-DME, the strong Li—O(EC or FEC) peaks were observed. Compared with the Li—O(DME), the peak position of Li—O(EC or FEC) peaks was closer to the y-axis, indicating a shorter bond length. In other words, the introduced additives had an even stronger affinity to the Li$^+$ than the DME molecules. According to the simulation results, it can be inferred that the formation of FSI$^-$-Li$^+$-DME(-EC/FEC) clusters are energetically favorable.

Diffusion coefficient determination: To obtain a deeper understanding on the solvation structures, $^1$H, $^{19}$F and $^7$Li DOSY NMR measurements were performed for the four studied electrolytes. The self-diffusion coefficients are summarized in FIGS. 57A-57B.

Figure 57A:
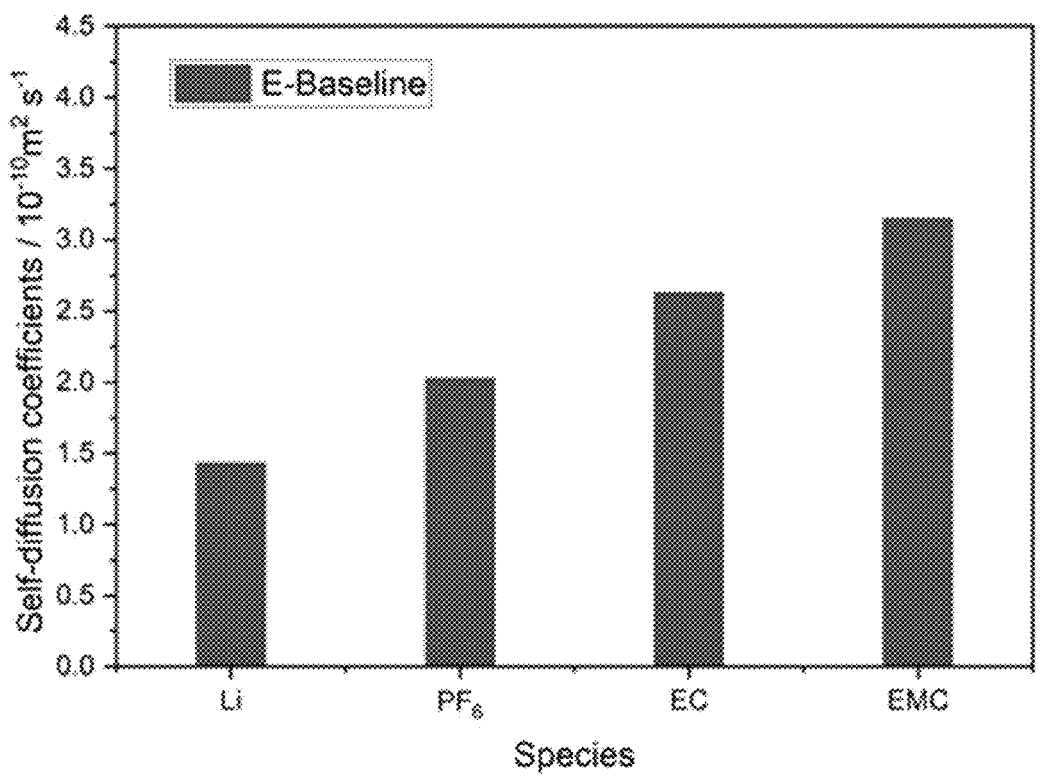
FIGS. 57A-57B show self-diffusion coefficients of different species in the baseline electrolyte (57A) and the electrolytes of FIGS. 56A-56C (57B).
Figure 57B:
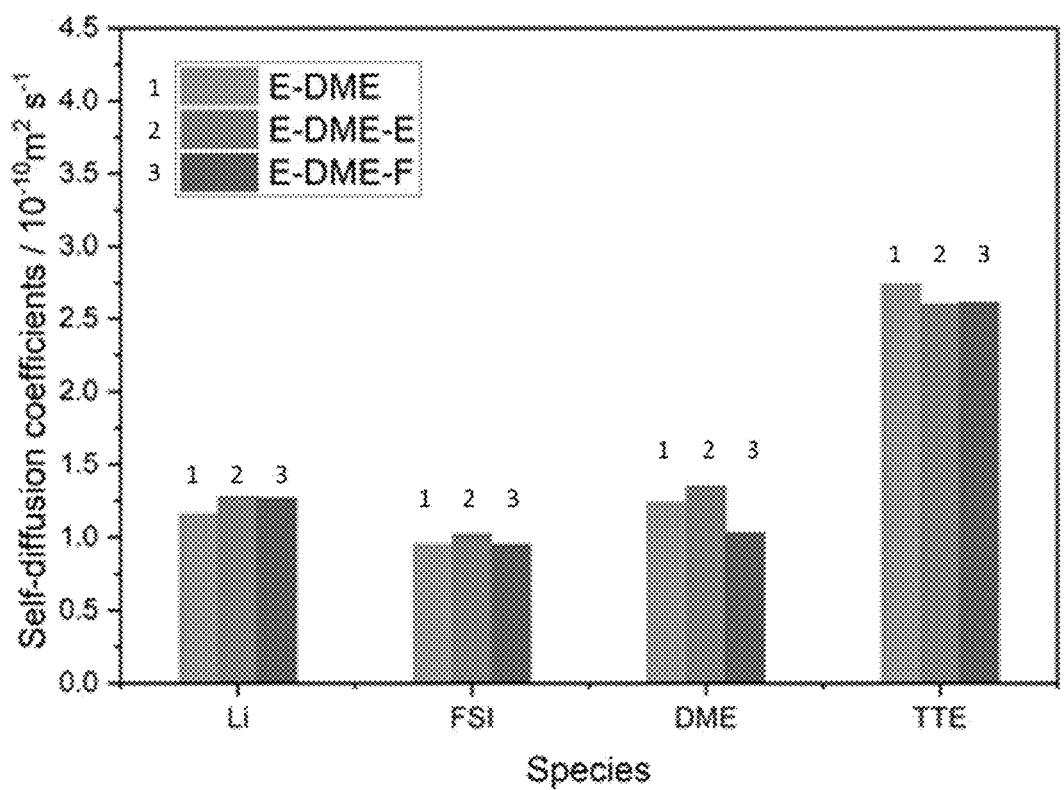

As shown in FIG. 57A, in E-Baseline, the self-diffusion coefficient of the cation is lower than that of the anion, which can be assigned to its larger, more sluggish cation solvation sheath. In the LHCEs (FIG. 57B), the self-diffusion coefficients of Li$^+$, FSI$^-$, DME were relatively similar, implying that the ion sheath clusters are relatively stable, and they mainly migrate as a whole in the LHCEs. However, the interchange between ion clusters also takes place as the diffusion coefficients are not identical. The self-diffusion coefficient of TTE is significantly larger than those of ion sheath cluster constituents, reaffirming that TTE has a relatively low affinity to the ion-sheath clusters and acts as a diluent in the DME-based HCEs. It should be noted that the diffusion coefficients of the additives cannot be accurately quantified, due to their low peak intensities in the spectra. On average, the self-diffusion coefficients of the species in the three DME-based LHCEs were lower than those of E-Baseline, which can be assigned to the higher viscosities of these DME-based LHCEs (FIG. 39A). Based on the self-diffusion coefficients, the transference numbers of E-baseline, E-DME, E-DME-E and E-DME-F were determined as 0.41, 0.55, 0.56 and 0.57, respectively.

Li salt dissociation degree determination: Based on the diffusion coefficients obtained from the DOSY NMR and the ionic conductivities (FIG. 39B), the dissociation degrees of conducting salts in the selected electrolytes can be determined by the modified Nernst-Einstein equation:

$$\sigma = \alpha \frac{Ne^2}{k_B T}(D_+ + D_-)$$

where, $\sigma$ is the measured ionic conductivity; $\alpha$, the dissociation degree; N, the number density of the lithium salt; e, the elementary charge, $k_B$, the Boltzmann constant; T, the temperature; and $D_+$ and $D_-$, the self-diffusion coefficients of cation and anion; respectively (Hayamizu, *Journal of Chemical and Engineering Data* 2012, 57(7):2012-2017).

In the case of the conventional electrolyte, E-Baseline, the dissociation degree was quantified to be 68.8%. In comparison, the dissociation degrees of E-DME, E-DME-E and E-DME-F were determined as 15.5%, 17.7% and 17.9%, respectively, being significantly lower than that of E-Baseline. The dissociation degrees of the studied electrolytes correspond well to the results obtained by AIMD simulations. Since TTE molecules barely participate in the solvation with $Li^+$, the scarcity of solvating molecules (DME) creates a significant proportion (>80%) of non-dissociated ion pairs in DME-based LHCEs. The addition of a small amount of EC or FEC into E-DME can slightly increase the dissociation degree of the LHCEs, due to the increased number of solvating molecules.

Combining the results obtained from AIMD and DOSY NMR, it can be concluded that the solvation structures of DME-based LHCEs are distinctive from that of E-Baseline. In E-Baseline, the solvation sheath is mainly comprised of $Li^+$-$(EC/VC)_n$. In contrast, the solvation sheath is comprised of several $FSI^-$-$Li^+$-$(DME/additive)_n$ clusters in DME-based LHCEs, and most of the $Li^+$-$FSI^-$ exists as non-dissociated ion pair. The addition of a small amount of EC and FEC into DME based LSE changes the composition of the solvation sheath while keeping the unique solvation structure intact.

Influence of the solvation structure on the SEI composition: The SEI formation on Gr is comprised of three consecutive procedures: (1) co-intercalation of the solvation sheath into the graphene layer, (2) expansion of Gr lattice, and (3) decomposition of the solvation sheath. For this reason, the composition and structure of the ion sheath play a highly influential role in the SEI formation on Gr. To study the influence of the unique solvation structure of LHCEs on the SEI formation, the compositions of the SEIs formed in these four electrolytes were systematically analyzed by XPS after three formation cycles and 500 cycles.

Figure 58:
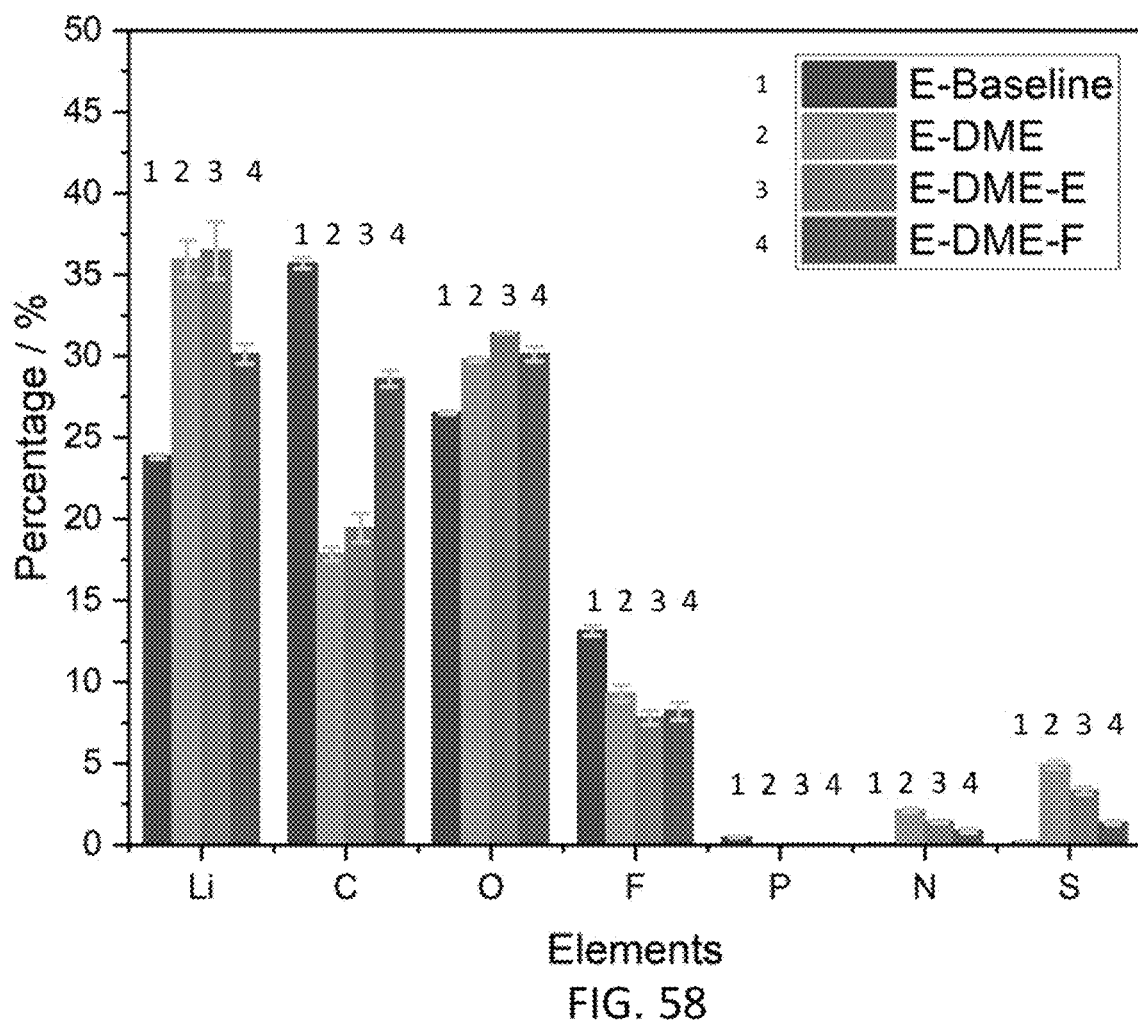
FIG. 58 shows atomic concentrations of elements in the SEIs formed on Gr anodes in the baseline, E-DME, E-DME-E, and E-DME-F electrolytes.

The atomic concentrations of different elements in SEIs after the formation cycles are summarized in FIG. 58. In E-Baseline, the characteristic element of the conducting salt ($LiPF_6$) is phosphorus (P). As determined by XPS, the atomic concentration of P in SEI formed in E-Baseline was lower than 0.5%. It suggests that the anions play a relatively weak role in the formation of SEI in the conventional 1 mol $L^{-1}$ $LiPF_6$-organocarbonates electrolyte, because the dissociated anions are electrostatically repelled by the negative charge of the Gr electrode during the first charge cycle. In comparison, significant amounts of N and S were detected in the SEIs formed in all three DME-based LHCEs. Since more than 80% of Li salt exists as non-dissociated ion pairs in the DME-based LHCEs, the non-dissociated anions also participate in the SEI formation process, which is represented as a significant amount of N and S in the SEIs formed in the DME-based LHCEs. With this, it can be concluded that the unique solvation structure of DME-based LHCEs promotes the participation of anions in the SEI formation process.

Figure 59:
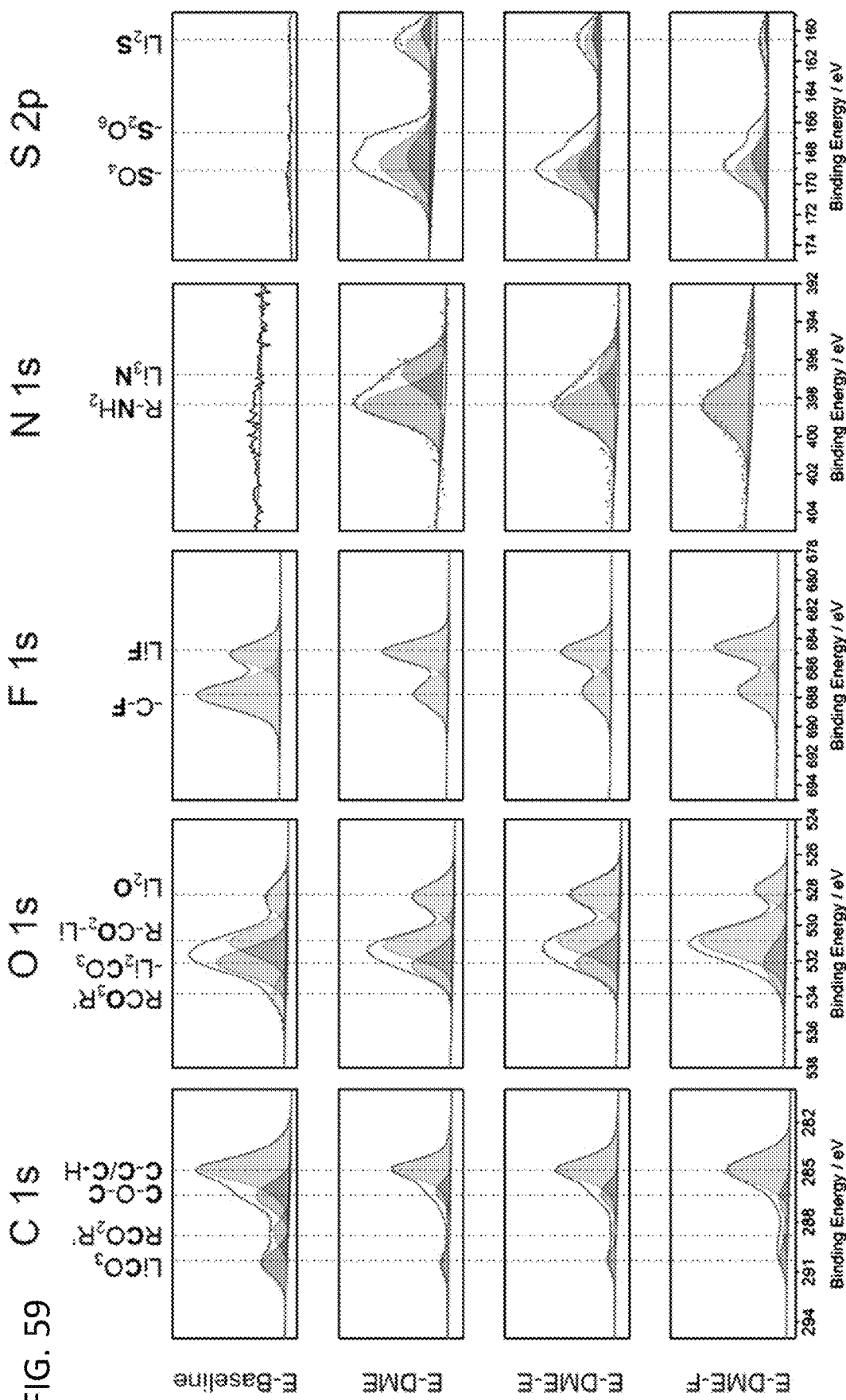
FIG. 59 shows XPS C 1s, O 1s, F 1s, N 1s, and S 2p spectra of SEIs formed on Gr anodes in the baseline, E-DME, E-DME-E, and E-DME-F electrolytes after 3 formation cycles.

The detailed XPS spectra of selected elements in the SEIs formed in the studied electrolytes after formation cycles are shown in FIG. 59. As illustrated in C 1s and O 1s spectra in FIG. 59, the concentration of $Li_2CO_3$ (290.3 eV in C1s spectra and 532.0 eV in O 1s spectra) was significantly higher in E-Baseline SEI than those of LHCE SEIs. In addition, the carbonate esters (R—$CO_3$—R', 533.8 eV in O1s spectra) were detected in the SEI formed in E-baseline, which cannot be detected in SEIs formed in LHCEs. These species mainly originate from the decomposition of $Li^+$-$(EC/VC)_n$ solvation sheath. In the F 1s spectra, two species were identified in all the SEIs: (1) the organic C—F species (at 688.0 eV) and (2) the inorganic LiF species (684.8 eV). The C—F species mainly originate from the PVDF binder and the LiF mainly originates from the Li salt decomposition. Compared with the E-Baseline SEI, the percentages of LiF in LHCE SEIs were significantly higher, which suggests that the anions in DME-based LHCEs play a more active role than in E-Baseline. In the N 1s and S 2p spectra, the decomposition products of the anions were identified as amines, $Li_3N$, sulfates, Li dithionate, and $Li_xS_y$, many of which are highly ionically conductive. As illustrated in FIG. 42, E-DME-E (E002E) cells and E-DME-F (E002F) cells exhibited comparable or even better C-rate performance than the E-Baseline (E268) cells, despite the conductivities of E-DME-E and E-DME-F are significantly lower than that of E-Baseline. The highly ionically conductive species in SEIs identified by XPS are considered to contribute to the excellent C-rate performance of E-DME-E and E-DME-F cells.

Figure 60:
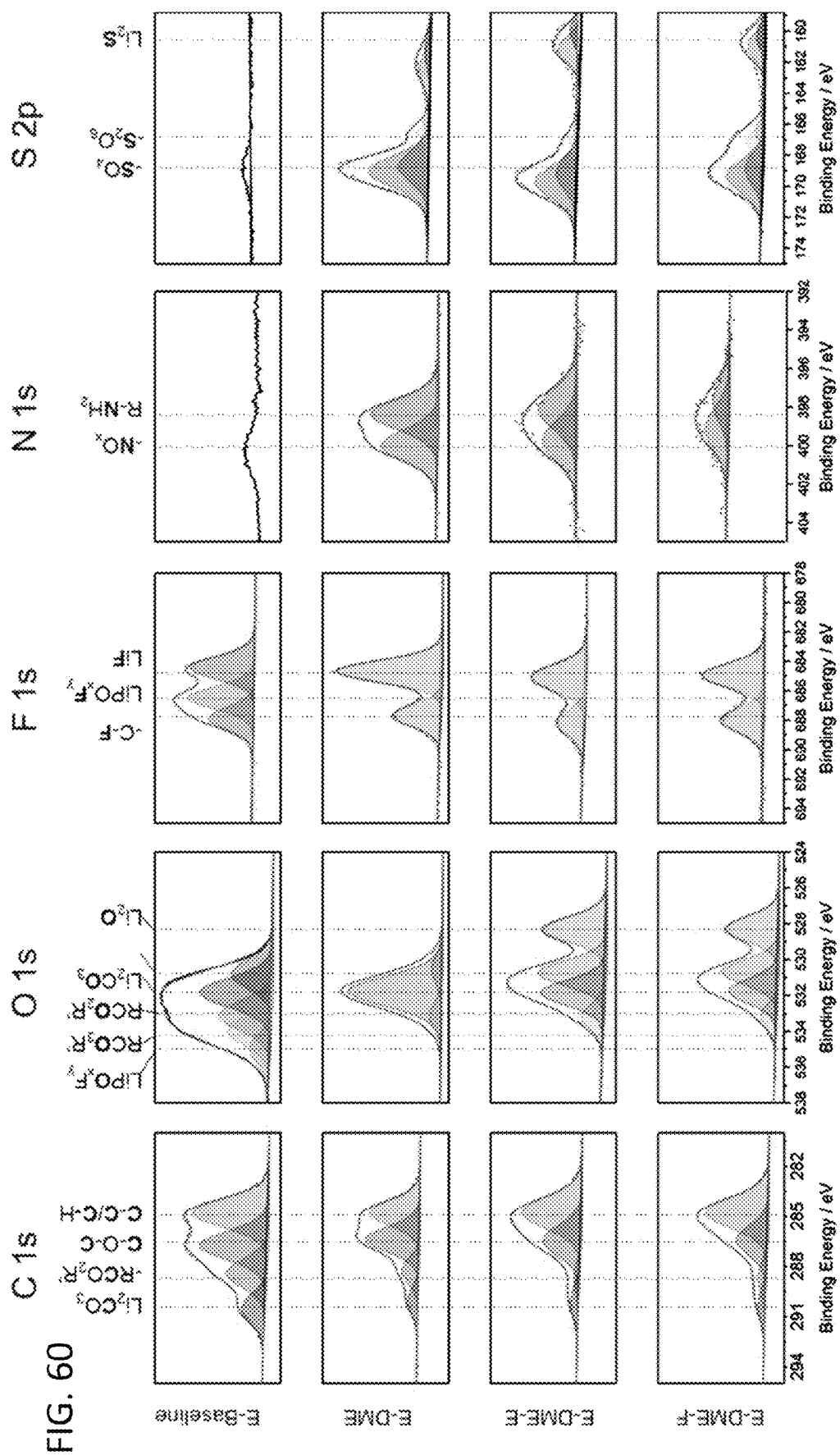
FIG. 60 shows XPS C 1s, O 1s, F 1s, N 1s, and S 2p spectra of SEIs formed on Gr anodes in the baseline, E-DME, E-DME-E, and E-DME-F electrolytes after 500 charge/discharge cycles.

After 500 cycles at C/3 charge and 1C discharge, significant composition change was observed in the SEIs formed in E-Baseline and E-DME (FIG. 60). In the SEI formed in E-baseline, the contents of ether species (—C—O—C—, 286.5 eV in C 1s), $Li_2CO_3$ (290.3 eV in C1s spectra and 532.0 eV in O 1s spectra) and carbonate esters (R—$CO_3$—R', 533.8 eV in O1s spectra) exhibited substantial increase after long-term cycling, which could be assigned to the accumulated decomposition of the electrolyte. New species such as $LiPO_xF_y$ were also detected, which can be assigned to the decomposition of chemically unstable $LiPF_6$ salt. Significant contents increase of ether species (—C—O—C—, 286.5 eV in C 1s), $Li_2CO_3$ (290.3 eV in C1s spectra and 532.0 eV in O 1s spectra) were also observed in the SEI formed in E-DME. After formation cycles, $Li_2O$ was observed in the SEIs formed in E-baseline and E-DME (FIG. 59), however it is not visible after long-term cycling performance evaluation. A probable explanation is that the $Li_2O$ signal is obscured by the propagated SEI.

As for the SEIs formed in E-DME-E and E-DME-F electrolytes after 500 cycles, only minor changes, i.e. slight increases in ether species and the species transformation from $Li_3N$ to $Li_xNO_y$, were observed, while the proportion of other species remained almost the same.

Based on the XPS spectra, it can be concluded that the unique solvation structure of LHCEs facilitates the participation of the anions in the SEI formation process, whereas the SEI in E-Baseline is predominantly comprised of the decomposition products of the solvating solvent. The anion derived decomposition products in LSE SEI possibly contribute to a higher ionic conductivity of the SEI. Meanwhile, the SEIs formed in E-DME-E and E-DME-F are more stable in composition compared with those formed in E-Baseline and E-DME with prolonged cycling.

Morphology evolution of SEI over long-term cycling: After the formation cycles, the morphologies of SEIs formed on Gr electrodes in the studied electrolytes were characterized by TEM. The results are summarized and depicted in FIGS. 61A-D. As illustrated in FIG. 61A, after the formation cycles in E-Baseline, the Gr particle was encapsulated by an SEI layer with the thickness range of 1.5-3.0 nm. In comparison, the Gr particle was covered by a thick and non-uniform SEI of 10.3 nm in E-DME (FIG. 61B). It reaffirms that, although E-DME (E002) (i.e. DME-based LSE without additive) can facilitate the formation of SEI that enables reversible charge/discharge cycling of the Gr||NMC811 cells (FIGS. 40A, 41A), the SEI formation process was achieved at the cost of significant amount of electrolyte decomposition and active Li loss. In addition, certain degrees of Gr exfoliation were observed (marked by yellow dash lines in FIG. 61B). Both the thick SEI and the partial Gr exfoliation indicated that the SEI formed in E-DME was not sufficiently effective. For this reason, the specific capacity of E-DME based cells merely amounted to 142.8 mAh g$^{-1}$ after three formation cycles, as illustrated in FIG. 40A. However, after the introduction of an additive, EC or FEC into E-DME, the morphology of the SEI was effectively improved. In the case of E-DME-E, an ultrathin (about 1.2 nm, FIG. 61C) and uniform SEI was formed on Gr particles after three formation cycles. In the case of E-DME-F, the SEI thickness was slightly thicker (4.0 nm, FIG. 61D). Unlike in the additive-free electrolyte E-DME, Gr particles did not exhibit partial exfoliation in E-DME-E and E-DME-F after formation cycles. Consequently, the irretrievable capacity losses of E-DME-E and E-DME-F cells in the first formation cycle was substantially reduced (FIGS. 40A and 40B). Evidently, the morphology of the SEI is significantly influenced by the electrolyte additive.

It is well accepted that the SEI evolution in LIBs is the major "culprit" accountable for the capacity decay of LIBs. For this reason, follow-up studies on SEI evolution over long-term cycling are indispensable to the understanding how the selected electrolytes influence the cycle life of Gr||NMC811 cells. After 500 charge/discharge cycles, postmortem TEM measurements were performed for the Gr particles retrieved from the Gr||NMC811 cells. As revealed in FIG. 61E, the thickness of SEI increased significantly by ~10 nm in E-Baseline, which is possibly the major contributor to the relatively rapid capacity decay of E-Baseline cells. In the case of E-DME, the thickness growth was not as severe as that in E-baseline. However, as illustrated in FIG. 61F, the partial exfoliation of Gr particles (marked by yellow dash lines) aggravated over long-term cycling. Similarly, partial exfoliation was also observed in E-DME-E cells (FIG. 61G). The gradually aggravated partial exfoliation is assumed to be the reason behind the gradual capacity increase of E-DME (E002) and E-DME-E (E002E) cells upon cycling for certain cycles, as shown in FIG. 41A. To study the degree of the Gr exfoliation after long term cycling, XRD were performed for the of the graphite particles retrieved from the cells. The XRD patterns of the powders were obtained by loading them into thin-walled glass capillaries (0.5 mm diameter, Charles Supper Co., MA). These were mounted into a Rigaku D-Max Rapid II micro-diffractometer equipped with a rotating Cr anode ($\lambda$=2.2910 Å). The X-rays generated passed through a collimator 300 μm in diameter onto a portion of the sample and the diffracted signal recorded on a 2D image plate during a 10-minute exposure. The 2D signal was subsequently integrated between 10 and 150° 2θ to give conventional 1 D diffraction traces. As shown in FIGS. 62A-62B, no apparent difference in XRD patterns was observed for the Gr particles after 500 charge/discharge cycles in the four studied electrolytes, despite partial exfoliation confirmed by TEM in E-DME and E-DME-E samples. It should be noted that TEM takes a relatively local perspective whereas XRD takes a global perspective. If the partial exfoliation only occurs in some parts on Gr particle, the change in the crystal structure may be lower than the detection limit of XRD. This confirmed that exfoliation only occurs in a small proportion of Gr particles and the change in the crystal structure is lower than the detection limit of XRD. In contrast, the SEI formed in E-DME-F was highly effective against solvent co-intercalation and partial Gr exfoliation, and the thickness of this SEI only increased by 2 nm after 500 cycles (FIG. 61H). For this reason, E-DME-F cells exhibited excellent capacity retention after the long-term cycling performance.

With this, it can be concluded that the composition of the solvation sheath (tuned by additives), plays a highly influential role in SEI formation process as well as the evolutions of SEIs in LHCEs. The SEI formed in E-DME-F is the most effective one as it protects the Gr particles not only from exfoliation but also the parasitic reactions at the interface between electrolyte and SEI.

Influence of electrolyte on cathode material: The compatibility of the DME-based electrolytes with the cathode materials should also be considered. According to the previous publications, the E-DME exhibits excellent anodic stability with NMC electrode in Li metal batteries (Ren et al., *Joule* 2019, 3(7):1662-1676). To verify this, the anodic stability windows of the studied electrolytes were evaluated in Li||LiMn$_2$O$_4$ according to literature (Kasnatscheew et al., *Physical Chemistry Chemical Physics* 2017, 19(24):16078-16086). The anodic stabilities of the E-Baseline, E-DME, E-DME-E and E-DME-F were determined as 4.7, 4.6, 4.6 and 4.6 V, respectively (FIG. 63), suggesting that the studied electrolytes are expected to be anodically stable against NMC811 at the cut-off voltage of 4.4 V. It was confirmed by the XPS spectra of NMC materials that the decompositions of the selected electrolytes on NMC811 were not severe, even after 500 charge/discharge cycles.

To obtain a deeper understanding of the interaction between the NMC811 cathode and the selected electrolytes, TEM images were taken for the NMC811 electrodes after formation cycles and long-term cycling performance evaluations. The results are summarized in FIGS. 64A-64H. After the formation cycles, a rock-salt layer of transition metal oxide can be observed in all the NMC811 samples (FIGS. 64A-64D). The phase transition of NMC811 from a layered structure to a rock-salt structure is considered to originate from the intrinsic structural instability of the cathode material at relatively high delithiation state. Such process can be catalyzed by the acidic impurities in the electrolyte. After 500 charge/discharge cycles, the thickness of rock-salt layer of NMC811 in E-baseline propagated to more than 20 nm (see FIGS. 64A, 64E). A mixed layer of small crystalline domains and amorphous species was also observed on top of the rock-salt layer (FIG. 64E). It is widely accepted that the LiPF$_6$ can readily lead to the generation of acidic species of HF in electrolytes, which accounts for the severe NMC811 degradation (Jia et al., *Chemistry of Materials* 2019, 31(11): 4025-4033).

In comparison, E-DME and E-DME-E samples exhibited negligible structure changes after 500 charge/discharge cycles (FIGS. 64B, 64F, and FIGS. 64C, 64G, respectively). The difference could be probably assigned to the better chemical stability of LiFSI than LiPF$_6$. However, NMC811 cycled in E-DME-F also exhibited significant phase transition, as a significant proportion of the material changed from layer structure to rock-salt structure (FIG. 64H). The reason could be assigned to the presence of FEC in the electrolyte. It was considered that FEC could also lead to the formation of HF in the electrolyte, which in turn facilitates the phase transition of NMC811. Despite that the phase transition from layered structure to rock-salt structure leads to the increased impedance of the cell, E-DME-F still achieved an excellent cycling performance in Gr∥NMC811 cells, which could be probably assigned to the fact that the beneficial effects of FEC on the Gr SEI overweighs its negative impact on the cathode material.

Conclusions: In this work, the concept of LHCE was adopted to develop DME-based electrolytes for Gr∥NMC811 cells operated at a charge cut-off voltage of 4.4 V. Compared with cells using a typical LiPF$_6$-oragnocarbonates electrolyte (E-Baseline), cells using E-DME-E (with EC as additive) and E-DME-F (with FEC as additive) exhibited superior long-term cycling performance and comparable C-rate performance. As revealed by the mechanistic studies, the DME-based LHCEs exhibited distinctive solvation structures, in which several LiFSI salt molecules and DME/additive molecules form a cluster as the solvation sheath and most of the LiFSI molecules in the cluster exist as non-dissociated ion pairs. Such salt-solvent/additive clusters promote the participation of salt anions in the SEI formation process. The resulting SEIs can enable long-term charge/discharge cycles. In addition, the lack of free DME molecules in DME-based LHCEs extends the anodic stability of these electrolytes.

A highly beneficial synergetic effect was observed between the electrolyte additive and the unique solvation structure of DME-based LHCEs. The addition of a small amount of electrolyte additives, such as EC and FEC, does not change the unique solvation structure of LHCEs. However, the additives effectively suppress active Li loss in the formation cycles, improve the C-rate performance and extend the cycle life of Gr∥NMC cells. Among all the studied electrolytes, E-DME-F is considered to be the most promising electrolyte, because a highly effective SEI is formed by the synergy between FEC and the solvation structure. The SEI exhibited extremely low growth rate over long-term cycling performance evaluation as well as effectively suppressed partial exfoliation of Gr particles. Consequently, the Gr∥NMC811 cells achieved an excellent capacity retention of 86.8% after 500 charge/discharge cycles. Based on these findings, it was demonstrated that, by tuning the structure and composition of the solvation sheath, an ether solvent that was conventionally considered to be incompatible with Gr electrode and unstable above 4 V can be engineered as an appropriate solvent for electrolytes that enable long cycle life and high rate capability of Gr-based, high-voltage LIBs (Gr∥NMC811 cells charged to 4.4V).

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. An electrolyte, consisting essentially of:
   a lithium salt;
   a nonaqueous solvent selected from
      (i) an ester, wherein the ester is dimethyl carbonate (DMC), ethyl methyl carbonate (EMC), diethyl carbonate (DEC), ethylene carbonate (EC), propylene carbonate (PC), difluoroethylene carbonate (DFEC), trifluoroethylene carbonate (TFEC), trifluoropropylene carbonate (TFPC), methyl 2,2,2-trifluoroethyl carbonate (MFEC), ethyl acetate, ethyl propionate, methyl butyrate, ethyl trifluoroacetate, 2,2,2-trifluoroethyl acetate, 2,2,2-trifluoroethyl trifluoroacetate, or any combination thereof,
      (ii) a phosphorus-containing solvent, wherein the phosphorus-containing solvent is trimethyl phosphate (TMPa), triethyl phosphate (TEPa), tributyl phosphate, triphenyl phosphate, trimethyl phosphite, triphenyl phosphite, tris(2,2,2-trifluoroethyl) phosphite, dimethyl methylphosphonate, diethyl ethylphosphonate, diethyl phenylphosphonate, bis(2,2,2-trifluoroethyl) methylphosphonate, hexamethylphosphoramide, hexamethoxyphosphazene (cyclotris(dimethoxyphosphonitrile), hexamethoxycyclotriphosphazene), hexafluorophosphazene (hexafluorocyclotriphosphazene), or any combination thereof,
      (iii) an ether,
      (iv) a nitrile,
      or any combination thereof, wherein the lithium salt is soluble in the nonaqueous solvent;
   a diluent selected from a fluoroalkyl ether, a fluorinated orthoformate, a fluorinated carbonate, a fluorinated borate, or a combination thereof, wherein the lithium salt has a solubility in the diluent at least 10 times less than a solubility of the lithium salt in the nonaqueous solvent; and
   an additive having a different composition than the lithium salt, a different composition than the nonaqueous solvent, and a different composition than the diluent, wherein the additive is EC, fluoroethylene carbonate (FEC), vinylene carbonate (VC), 4-vinyl-1,3-dioxolan-2-one (vinyl ethylene carbonate, VEC), 4-methylene-1,3-dioxolan-2-one (4-methylene ethylene carbonate, MEC), 4,5-dimethylene-1,3-dioxolan-2-one, prop-1-ene-1,3-sultone (PES), 1,3,2-dioxathiolane-2-oxide, 1,3,2-dioxathiolane-2,2-dioxide, 1,3,2-dioxathiane-2,2-dioxide (DTD), lithium 2-trifluoromethyl-4,5-dicyanoimidazole (LiTDI), LiDFOB), lithium hexafluorophosphate, 3-methyl-,4,2-dixoazol-5-one (MDO), tris(2,2,2-trifluoroethyl) phosphite (TTFEPi), 2-oxo-1,3,2-dioxathiane, butanedinitrile, pentanedinitrile, hexanedinitrile, tris(pentafluorophenyl) phosphine, 1-methylsulfonylethene, 1-ethenylsulfonylethane, or any combination thereof,
   the electrolyte having a lithium salt-nonaqueous solvent-additive-diluent molar ratio of 1:x:y:z where 0.5≤x≤5, 0≤y≤1, and 0.5≤z≤5.

2. The electrolyte of claim 1, wherein the lithium salt comprises lithium bis(fluorosulfonyl)imide (LiFSI), lithium bis(trifluoromethanesulfonyl)imide (LiTFSI), lithium (fluorosulfonyl)(trifluoromethylsulfonyl)imide (LiFTFSI), lithium bis(pentafluoroethanesulfonyl)imide (LiBETI), lithium trifluoromethanesulfonate (LiTf), lithium bis(oxalato)borate (LiBOB), $LiPF_6$, $LiAsF_6$, $LiBF_4$, $LiCF_3SO_3$, $LiClO_4$, lithium difluoro(oxalato)borate (LiDFOB), LiI, LiBr, LiCl, LiSCN, $LiNO_3$, $LiNO_2$, $Li_2SO_4$, or any combination thereof.

3. The electrolyte of claim 1, wherein the nonaqueous solvent comprises DMC, EMC, DEC, EC, PC, DFEC, TFEC, TFPC, MFEC, ethyl acetate, ethyl propionate, methyl butyrate, ethyl trifluoroacetate, 2,2,2-trifluoroethyl acetate, 2,2,2-trifluoroethyl trifluoroacetate, dimethyl sulfone (DMS), TMPa, TEPa, tributyl phosphate, triphenyl phosphate, trimethyl phosphite, triphenyl phosphite, tris(2,2,2-trifluoroethyl) phosphite, dimethyl methylphosphonate, diethyl ethylphosphonate, diethyl phenylphosphonate, bis(2,2,2-trifluoroethyl) methylphosphonate, hexamethylphosphoramide, hexamethoxyphosphazene (cyclo-tris(dimethoxyphosphonitrile), hexamethoxycyclotriphosphazene), hexafluorophosphazene (hexafluorocyclotriphosphazene), 1,2-dimethoxyethane (DME), diethylene glycol dimethyl ether (diglyme), triethylene glycol dimethyl ether (triglyme), tetraethylene glycol dimethyl ether (tetraglyme), 1,3-dioxolane (DOL), allyl ether, acetonitrile, propionitrile, or any combination thereof.

4. The electrolyte of claim 1, wherein:
(i) the additive comprises EC, FEC, VC, or a combination thereof; or
(ii) y is 0.1-0.5; or
(iii) both (i) and (ii).

5. The electrolyte of claim 1, wherein:
the nonaqueous solvent comprises a carbonate other than EC, FEC, or VC; and
the additive comprises 2 wt % to 10 wt % FEC and 0.1 wt % to 2 wt % VC.

6. The electrolyte of claim 1, wherein the diluent comprises 1,1,2,2-tetrafluoroethyl-2,2,3,3-tetrafluoropropyl ether (TTE), bis(2,2,2-trifluoroethyl) ether (BTFE), 1H,1H,5H-octafluoropentyl 1,1,2,2-tetrafluoroethyl ether (OTE), 1,2,2,2-tetrafluoroethyl trifluoromethyl ether, heptafluoroisopropyl methyl ether, tris(2,2,2-trifluoroethyl)orthoformate (TFEO), bis(2,2,2-trifluoroethyl carbonate), tris(2,2,2-trifluoroethyl) borate, or any combination thereof.

7. The electrolyte of claim 1, wherein the nonaqueous solvent comprises DMC, DME, TMS, TMPa, TEPa, or any combination thereof.

8. The electrolyte of claim 7, wherein:
(i) the lithium salt comprises LiFSI; or
(ii) the diluent comprises TTE, BTFE, OTE, or any combination thereof; or
(iii) the additive comprises EC, FEC, VC, or any combination thereof; or
(iv) any combination of (i), (ii), and (iii).

9. The electrolyte of claim 1, wherein $0.5 \leq x+y \leq 4.5$.

10. The electrolyte of claim 1, wherein:
x=0.5 to 3.5;
y=0.01 to 0.8; and
z=1 to 4.

11. The electrolyte of claim 1, wherein:
(i) y=0.15 to 0.25; or
(ii) x+y=2 to 3; or
(iii) both (i) and (ii).

12. The electrolyte of claim 1, wherein:
x=1.6 to 2.8;
y=0.2 to 0.6;
x+y=2.2 to 3.0; and
z=3.

13. A battery system, comprising:
an electrolyte according to claim 1;
an anode, where the anode is a carbon-based anode, a silicon-based anode, or a silicon/carbon composite-based anode; and
a cathode.

14. The battery system of claim 13, wherein the cathode comprises $Li_{1+w}Ni_xMn_yCo_zO_2$ (x+y+z+w=1, $0 \leq w \leq 0.25$), $LiNi_xMn_yCo_zO_2$ (x+y+z=1), $LiCoO_2$, $LiNi_{0.8}Co_{0.15}Al_{0.05}O_2$, $LiNi_{0.5}Mn_{1.5}O_4$ spinel, $LiMn_2O_4$, $LiFePO_4$, $Li_{4-x}M_xTi_5O_{12}$ (M=Mg, Al, Ba, Sr, or Ta; $0 \leq x \leq 1$), $MnO_2$, $V_2O_5$, $V_6O_{13}$, $LiV_3O_8$, $LiM^{C1}_xM^{C2}_{1-x}PO_4$ ($M^{C1}$ or $M^{C2}$=Fe, Mn, Ni, Co, Cr, or Ti; $0 \leq x \leq 1$), $Li_3V_{2-x}M^1_x(PO_4)_3$ ($M^1$=Cr, Co, Fe, Mg, Y, Ti, Nb, or Ce; $0 \leq x \leq 1$), $LiVPO_4F$, $LiM^{C1}_xM^{C2}_{1-x}O_2$ (($M^{C1}$ and $M^{C2}$ independently are Fe, Mn, Ni, Co, Cr, Ti, Mg, or Al; $0 \leq x \leq 1$), $LiM^{C1}_xM^{C2}_yM^{C3}_{1-x-y}O_2$ (($M^{C1}$, $M^{C2}$, and $M^{C3}$ independently are Fe, Mn, Ni, Co, Cr, Ti, Mg, or Al; $0 \leq x \leq 1$; $0 \leq y \leq 1$), $LiMn_{2-y}X_yO_4$ (X=Cr, Al, or Fe, $0 \leq y \leq 1$), $LiNi_{0.5-y}X_yMn_{1.5}O_4$ (X=Fe, Cr, Zn, Al, Mg, Ga, V, or Cu; $0 \leq y < 0.5$), $xLi_2MnO_3 \cdot (1-x)LiM^{C1}_yM^{C2}_zM^{C3}_{1-y-z}O_2$ ($M^{C1}$, $M^{C2}$, and $M^{C3}$ independently are Mn, Ni, Co, Cr, Fe, or mixture thereof; x=0.3-0.5; $y \leq 0.5$; $z \leq 0.5$), $Li_2M^2SiO_4$ ($M^2$=Mn, Fe, or Co), $Li_2M^2SO_4$ ($M^2$=Mn, Fe, or Co), $LiM^2SO_4F$ ($M^2$=Fe, Mn, or Co), $Li_{2-x}(Fe_{1-y}Mn_y)P_2O_7$ ($0 \leq y \leq 1$), $Cr_3O_8$, $Cr_2O_5$, a carbon/sulfur composite, or an air electrode.

15. The battery system of claim 13, wherein:
the cathode comprises $LiNi_xMn_yCo_zO_2$ where $x \geq 0.6$ or $LiNi_xMg_yTi_{1-x-y}O_2$ where $0.9 \leq x < 1$; and
the anode is a graphite-based anode, a silicon-based anode, a silicon/graphite composite-based anode comprising 10 wt % to 90 wt % graphite and 5 wt % to 90 wt % silicon, or a silicon/graphite composite anode comprising carbon-coated silicon with a carbon content of 5 wt % to 55 wt %.

16. The battery system of claim 13, wherein the battery system exhibits:
(i) a first cycle Coulombic efficiency of at least 75%; or
(ii) an average Coulombic efficiency of at least 98% over 500 cycles at 25° C. after three formation cycles; or
(iii) an average Coulombic efficiency of at least 99.7% after 200 cycles; or
(iv) a capacity retention of at least 85% after 500 cycles at 25° C. compared to the first cycle after three formation cycles; or
(v) a capacity retention of at least 90% from $350^{th}$ cycle to $500^{th}$ cycle; or
(vi) any combination of (i), (ii), (iii), (iv), and (v).

17. The battery system of claim 13, wherein:
the lithium salt comprises LiFSI;
the nonaqueous solvent comprises DME, DMC, TMPa, or TMS;
the diluent comprises TTE or OTE; and
the additive comprises VC, EC, FEC, or any combination thereof.

18. The battery system of claim 13, wherein:
(i) the battery system is operable at a voltage 2.5 V to 4.5 V; or
(ii) the battery system is operable over a temperature range of from −30° C. to 60° C.; or
(iii) both (i) and (ii).

19. An electrolyte, comprising:
a lithium salt;
a nonaqueous solvent consisting essentially of dimethyl carbonate (DMC), ethyl methyl carbonate (EMC), diethyl carbonate (DEC), ethylene carbonate (EC), propylene carbonate (PC), difluoroethylene carbonate (DFEC), trifluoroethylene carbonate (TFEC), trifluoropropylene carbonate (TFPC), methyl 2,2,2-trifluoroethyl carbonate (MFEC), ethyl acetate, ethyl propionate, methyl butyrate, ethyl trifluoroacetate, 2,2,2-trifluoroethyl acetate, 2,2,2-trifluoroethyl trifluoroacetate, trimethyl phosphate (TMPa), triethyl phosphate (TEPa), tributyl phosphate, triphenyl phosphate, trimethyl phosphite, triphenyl phosphite, tris(2,2,2-trifluoroethyl) phosphite, dimethyl methylphosphonate, diethyl ethylphosphonate, diethyl phenylphosphonate, bis(2,2,2-trifluoroethyl) methylphosphonate, hexamethylphosphoramide, hexamethoxyphosphazene (cyclo-tris(dimethoxyphosphonitrile), hexamethoxycyclotriphosphazene), hexafluorophosphazene (hexafluorocyclotriphosphazene), an ether, a nitrile, or any combination thereof, wherein the lithium salt is soluble in the nonaqueous solvent;

a diluent comprising a fluoroalkyl ether, a fluorinated orthoformate, a fluorinated carbonate, a fluorinated borate, or a combination thereof, wherein the lithium salt has a solubility in the diluent at least 10 times less than a solubility of the lithium salt in the nonaqueous solvent; and an additive having a different composition than the lithium salt, a different composition than the nonaqueous solvent, and a different composition than the diluent, the additive consisting essentially of EC, fluoroethylene carbonate (FEC), vinylene carbonate (VC), 4-vinyl-1,3-dioxolan-2-one (vinyl ethylene carbonate, VEC), 4-methylene-1,3-dioxolan-2-one (4-methylene ethylene carbonate, MEC), 4,5-dimethylene-1,3-dioxolan-2-one, lithium 2-trifluoromethyl-4,5-dicyanoimidazole (LiTDI), LiDFOB), lithium hexafluorophosphate, 3-methyl-,4,2-dixoazol-5-one (MDO), tris(2,2,2-trifluoroethyl) phosphite (TTFEPi), 2-oxo-1,3,2-dioxathiane, butanedinitrile, pentanedinitrile, hexanedinitrile, tris(pentafluorophenyl) phosphine, 1-methylsulfonylethene, 1-ethenylsulfonylethane, or any combination thereof, the electrolyte having a lithium salt-nonaqueous solvent-additive-diluent molar ratio of 1:x:y:z where $0.5 \leq x \leq 5$, $0 \leq y \leq 1$, and $0.5 \leq z \leq 5$.

20. An electrolyte, comprising:

a lithium salt;

a nonaqueous solvent selected from dimethyl carbonate (DMC), ethyl methyl carbonate (EMC), diethyl carbonate (DEC), ethylene carbonate (EC), propylene carbonate (PC), difluoroethylene carbonate (DFEC), trifluoroethylene carbonate (TFEC), trifluoropropylene carbonate (TFPC), methyl 2,2,2-trifluoroethyl carbonate (MFEC), ethyl acetate, ethyl propionate, methyl butyrate, ethyl trifluoroacetate, 2,2,2-trifluoroethyl acetate, 2,2,2-trifluoroethyl trifluoroacetate, a sulfur-containing solvent, trimethyl phosphate (TMPa), triethyl phosphate (TEPa), tributyl phosphate, triphenyl phosphate, trimethyl phosphite, triphenyl phosphite, tris(2,2,2-trifluoroethyl) phosphite, dimethyl methylphosphonate, diethyl ethylphosphonate, diethyl phenylphosphonate, bis(2,2,2-trifluoroethyl) methylphosphonate, hexamethylphosphoramide, hexamethoxyphosphazene (cyclo-tris(dimethoxyphosphonitrile), hexamethoxycyclotriphosphazene), hexafluorophosphazene (hexafluorocyclotriphosphazene), an ether, a nitrile, or any combination thereof, wherein the lithium salt is soluble in the nonaqueous solvent, and wherein the solvent does not comprise a solvent other than those listed in an amount >1 wt %;

a diluent comprising 1,1,2,2-tetrafluoroethyl-2,2,3,3-tetrafluoropropyl ether (TTE), bis(2,2,2-trifluoroethyl) ether (BTFE), 1 H,1 H,5H-octafluoropentyl 1,1,2,2-tetrafluoroethyl ether (OTE), 1,2,2,2-tetrafluoroethyl trifluoromethyl ether, heptafluoroisopropyl methyl ether, tris(2,2,2-trifluoroethyl)orthoformate (TFEO), bis(2,2,2-trifluoroethyl carbonate), tris(2,2,2-trifluoroethyl) borate, or any combination thereof, wherein the lithium salt has a solubility in the diluent at least 10 times less than a solubility of the lithium salt in the nonaqueous solvent; and an additive having a different composition than the lithium salt, a different composition than the nonaqueous solvent, and a different composition than the diluent, wherein the additive comprises EC, fluoroethylene carbonate (FEC), vinylene carbonate (VC), 4-vinyl-1,3-dioxolan-2-one (vinyl ethylene carbonate, VEC), 4-methylene-1,3-dioxolan-2-one (4-methylene ethylene carbonate, MEC), 4,5-dimethylene-1,3-dioxolan-2-one, prop-1-ene-1,3-sultone (PES), 1,3,2-dioxathiolane-2-oxide, 1,3,2-dioxathiolane-2,2-dioxide, 1,3,2-dioxathiane-2,2-dioxide (DTD), lithium 2-trifluoromethyl-4,5-dicyanoimidazole (LiTDI), LiDFOB), lithium hexafluorophosphate, 3-methyl-,4,2-dixoazol-5-one (MDO), tris(2,2,2-trifluoroethyl) phosphite (TTFEPi), 2-oxo-1,3,2-dioxathiane, butanedinitrile, pentanedinitrile, hexanedinitrile, tris(pentafluorophenyl) phosphine, 1-methylsulfonylethene, 1-ethenylsulfonylethane, or any combination thereof, the electrolyte having a lithium salt-nonaqueous solvent-additive-diluent molar ratio of 1:x:y:z where $0.5 \leq x \leq 5$, $0 \leq y \leq 1$, and $0.5 \leq z \leq 5$.

\* \* \* \* \*